US011448543B2

(12) United States Patent
Yamaguchi et al.

(10) Patent No.: US 11,448,543 B2
(45) Date of Patent: Sep. 20, 2022

(54) QUANTITY MEASUREMENT DEVICE WITH DETECTION UNIT CONTACTING HOUSING

(71) Applicant: DENSO CORPORATION, Kariya (JP)

(72) Inventors: Junzo Yamaguchi, Kariya (JP); Noboru Kitahara, Kariya (JP); Hiroshi Tagawa, Kariya (JP); Masaki Inoue, Kariya (JP); Hiroyuki Akuzawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 16/749,485

(22) Filed: Jan. 22, 2020

(65) Prior Publication Data

US 2020/0158547 A1    May 21, 2020

Related U.S. Application Data

(63) Continuation of application No. PCT/JP2018/025181, filed on Jul. 3, 2018.

(30) Foreign Application Priority Data

Jul. 24, 2017  (JP) .............................. JP2017-142855
Dec. 25, 2017  (JP) .............................. JP2017-247428

(51) Int. Cl.
*G01F 15/02*  (2006.01)
*G01K 13/02*  (2021.01)
(Continued)

(52) U.S. Cl.
CPC ..... *G01F 15/022* (2013.01); *F02M 35/10386* (2013.01); *G01F 1/68* (2013.01);
(Continued)

(58) Field of Classification Search
CPC .. G01F 1/68–699; G01F 15/18; G01F 15/185; F02M 35/10386; G01K 13/02; G01K 13/024
See application file for complete search history.

(56) References Cited

U.S. PATENT DOCUMENTS 5,631,416 A * 5/1997 Rilling ..................... G01F 1/684
73/204.22
5,780,735 A 7/1998 Kadohiro et al.
(Continued)

FOREIGN PATENT DOCUMENTS

DE  20 2008 007 291   10/2008
JP       01/61282     8/2001
(Continued)

OTHER PUBLICATIONS

U.S. Appl. No. 16/749,504 to Yamaguchi et al., titled "Physical Quantity Measurement Device and Measurement Control Device", filed Jan. 22, 2020 (290 pages).

*Primary Examiner* — Justin N Olamit
(74) *Attorney, Agent, or Firm* — Nixon & Vanderhye P.C.

(57) ABSTRACT

A physical quantity measurement device measures a physical quantity of a fluid. A detection unit has a physical quantity detector that detects a physical quantity of the fluid in a measurement flow channel. A housing accommodates at least a part of the detection unit and forms the measurement flow channel. The housing includes a housing attachment that is attached to a predetermined attaching target, and a position holder holding a position of the detection unit by contacting the detection unit. The housing includes an inward part positioned inward of the attaching target and an outward part positioned outward of the attaching target. The position holder is provided inward of the housing attachment in an alignment direction along which the inward part and the outward part are aligned.

11 Claims, 105 Drawing Sheets

(51) Int. Cl.
  *G01F 1/68* (2006.01)
  *G01F 5/00* (2006.01)
  *F02M 35/10* (2006.01)
  *G01F 1/684* (2006.01)
  *G01F 1/696* (2006.01)
  *G01F 15/14* (2006.01)
  *G01F 15/16* (2006.01)
  *G01F 15/18* (2006.01)
  *G01K 13/024* (2021.01)

(52) U.S. Cl.
  CPC .......... *G01F 1/6847* (2013.01); *G01F 1/6965* (2013.01); *G01F 5/00* (2013.01); *G01F 15/14* (2013.01); *G01F 15/16* (2013.01); *G01F 15/185* (2013.01); *G01K 13/02* (2013.01); *G01K 13/024* (2021.01)

(56) References Cited

U.S. PATENT DOCUMENTS

| | | | |
|---|---|---|---|
| 6,012,432 A | 1/2000 | Igarashi et al. | |
| 6,182,639 B1 | 2/2001 | Igarashi et al. | |
| 6,427,668 B1 | 8/2002 | Igarashi et al. | |
| 6,805,002 B2 * | 10/2004 | Yonezawa | G01F 15/18 73/204.22 |
| 8,677,811 B2 * | 3/2014 | Tagawa | G01F 1/6845 73/114.32 |
| 9,441,584 B2 * | 9/2016 | Tagawa | G01F 1/692 |
| 10,627,275 B2 * | 4/2020 | Haag | G01F 1/68 |
| 2002/0069699 A1 | 6/2002 | Sato et al. | |
| 2003/0019289 A1 | 1/2003 | Ueyama et al. | |
| 2006/0112763 A1 | 6/2006 | Uramachi et al. | |
| 2011/0259097 A1 | 10/2011 | Mais et al. | |
| 2015/0096360 A1 | 4/2015 | Tagawa et al. | |
| 2015/0168192 A1 | 6/2015 | Morino et al. | |
| 2016/0282161 A1 | 9/2016 | Itou | |
| 2018/0136018 A1 | 5/2018 | Ooga | |

FOREIGN PATENT DOCUMENTS

| | | |
|---|---|---|
| JP | 2014-092430 | 5/2014 |
| JP | 5533771 | 6/2014 |
| JP | 2015-40703 | 3/2015 |
| JP | 2015-108558 | 6/2015 |
| JP | 2015-210205 | 11/2015 |
| JP | 2016-42035 | 3/2016 |
| JP | 5929721 | 6/2016 |
| JP | 2016-138745 | 8/2016 |
| JP | 2016-176906 | 10/2016 |
| JP | 2016-186499 | 10/2016 |
| JP | 6073722 | 2/2017 |
| JP | 2018-155700 | 10/2018 |
| JP | 2019-23605 | 2/2019 |
| JP | 2019-23606 | 2/2019 |
| JP | 2019-023607 | 2/2019 |
| JP | 2019-23608 | 2/2019 |
| JP | 2019-23611 | 2/2019 |
| WO | 2015/068569 | 5/2015 |
| WO | 2019/021762 | 1/2019 |
| WO | 2019/021763 | 1/2019 |

* cited by examiner

FIG. 2
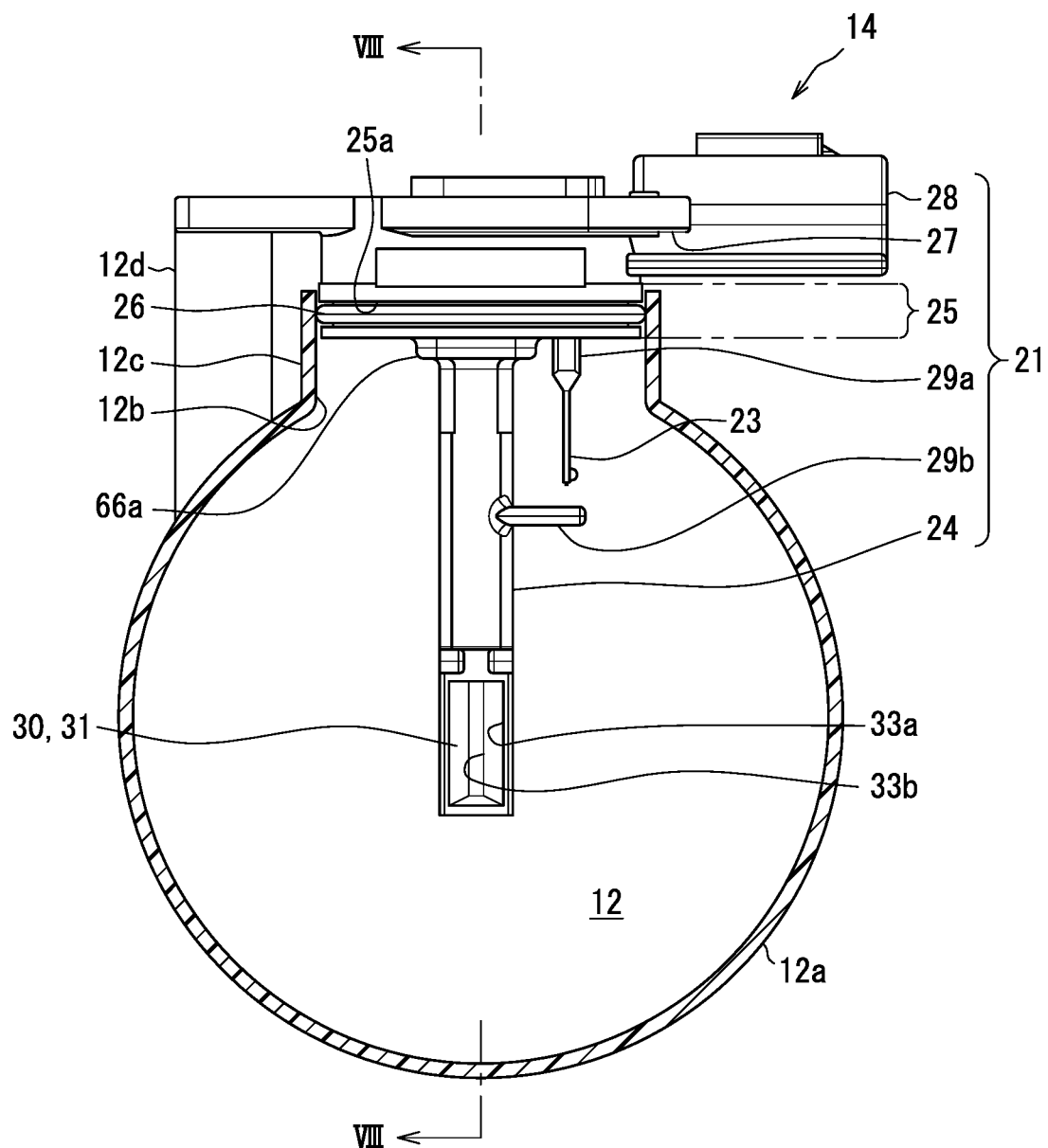
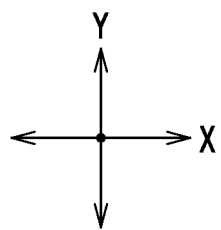

FIG. 5
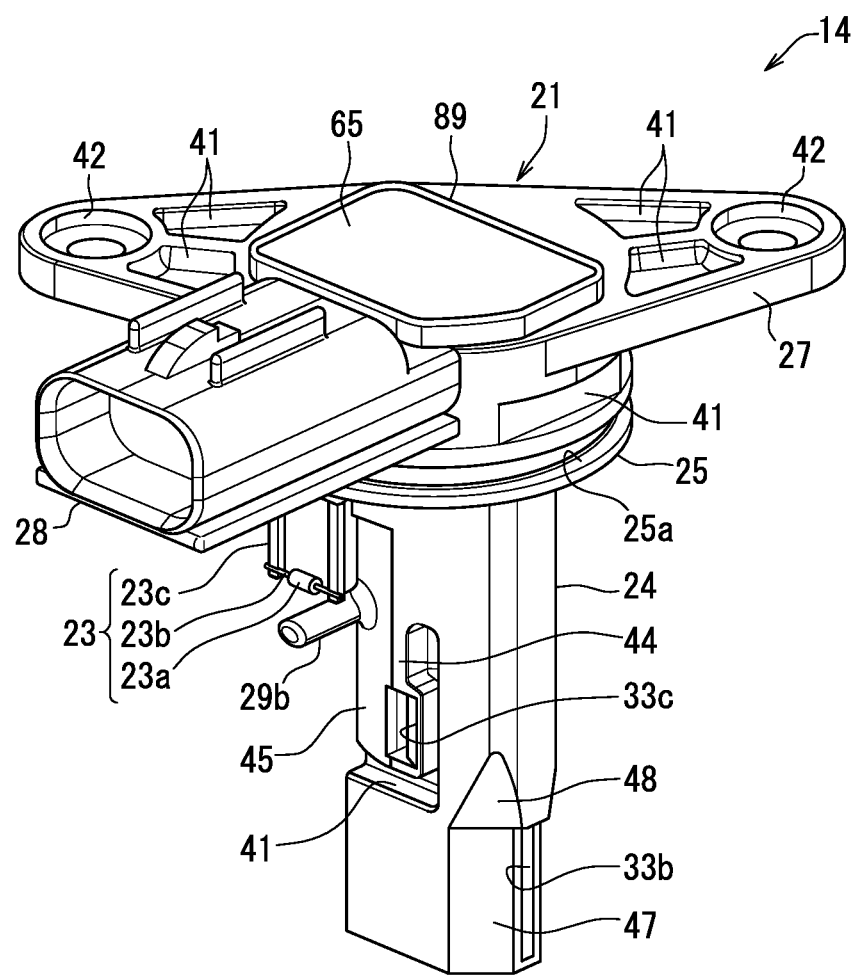
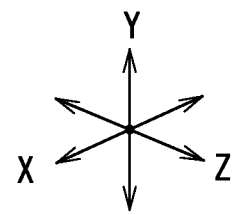

FIG. 7
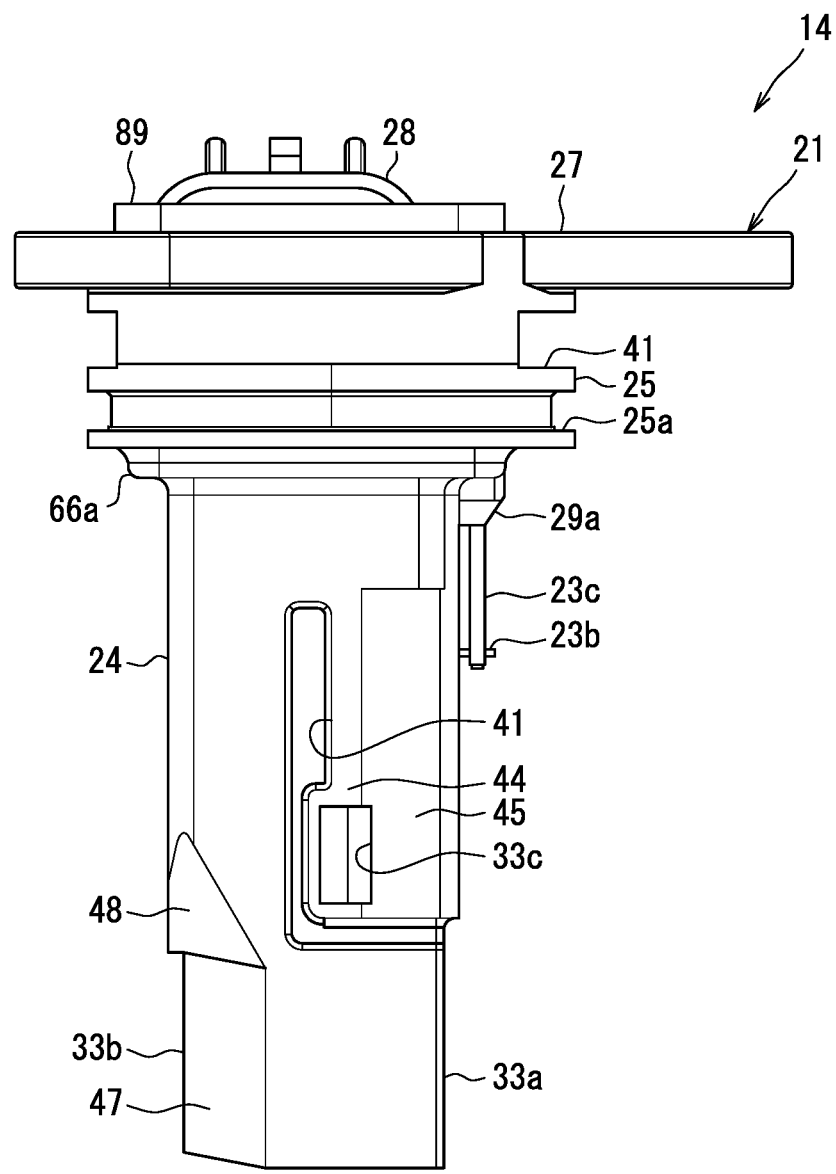
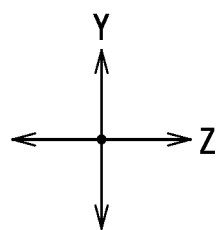

FIG. 10
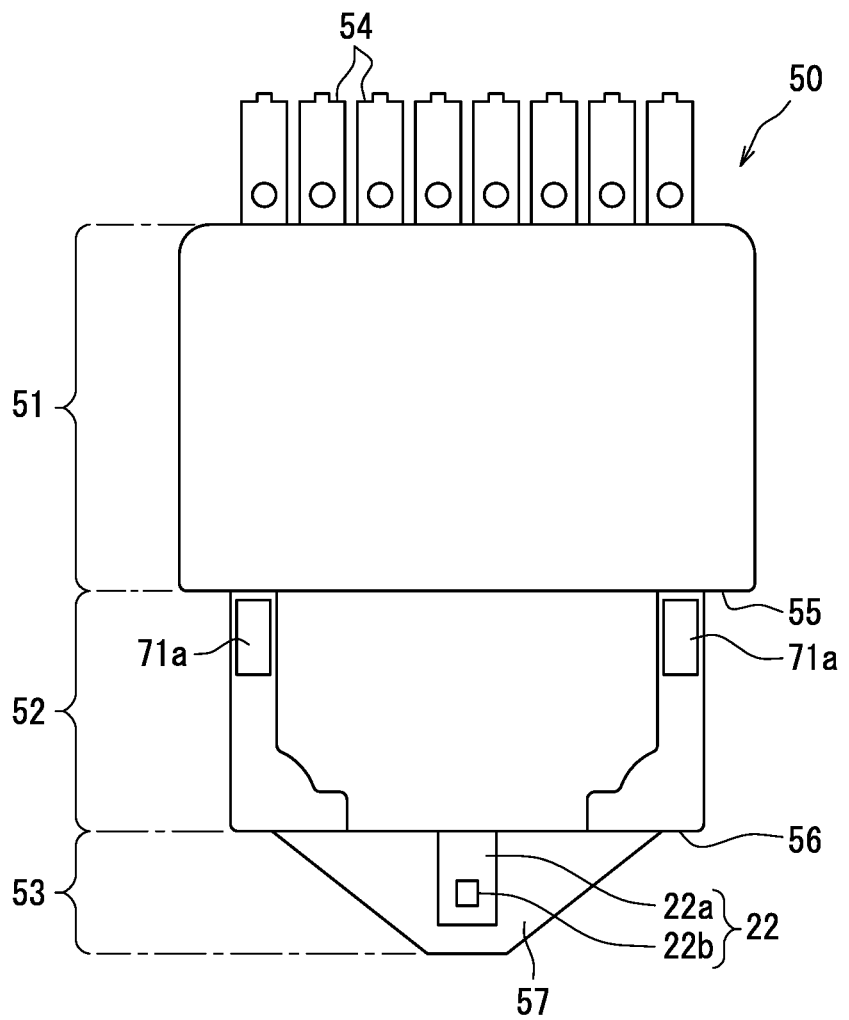
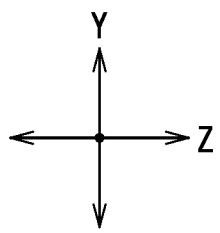

⟨F⟩

FIG. 42
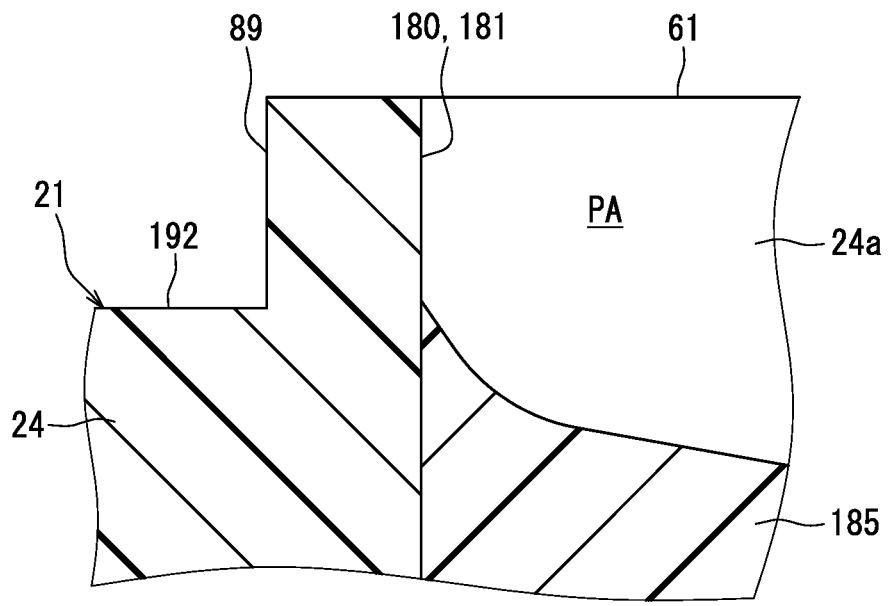
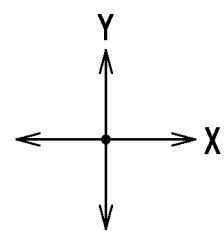

FIG. 43
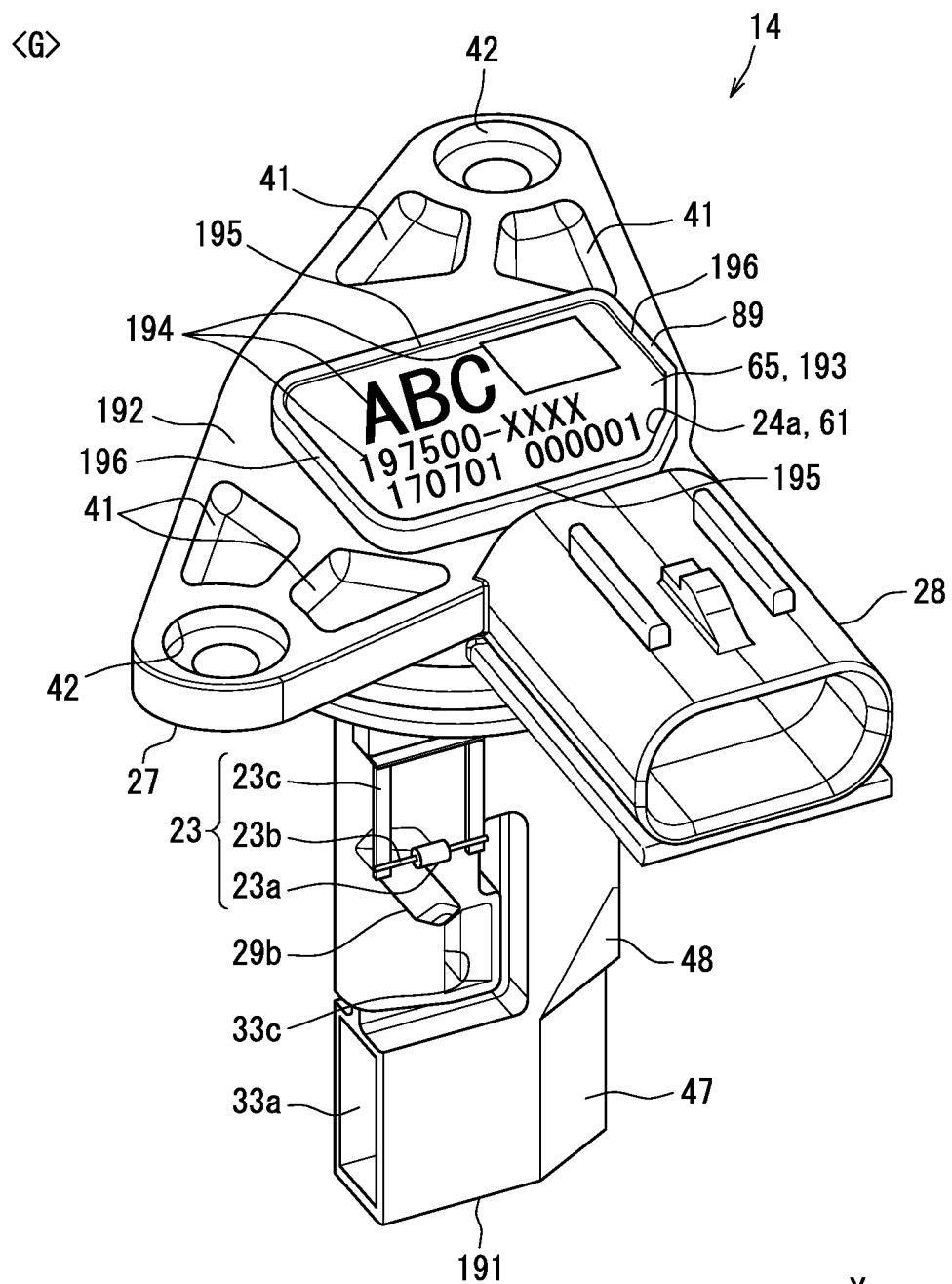
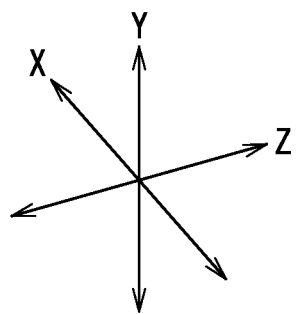

FIG. 45
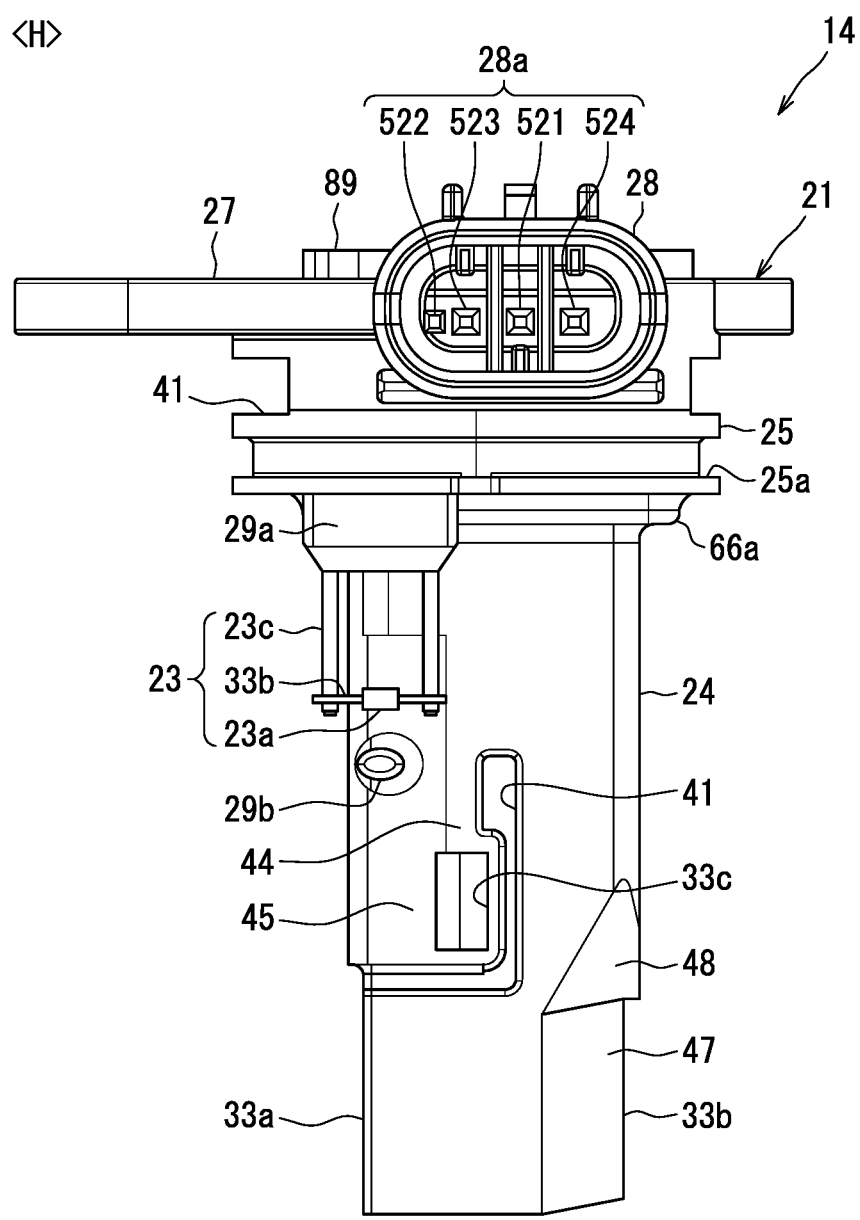
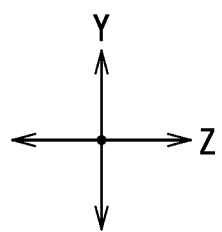

FIG. 61
<SHARED>
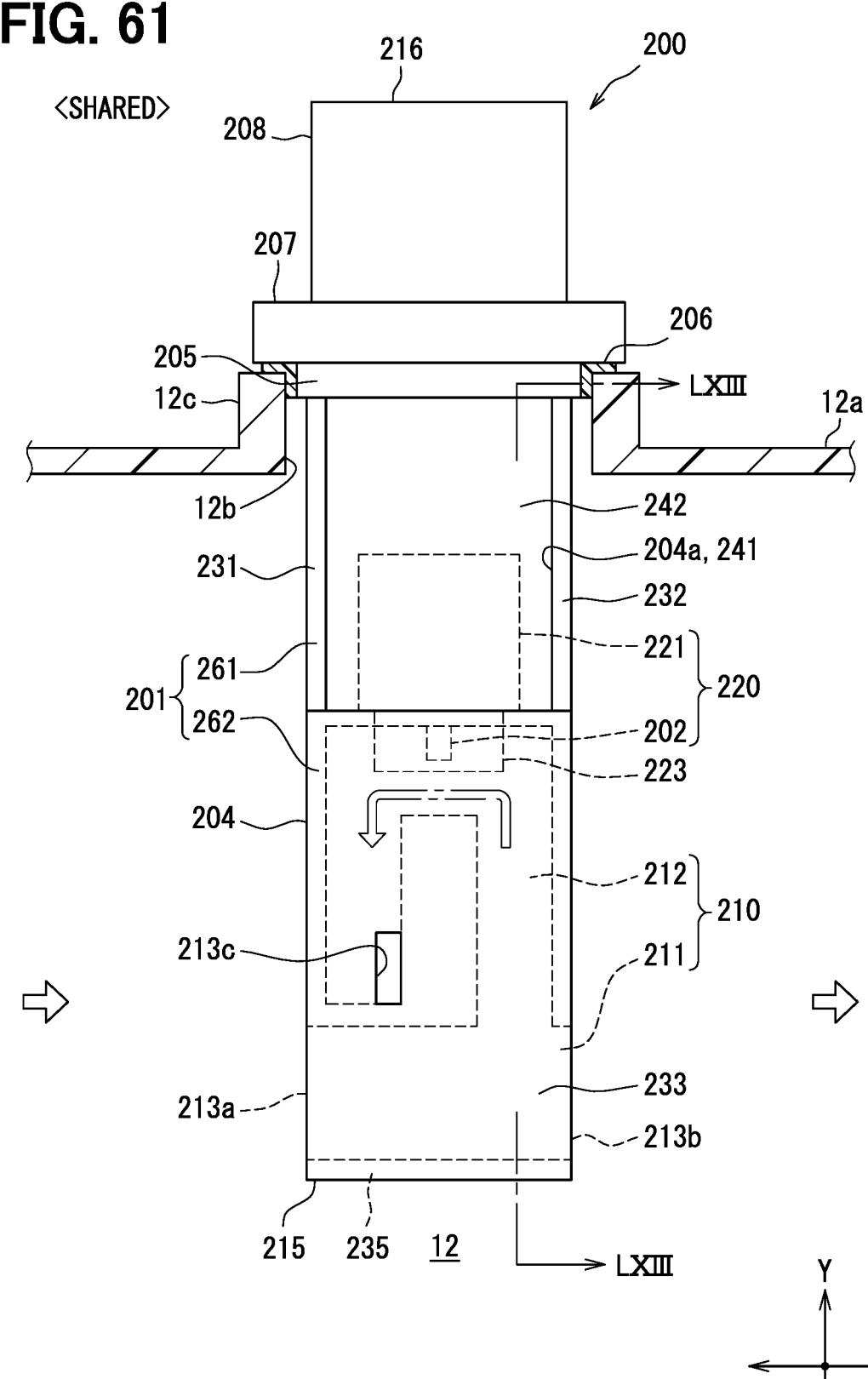
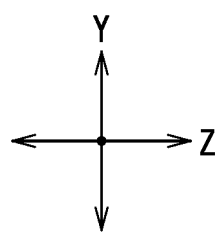

FIG. 62
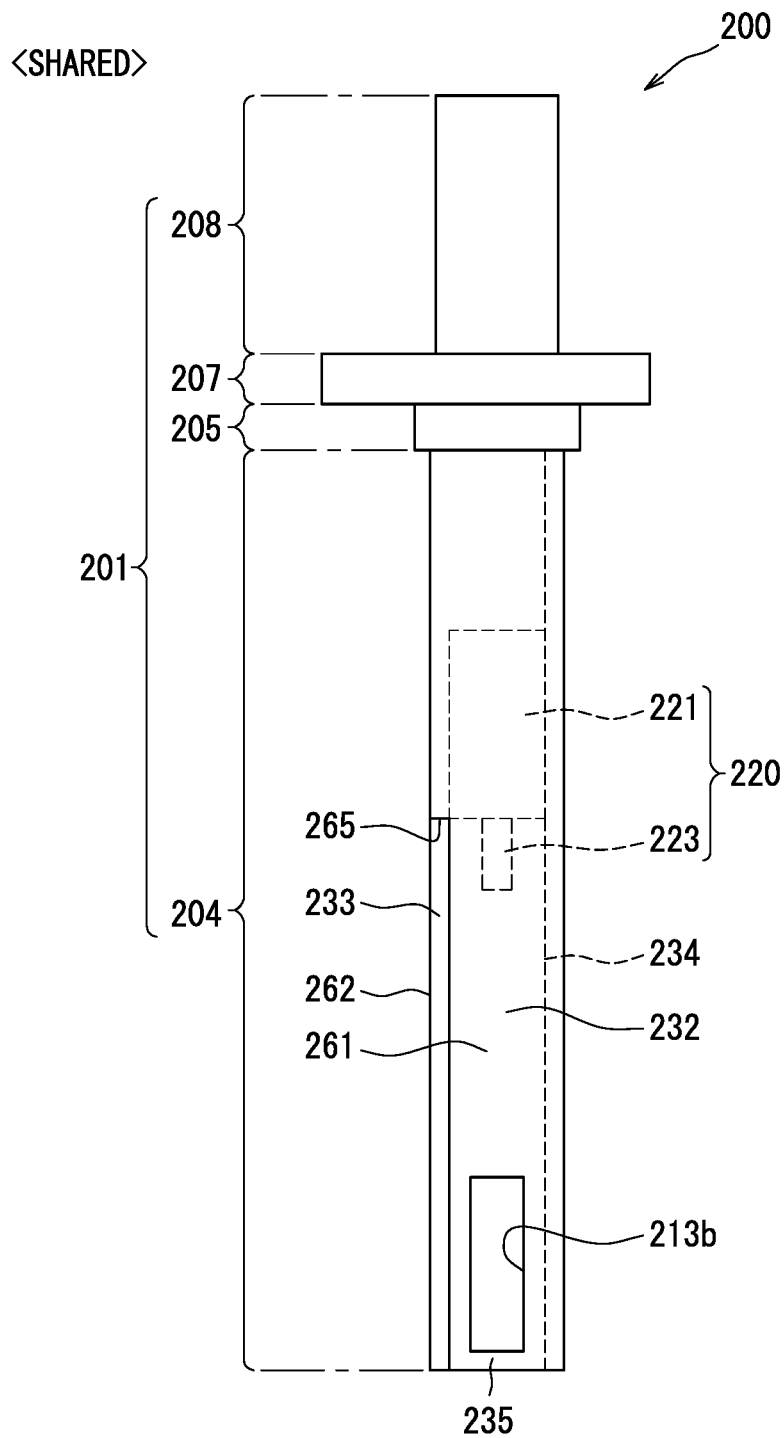
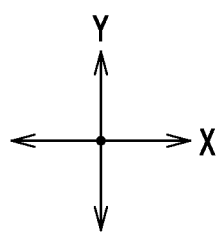

<SHARED>

FIG. 72
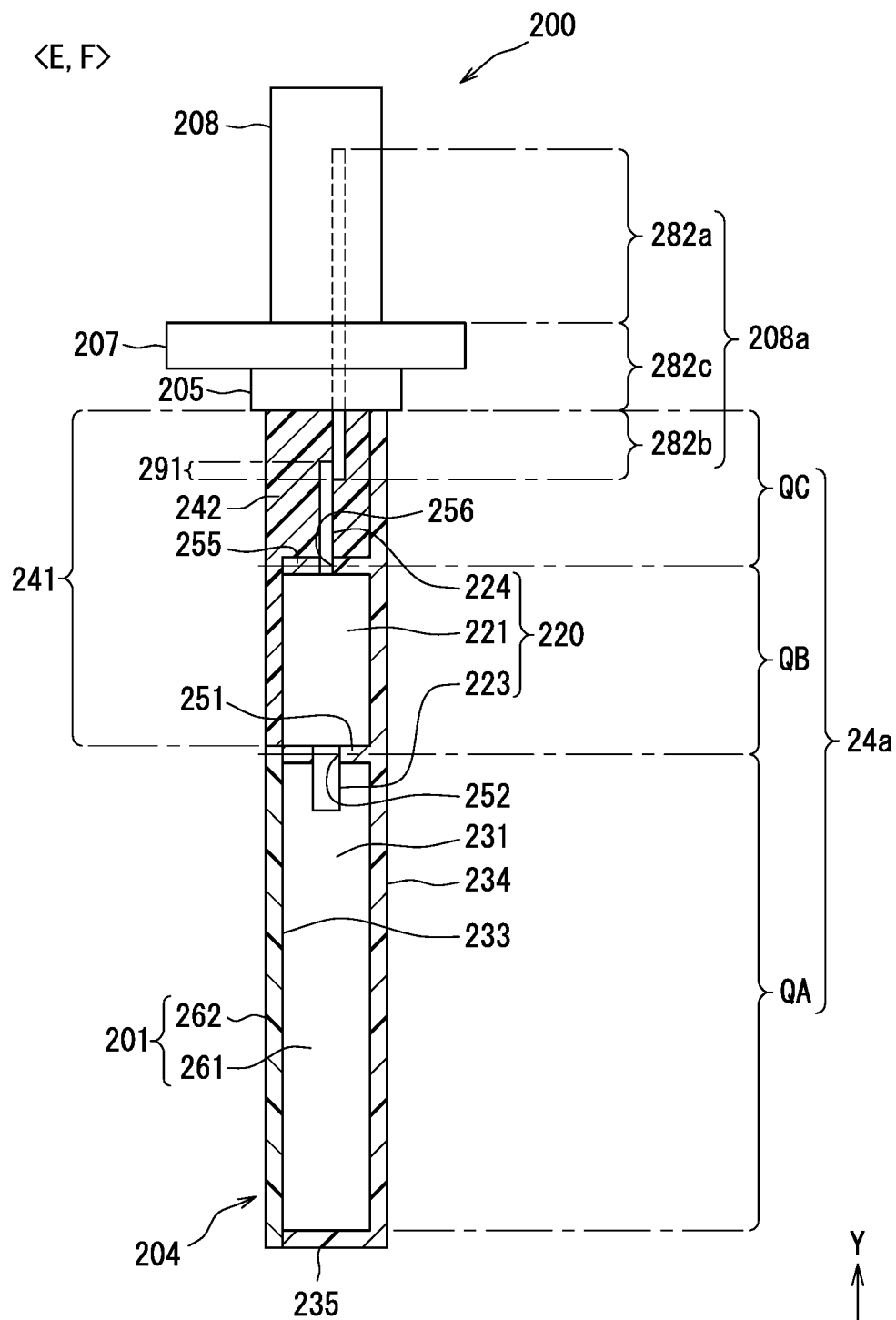
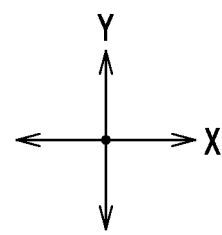

FIG. 74
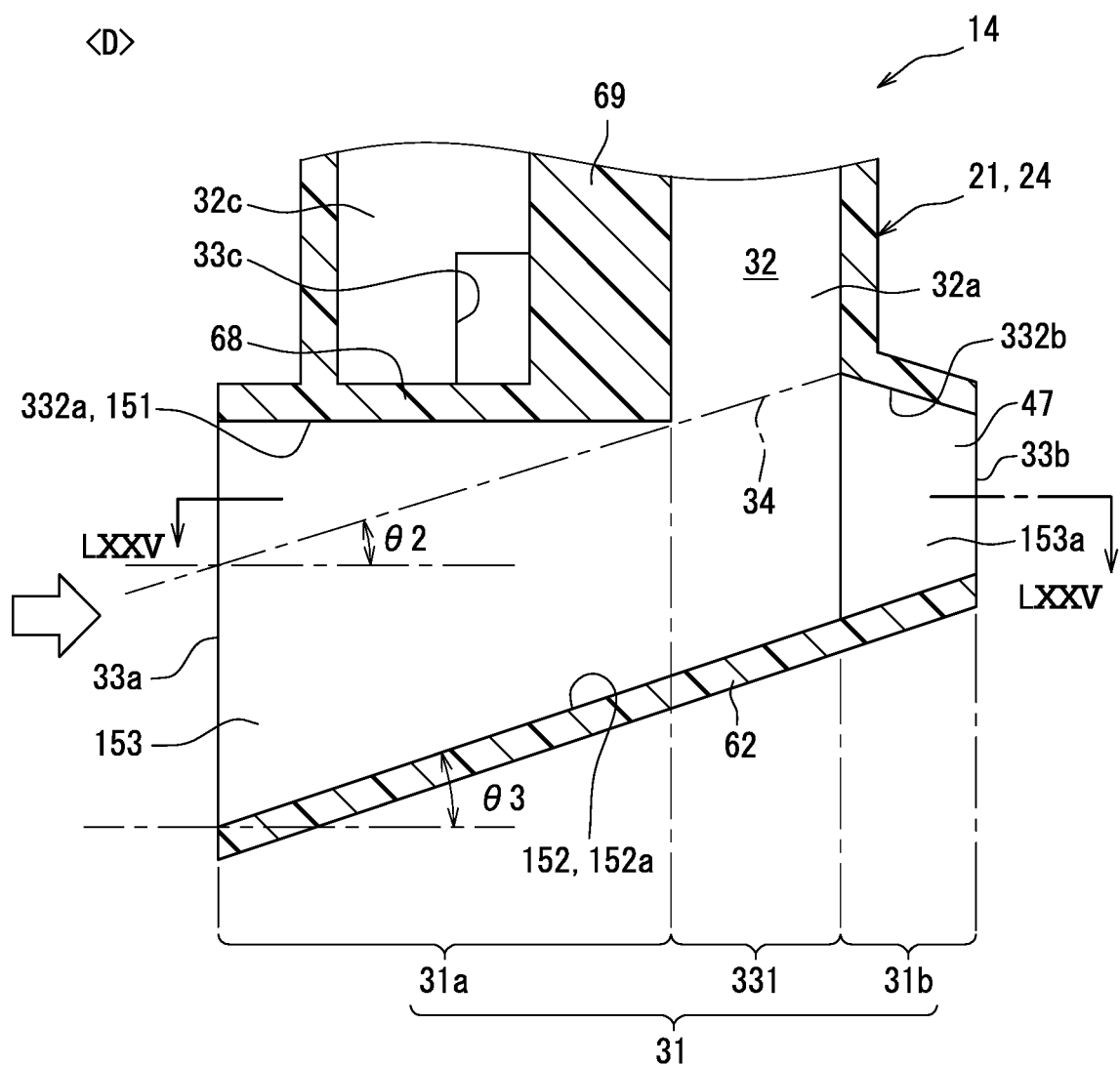
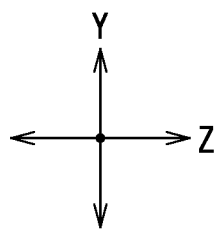

⟨D⟩

FIG. 83
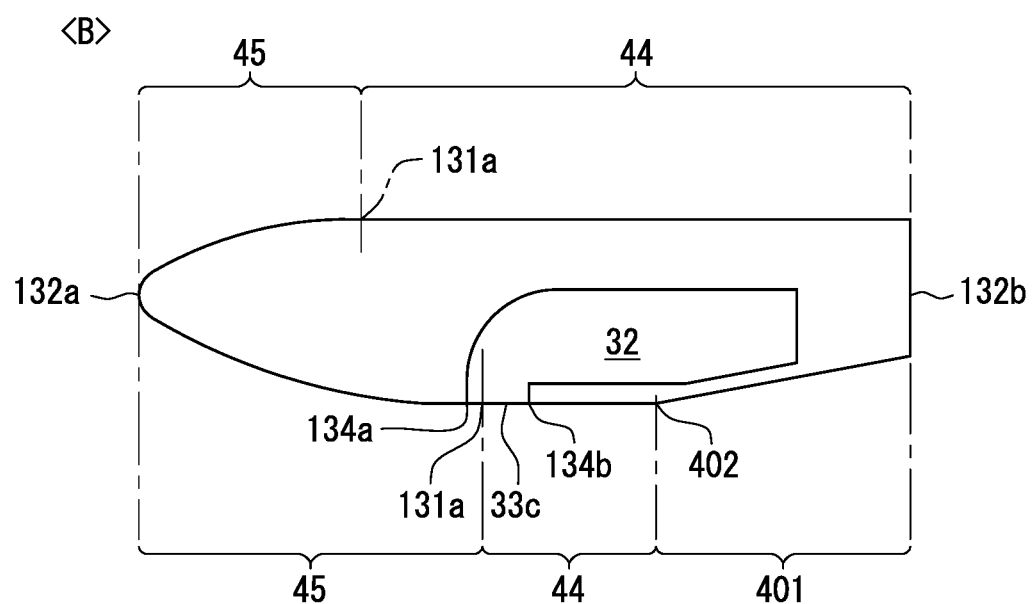
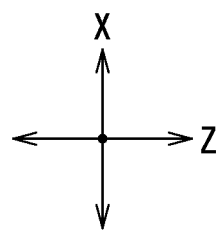

⟨B⟩

⟨B⟩

⟨C⟩

<C>

FIG. 92
<C>
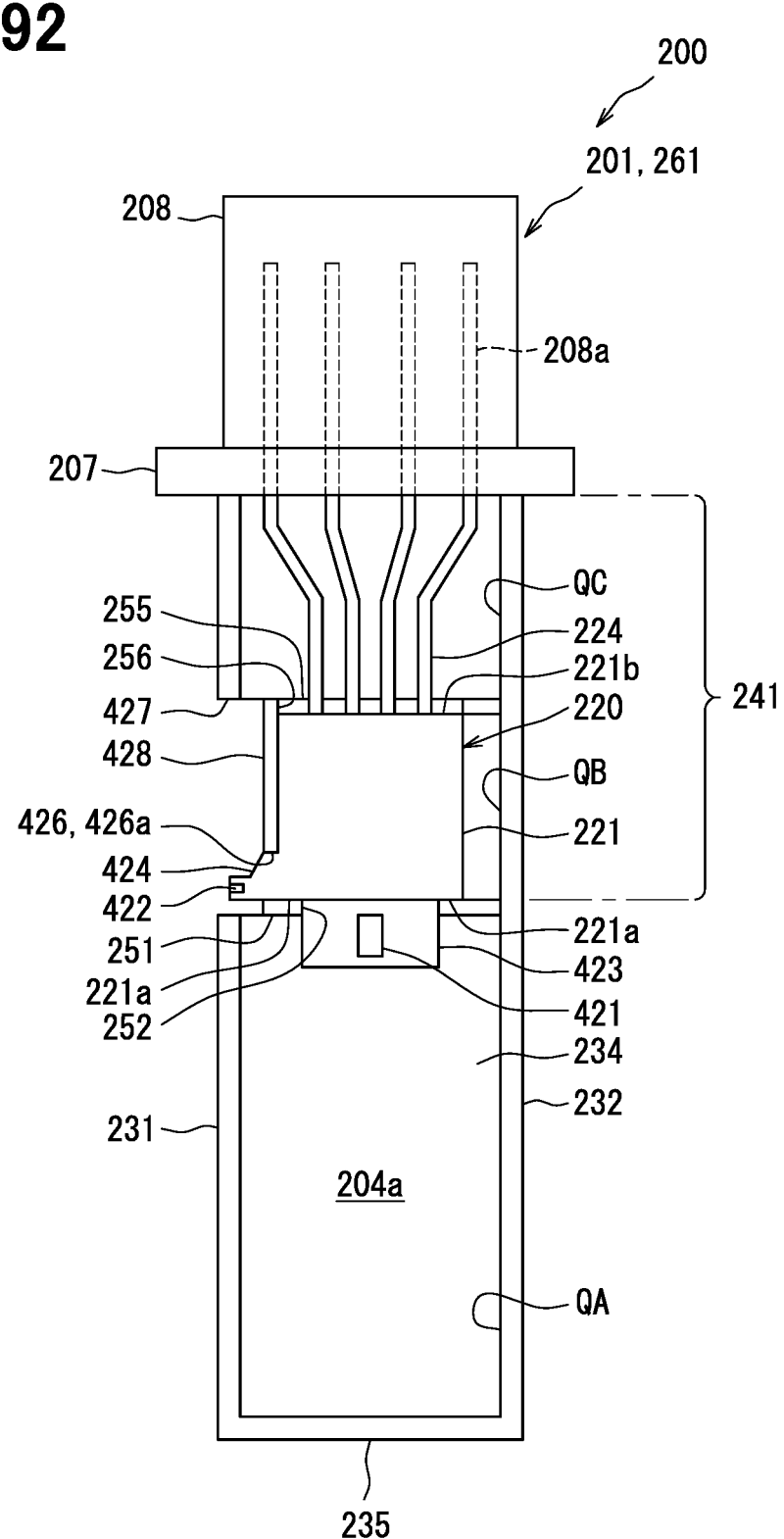
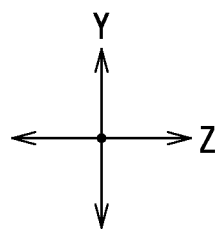

⟨D⟩

FIG. 104
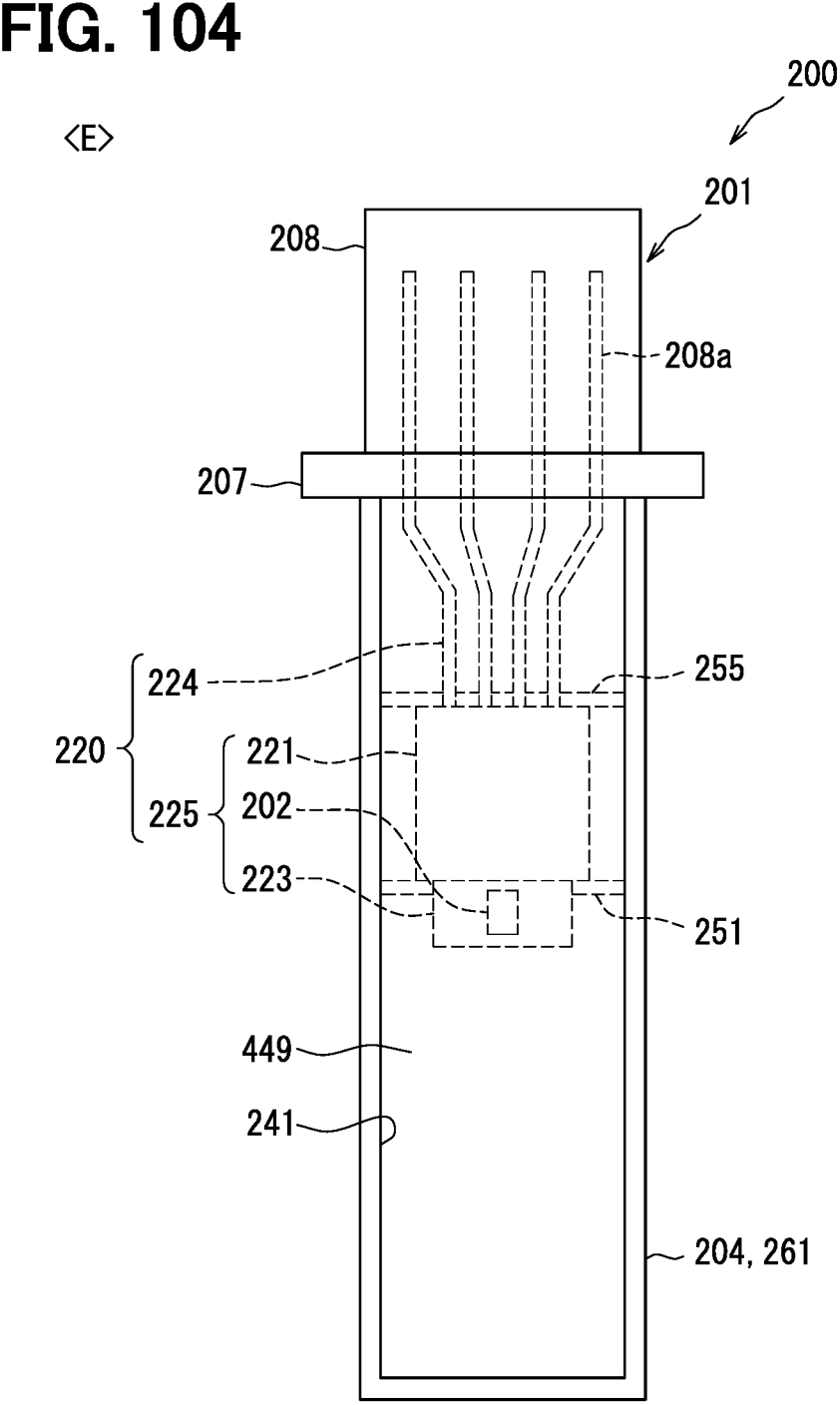
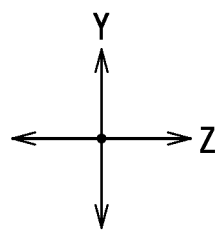

⟨F⟩

<F>

<F>

<H>

<H>

<H>

QUANTITY MEASUREMENT DEVICE WITH DETECTION UNIT CONTACTING HOUSING

CROSS REFERENCE TO RELATED APPLICATIONS

The present application is a continuation application of International Patent Application No. PCT/JP2018/025181 filed on Jul. 3, 2018, which designated the U.S. and claims the benefit of priority from Japanese Patent Application No. 2017-142855 filed on Jul. 24, 2017, and Japanese Patent Application No. 2017-247428 filed on Dec. 25, 2017. The entire disclosures of all of the above applications are incorporated herein by reference.

TECHNICAL FIELD

The present disclosure relates to a physical quantity measurement device and a manufacturing method of a physical quantity measurement device.

BACKGROUND

A physical quantity measurement device measures a flow rate of intake air taken into an internal combustion engine. The physical quantity measurement device includes a main passage through which an inflow fluid passes, and a bypass passage branched from the main passage. A flow rate detector for outputting a detection signal corresponding to the flow rate of intake air is provided in the bypass passage.

SUMMARY

According to at least one embodiment of the present disclosure, a physical quantity measurement device measures a physical quantity of a fluid. The physical quantity measurement device includes a measurement flow channel through which the fluid flows, a detection unit having a physical quantity detector that detects a physical quantity of the fluid in the measurement flow channel, and a housing that accommodates at least a part of the detection unit and forms the measurement flow channel. The housing includes a housing attachment that is attached to a predetermined attaching target. The housing includes a position holder holding a position of the detection unit by contacting the detection unit. The housing includes an inward part positioned inward of the attaching target and an outward part positioned outward of the attaching target. The position holder is provided inward of the housing attachment in an alignment direction along which the inward part and the outward part are aligned. The position holder is thinner than the housing attachment.

BRIEF DESCRIPTION OF DRAWINGS

FIG. 2 is a front view of an air flow meter in a state of being attached to an intake pipe.

FIG. 5 is a perspective view of the air flow meter as seen from a downstream-side end face of the air flow meter.

FIG. 7 is a side view of the air flow meter as viewed from a side opposite to the connector portion.

FIG. 10 is a front view showing a configuration of a sensor SA.

FIG. 42 is an enlarged view of a lip periphery of FIG. 41.

FIG. 43 is a perspective view of a potting portion of the air flow meter in a configuration group G.

FIG. 45 is a side view of the air flow meter as viewed from the connector portion side.

FIG. 61 is a side view of an air flow meter in a state of being attached to an intake pipe according to a fourth embodiment.

FIG. 62 is a front view of the air flow meter.

FIG. 72 is a vertical cross-sectional view of an air flow meter in configuration groups E and F.

FIG. 74 is a vertical cross-sectional view of the housing around a passage flow channel in a configuration group D according to a fifth embodiment.

FIG. 83 is a cross-sectional view taken along a line LXXXIII-LXXXIII line of FIG. 82.

FIG. 92 is a view showing an internal structure of a housing in a state in which a potting portion and a cover member are removed in Modification C3.

FIG. 104 is a side view of the housing.

FIG. 120 is a horizontal cross-sectional view of a housing in Modification B4.

FIG. 121 is an enlarged view of a periphery of a lip in Modification F6.

DETAILED DESCRIPTION

Figure 1:
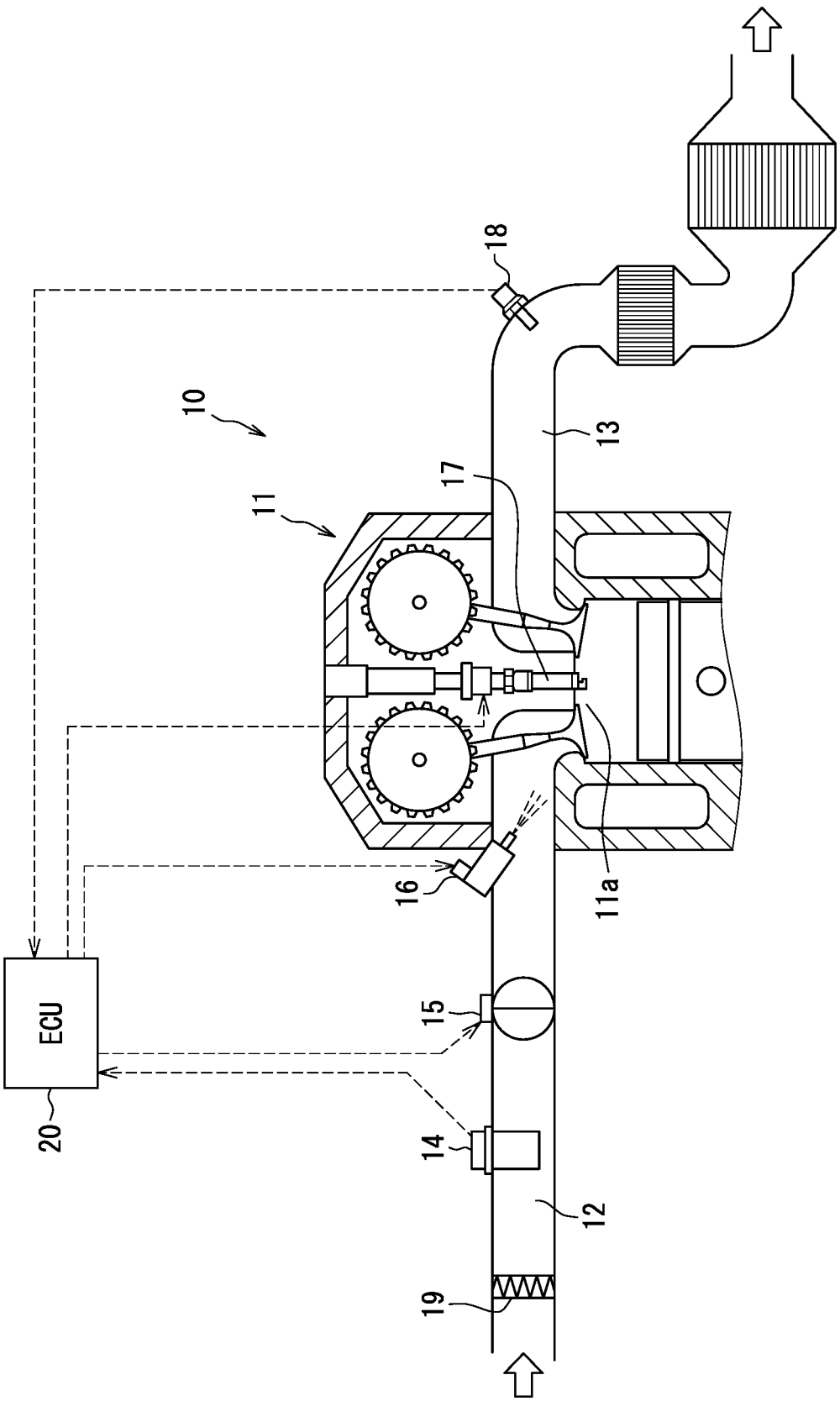
FIG. 1 is a schematic diagram illustrating a configuration of a combustion system according to a first embodiment.

According to a first aspect of the present disclosure, a physical quantity measurement device measures a physical quantity of a fluid. The physical quantity measurement device includes a measurement flow channel through which the fluid flows, a detection unit having a physical quantity detector that detects a physical quantity of the fluid in the measurement flow channel, and a housing that accommodates at least a part of the detection unit and forms the measurement flow channel. The housing includes a housing attachment that is attached to a predetermined attaching target. The housing includes a position holder holding a position of the detection unit by contacting the detection unit. The housing includes an inward part positioned inward of the attaching target and an outward part positioned outward of the attaching target. The position holder is provided inward of the housing attachment in an alignment direction along which the inward part and the outward part are aligned. The position holder is thinner than the housing attachment.

In the physical quantity measurement device in which a housing attachment is attached to an attaching target, increase of the wall thickness of the housing attachment can be regarded as a method of providing the housing attachment with a strength for supporting the physical quantity measurement device. However, when the housing is molded by curing the molten resin, an unintentional deformation caused by the curing of the molten resin is more likely to occur in the housing in the thicker portion, and the shape of the position holder is more likely to vary from product to product. If the position of the detection unit varies from product to product due to the variation in the shape of the position holder, the detection accuracy of the physical quantity detector may also vary.

On the other hand, according to the first aspect, the position holder is located closer to the housing end than the housing attachment and is thinner than the housing attachment. Thus, since the housing attachment is thick, a strength for supporting the physical quantity measurement device can be given to the housing attachment. On the other hand, since the position holder is thin, an unintentional deformation attributable to the curing of the molten resin is less likely to occur, and the shape of the position holder is less likely to vary from product to product. In that case, since the position of the physical quantity detector hardly varies, the detection accuracy of the physical quantity detector can be inhibited from varying from product to product.

According to a second aspect of the present disclosure, a physical quantity measurement device measures a physical quantity of a fluid. The physical quantity measurement device includes a measurement flow channel through which the fluid flows, a detection unit having a physical quantity detector that detects a physical quantity of the fluid in the measurement flow channel, and a housing that accommodates at least a part of the detection unit and forms the measurement flow channel. The housing includes a housing attachment that is attached to a predetermined attaching target. The housing includes a position holder holding a position of the detection unit by contacting the detection unit. The housing includes an inward part positioned inward of the attaching target and an outward part positioned outward of the attaching target. The position holder is provided inward of the housing attachment in an alignment direction along which the inward part and the outward part are aligned.

According to a second aspect, since the position holder is provided closer to the housing end than the housing attachment, there is no need to provide the position holder with a strength for supporting the physical quantity measurement device. For that reason, the overall wall thickness of the position holder can be thinned more than the wall thickness of the housing attachment. Therefore, similarly to the first embodiment, the variation in the detection accuracy of the physical quantity detector can be reduced from product to product.

According to a third aspect of the present disclosure, a method is for manufacturing a physical quantity measurement device that measures a physical quantity of a fluid. The method includes molding a housing. The housing includes an accommodation space extending from a housing opening to accommodate at least a part of a detection unit, a measurement flow channel through which the fluid flows, a housing attachment that is attached to a predetermined attaching target, and a position holder that is provided at a position different from the housing attachment. The method includes inserting the detection unit into the accommodation space from the housing opening such that the detection unit becomes in contact with the position holder to hold a position of the detection unit. The detection unit has a physical quantity detector that detects a physical quantity of the fluid in the measurement flow channel.

According to the third aspect, since the position holder is provided at a position different from the housing attachment in the housing, there is no need to provide the strength for supporting the physical quantity measurement device to the position holder. For that reason, similarly to the second embodiment, the detection accuracy of the physical quantity detector can be inhibited from varying from product to product.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A combustion system 10 shown in FIG. 1 includes an internal combustion engine 11 such as a gasoline engine, an intake passage 12, an exhaust passage 13, an air flow meter 14, and an ECU 20, and the combustion system 10 is mounted on a vehicle, for example. The air flow meter 14 is provided in the intake passage 12, and has a function of measuring physical quantities such as a flow rate, a temperature, a humidity, and a pressure of an intake air supplied to the internal combustion engine 11. The air flow meter 14 corresponds to a physical quantity measurement device for measuring the intake air as a fluid. The intake air is a gas supplied to a combustion chamber 11a of the internal combustion engine 11. In the combustion chamber 11a, a mixture of the intake air and a fuel is ignited by an ignition plug 17.

The ECU (Engine Control Unit) 20 is a control device for controlling the operation of the combustion system 10. The ECU 20 is a calculation processing circuit including a processor, a storage medium such as a RAM, a ROM and a flash memory, a microcomputer including an input and output unit, a power supply circuit, and the like. The ECU 20 receives a sensor signal output from the air flow meter 14, sensor signals output from a large number of vehicle-mounted sensors, and the like. The ECU 20 performs an engine control on a fuel injection amount, an EGR amount, and the like of an injector 16 with the use of the measurement result by the air flow meter 14. The ECU 20 is a control device for controlling the operation of the internal combustion engine 11, and the combustion system 10 may be referred to as an engine control system. The ECU 20 corresponds to an external device.

The air flow meter 14 is one of a large number of measurement units included in the combustion system 10. In an intake system and an exhaust system of the internal combustion engine 11, for example, an air-fuel ratio sensor 18 and the like are provided in addition to the air flow meter 14 as a measurement unit. The air flow meter 14 is disposed on a downstream side of an air cleaner 19 and an upstream side of a throttle valve 15 in the intake passage 12. In that case, with respect to the air flow meter 14 in the intake passage 12, the air cleaner 19 side is on the upstream side, and the combustion chamber 11a side is on the downstream side.

Figure 3:
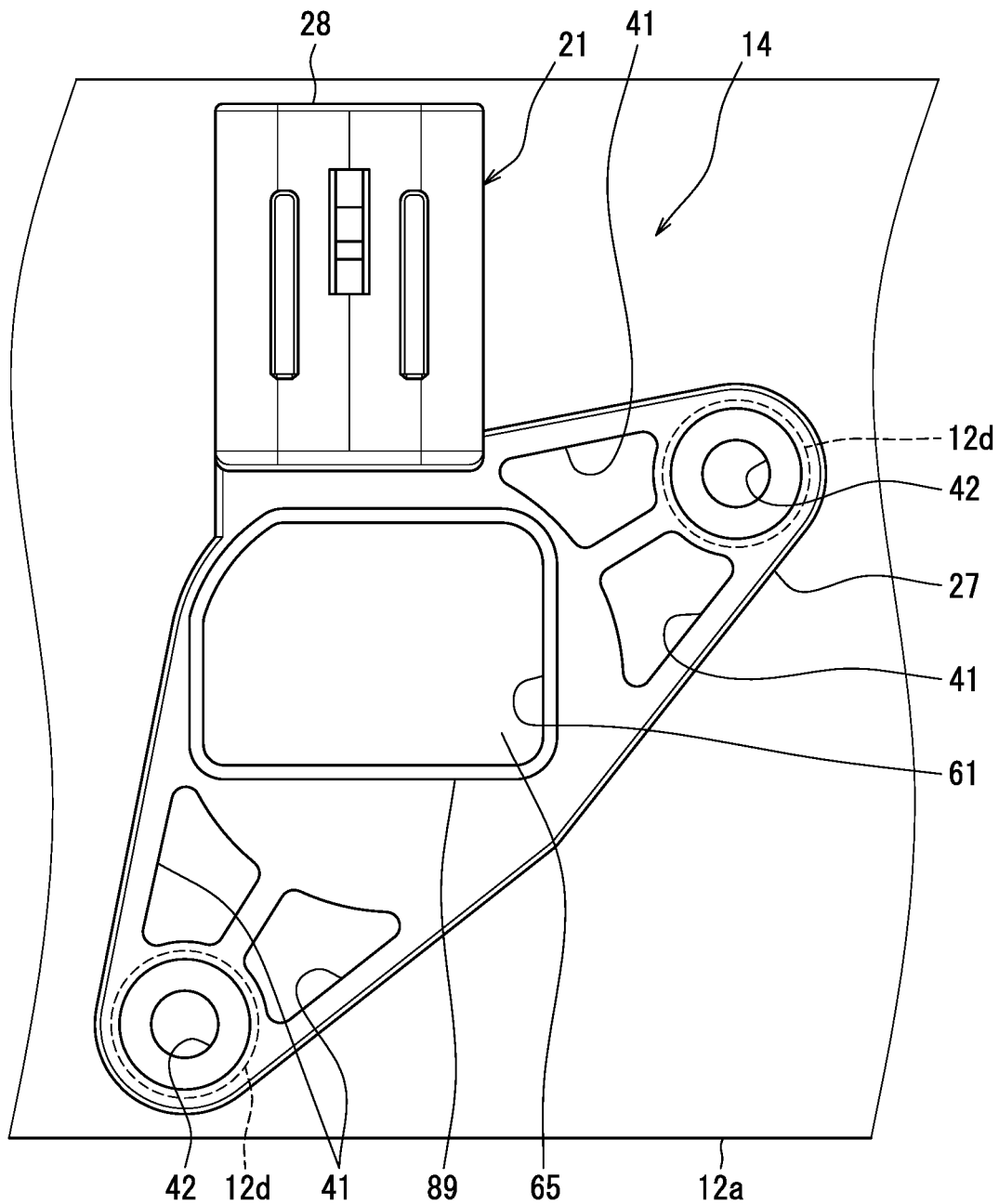
FIG. 3 is a top view of an air flow meter in a state of being attached to the intake pipe.
Figure 4:
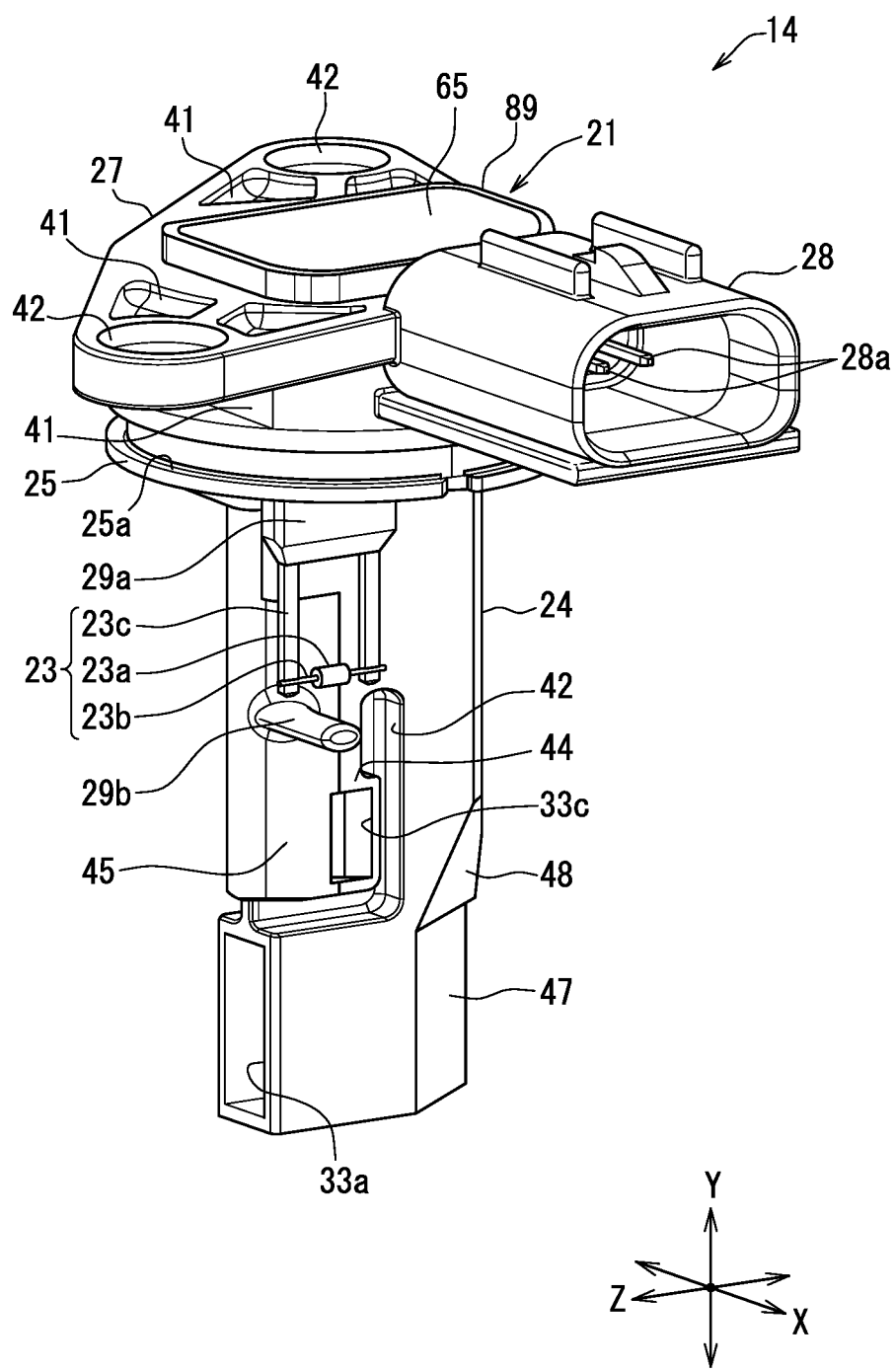
FIG. 4 is a perspective view of the air flow meter as seen from an upstream-side end face of the air flow meter.

The air flow meter 14 shown in FIGS. 2 and 3 is detachably attached to an intake pipe 12a defining the intake passage 12. The air flow meter 14 is inserted into an airflow insertion hole 12b provided so as to penetrate through a cylindrical wall of the intake pipe 12a, and at least a part of the air flow meter 14 is located in the intake passage 12. The intake pipe 12a has a pipe flange 12c extending from the airflow insertion hole 12b toward an outer peripheral side, and includes a pipe made of a synthetic resin material or the like. A pipe flange 12c extends along a peripheral portion of the airflow insertion hole 12b, and is formed in an annular shape, for example. A tip end face of the pipe flange 12c extends in a direction orthogonal to a center line of the pipe flange 12c. In that case, the tip end face of the pipe flange 12c extends in a longitudinal direction of the intake passage 12, that is, in a direction in which the intake air flows in the intake passage 12. The intake pipe 12a corresponds to an attaching target.

The air flow meter 14 includes a housing 21, a flow rate detector 22 (refer to FIG. 8), and an intake air temperature sensor 23. The housing 21 is made of, for example, a resin material or the like. In the air flow meter 14, since the housing 21 is attached to the intake pipe 12a, the flow rate detector 22 is brought into contact with the intake air flowing through the intake passage 12. The housing 21 includes a housing body 24, a ring holding portion 25, a flange portion 27, a connector portion 28, a root portion 29a, and a protective protrusion 29b, and an O-ring 26 is attached to the ring holding portion 25. The housing body 24, the ring holding portion 25, the flange portion 27, the connector portion 28, the root portion 29a, and the protective protrusion 29b are manufactured by a single resin molding process, which will be described later, in order to realize cost reduction.

As shown in FIGS. 2 to 7, the housing body 24 is formed in a cylindrical shape as a whole, and in the housing 21, the ring holding portion 25, the flange portion 27, the connector portion 28, the root portion 29a, and the protective protrusion 29b are integrally provided in the housing body 24. When a width direction X, a height direction Y, and a depth direction Z are defined in the air flow meter 14, the housing body 24 extends in the height direction Y, and the ring holding portion 25 and the flange portion 27 extend from the housing body 24 in the width direction X and the depth direction Z. The ring holding portion 25, the flange portion 27, and the connector portion 28 are disposed on a base end side of the housing 21 with respect to the housing body 24. Hereinafter, the base end side of the housing 21 is also referred to as a housing base end side, and a tip side of the housing 21 is also referred to as a housing tip side. In other words, in the height direction Y, a housing base end face 192 (shown in the drawing) side, which will be described later, is referred to as the housing base end side, and a housing tip end face 191 side is referred to as a housing tip side. The housing base end face 192 may be referred to as a base end or a base end portion of the housing 21, and the housing tip end face 191 may be referred to as a tip or a tip portion of the housing 21. The width direction X, the height direction Y, and the depth direction Z are orthogonal to each other.

The ring holding portion 25 is a portion that is fitted into the airflow insertion hole 12*b* through the O-ring 26. The ring holding portion 25 has a holding groove 25*a* circumferentially extending along the periphery of the housing body 24, and holds the O-ring 26 in a state in which the O-ring 26 is inserted into the holding groove 25*a*. The ring holding portion 25 has a pair of groove defining portions protruding in the width direction X and the depth direction Z, and the groove defining portions are spaced apart from each other in the height direction Y, so that the holding groove 25*a* is defined between the groove defining portions. The pair of groove defining portions may also be referred to as seal guide walls.

The O-ring 26 is a member for sealing the intake passage 12 and the outside of the intake pipe 12*a*. The O-ring 26 is fitted externally to the ring holding portion 25, and is interposed between the ring holding portion 25 and the airflow insertion hole 12*b* in a state of entering an inner peripheral side of the pipe flange 12*c*.

The flange portion 27 is disposed closer to the housing base end side than the ring holding portion 25, and covers the airflow insertion hole 12*b* from the outer peripheral side of the intake pipe 12*a*. Further, the flange portion 27 can restrict the housing 21 from excessively entering the intake passage 12 by being caught by the tip portion of the pipe flange 12*c* of the intake pipe 12*a*. The connector portion 28 surrounds multiple connector terminals 28*a* (refer to FIG. 6), and corresponds to a terminal protection portion for protecting the connector terminals 28*a*. A plug portion is inserted into the connector portion 28. The plug portion is provided at an end portion of a connecting line which are electrically connected directly or indirectly to the ECU 20 and mates with the connector portion 28.

The housing 21 is formed with multiple thinned portions 41 for improving a dimensional accuracy and reducing a weight after molding. The thinned portions 41 are provided, for example, on the flange portion 27, the housing body 24, and the ring holding portion 25. In addition, when the housing 21 is molded with resin, a thickness of the housing 21 is appropriately thinned by the thinned portions 41, so that a portion in which a molten resin does not flow is hardly generated in the mold portion such as a mold. Further, the deterioration of dimensional accuracy that occurs due to cooling and shrinkage of the resin component after molding can be inhibited. Multiple screw holes 42 are provided in the flange portion 27, and the housing 21 is fixed to the intake pipe 12*a* with the use of the screw holes 42. The intake pipe 12*a* is provided with bosses 12*d* to which screw members (not shown) passing through the screw holes 42 are mounted, and the flange portion 27 is supported by the bosses 12*d*. Each of the bosses 12*d* extends along the pipe flange 12*c* from the outer peripheral surface of the intake pipe 12*a*, and is disposed at a position separated from the pipe flange 12*c*. The bosses 12*d* may be provided integrally with the pipe flange 12*c*.

The root portion 29*a* protrudes from the ring holding portion 25 toward the housing tip side in the height direction Y, and is disposed at a position laterally separated from the housing body 24 in the width direction X in order to avoid the influence of a heat of the housing body 24 which has received the heat from the engine and has risen in temperature. The intake air temperature sensor 23 includes a temperature sensing element 23*a* for sensing the temperature of the intake air, a pair of lead wires 23*b* extending from the temperature sensing element 23*a*, and a pair of intake air temperature terminals 23*c* connected to the lead wires 23*b*. The pair of intake air temperature terminals 23*c* extend from the root portion 29*a*, and the temperature sensing element 23*a* is put across the pair of intake air temperature terminals 23*c* through the pair of lead wires 23*b*. Both the lead wires 23*b* and the intake air temperature terminals 23*c* have conductivity, and the intake air temperature terminals 23*c* are electrically connected to the connector terminals 28*a* (refer to FIG. 18) provided in the connector portion 28. The intake air temperature terminals 23*c* may be connected to a bridge terminal 86 to be described later. Although not shown in the drawing, in another embodiment, the lead wires 23*b* and the intake air temperature terminals 23*c* may be integrated together. The intake air temperature sensor 23 outputs a detection signal corresponding to the intake air temperature sensed by the temperature sensing element 23*a*.

The protective protrusion 29*b* protrudes laterally from the housing body 24 in the width direction X, and is disposed closer to the housing tip side than the intake air temperature sensor 23. A protrusion dimension of the protective protrusion 29*b* from the housing body 24 is larger than a separation distance of the intake air temperature sensor 23 from the housing body 24. In that case, when the housing 21 is viewed from the tip side, the intake air temperature sensor 23 is seen to overlap with a back side of the protective protrusion 29*b*. For that reason, when the housing 21 is inserted into the airflow insertion hole 12*b* when the air flow meter 14 is attached to the intake pipe 12*a*, even if the insertion position of the housing 21 is deviated in the width direction X, the protective protrusion 29*b* comes into contact with the outer peripheral surface of the intake pipe 12*a*. Therefore, the intake air temperature sensor 23 is restrained from being damaged by the intake air temperature sensor 23 coming into contact with the outer peripheral surface of the intake pipe 12*a*.

Figure 8:
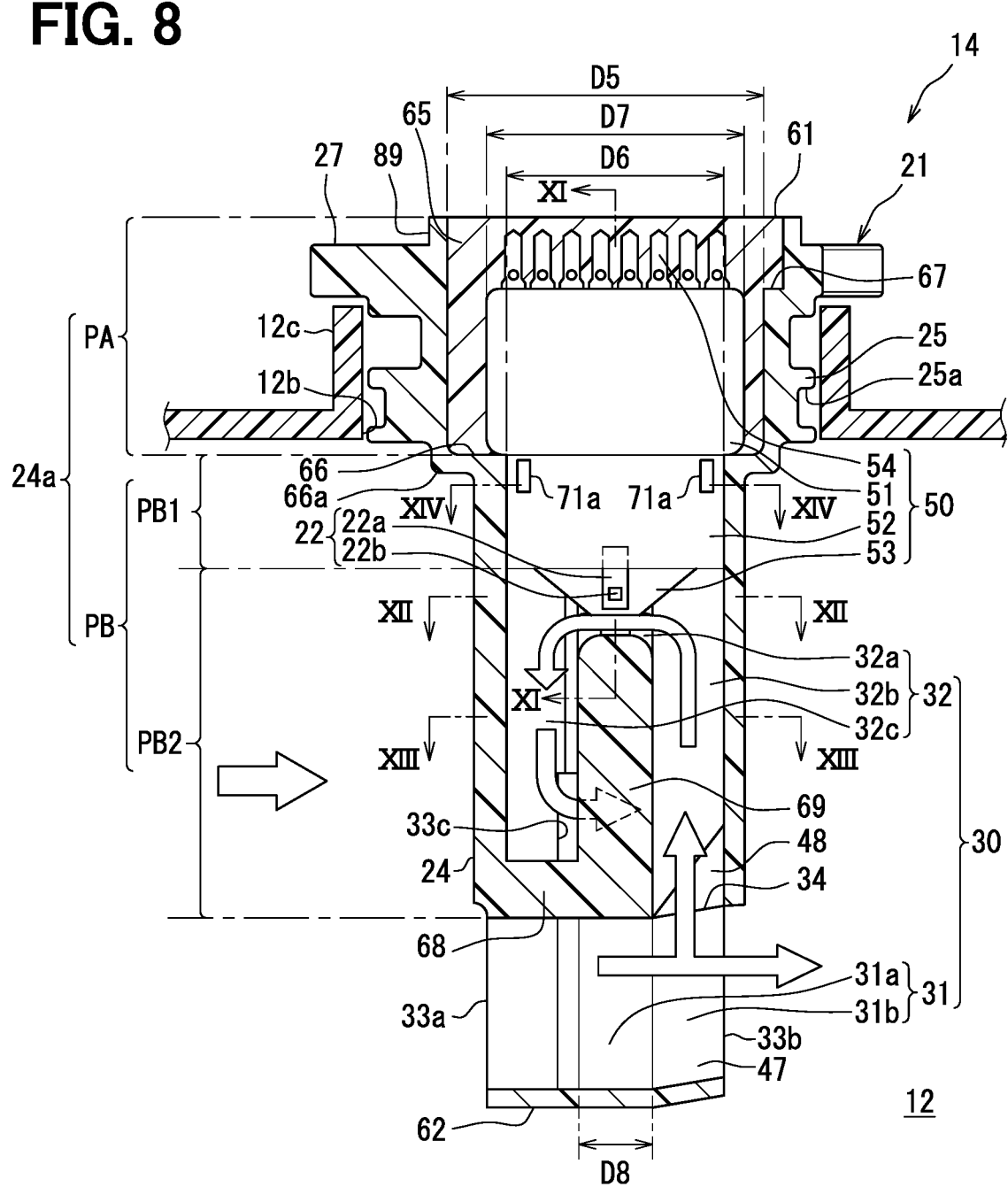
FIG. 8 is a cross-sectional view taken along a line VIII-VIII of FIG. 2.

As shown in FIG. 8, the housing body 24 defines a bypass flow channel 30 through which a part of the intake air flowing through the intake passage 12 flows. The bypass flow channel 30 has a passage flow channel 31 and a measurement flow channel 32, and the passage flow channel 31 and the measurement flow channel 32 are defined by an internal space of the housing body 24. The passage flow channel 31 penetrates through the housing body 24 in the depth direction Z, and includes an inflow port 33*a* as an upstream end portion and an outflow port 33*b* as a downstream end portion. The measurement flow channel 32 is a branch flow channel branched from an intermediate portion of the passage flow channel 31, and has a measurement outlet 33*c* which is a downstream end portion. The intake passage 12 may be referred to as a main passage, and the bypass flow channel 30 may be referred to as a sub-passage. In FIG. 8, the O-ring 26 is not shown.

Returning to the description of FIGS. 2 to 7, in the housing body 24, the inflow port 33*a* is provided on an upstream-side end face of the housing body 24, and the outflow port 33*b* is provided on a downstream-side end face of the housing body 24. Further, one measurement outlet 33*c* is provided on each of both side surfaces of the housing body 24. The measurement outlets 33c have an elongated shape extending in the height direction Y, and are aligned side by side in the width direction X. A side surface of the housing body 24 has a flat surface 44 extending straight in the height direction Y and the depth direction Z, and an upstream-side end face of the housing body 24 has a curved surface 45 curved so as to bulge toward the upstream side. The flat surface 44 and the curved surface 45 are adjacent to each other in the depth direction Z, and the measurement outlets 33c are disposed at a position across a boundary between the flat surface 44 and the curved surface 45 in the depth direction Z on the side surface of the housing body 24.

In this example, unlike the present embodiment, in the configuration in which all of the measurement outlets 33c are opened to the curved surface 45 of the upstream-side end face, the measurement outlets 33c are susceptible to the dynamic pressure on the upstream side of the intake passage 12. As a result, there is a concern that a flow rate flowing into the measurement flow channel 32 from the passage flow channel 31 is unintentionally reduced, and foreign matter such as dust enters the measurement flow channel 32 from the measurement outlet 33c.

Further, at the boundary between the flat surface 44 and the curved surface 45 in the housing body 24, the intake air is likely to be separated because a direction of advancement of the intake air flowing along the flat surface 44 at the upstream-side end portion changes at the flat surface 44. For that reason, unlike the present embodiment, in the configuration in which all of the measurement outlets 33c are opened to the flat surface 44 of the side surface, the measurement outlet 33c is affected by the separation of the intake air generated at the boundary between the flat surface 44 and the curved surface 45, and there is a concern that a flow velocity in the measurement flow channel 32 becomes unstable.

In contrast to the above configurations, in the configuration in which the measurement outlet 33c is disposed across the flat surface 44 and the curved surface 45 as in the present embodiment, there is an advantage that the measurement outlet 33c is less susceptible to the effect of a dynamic pressure on the upstream side of the intake passage 12 and the separation of the intake air. In that case, the measurement outlet 33c is disposed at a position in which the influence of the dynamic pressure received from the upstream side of the intake passage 12 and the influence of the separation of a gas flowing through the intake passage 12 are balanced with each other. Further, the above-mentioned advantage is further increased by shortening the measurement outlet 33c as much as possible in the depth direction Z, and from the viewpoint of increasing the advantage, it is preferable that the measurement outlet 33c has an elongated shape in the height direction Y as in the present embodiment.

Figure 9:
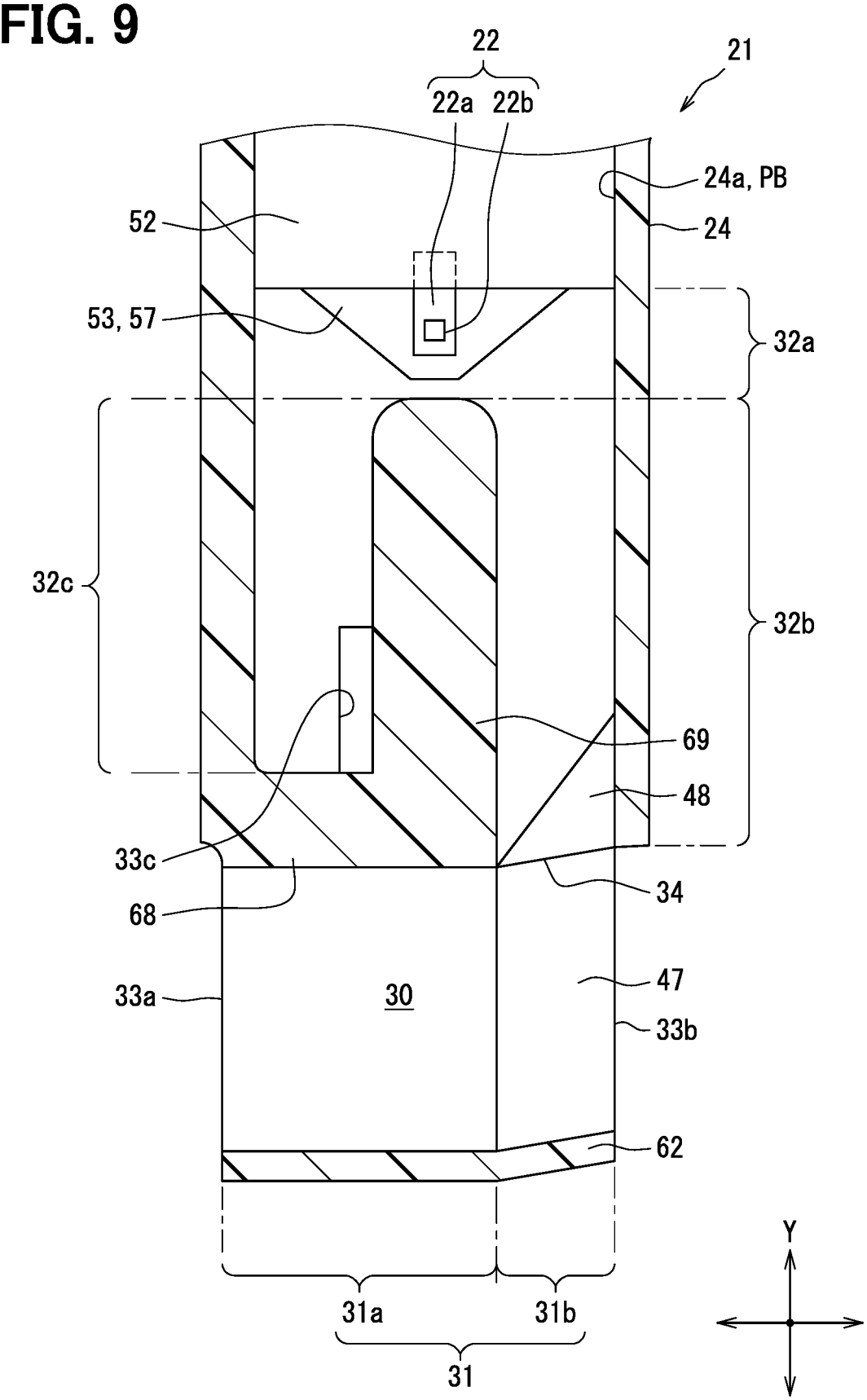
FIG. 9 is an enlarged view of a periphery of a measurement flow channel of FIG. 8.

As shown in FIGS. 8 and 9, the passage flow channel 31 has an inflow passage 31a extending straight from the inflow port 33a and an outflow passage 31b extending straight from the outflow port 33b. The inflow passage 31a extends in the depth direction Z, while the outflow passage 31b extends in a direction inclined with respect to the depth direction Z. The outflow passage 31b is inclined toward the outflow port 33b to the housing base end side, with the result that the outflow port 33b is disposed at a position deviated from the inflow port 33a toward the housing base end side.

The passage flow channel 31 is configured to be narrowed toward the outflow port 33b. In other words, the passage flow channel 31 is configured not to be narrowed even when approaching the inflow port 33a from the outflow port 33b in the depth direction Z. The flow channel area of the inflow passage 31a is uniform in the depth direction Z. In the inflow passage 31a, both the height dimension in the height direction Y and the width dimension in the width direction X are uniform in the depth direction. On the other hand, a cross-sectional area of the outflow passage 31b gradually decreases toward the outflow port 33b. In the outflow passage 31b, the height dimension is uniform in the depth direction Z, while the width dimension gradually decreases toward the outflow port 33b.

A flow channel area of the passage flow channel 31 is a cross-sectional area of the passage flow channel 31 in a direction orthogonal to a center line of the passage flow channel 31 or a direction in which the passage flow channel 31 extends. The center line of the inflow passage 31a extends in the depth direction Z, and the center line of the outflow passage 31b is slightly inclined with respect to the depth direction Z.

As shown in FIGS. 4 to 7, the housing body 24 has a passage throttle portion 47 for throttling the width dimension of the outflow passage 31b, and a throttle configuration of the passage flow channel 31 is realized by the passage throttle portion 47. The housing body 24 has a constriction portion 48 that gradually constricts the side surface and the downstream-side end face of the housing body 24 toward the passage throttle portion 47. With the provision of the constriction portion 48, an inner wall surface of the passage throttle portion 47 and an inner wall surface of an introduction path 32b can be connected to each other without a step. As a result, a separation flow at the connection portion between the outflow passage 31b and the introduction path 32b can be inhibited from occurring, and the measurement accuracy is improved.

Returning to the description of FIGS. 8 and 9, a flow channel boundary portion 34, which is a boundary between the passage flow channel 31 and the measurement flow channel 32, is a boundary between the outflow passage 31b and the measurement flow channel 32. The flow channel boundary portion 34 includes a measurement inlet which is an upstream end portion of the measurement flow channel 32. In the depth direction Z, a length dimension of the flow channel boundary portion 34 is the same as the length dimension of the outflow passage 31b. In that case, the flow channel boundary portion 34 is not exposed from the inflow port 33a in the depth direction Z because the inflow port 33a side of the flow channel boundary portion 34 is disposed closer to the housing tip side. In this example, in the inner peripheral surface of the passage flow channel 31, a surface of the housing base end side is referred to as a ceiling surface, and a surface of the tip side is referred to as a bottom surface. In that case, when the outflow port 33b is viewed from the upstream side in the depth direction Z, the flow channel boundary portion 34 is hidden on a back side of a ceiling surface of the inflow passage 31a so as to be invisible. As a result, even if foreign matter such as dust, dust, waterdrops, or oil drops fly off along with the intake air, the foreign matter travels straight through the passage flow channel 31 and is discharged from the outflow port 33b, so that the foreign matter can be prevented from breaking the detection element 22b without reaching the flow rate detector 22, and the foreign matter can be prevented from accumulating to deteriorate the detection accuracy.

The measurement flow channel 32 has a folded shape folded back at an intermediate position. The measurement flow channel 32 includes a detection path 32a provided with the flow rate detector 22, an introduction path 32b for introducing the intake air into the detection path 32a, and a discharge path 32c for discharging the intake air from the detection path 32a. The introduction path 32b extends from the flow channel boundary portion 34 toward the housing base end side, and the discharge path 32c extends from the measurement outlet 33c toward the housing base end side. The introduction path 32b and the discharge path 32c extend in parallel with each other in the height direction Y, and the respective flow channel areas of the introduction path 32b and the discharge path 32c are uniform in the height direction Y. In the introduction path 32b and the discharge path 32c, both the width dimension in the width direction X and the depth dimension in the depth direction Z are uniform in the height direction. In that case, the introduction path 32b and the discharge path 32c are not narrowed even when approaching the housing base end side.

The flow channel area of the measurement flow channel 32 is a cross-sectional area of the measurement flow channel 32 in a direction orthogonal to the center line of the measurement flow channel 32. The center lines of the introduction path 32b and the discharge path 32c extend in the height direction Y, and the center line of the detection path 32a extends in the depth direction Z. The height direction Y in which the introduction path 32b and the discharge path 32c extend corresponds to a direction in which the detection path 32a and the housing opening 61 are aligned and the direction in which the measurement flow channel 32 and the sensor SA 50 are aligned.

The detection path 32a is disposed closer to the housing base end side than the introduction path 32b and the discharge path 32c, and connects the downstream end portion of the introduction path 32b and the upstream end portion of the discharge path 32c with each other in a state where the detection path 32a is extended to the introduction path 32b and the discharge path 32c. The introduction path 32b is disposed downstream of the discharge path 32c in the depth direction Z, and the intake air flows in the detection path 32a in a direction opposite to the intake passage 12 and the passage flow channel 31. In the measurement flow channel 32, the intake air flowing in from the passage flow channel 31 once flows toward the housing base end side, and then U-turns by passing through the detection path 32a to flow toward the housing tip side. With the provision of the U-turned shaped flow channel, even if foreign matter such as dust, dust, waterdrops, or oil droplets fly off together with the intake air, the foreign matter can be prevented from damaging the detection element 22b without reaching the flow rate detector 22, and the foreign matter can be prevented from accumulating to deteriorate the detection accuracy. In the first place, the foreign matter that has entered the passage flow channel 31 from the inflow port 33a travels along the flow of the intake air, so that the foreign matter is likely to be discharged from the outflow port 33b, and hardly flows from the passage flow channel 31 into the measurement flow channel 32. This also makes it difficult for the foreign matter to reach the flow rate detector 22.

The measurement outlet 33c opens the discharge path 32c in the width direction X. A sum total of the opening areas of the two measurement outlets 33c is substantially the same as the flow channel area of the discharge path 32c. For example, unlike the present embodiment, in a configuration in which the sum total of the opening areas of the two measurement outlets 33c is larger than the flow channel area of the discharge path 32c, there is a concern that foreign matter is likely to enter the discharge path 32c from the measurement outlet 33c. In addition, in the configuration in which the sum total opening area is smaller than the flow channel area, the intake air flowing through the measurement flow channel 32 is less likely to flow out from the measurement outlet 33c, and there is a concern that a flow velocity of the intake air passing through the flow rate detector 22 is lowered and the detection accuracy of the flow rate detector 22 is lowered. On the other hand, according to the present embodiment, since the sum total opening area is substantially the same as the flow channel area, an entry of foreign matter from the measurement outlet 33c and a decrease in the flow velocity in the measurement flow channel 32 can be inhibited.

The flow rate detector 22 includes a detection board 22a as a circuit board, and a detection element 22b mounted on the detection board 22a. The detection board 22a forms an outer contour of the flow rate detector 22, and the detection element 22b is disposed at the center of the board surface of the detection board 22a. In that case, the detection element 22b is disposed at the center of the flow rate detector 22. The detection board 22a is electrically connected to the connector terminals 28a (refer to FIG. 18). The detection element 22b has a heat generation portion such as a heat generating resistive element and a temperature detector, and the flow rate detector 22 outputs a detection signal according to a change in temperature caused by heat generation in the detection element 22b. The flow rate detector 22 may also be referred to as a sensor chip.

In this example, in order to properly maintain the detection accuracy of the flow rate detector 22, there is a need to increase a temperature change in the temperature detector attributable to the intake flow rate in the detection element 22b to some extent, and in order to increase the temperature change, it is preferable to increase a flow velocity of a fluid coming in contact with the detection element 22b to some extent. This is to eliminate the influence of the temperature change acting on the detection element 22b by natural convection with respect to the temperature change of the detection element 22b according to the flow velocity of the fluid. The temperature change due to the natural convection depends on an installation angle of the detection element 22b, and causes an error in the detection signal of the temperature change due to the fluid. With an increase in the flow velocity of the fluid coming in contact with the detection element 22b, the influence of natural convection caused by the installation angle of the detection element 22b and the air flow meter 14 can be eliminated, and the detection of the fluid can be properly maintained.

The flow rate detector 22 corresponds to a physical quantity detector that detects the flow rate of the intake air as a physical quantity. The flow rate detector 22 is not limited to a thermal type flow rate sensor, and may be an ultrasonic type flow rate sensor, a Kalman vortex type flow rate sensor, or the like.

The air flow meter 14 has a sensor sub-assembly including a tip-type flow rate detector 22, and the sensor sub-assembly is referred to as a sensor SA 50. In this instance, the sensor SA 50 may be referred to as a sensor unit, and the air flow meter 14 may be referred to as a tip-type flow rate measurement device. The sensor SA 50 corresponds to a detection unit.

As shown in FIG. 10, the sensor SA 50 includes a circuit accommodation portion 51, a junction portion 52, a sensing portion 53, and lead terminals 54, and is formed in a plate shape extending in the depth direction Z and the height direction Y as a whole. In the height direction Y, the junction portion 52 is provided between the circuit accommodation portion 51 and the sensing portion 53, and the lead terminals 54 have conductivity and extend from the circuit accommodation portion 51 toward the opposite side of the sensing portion 53. In both the width direction X and the depth direction Z, the junction portion 52 is thinner than the circuit accommodation portion 51, and the sensing portion 53 is further thinner than the junction portion 52. Specifically, in both the width dimension in the width direction X and the depth dimension in the depth direction Z, the junction portion 52 is smaller than the circuit accommodation portion 51, and the sensing portion 53 is further smaller than the junction portion 52. In that case, a circuit step surface 55 is formed between the circuit accommodation portion 51 and the junction portion 52, and a sensing step surface 56 is formed between the junction portion 52 and the sensing portion 53. Each of the step surfaces 55 and 56 extends annularly along a peripheral portion of the junction portion 52 so as to be circumferentially arranged, and faces a tip side of the sensor SA 50.

The sensing portion 53 includes at least a part of the detection board 22a and the detection element 22b in the flow rate detector 22, and also includes a sensing support portion 57 for supporting the included part in the sensing portion 53. The sensing support portion 57 forms an outer contour of the sensing portion 53, and extends from the junction portion 52 toward the tip side of the flow rate detector 22.

Figure 11:
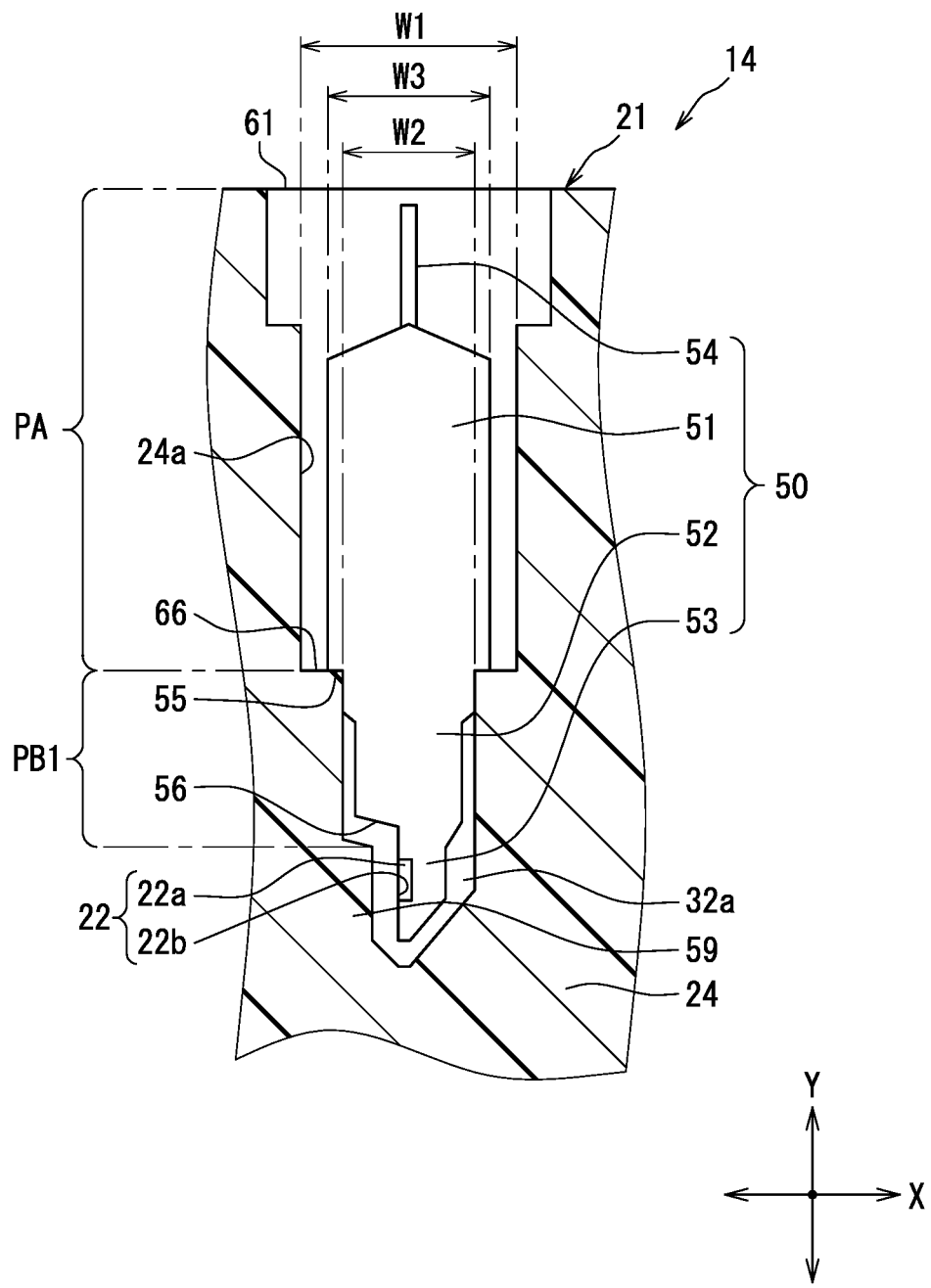
FIG. 11 is a cross-sectional view taken along a line XI-XI of FIG. 8.
Figure 12:
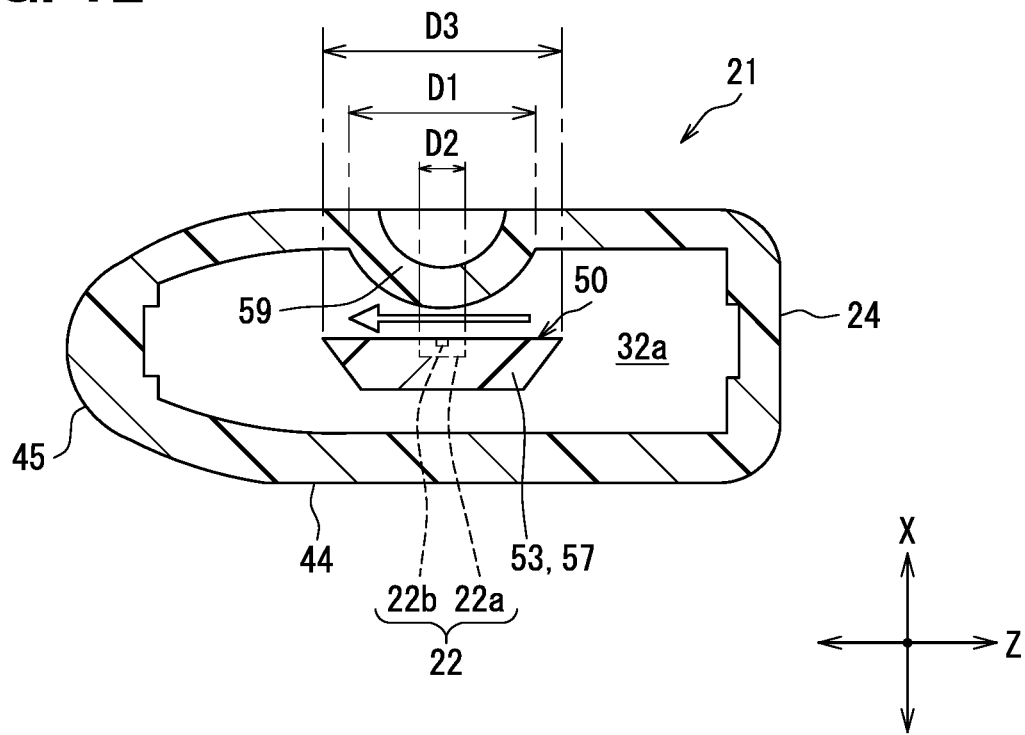
FIG. 12 is a cross-sectional view taken along a line XII-XII of FIG. 8.

As shown in FIG. 8, FIG. 11, and FIG. 12, in the housing 21, the sensor SA 50 is disposed at a position where the sensing portion 53 enters the detection path 32a. The sensing portion 53 is disposed at an intermediate position of the detection path 32a in the width direction X, and extends in the depth direction Z and the height direction Y. The sensing portion 53 is in a state in which an intermediate region of the detection path 32a is partitioned in the width direction X, and a detection throttle portion 59 for throttling the detection path 32a by reducing the flow channel area of the detection path 32a is provided at a position facing the flow rate detector 22 on an inner peripheral surface of the detection path 32a. The detection throttle portion 59 protrudes from the inner peripheral surface of the detection path 32a toward the flow rate detector 22, and a depth dimension D1 of the detection throttle portion 59 in the depth direction Z is larger than a depth dimension D2 of the flow rate detector 22 in the depth direction Z. In a region where the flow rate detector 22 exists in the height direction Y, a depth dimension D3 of the sensing support portion 57 in the depth direction Z is larger than a depth dimension D1 of the detection throttle portion 59.

The detection throttle portion 59 has a tapered shape in the width direction X. Specifically, a base end portion of the detection throttle portion 59 protruding from the inner wall of the housing body 24 in the width direction X is the widest portion, and a tip portion of the detection throttle portion 59 is the narrowest portion. The width dimension of the base end portion of the detection throttle portion 59 is set to the depth dimension D1 described above. The detection throttle portion 59 has a curved surface that expands toward the flow rate detector 22. The detection throttle portion 59 may have a tapered shape expanded toward the flow rate detector 22.

When a surface of the inner peripheral surface of the detection path 32a on the housing tip side is referred to as a bottom surface and a surface on the housing base end side is referred to as a ceiling surface, the bottom surface of the detection path 32a is formed by the housing body 24, while the ceiling surface is formed by the sensing step surface 56 of the sensor SA 50. In other words, the detection path 32a is partitioned by the sensing step surface 56. In this example, in an open region PB, the junction portion 52 is accommodated in an accommodation region PB1 as a part of the sensor SA 50, and a boundary between the accommodation region PB1 and a measurement region PB2 coincides with the sensing step surface 56. When a gap exists between the junction portion 52 and the housing body 24, the gap may communicate with the detection path 32a.

The detection throttle portion 59 extends from the bottom surface of the detection path 32a toward the ceiling surface. The outer peripheral surface of the detection throttle portion 59 extends straight in the height direction Y. In the height direction Y, the detection throttle portion 59 and the sensing step surface 56 of the sensor SA 50 are separated from each other, and a space between the tip of the detection throttle portion 59 and the sensing step surface 56 is also included in the detection path 32a.

In the detection path 32a, a separation distance between the sensing support portion 57 and the detection throttle portion 59 gradually decreases toward the flow rate detector 22 in the depth direction Z. In the above configuration, when the intake air flowing into the detection path 32a from the introduction path 32b passes between the sensing support portion 57 and the detection throttle portion 59, the flow velocity of the intake air is likely to increase toward the detection element 22b of the flow rate detector 22. In that case, since the intake air is applied to the detection element 22b at an appropriate flow velocity, the detection accuracy of the flow rate detector 22 can be enhanced.

Returning to the description of FIG. 8, the housing body 24 is formed in a cylindrical shape as a whole. The housing body 24 has a housing opening 61 that opens the internal space 24a, and the housing opening 61 is formed in one end face of the housing body 24. The other end of the housing body 24 is closed, and the closed part is referred to as a housing bottom portion 62, and the housing bottom portion 62 forms a bottom surface of the passage flow channel 31. The housing body 24 has holes that define the inflow port 33a and the outflow port 33b, and those holes extend from the housing bottom portion 62 toward the housing base end side.

The air flow meter 14 has a potting portion 65 as a closing portion for closing the housing opening 61. The potting portion 65 seals the internal space 24a of the housing body 24 by filling the internal space 24a with a resin material such as a molten potting resin. In that case, the potting portion 65 may be referred to as a sealing portion or a seal portion. The potting portion 65 is not formed integrally with the housing 21 in the air flow meter 14, but is formed independently of the housing 21.

The internal space 24a includes the sealing region PA sealed by the potting portion 65 and the open region PB not sealed by the potting portion 65. The sealing region PA extends from the housing opening 61 toward the housing tip side, and the open region PB is disposed on the housing tip side of the sealing region PA. The open region PB extends from the sealing region PA toward the housing tip side, and the open region PB includes the measurement flow channel 32. The boundary between the sealing region PA and the open region PB extends in a direction orthogonal to the height direction Y. The sealing region PA corresponds to a potting region.

The open region PB has an accommodation region PB1 in which a part of the sensor SA 50 is accommodated, and a measurement region PB2 in which the measurement flow channel 32 is provided. The accommodation region PB1 extends from the sealing region PA toward the housing tip side, and the measurement region PB2 is provided on the housing tip side of the accommodation region PB1. The boundary between the accommodation region PB1 and the measurement region PB2 extends in a direction perpendicular to the height direction Y, and the accommodation region PB1 and the measurement region PB2 divide the open region PB into two in the height direction Y.

A region step surface 66 is formed on the inner peripheral surface of the housing body 24 between the inner peripheral surface of the sealing region PA and the inner peripheral surface of the open region PB. The region step surface 66 extends annularly so as to surround the internal space 24a, and faces the housing base end side. For the purpose of reducing a wall thickness of the housing body 24 as much as possible, the housing body 24 is provided with an overhanging portion 66a which overhangs to the outer peripheral side in accordance with the region step surface 66. The region step surface 66 and the overhanging portion 66a are disposed closer to the housing tip side than the ring holding portion 25. The region step surface 66 corresponds to a hooking portion.

A sealing step surface 67 provided closer to the housing base end side than the region step surface 66 is provided on the inner peripheral surface of the sealing region PA. Similar to the region step surface 66, the sealing step surface 67 extends annularly around the periphery of the sealing region PA so as to face the housing base end side.

The sensor SA 50 extends over the sealing region PA and the open region PB in the height direction Y, and is entirely accommodated in the internal space 24a of the housing 21. The circuit step surface 55 of the sensor SA 50 is caught by the region step surface 66 of the housing 21, thereby restricting the sensor SA 50 from further entering the internal space 24a. Further, the circuit step surface 55 and the region step surface 66 abut against each other in close contact with each other, and when the potting portion 65 is formed, entering of the molten resin into the open region PB is restricted by the abutment portion. In that instance, the boundary between the sealing region PA and the open region PB coincides with the boundary between the circuit accommodation portion 51 and the junction portion 52 of the sensor SA 50. The sensor SA 50 is assembled to the housing 21, so that all or part of the internal space 24a of the housing 21 is occupied by the sensor SA 50.

In the depth direction Z, a depth dimension D5 of the sealing region PA at the region step surface 66 is larger than a depth dimension D6 of the open region PB. In that instance, in the sensor SA 50, a depth dimension D7 of the circuit accommodation portion 51 at the circuit step surface 55 is smaller than the depth dimension D5 of the sealing region PA and larger than the depth dimension D6 of the open region PB. As shown in FIG. 11, a width dimension W1 of the sealing region PA at the region step surface 66 in the width direction X is larger than a width dimension W2 of the open region PB. In that instance, in the sensor SA 50, a width dimension W3 of the circuit accommodation portion 51 at the circuit step surface 55 is smaller than the width dimension W1 of the sealing region PA and larger than the width dimension W2 of the open region PB. In this manner, a configuration is realized in which the circuit step surface 55 of the sensor SA 50 is caught by the region step surface 66 of the housing 21.

In the sensor SA 50, the width direction X and the depth direction Z are orthogonal to a direction in which the circuit accommodation portion 51 and the flow rate detector 22 are aligned, and orthogonal to a direction in which the sensing support portion 57 protrudes from the junction portion 52. The width direction X and the depth direction Z are a direction orthogonal to the direction in which the lead terminals 54 protrude from the circuit accommodation portion 51. In the housing 21, the depth direction Z is a direction in which the intake air flows in the passage flow channel 31 and the detection path 32a.

The housing body 24 has a lateral partition wall 68 and a longitudinal partition wall 69, and the partition walls 68 and 69 are provided in a lateral direction in the depth direction Z. The lateral partition wall 68 divides the internal space 24a in a direction orthogonal to the height direction Y, thereby defining an end portion of the open region PB on the housing tip side. The lateral partition wall 68 extends from the upstream-side outer peripheral portion of the housing body 24 toward the downstream side, and separates the open region PB and the inflow passage 31a vertically. The lateral partition wall 68 is disposed closer to the housing base end side than the inflow port 33a, and forms a ceiling surface of the inflow passage 31a. The longitudinal partition wall 69 extends from the lateral partition wall 68 toward the housing base end side, separates the introduction path 32b and the discharge path 32c of the measurement flow channel 32 from each other, and forms the floor surface of the detection path 32a. The lateral partition wall 68 may be referred to as a lateral partition portion, and the longitudinal partition wall 69 may be referred to as a longitudinal partition portion. The lateral partition wall 68 corresponds to a passage partition portion, and the longitudinal partition wall 69 corresponds to a measurement partition portion.

The housing body 24 is configured not to narrow the internal space 24a even when the housing body 24 approaches the housing opening 61 from the housing base end side with respect to the inflow port 33a and the outflow port 33b. In the above configuration, even if the inner peripheral surface of the housing body 24 has a step surface facing the housing base end side like the region step surface 66, there is no step surface facing the housing tip side. Further, a separation distance between portions of the inner peripheral surface of the housing 21 facing each other across the internal space 24a does not become small even if the separation distance increases or does not change toward the housing opening 61 in the height direction Y.

Figure 13:
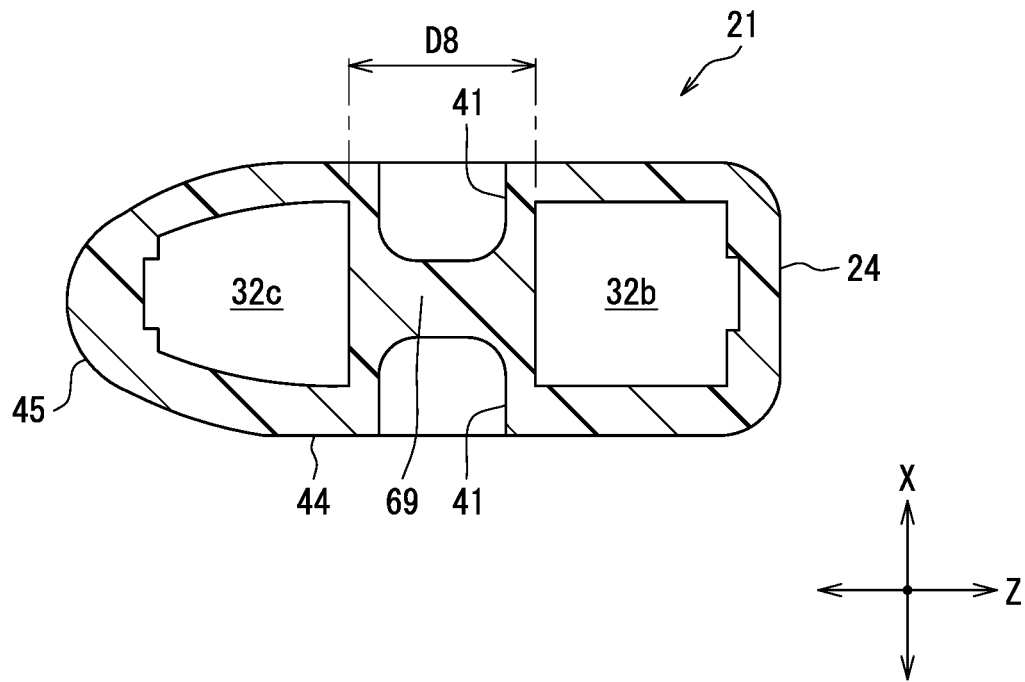
FIG. 13 is a cross-sectional view taken along a line XIII-XIII of FIG. 8.

The longitudinal partition wall 69 is configured so as not to become thick even when approaching the housing opening 61 in the height direction Y. In the above configuration, a depth dimension of the longitudinal partition wall 69 in the depth direction Z does not increase even if the depth dimension decreases or does not change toward the housing opening 61 in the height direction Y. In FIGS. 12 and 13, the depth dimension D1 of the detection throttle portion 59 is the same as or smaller than a depth dimension D8 of a portion where the longitudinal partition wall 69 is thin in the depth direction Z. As a result, a step surface facing the housing tip side is not formed at the boundary between the detection throttle portion 59 and the longitudinal partition wall 69.

Returning to the description of FIG. 8, the internal space 24a of the housing body 24 may be narrowed as the internal space 24a approaches the housing opening 61 in the region closer to the housing tip side than the lateral partition wall 68 in the height direction Y. In other words, the width dimension of the passage flow channel 31 in the width direction X may gradually decrease as the passage flow channel 31 approaches the housing opening 61 in the height direction Y. In addition, a step surface facing the housing tip side may be formed on the inner peripheral surface of the passage flow channel 31.

However, as described above, the passage flow channel 31 is configured not to be narrowed even when approaching the inflow port 33a in the depth direction Z. In the above configuration, the inner peripheral surface of the passage flow channel 31 may have a step surface facing the inflow port 33a side, but there is no step surface facing the outflow port 33b side.

Figure 14:
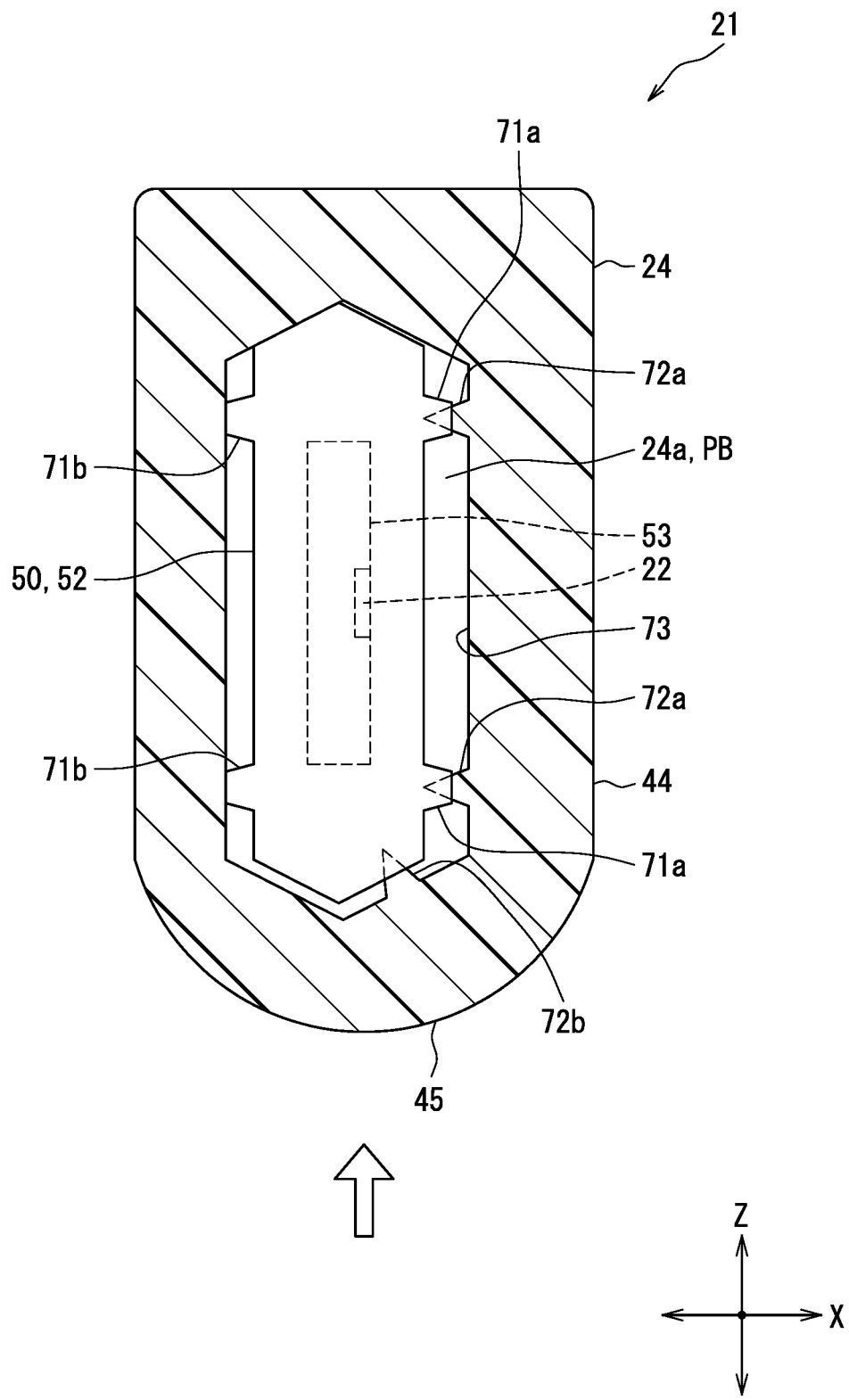
FIG. 14 is a cross-sectional view taken along a line XIV-XIV of FIG. 8.

In the internal space 24a of the housing body 24, since the junction portion 52 of the sensor SA 50 is fitted to the inner peripheral surface of the housing body 24, the circuit step surface 55 of the sensor SA 50 and the region step surface 66 of the housing body 24 are held in an abutment position. When one surface of the plate surfaces of the sensor SA 50 on which the flow rate detector 22 is provided is referred to as a front surface and the other surface on the other side of the front surface is referred to as a back surface, as shown in FIGS. 8 and 14, the sensor SA 50 has a front SA protrusion 71a protruding to the front side and a back SA protrusion 71b protruding to the back side. Two front SA protrusions 71a and two back SA protrusions 71b are provided in each of the junction portions 52.

The housing body 24 has a width housing protrusion 72a protruding in the width direction X from an inner peripheral surface of the housing body 24, and a depth housing protrusion 72b protruding in the depth direction Z. The housing protrusions 72a and 72b protrude from the inner peripheral surface of the housing body 24 toward the inner peripheral side. Two width housing protrusions 72a are provided at positions facing the front surface of the sensor SA 50. One depth housing protrusion 72b is provided at a position facing a side surface of the sensor SA 50 in the upstream-side outer peripheral portion of the housing body 24, and extends in a direction away from the curved surface 45 of the housing body 24 in a direction inclined with respect to the depth direction Z.

The housing protrusions 72a and 72b are disposed on the inner peripheral surface of the open region PB, and thus are provided closer to the housing tip side than the ring holding portion 25. In this example, in the housing 21, the wall thickness of the portion where the ring holding portion 25 is formed is relatively large due to the provision of the ring holding portion 25 on the outer peripheral side of the housing body 24, the provision of the holding groove 25a, and the like. For that reason, in the case of molding the housing 21 with resin, there is a concern that the resin distortion of the portion of the housing 21 where the ring holding portion 25 is formed is likely to occur as the molten resin is cured. On the other hand, as described above, since the housing protrusions 72a and 72b are disposed at positions separated from the ring holding portion 25 toward the housing tip side, the influence of the resin distortion in the ring holding portion 25 is less likely to be applied to the housing protrusions 72a and 72b. For that reason, the dimensions and positions of the housing protrusions 72a and 72b can be accurately realized as designed.

The respective tip end faces of the front SA protrusion 71a and the width housing protrusion 72a are in contact with each other, and the back SA protrusion 71b is in contact with a flat portion of the inner peripheral surface of the housing body 24. As a result, the relative movement of the sensor SA 50 to the housing body 24 in the width direction X is regulated. Further, in the junction portion 52, the tip end face of the depth housing protrusion 72b abuts on the side end face of the housing body 24 on the side of the curved surface 45, and in the junction portion 52, the side end face of the side opposite to the curved surface 45 abuts on the flat portion of the inner peripheral surface of the housing body 24. As a result, the sensor SA 50 is restricted from moving relative to the housing body 24 in the depth direction Z.

The sensor SA 50 is disposed at a position closer to the side of the inner peripheral surface of the housing body 24 facing away from the width housing protrusion 72a than the center of the internal space 24a in the width direction X because no protrusion corresponding to the back SA protrusion 71b is provided on the inner peripheral surface of the housing body 24. In other words, the sensor SA 50 is disposed at a position closer to the back surface of the sensor SA 50.

Figure 15:
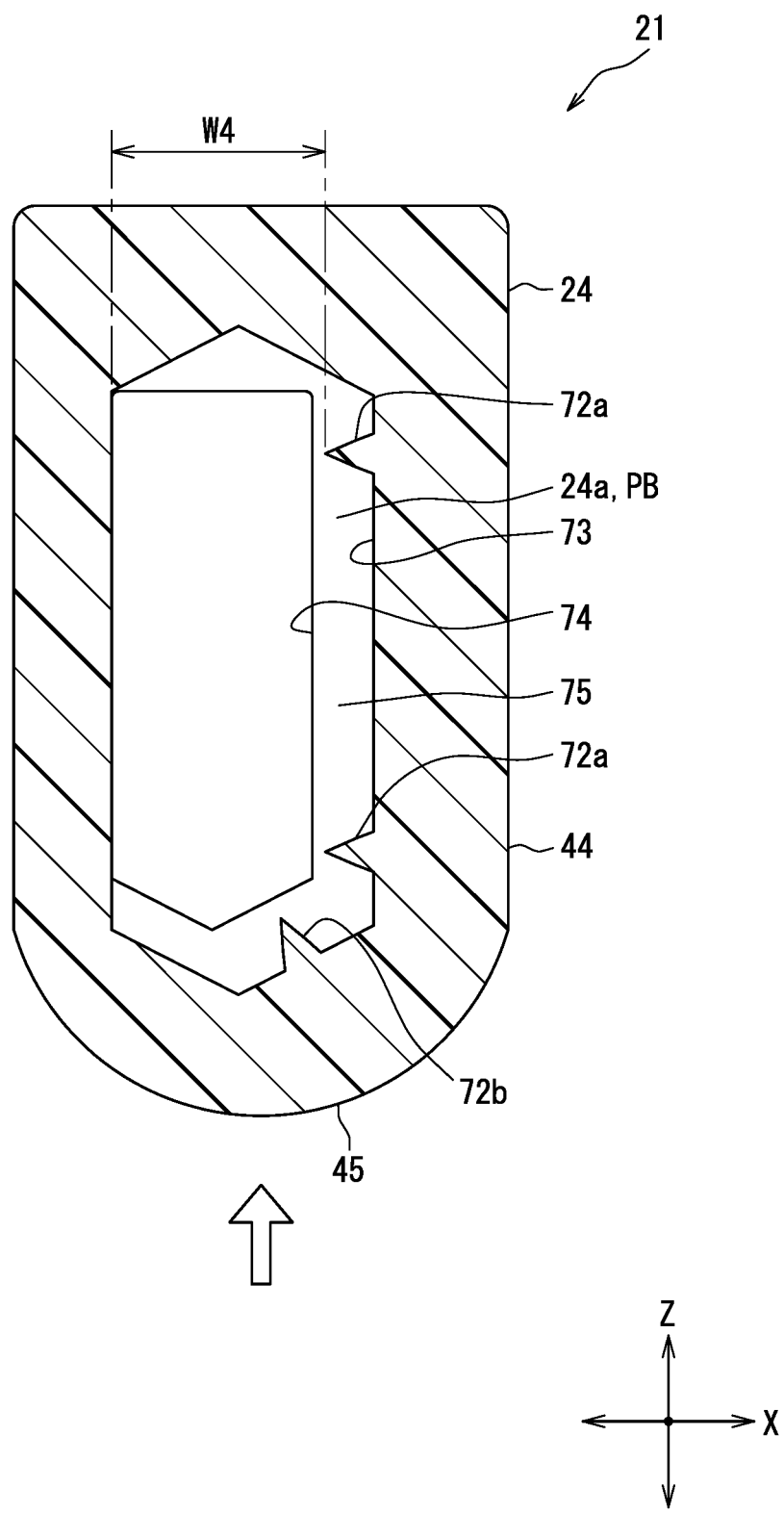
FIG. 15 is a horizontal cross-sectional view of a housing before the sensor SA is inserted into the housing.

In this example, the housing protrusions 72a and 72b in which the sensor SA 50 is not fitted to the inner peripheral surface of the housing body 24 at the time of manufacturing the air flow meter 14 will be described referring to FIGS. 15 and 16. As shown in FIG. 15, the protrusion dimensions of the housing protrusions 72a and 72b from the inner peripheral surface of the housing body 24 are larger than those after the sensor SA 50 has been fitted. For example, the housing protrusions 72a and 72b, which are not fitted with the sensor SA 50, are tapered in the protruding directions, and the housing protrusions 72a and 72b have sharp tips.

The inner peripheral surface of the housing body 24 has a protrusion support surface 73 for supporting the housing protrusions 72a and 72b. In this example, in order to prevent the end faces of the housing protrusions 72a and 72b from becoming step surfaces facing the housing tip side, a protrusion covering surface 74 for covering the housing protrusions 72a and 72b from the housing tip side is included in the inner peripheral surface of the housing body 24. The protrusion covering surface 74 is provided closer to the housing tip side than the protrusion support surface 73, and is disposed closer to the inner peripheral side in the width direction X and the depth direction Z than the protrusion support surface 73. A covering step surface 75 facing the housing base end side is formed at a boundary between the protrusion support surface 73 and the protrusion covering surface 74.

Figure 16:
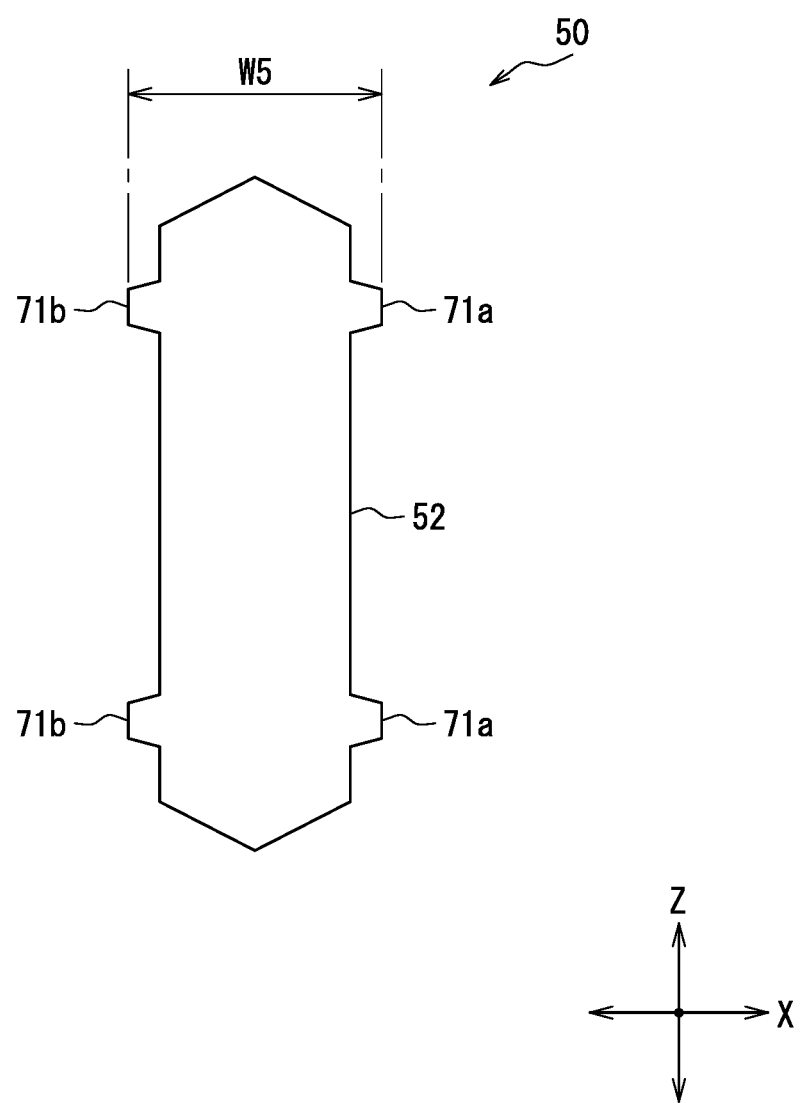
FIG. 16 is a horizontal cross-sectional view of the sensor SA prior to insertion into the housing.

As shown in FIG. 14 and FIG. 16, unlike the housing protrusions 72a and 72b, the SA protrusions 71a and 71b of the sensor SA 50 have no significant change in shapes and dimensions before and after the SA protrusions 71a and 71b are fitted to the inner peripheral surface of the housing body 24. This is because the SA protrusions 71a and 71b are made of a material having higher hardness and strength than the housing protrusions 72a and 72b.

In FIGS. 15 and 16, in the housing body 24 prior to the sensor SA 50 being fitted, an effective dimension W4 of the internal space 24a in the width direction X excluding the SA protrusions 71a and 71b is smaller than a width dimension W5 of the thickest part of the sensor SA 50 in the width direction X. The width dimension W5 is a separation distance between the tips of the SA protrusions 71a and 71b. In that case, when the sensor SA 50 is inserted into the internal space 24a from the housing opening 61, the tip portion of the width housing protrusion 72a is scraped off by the front SA protrusion 71a, and the tip portion of the depth housing protrusion 72b is scraped off by the side end face of the junction portion 52. In this instance, the sensor SA 50 is pressed toward the back surface of the inner peripheral surface of the housing body 24 and toward the side of the inner peripheral surface of the housing body 24 facing away from the curved surface 45, so that the sensor SA 50 is accurately positioned in the internal space 24a in the width direction X. When the sensor SA 50 is inserted into the internal space 24a, the deformation of the housing protrusions 72a and 72b pressed by the front SA protrusion 71a and the junction portion 52 is more likely to occur than scraping of the tip portions of the housing protrusions 72a and 72b. In that case, the housing protrusions 72a and 72b are deformed so as to be crushed by the front SA protrusions 71*a* and the junction portion 52, whereby the protrusion dimensions of the housing protrusions 72*a* and 72*b* are reduced.

As described above, in the configuration in which the width dimension W5 of the sensor SA 50 is defined by the SA protrusions 71*a* and 71*b*, the manufacturing variation of the width dimension W5 is less likely to occur as compared with the configuration in which the width dimension W5 is defined by the front surface and the back surface of the junction portion 52, for example. For that reason, the positioning accuracy of the sensor SA 50 with respect to the housing body 24 in the width direction X and the depth direction Z can be further improved as compared with a configuration in which the sensor SA 50 does not have the SA protrusions 71*a* and 71*b*.

Each of the SA protrusions 71*a* and 71*b* and the housing protrusions 72*a* and 72*b* has an elongated shape extending in the height direction Y. The SA protrusions 71*a* and 71*b* extend from the circuit step surface 55 toward the housing tip side to an intermediate position of the junction portion 52, and the housing protrusions 72*a* and 72*b* extend from the region step surface 66 toward the housing tip side to an intermediate position of the housing body 24. In the present embodiment, the housing protrusions 72*a* and 72*b* extend toward the housing tip side more than the SA protrusions 71*a* and 71*b*, and the tip portion of the width housing protrusion 72*a* remains at the housing tip side more than the front SA protrusion 71*a* without being scraped off. When the width housing protrusion 72*a* is deformed by being pressed by the front SA protrusion 71*a*, a portion of the width housing protrusion 72*a* located closer to the housing tip side than the front SA protrusion 71*a* is not deformed or slightly deformed.

The SA protrusions 71*a* and 71*b* may extend to the end portion of the junction portion 52 on the housing tip side. The housing protrusions 72*a* and 72*b* may extend to the end portion of the open region PB on the housing tip side. In that case, since the end faces of the housing protrusions 72*a* and 72*b* do not face the housing base end side in the open region PB, there is no need to provide the protrusion covering surface 74 and the covering step surface 75.

FIGS. 12 and 13 are different from FIGS. 14 and 15 in the cross-sectional shape of the internal space 24*a* of the housing body 24 because FIGS. 12 and 13 are schematic diagrams, and FIGS. 12 to 15 are diagrams relating to the air flow meter 14 of FIG. 8. In FIG. 11, the SA protrusions 71*a* and 71*b* and the housing protrusions 72*a* and 72*b* are not shown, and in FIG. 14, the protrusion covering surface 74 and the covering step surface 75 are not shown.

Figure 17:
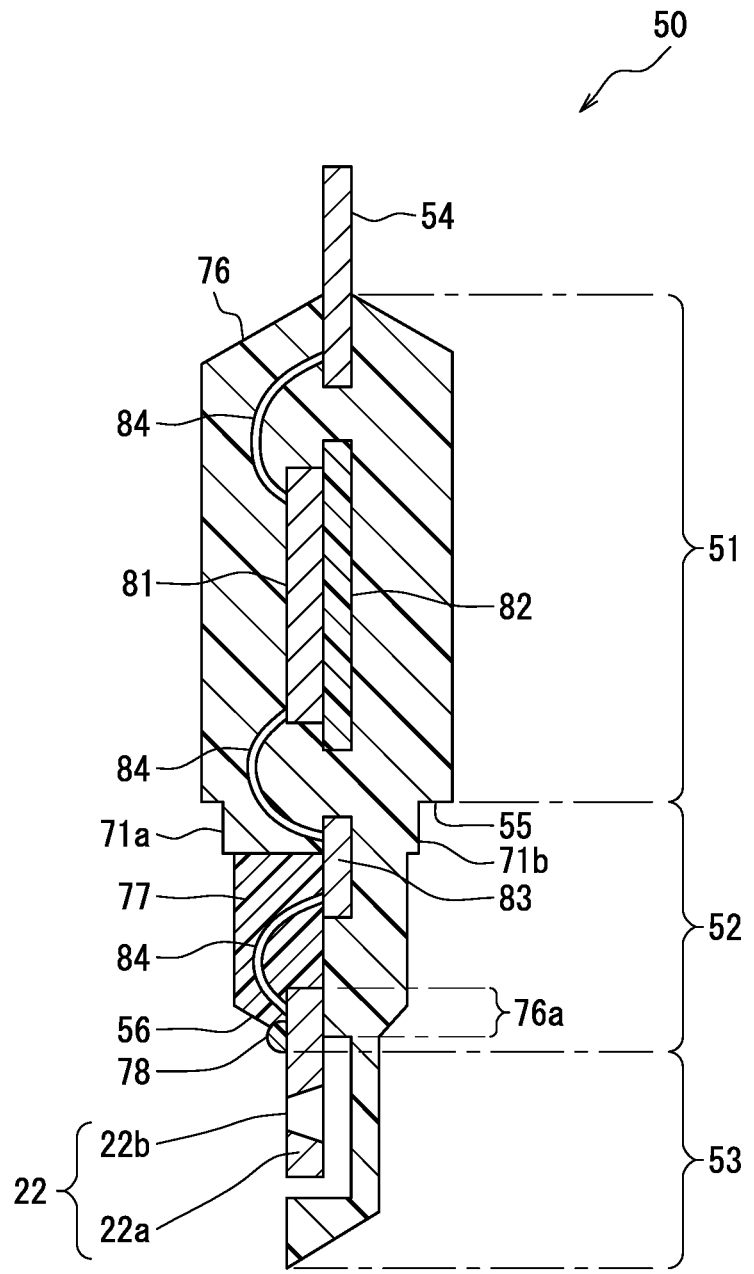
FIG. 17 is a vertical cross-sectional view showing an internal configuration of the sensor SA.

As shown in FIG. 17, the sensor SA 50 includes a circuit chip 81 for performing various processes, a lead frame 82 for supporting the circuit chip 81, a relay board 83, and bonding wires 84 in addition to the flow rate detector 22 and the lead terminals 54. The relay board 83 relays the signal from the flow rate detector 22 to the circuit chip 81. The multiple bonding wires 84 are provided so that the detection board 22*a* and the lead terminals 54 are electrically connected to each other.

The sensor SA 50 also includes a mold portion 76 that forms an outer contour of the sensor SA 50. The mold portion 76 is made of a resin material such as a mold resin, and fixes the flow rate detector 22, the lead terminals 54, the circuit chip 81, the lead frame 82, the relay board 83, the bonding wires 84, and the like in a protected state. The bonding wires 84 bridged between the relay board 83 and the detection board 22*a* is protected by a protective portion 77 made of a resin material such as a potting resin. The detection board 22*a* is provided with a dam material 78 extending along the peripheral portion of the protective portion 77, and the dam material 78 serves to define the shape of the molten resin when forming the protective portion 77.

The mold portion 76 has a support surface 76*a* for supporting the detection board 22*a*. The plate surface of the detection board 22*a* is bonded to the support surface 76*a* in an overlapping state, and the detection board 22*a* is supported in a state of being sandwiched between the support surface 76*a* and the protective portion 77. In this example, in the sensor SA 50, the support surface 76*a* and the circuit chip 81 are disposed at positions as far as possible apart from the circuit step surface 55 which is a fixed part with the housing body 24. For example, the support surface 76*a* and the circuit chip 81 are not disposed at positions that extend laterally to the circuit step surface 55 in the width direction X and the height direction Y. In this instance, even if the sensor SA 50 is deformed by an external force applied to the circuit step surface 55, the flow rate detector 22 and the circuit chip 81 are less likely to be deformed, and therefore, the operation accuracy of the circuit chip 50 can be appropriately maintained.

Figure 18:
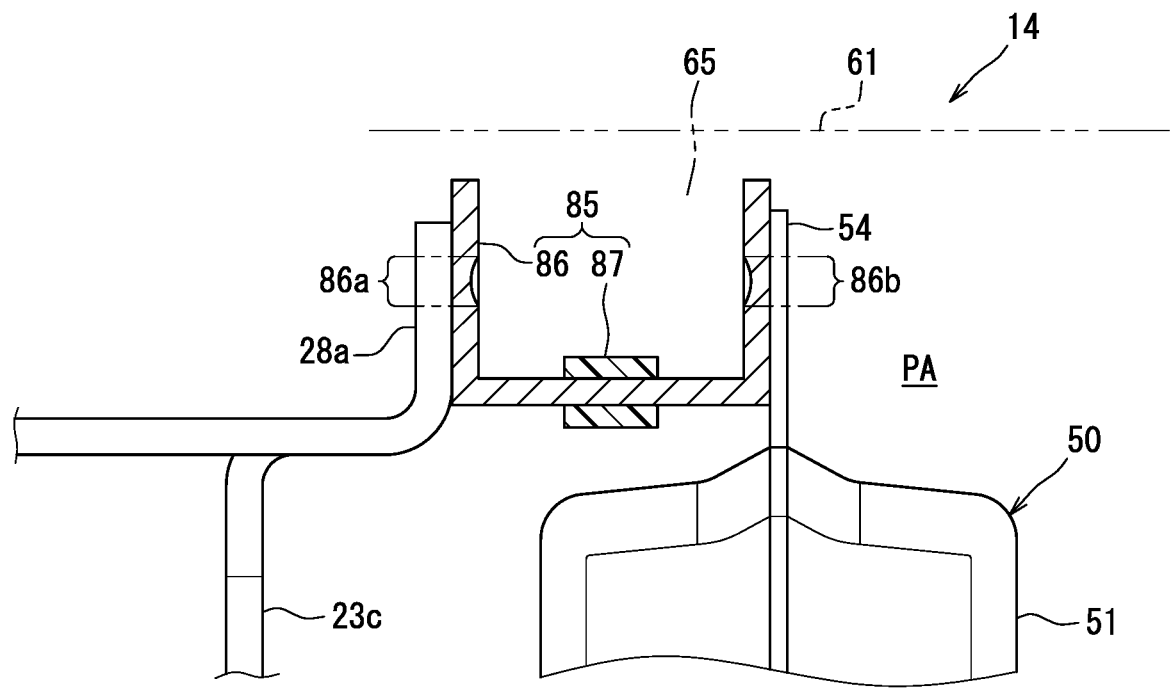
FIG. 18 is a diagram illustrating a connection structure between a connector terminal and a lead terminal of the sensor SA.
Figure 19:
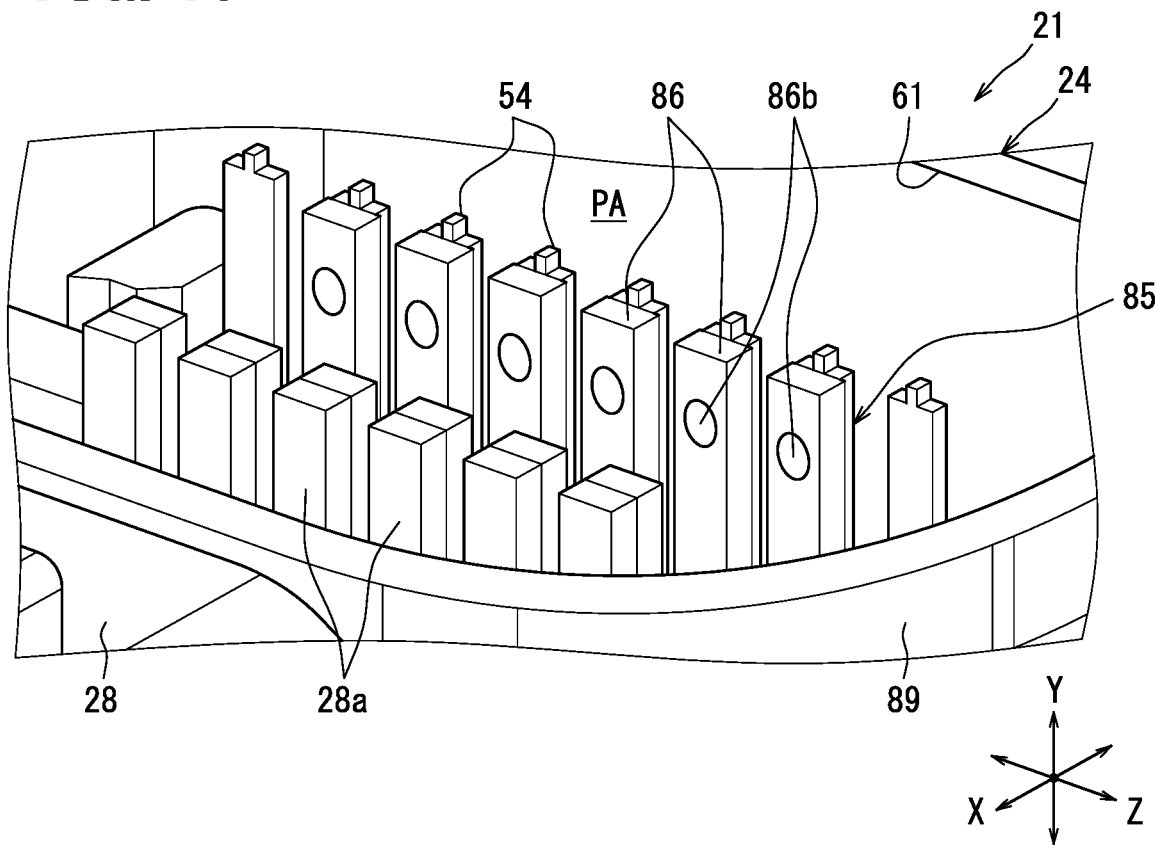
FIG. 19 is a perspective view showing an internal structure of a sealing region.

As shown in FIGS. 18 and 19, the lead terminals 54 of the sensor SA 50 are electrically connected to the connector terminals 28*a* of the connector portion 28 through the terminal unit 85 in the sealing region PA of the housing body 24. The multiple lead terminals 54 and the multiple connector terminals 28*a* are aligned at predetermined intervals in the depth direction Z. The lead terminal 54 and the connector terminal 28*a* corresponding to each other are disposed as a pair of terminals at positions facing each other in the width direction X, and those terminals 28*a* and 54 are connected to each other through the terminal unit 85.

Figure 20:
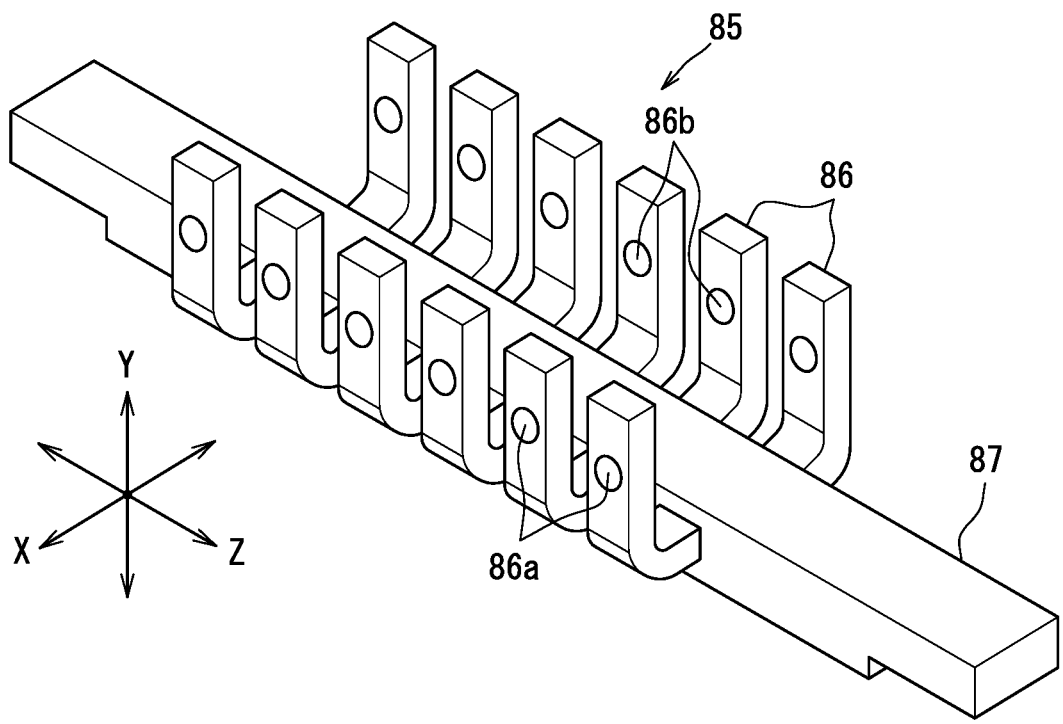
FIG. 20 is a perspective view of a terminal unit.

As shown in FIG. 20, the terminal unit 85 includes multiple bridge terminals 86 and a terminal fixing portion 87 for fixing the bridge terminals 86. Each of the bridge terminals 86 is an elongated member having conductivity and extending generally in a U-shape. The bridge terminal 86 has a first connection portion 86*a* to which the connector terminal 28*a* is connected, and a second connection portion 86*b* to which the lead terminal 54 is connected. The connection portions 86*a* and 86*b* are portions in which parts of the bridge terminals 86 protrude while being curved in the thickness direction, and the protruding portions are connected to the terminals 28*a* and 54 by welding or the like. The multiple bridge terminals 86 are aligned at predetermined intervals in the depth direction Z, and the terminal fixing portion 87 connects intermediate portions of the bridge terminals 86 to each other in a state of extending in the depth direction Z. The terminal fixing portion 87 is formed of a resin material or the like having electrical insulating properties.

The connector terminals 28*a*, the lead terminals 54, and the bridge terminals 86 are connected to each other and extend in the height direction Y. In that case, since there is no need to perform a bending process such as a post-bending process in accordance with an actual positional relationship when those terminals 28*a*, 54, and 86 are connected to each other, a work load when manufacturing the air flow meter 14 can be reduced. Further, when the terminals 28*a*, 54, and 86 are connected by spot welding, the electrodes of a welding jig and the terminals 28*a*, 54, and 86 can be stably brought into contact with each other, so that a welding strength can be likely to be increased. As the welding for connecting the terminals 28*a*, 54, and 86, laser welding or the like may be used in addition to the spot welding. The terminals 28*a*, 54, and 86 may be electrically connected to each other by wire bonding, soldering, or the like.

The terminal unit 85 is fixed to the housing body 24 by the terminal fixing portion 87 being caught by the sealing step surface 67 or the like. In that case, the terminal unit 85 is positioned with respect to the housing body 24 in the height direction Y by the sealing step surface 67.

In FIG. 18, the housing body 24 is not shown, and the housing opening 61 and the potting portion 65 are indicated in virtual lines. In FIG. 19, the housing body 24 is illustrated, but the potting portion 65 is not illustrated. Each of the bridge terminals 86 may have a fit portion for fitting the connector terminal 28*a* and the lead terminal 54. In the above configuration, there is no need to perform spot welding on the terminals 28*a*, 54, and 86.

A signal from the temperature sensing element 23*a* is output from the connector portion 28 in the order of the intake air temperature terminals 23*c*, the bridge terminals 86, the lead terminals 54, the circuit chip 81, the lead terminals 54, the bridge terminals 86, and the connector terminals 28*a*.

In the sensor SA 50, a flow rate signal corresponding to the flow rate of the intake air flowing through the measurement flow channel 32 is output from the flow rate detector 22 to the circuit chip 81, and the flow rate signal is processed by the circuit chip 81 to calculate the flow rate of the intake air in the intake passage 12. The flow rate calculated by the circuit chip 81 is transmitted to the ECU 20 by transmitting a signal through the lead terminals 54 and the connector terminals 28*a*. As described above, the air flow meter 14 detects the flow rate of the intake air flowing through the intake passage 12 by the flow rate detector 22.

Figure 21:
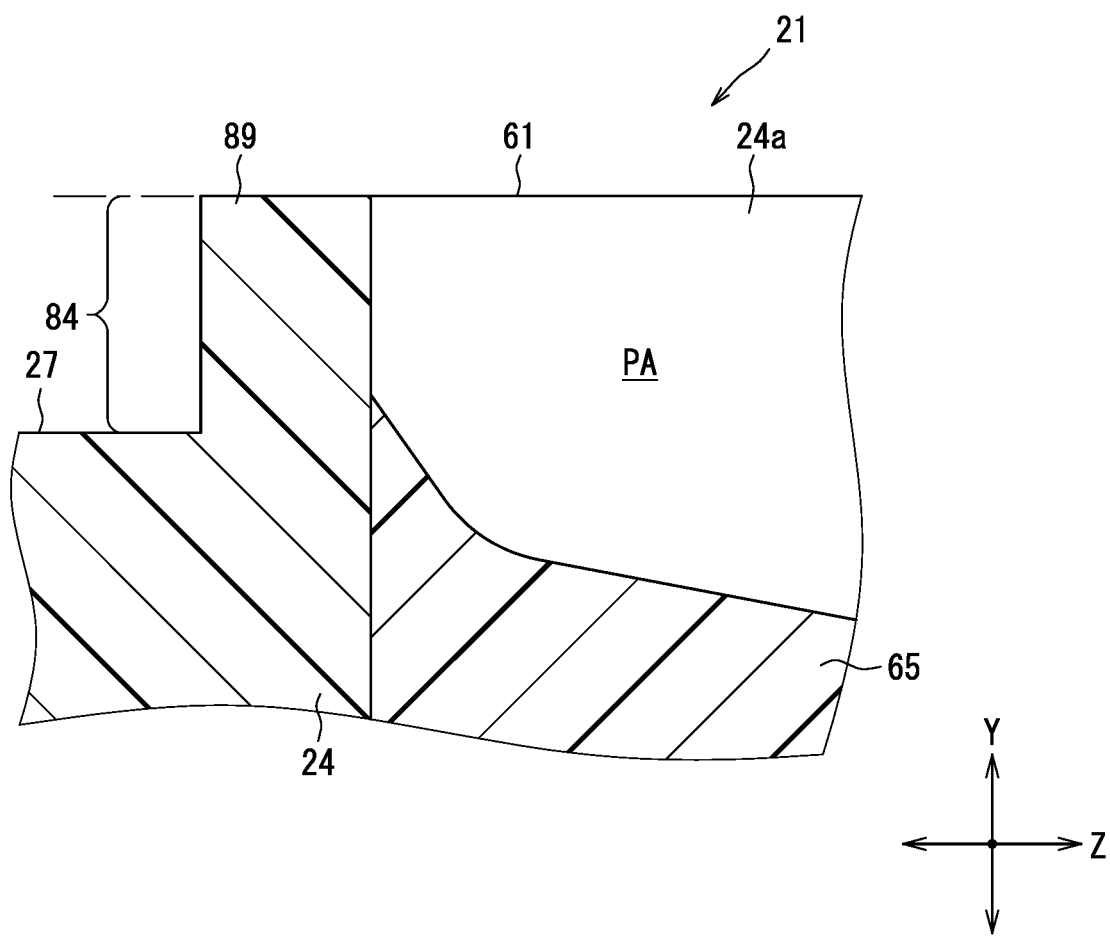
FIG. 21 is an enlarged view of a periphery of a lip in FIG. 8.

As described above, in the sealing region PA, the terminals 28*a*, 54, and 86 are sealed by the potting portion 65 so as not to be exposed. As shown in FIGS. 8 and 21, the housing body 24 has a lip 89 extending along the peripheral portion of the housing opening 61. The lip 89 circumferentially surrounds the housing opening 61 in an annular shape, and has a function of regulating the molten resin from flowing out of the housing opening 61 when the potting portion 65 is formed. In the housing 21, the flange portion 27 exists on an outer peripheral side of the lip 89.

As shown in FIG. 21, a surface of the potting portion 65 is located at a position separated from the housing opening 61 toward the housing tip side in the height direction Y. The surface does not extend straight in the width direction X and the depth direction Z, but is disposed at a position closer to the housing opening 61 as the surface of the potting portion 65 is closer to the inner peripheral surface of the housing body 24. This is because a phenomenon occurs in which the molten resin filled in the sealing region PA creeps up the inner peripheral surface of the housing body 24 when the potting portion 65 is formed. The creep-up phenomenon of the molten resin tends to occur particularly at corner portions. On the other hand, in the present embodiment, as shown in FIG. 3, since the housing opening 61 and the four corners of the sealing region PA are curved surfaces, a phenomenon that the molten resin creeps up is less likely to occur, as a result of which, the molten resin is less likely to flows out of the housing opening 61. In that case, voids and gaps are also less likely to occur when the sealing region PA is filled with the molten resin.

When an epoxy resin is selected as a thermosetting resin used to form the potting portion 65, an epoxy resin is harder than a urethane resin, for example, so that the positioning accuracy of the sensor SA 50 can be enhanced. As the thermosetting resin capable of forming the potting portion 65, in addition to the epoxy resin, the urethane resin, a silicone resin, or the like can be used.

Figure 22:
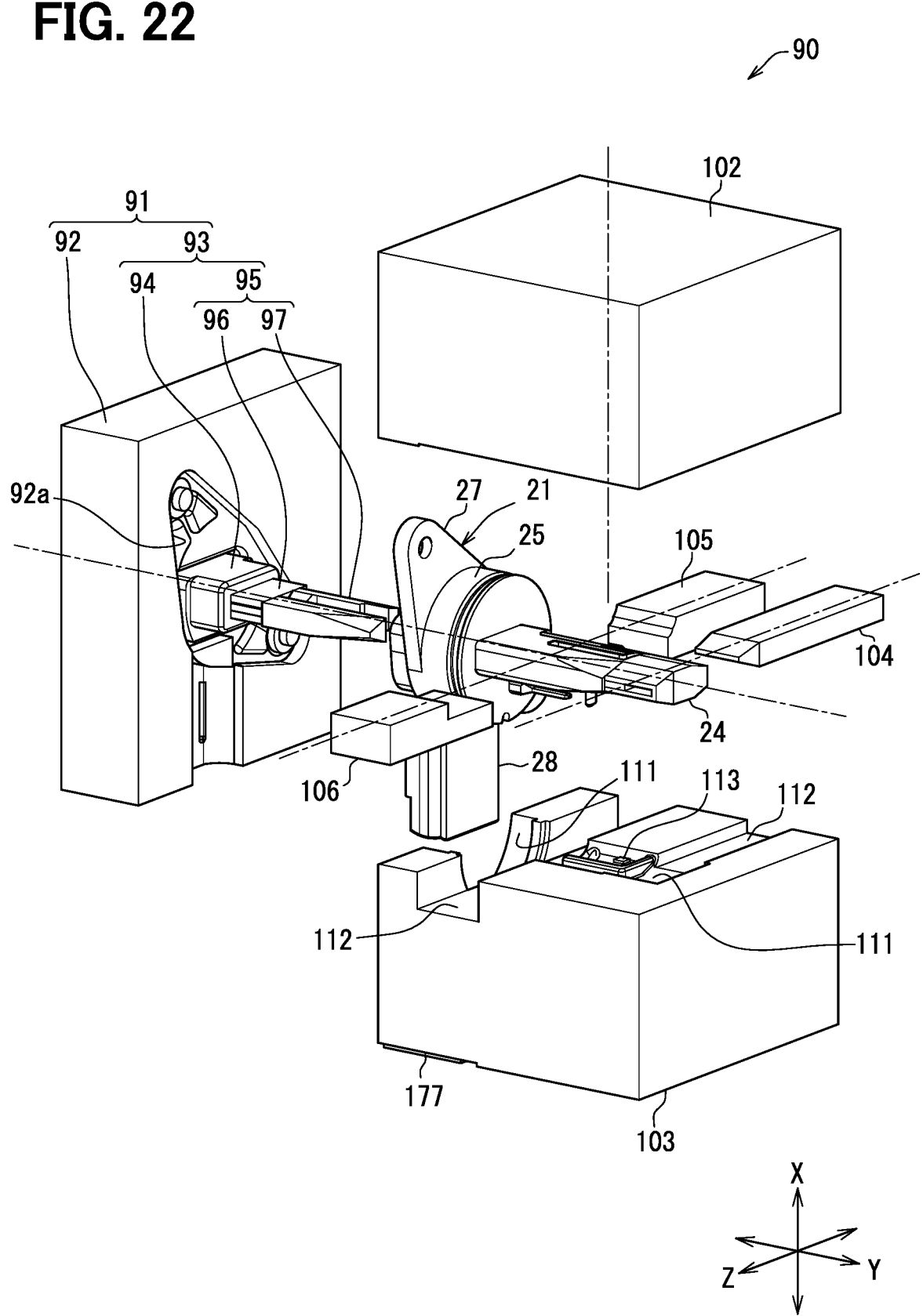
FIG. 22 is an exploded perspective view of a mold device.

Next, a mold device 90 for molding the housing 21 with resin will be described with reference to FIGS. 22 to 26. As shown in FIG. 22, the mold device 90 has an inner peripheral mold portion 91 for molding the inner peripheral surface of the housing body 24, outer peripheral mold portions 102 and 103 for molding the outer peripheral surface of the housing 21, a passage mold portion 104 for molding the passage flow channel 31, and root mold portions 105 and 106 for molding the root portion 29*a*.

The inner peripheral mold portion 91 has a mold main body portion 92 and an inward portion 93. The mold main body portion 92 has a main body recess portion 92*a* for forming the outer peripheral surface of the flange portion 27 and the connector portion 28, and the inward portion 93 extends from a bottom surface of the main body recess portion 92*a* in order to define the internal space 24*a* of the housing body 24. When the direction defined for the air flow meter 14 is also applied to the mold device 90, the main body recess portion 92*a* is recessed in the height direction Y, and the inward portion 93 extends in the height direction Y. A surface of the inner peripheral surface of the main body recess portion 92*a* facing in the height direction Y is referred to as a bottom surface.

The inward portion 93 has a sealing molding portion 94 for defining the sealing region PA and an open molding portion 95 for defining the open region PB, and the open molding portion 95 extends from the sealing molding portion 94 in the height direction Y. The open molding portion 95 has an accommodation molding portion 96 for defining the accommodation region PB1 and a measurement molding portion 97 for defining the measurement region PB2, and the measurement molding portion 97 extends from the accommodation molding portion 96 in the height direction Y.

Figure 23:
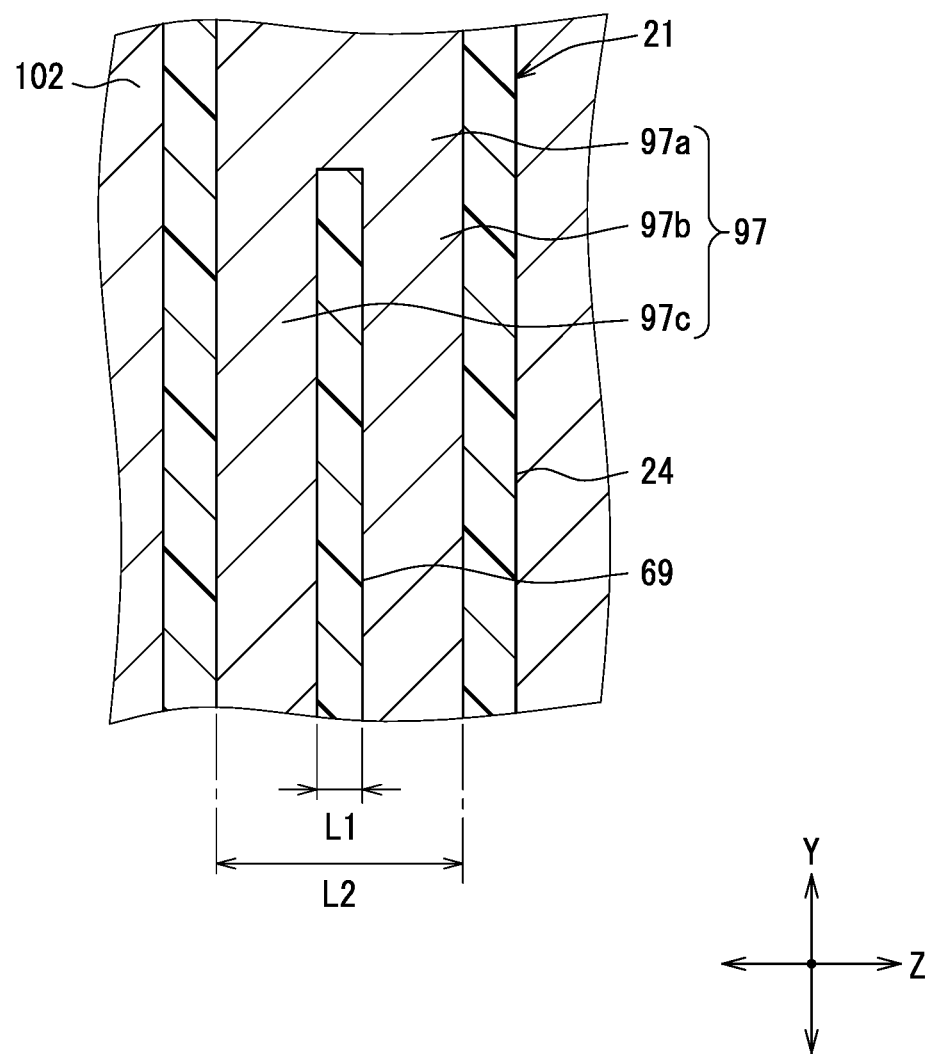
FIG. 23 is a diagram illustrating molding of a measurement flow channel by a measurement molding portion.
Figure 24:
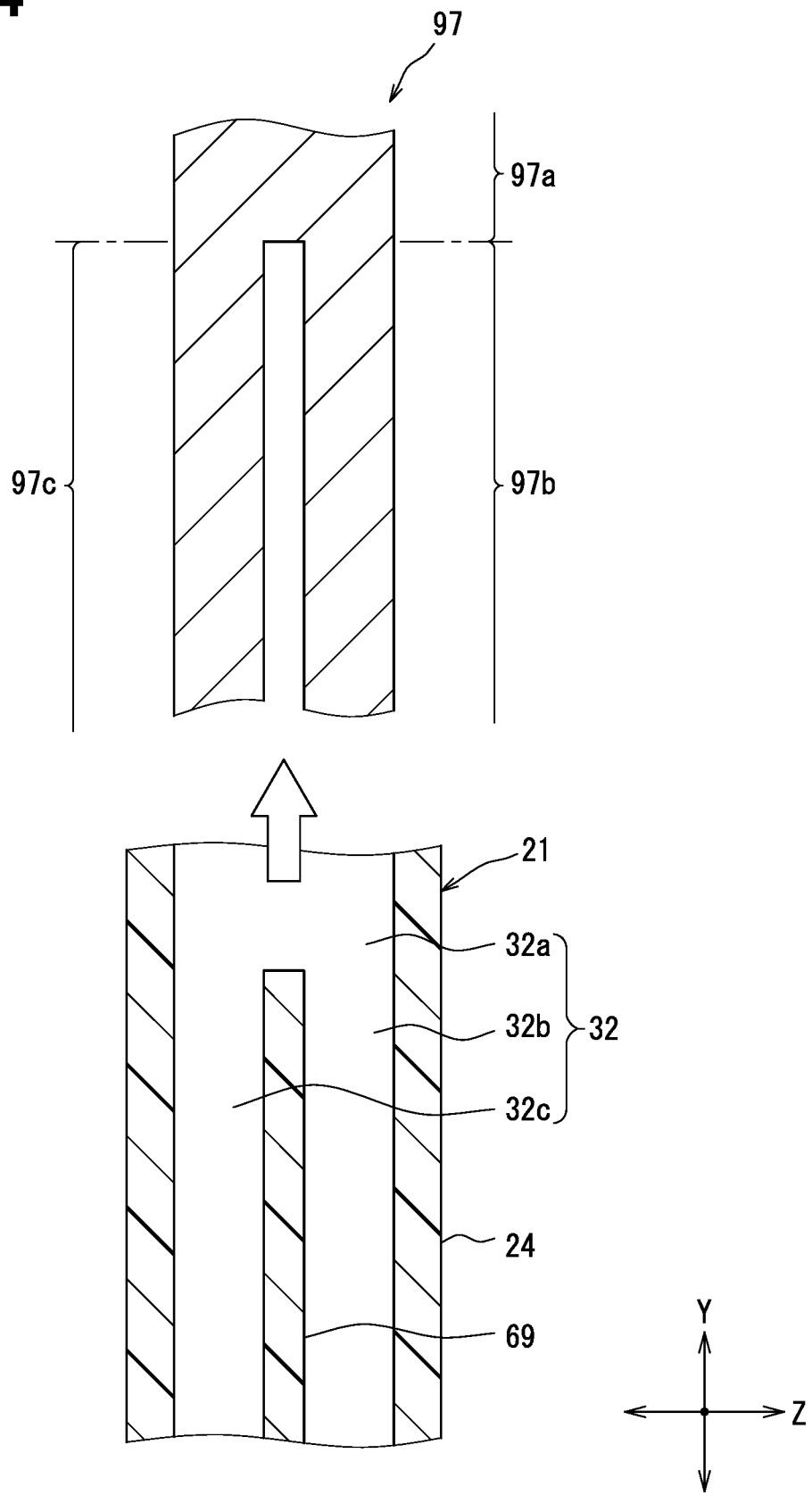
FIG. 24 is a view showing a state in which the measurement molding portion is removed from the housing.
Figure 25:
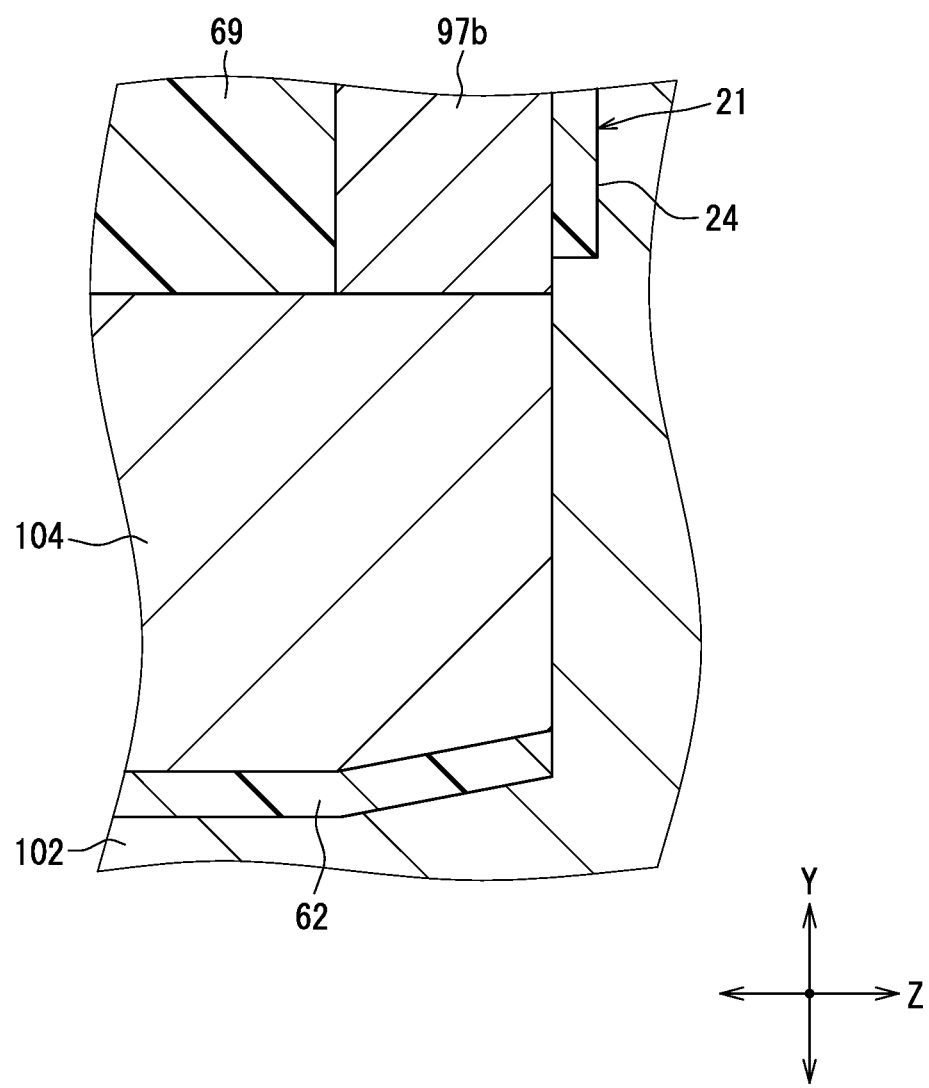
FIG. 25 is a diagram illustrating molding of a passage flow channel by a passage mold portion.

In FIGS. 22 to 24, the measurement molding portion 97 has a detection molding portion 97*a* for defining the detection path 32*a*, an introduction molding portion 97*b* for defining the introduction path 32*b*, and a discharge molding portion 97*c* for defining the discharge path 32*c*. The introduction molding portion 97*b* and the discharge molding portion 97*c* extend from the detection molding portion 97*a* in the height direction Y, and are both elongated columnar members. The introduction molding portion 97*b* and the discharge molding portion 97*c* are aligned laterally in the depth direction Z in a state of being separated from each other, and the detection molding portion 97*a* connects the introduction molding portion 97*b* and the discharge molding portion 97*c*. The introduction molding portion 97*b* corresponds to an introduction column portion, the discharge molding portion 97*c* corresponds to a discharge column portion, and the detection molding portion 97*a* corresponds to a columnar connection portion.

The inner peripheral mold portion 91 is configured so that the inward portion 93 can be extracted from the housing opening 61 when the housing 21 is molded with resin. More specifically, in the inward portion 93, the sealing molding portion 94, the accommodation molding portion 96, the detection molding portion 97*a*, the introduction molding portion 97*b*, and the discharge molding portion 97*c* may be thinned or unchanged toward the tip portion of the inward portion 93, but are not thickened. Further, even if a step surface facing the tip side of the inward portion 93 is formed on an outer peripheral surface of the inward portion 93, a step surface facing a base end side of the inward portion 93 is not formed. Therefore, in the inward portion 93, a width dimension in the width direction X and a depth dimension in the depth direction Z may be smaller or unchanged toward the tip portion of the inward portion 93 but are not larger. In this example, the tip portion of the inner peripheral mold portion 91 is a side of the introduction molding portion 97b and the discharge molding portion 97c which is not connected to the detection molding portion 97a.

In particular, in FIG. 23 and FIG. 24, a separation distance L1 between the introduction molding portion 97b and the discharge molding portion 97c may be larger or unchanged toward the tip portion of the inward portion 93, but are not smaller. A separation distance L2 between the outer surfaces of the introduction molding portion 97b and the discharge molding portion 97c may be smaller or unchanged toward the tip portion of the inward portion 93, but are not larger. Further, when one way in the width direction X is referred to as a right way and the other way is referred to as a left way, a separation distance between a right surface of the outer peripheral surface of the introduction molding portion 97b facing rightward and a left surface of the outer peripheral surface of the discharge molding portion 97c facing leftward does not increase toward the tip portion of the inward portion 93. Similarly, a separation distance between a left surface of the introduction molding portion 97b and a right surface of the discharge molding portion 97c does not increase toward the tip portion of the inward portion 93.

The passage mold portion 104 is configured so as to be extractable from the inflow port 33a when the housing 21 is molded with resin. Specifically, in FIGS. 22, 25, and 26, the passage mold portion 104 is an elongated columnar member extending in the depth direction Z. In the passage mold portion 104, when a portion for forming the outflow port 33b is referred to as a tip portion, the passage mold portion 104 may be thinner or unchanged toward the tip portion of the passage mold portion 104, but is not thicker. Further, even if a step surface facing the tip side of the passage mold portion 104 is formed on the outer peripheral surface of the passage mold portion 104, a step surface facing the base end side of the passage mold portion 104 is not formed. Therefore, in the passage mold portion 104, the width dimension in the width direction X and the height dimension in the height direction Y may be smaller or unchanged toward the tip portion of the passage mold portion 104, but are not larger.

Returning to the description of FIG. 22, the pair of outer peripheral mold portions 102 and 103 are aligned side by side in the width direction X. The width direction X is a direction orthogonal to the depth direction Z, which is an alignment direction of the introduction molding portion 97b and the discharge molding portion 97c in the inner peripheral mold portion 91. A housing recess portion 111 for molding the housing 21 and a mold recess portion 112 for accommodating the passage mold portion 104 and the root mold portions 105 and 106 are formed in the pair of outer peripheral mold portions 102 and 103. In the outer peripheral surface of the flange portion 27 and the outer peripheral surface of the connector portion 28, portions different from each other are molded in the main body recess portion 92a of the inner peripheral mold portion 91 and the housing recess portion 111 of the outer peripheral mold portions 102 and 103. The outer peripheral mold portions 102 and 103 each have an outlet extension portion 113 for defining the measurement outlet 33c, and the outlet extension portion 113 extends in the width direction X from a bottom surface of the mold recess portion 112 for the housing 21. In addition, the first outer peripheral mold portion 102 has a mold portion (not shown) that enters an interior of the main body recess portion 92a of the inner peripheral mold portion 91 in order to form the inner peripheral surface of the connector portion 28, and a recess portion in order to form the protective protrusion 29b.

The first outer peripheral mold portion 102 corresponds to a first mold portion, and the second outer peripheral mold portion 103 corresponds to a second mold portion. The width direction X in which the outlet extension portion 113 extends is also an alignment direction of the first outer peripheral mold portion 102 and the second outer peripheral mold portion 103.

The pair of root mold portions 105 and 106 are aligned side by side in the depth direction Z between the first outer peripheral mold portion 102 and the second outer peripheral mold portion 103. In the root mold portions 105 and 106, recess portions for molding the root portion 29a are provided on the respective tip end faces. The recess portion of the first root mold portion 105 has a shape corresponding to the upstream-side end face of the root portion 29a, and the recess portion of the second root mold portion 106 has a shape corresponding to the downstream-side end face of the root portion 29a.

Next, as a method of manufacturing the air flow meter 14, a method of manufacturing the housing 21 with the use of the mold device 90 will be described. The method of manufacturing the air flow meter 14 corresponds to a method of manufacturing the physical quantity measurement device.

First, the mold portions 91 and 102 to 106 are prepared for the mold device 90. Then, those mold portions 91 and 102 to 106 are assembled together. For example, the first outer peripheral mold portion 102 and the second outer peripheral mold portion 103 are fixed to each other with their respective recess portions facing each other, and the inward portion 93 of the inner peripheral mold portion 91, the passage mold portion 104, and the root mold portions 105 and 106 are inserted into the opening defined between the outer peripheral mold portions 102 and 103. The opening is defined by the respective mold recess portions 112 of the outer peripheral mold portions 102 and 103, and the inward portion 93 of the inner peripheral mold portion 91, the passage mold portion 104, and the root mold portions 105 and 106, which have been inserted from the opening slide inside the mold recess portion 112. In the above step, the second outer peripheral mold portion 103 may be mounted on the first outer peripheral mold portion 102 in a state where the first outer peripheral mold portion 102 is installed on a work table or the like, and the inward portion 93 of the inner peripheral mold portion 91, the passage mold portion 104, and the two root mold portions 105, 105 are mounted in the recess portion of the first outer peripheral mold portion 102. In short, the above step has only to assemble the mold device 90.

In the assembled state of the mold device 90, the outlet extension portions 113 of the outer peripheral mold portions 102 and 103 abut against the discharge molding portion 97c of the inner peripheral mold portion 91, thereby realizing a configuration in which the measurement outlet 33c penetrates through the outer peripheral portion of the housing 21. In the above state, the tip end face of the passage mold portion 104 abuts against at least one of the inner peripheral surfaces of the housing recess portions 111 of the outer peripheral mold portions 102 and 103, thereby realizing a configuration in which the outflow port 33b penetrates through the outer peripheral portion of the housing 21. In addition, a configuration in which the tip portion of the passage mold portion 104 extends beyond the introduction molding portion 97b and the tip end face abuts against both of the outer peripheral mold portions 102 and 103 can be referred to as an inlay structure. With the above inlay structure, an effect of inhibiting burrs around the outflow port 33b can be obtained.

The intake air temperature terminals 23c and the connector terminals 28a are preliminarily attached to the inner peripheral mold portion 91 and the outer peripheral mold portions 102 and 103 in a state of being connected to each other before assembling the mold device 90. As a result, even when the housing 21 is integrally molded, a configuration in which the terminals 23c and 28a are embedded in the housing 21 can be realized.

After assembly of the mold device 90 has been completed, molten resin is injected into the mold device 90 through only one injection port provided in the mold device 90. The injection port is formed in, for example, the first outer peripheral mold portion 102, and the molten resin for integrally molding the entire housing 21 is completely filled into the inside of the mold device 90 by one injection. Although the resin injection may be performed multiple times, all of the molten resin divided into multiple injections are used for integrally molding the housing 21. Unlike the present embodiment, for example, when a housing is manufactured by performing resin injection for molding the multiple members and resin injection for joining those members to each other, it is considered that the housing is not integrally molded.

After the molten resin filled in the gaps between the mold portions 91, 102 to 106 has been cured in the mold device 90, the mold portions 91, and 102 to 106 are removed from the housing body 24 by disassembling the mold device 90. For example, the housing 21 is removed from the outer peripheral mold portions 102 and 103 by extracting the inward portion 93 of the inner peripheral mold portion 91, the passage mold portion 104, and the root mold portions 105 and 106 from the opening between the outer peripheral mold portions 102 and 103 and separating the outer peripheral mold portions 102 and 103 from each other. After the outer peripheral mold portions 102 and 103 have been separated from each other, the inner peripheral mold portion 91, the passage mold portion 104, and the root mold portions 105 and 106 may be removed from the housing 21. In short, the housing 21 may be removed by disassembling the mold device 90.

Figure 26:
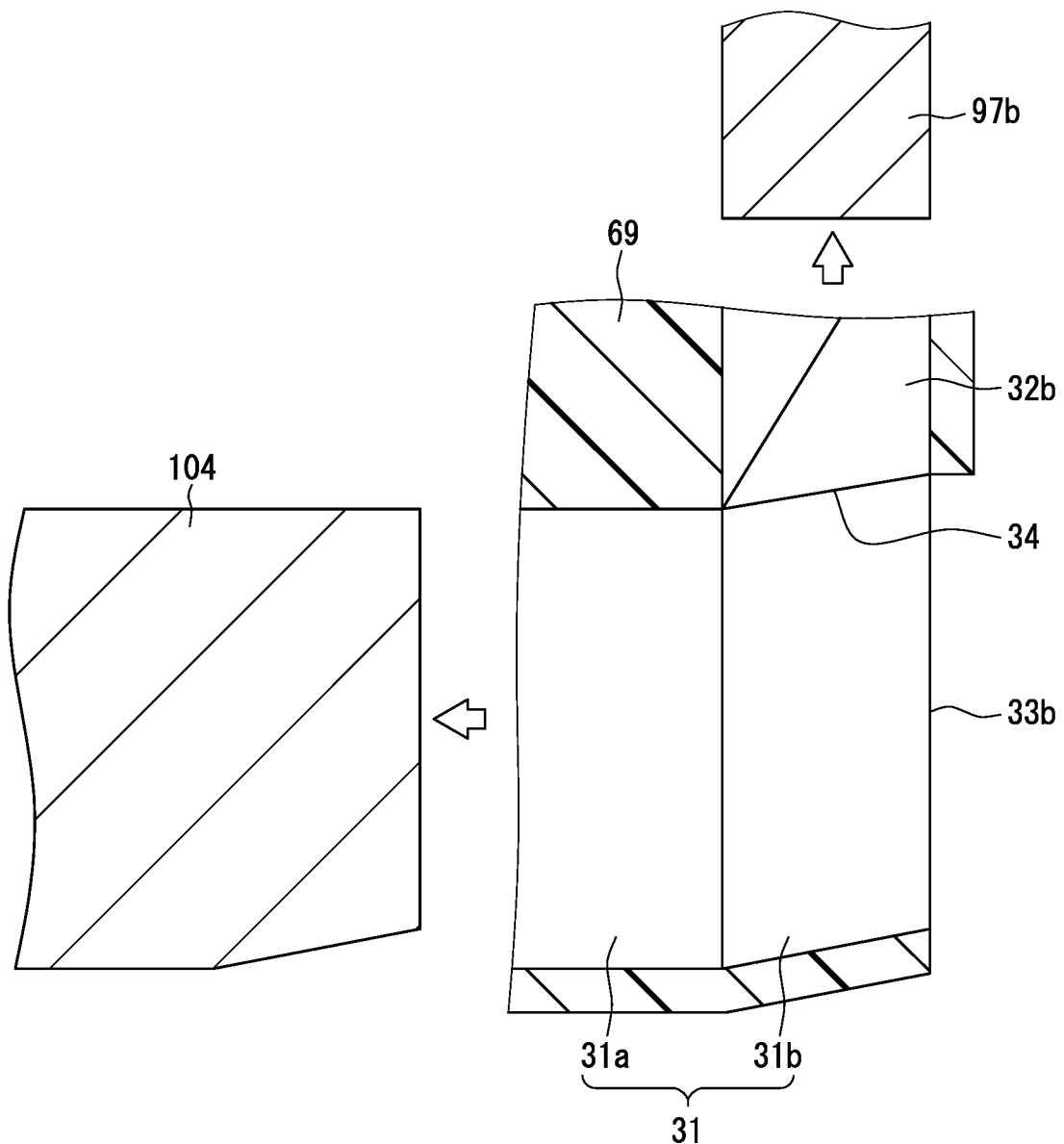
FIG. 26 is a view showing a state in which the passage mold portion and the measurement molding portion are removed from the housing.

In this example, in the inner peripheral mold portion 91, the inner peripheral surface of the housing body 24 can be integrally molded by realizing a configuration in which the inward portion 93 can be extracted from the housing opening 61 as described above. For example, as shown in FIG. 24, the measurement flow channel 32 is integrally molded by detaching the measurement molding portion 97 from the inner peripheral surface of the housing body 24. With respect to the passage mold portion 104, a configuration in which the passage mold portion 104 can be extracted from the inflow port 33a is realized as described above, with the result that the inner peripheral surface of the passage flow channel 31 can be integrally molded as shown in FIG. 26. When molding the resin of the housing 21, the introduction molding portion 97b reaches the outflow passage 31b beyond the flow channel boundary portion 34. As a result, even if the outflow passage 31b is inclined toward the housing base end side with respect to the inflow passage 31a, the passage mold portion 104 can be avoided from being caught by the longitudinal partition wall 69 so that the passage mold portion 104 cannot be extracted from the inflow port 33a.

<Effects of Configuration Group A>

The effects of a configuration group A on integral molding of the measurement flow channel will be described. According to the present embodiment, since the housing 21 is integrally molded with the use of the mold device 90, there is no need to manufacture the housing 21 by separately molding the multiple members with resin and then combining those members together. In that case, a step is less likely to occur on the inner peripheral surface of the passage flow channel 31 or the measurement flow channel 32 at the boundary between the members, and the width dimensions of the passage flow channel 31 and the measurement flow channel 32 are less likely to vary from product to product in the width direction X. With a reduction in the manufacturing variation in this manner, the detection accuracy of the intake air amount by the flow rate detector 22 can be enhanced.

According to the present embodiment, since the outer peripheral surface of the housing 21 is formed using at least two mold portions, that is, the first outer peripheral mold portion 102 and the second outer peripheral mold portion 103, the degree of freedom of the outer peripheral shape of the housing 21 can be enhanced. In addition, since the width direction X in which the outer peripheral mold portions 102 and 103 are aligned in the mold device 90 is orthogonal to the depth direction Z in which the introduction path 32b and the discharge path 32c are aligned, the depth dimension of the housing recess portions 111 is reduced as compared with, for example, a configuration in which the outer peripheral mold portions 102 and 103 are aligned in the depth direction Z. In that case, since the molten resin is likely to spread over the entire housing recess portions 111, a product defect in which a part of the resin-molded housing 21 is missing can be inhibited from occurring.

According to the present embodiment, since the outlet extension portion 113 of the first outer peripheral mold portion 102 abuts against the inner peripheral mold portion 91 in the mold device 90, the measurement outlet 33c penetrating through the outer peripheral portion of the housing 21 can be molded by the mold device 90. For that reason, a work load for providing the measurement outlet 33c can be reduced as compared to a method in which the measurement outlet 33c is provided by, for example, molding the housing 21 and then performing a hole drilling process on the outer peripheral portion of the housing 21. In addition, in order to mold the measurement outlet 33c that penetrates through the outer peripheral portion of the housing 21 in the width direction X, the outlet extension portion 113 may be extended from the first outer peripheral mold portion 102 in the width direction X. For that reason, unlike the passage flow channel 31 molded with the use of the passage mold portion 104, for example, there is no need to use a dedicated mold portion for molding the measurement outlet 33c separately from the first outer peripheral mold portion 102. In that case, the manufacturing cost of the mold device 90 can be reduced as much as the dedicated mold portion is not used, and further, the work load required for assembling the mold device 90 can be reduced by not using the dedicated mold portion.

According to the present embodiment, in the mold device 90, since the passage mold portion 104 is aligned with the inner peripheral mold portion 91 in the depth direction Z, a configuration in which the inflow port 33a and the outflow port 33b of the passage flow channel 31 are opened in the depth direction Z can be realized by resin molding. For example, unlike the present embodiment, in a configuration in which a dedicated portion for providing the inflow port 33a and the outflow port 33b opened in the depth direction Z is provided in the first outer peripheral mold portion 102, it becomes difficult to remove the first outer peripheral mold portion 102 from the housing 21 in the width direction X.

According to the present embodiment, the flange portion 27 and the connector portion 28 extending from the housing body 24 in the width direction X and the depth direction Z are molded by combining the mold main body portion 92 of the inner peripheral mold portion 91 and the outer peripheral mold portions 102 and 103. In order to mold the flange portion 27 and the connector portion 28 in this manner, the mold main body portion 92 and the outer peripheral mold portions 102 and 103 are combined together in the height direction Y, thereby being capable of easily removing the mold main body portion 92 and the outer peripheral mold portions 102 and 103 from the flange portion 27.

According to the present embodiment, in the mold device 90, the inward portion 93 of the inner peripheral mold portion 91 is in a state of entering the housing recess portion 111 of each of the outer peripheral mold portions 102 and 103. In this case, after the molten resin has been cured, the operator or the like can remove the inner peripheral mold portion 91 from the housing 21 by pulling out the inward portion 93 from the housing opening 61 in a state of holding the mold main body portion 92. For that reason, the mold device 90 which realizes the integral molding of the housing 21 can be realized, and moreover, and the mold device 90 can be removed from the housing 21.

According to the present embodiment, in the housing 21, the internal space 24a is not narrowed even when the internal space 24a comes closer to the housing opening 61 in the height direction Y. For that reason, when the housing 21 is molded with resin by using the mold device 90, the inward portion 93 of the inner peripheral mold portion 91 can be extracted from the housing opening 61. This makes it unnecessary to divide the portion defining the internal space 24a in the housing 21 into multiple members. For example, unlike the present embodiment, in the housing 21 in which the internal space 24a is narrowed toward the housing opening 61, the inward portion 93 is caught on the inner peripheral surface of the narrowed portion, which makes it difficult to extract the inward portion 93 from the housing opening 61. In the above configuration, the portion defining the internal space 24a is divided into multiple members, and those members are assembled together to manufacture the internal space 24a, as a result of which, the manufacturing variation as described above is likely to occur.

Moreover, if the internal space 24a is not narrowed toward the housing base end side, the internal space 24a is narrowed toward the housing tip side. In the above configuration, since the measurement flow channel 32 and the passage flow channel 31 are reduced in size as much as possible relative to the sensor SA 50, the housing 21 can be downsized. In addition, when the housing 21 is downsized, the resin material used for manufacturing the housing 21 is reduced, so that the material cost required for manufacturing the housing 21 can be reduced. In other words, the manufacturing cost of the air flow meter 14 can be reduced.

According to the present embodiment, the region step surface 66 on which the sensor SA 50 is caught faces the housing opening 61. For that reason, the sensor SA 50 can be positioned by the region step surface 66 in the height direction Y while the region step surface 66 realizes a configuration in which the internal space 24a is not narrowed toward the housing opening 61. Therefore, when manufacturing the air flow meter 14, the operator can accurately position the sensor SA 50 by easily inserting the sensor SA 50 into the housing opening 61 to a position where the housing opening 61 is caught by the region step surface 66.

According to the present embodiment, since the circuit step surface 55 of the sensor SA 50 and the region step surface 66 of the housing 21 are in contact with each other over the entire circumference of the circuit step surface 55 and the housing 21, the sealing region PA and the open region PB can be separated from each other by the abutment portions of the circuit step surface 55 and the region step surface 66. In that case, since the molten resin filled in the sealing region PA is restricted from flowing into the open region PB at the time of manufacturing the potting portion 65, the size and shape of the open region PB and the measurement flow channel 32 can be avoided from being unintentionally changed by the molten resin.

According to the present embodiment, even if the longitudinal partition wall 69 that separates the introduction path 32b and the discharge path 32c in the open region PB is not thinner even if the longitudinal partition wall 69 comes closer to the housing opening 61 in the height direction Y. For that reason, the introduction molding portion 97b and the discharge molding portion 97c can be extracted from the introduction path 32b and the discharge path 32c in the inward portion 93 of the inner peripheral mold portion 91. This makes it possible to realize a configuration in which the inward portion 93 of the inner peripheral mold portion 91 can be extracted from the housing opening 61.

According to the present embodiment, since the detection throttle portion 59 is provided in the detection path 32a of the measurement flow channel 32, the flow velocity of the intake air passing through the flow rate detector 22 tends to be increased, and thus the detection accuracy of the flow rate detector 22 can be enhanced. The detection throttle portion 59 does not become thick even when the detection throttle portion 59 comes closer to the housing opening 61 in the height direction Y, extends from the longitudinal partition wall 69 toward the housing opening 61 side, and is not thicker than the longitudinal partition wall 69. For that reason, when molding the resin of the housing 21, the inward portion 93 of the inner peripheral mold portion 91 can be removed from the longitudinal partition wall 69 and the detection throttle portion 59.

According to the present embodiment, since the passage flow channel 31 is provided closer to the housing tip side than the measurement region PB2, a configuration can be realized in which the measurement flow channel 32 is molded by the inward portion 93 of the inner peripheral mold portion 91 and the passage flow channel 31 is molded by the passage mold portion 104. In the above configuration, there is a need to make the depth direction Z in which the passage mold portion 104 is extracted from the passage flow channel 31 orthogonal to the height direction Y in which the inward portion 93 is extracted from the housing opening 61. For that reason, even if the lateral partition wall 68 that separates the detection path 32a and the passage flow channel 31 from each other extends in the depth direction Z, the lateral partition wall 68 can be molded by the passage mold portion 104 and the inward portion 93 of the inner peripheral mold portion 91. Therefore, even if the housing 21 includes the lateral partition wall 68 extending in the depth direction Z, the housing 21 can be integrally molded.

Unlike the present embodiment, there is a physical quantity measurement device in which a measurement flow channel is defined by a combination of multiple members. The physical quantity measurement device has a pair of covers facing each other and a main body portion provided between the covers. In the physical quantity measurement device, a sub-passage is provided between the cover and the main body portion or between a pair of covers, and a flow rate detector for detecting a flow rate of the intake air is provided in the sub passage. The pair of covers and the main body portion are formed independently of each other by a resin molding process of injecting a thermoplastic resin into a mold, and are assembled together to provide sub-passage.

However, in a configuration in which the sub-passage is defined by multiple members such as the pair of covers and the main body portion, there is a concern that the shape, size, and the like of the sub-passage may vary from product to product due to a positional deviation between those members. For example, when the position at which the pair of covers are attached to the main body portion deviates from each other in the thickness direction of the housing, the flow channel area of the sub-passage varies from product to product. On the other hand, according to the present embodiment, the manufacturing variation of the measurement flow channel for measuring the physical quantity can be reduced.

<Description of Configuration Group B>

A configuration group B relating to the position of the measurement outlet will be described with reference to FIG. 27, FIG. 28, and the like. Although FIG. 6, FIG. 7, and the like show that the thinned portions 41 are provided on the flat surface 44 on the outer peripheral surface of the housing 21, a description will be advanced on the assumption that the thinned portions 41 are not provided on the flat surface 44.

Figure 27:
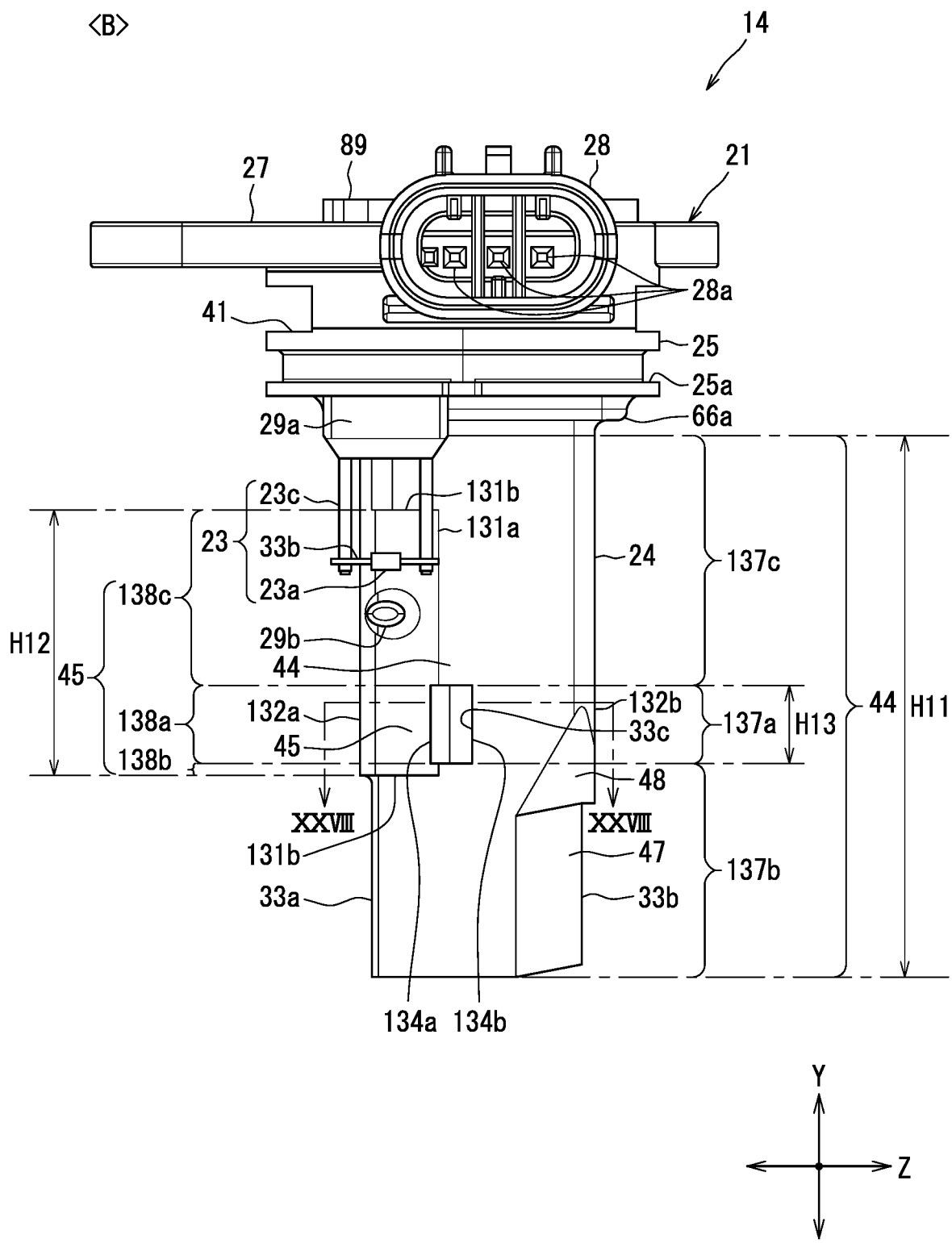
FIG. 27 is a side view of an air flow meter in a configuration group B as viewed from a connector portion side.
Figure 28:
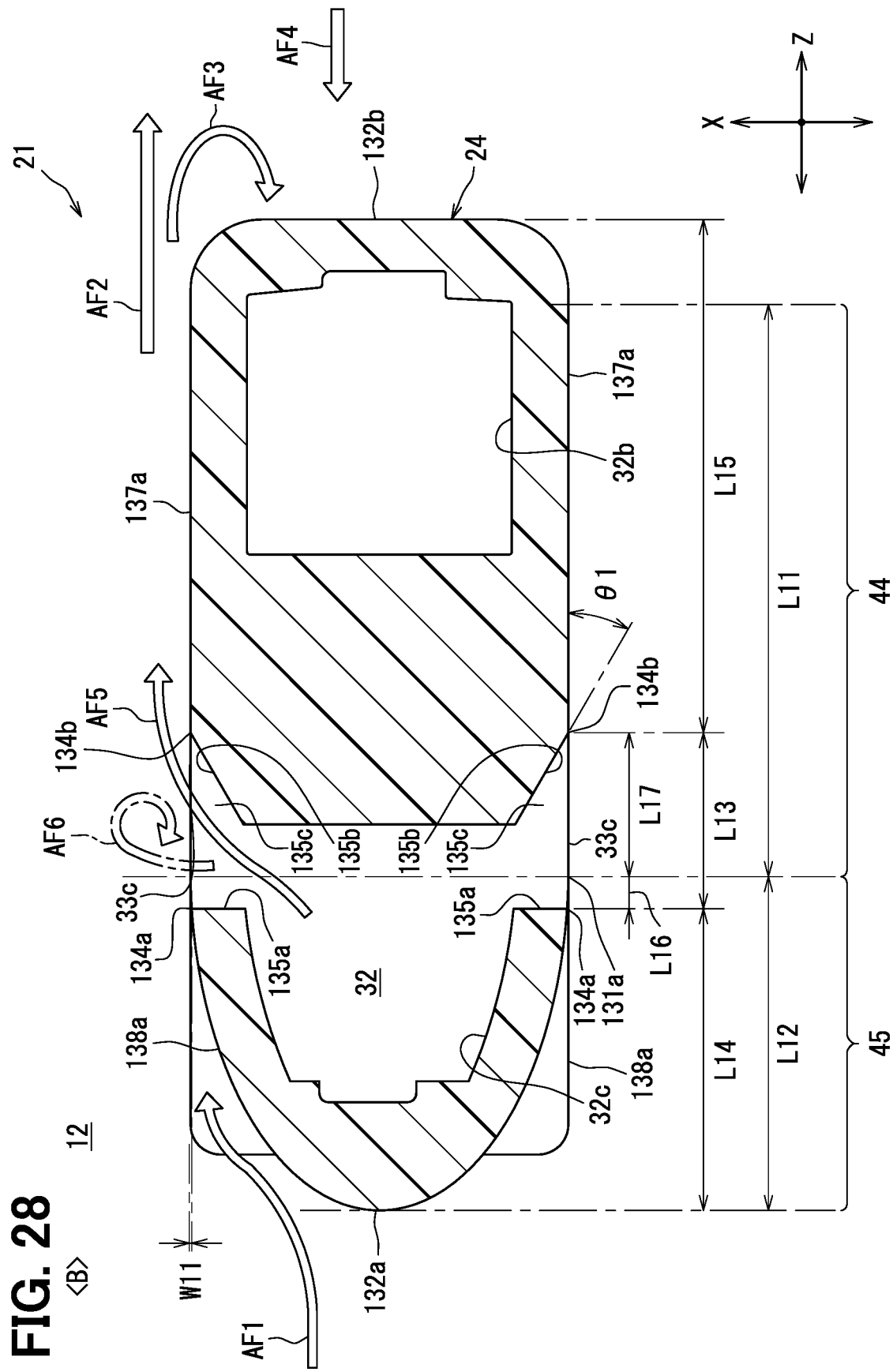
FIG. 28 is a cross-sectional view taken along a line XXVIII-XXVIII of FIG. 27.

As shown in FIGS. 27 and 28, in the outer peripheral surface of the housing 21, the upstream end portion is referred to as an outer peripheral upstream end 132a, and the downstream end portion is referred to as an outer peripheral downstream end 132b. In that case, the housing 21 has a curved surface 45 formed by gradually decreasing the thickness in the width direction X from the flat surface 44 toward the outer peripheral upstream end 132a in the depth direction Z. In that case, in the housing 21, the width dimension in the width direction X gradually decreases toward the outer peripheral upstream end 132a.

On the outer peripheral surface of the housing 21, there are boundaries 131a and 131b between the flat surface 44 and the curved surface 45. The vertical boundary 131a extends in the height direction Y, and the lateral boundary 131b extends in the depth direction Z. If a surface of outer peripheral surfaces of the housing 21 on the connector portion 28 side is referred to as a front surface and a surface on the opposite side to the front surface is referred to as a back surface, the front surface and the back surface are aligned in the width direction X and are a pair of side surfaces included in the outer peripheral surface of the housing 21. The outer peripheral upstream end 132a is a boundary between the front curved surface 45 and the back curved surface 45, and extends in the height direction Y. On the other hand, the outer peripheral downstream end 132b is a plane extending in the width direction X and the height direction Y. The outflow port 33b is provided at the outer peripheral downstream end 132b.

On the outer peripheral surface of the housing 21, the flat surface 44, the curved surface 45, and the measurement outlet 33c all have a longitudinally long shape extending in the height direction Y. In particular, the measurement outlet 33c has a flat shape extending along the vertical boundary 131a in a state of extending across the vertical boundary 131a in the depth direction Z. In the measurement outlet 33c, the longitudinal dimension in the height direction Y is larger than the lateral dimension in the depth direction Z. The open area of the measurement outlet 33c is smaller than the open area of the inflow port 33a.

In the height direction Y, a height dimension H11 of the flat surface 44 is larger than both a height dimension H12 of the curved surface 45 and a height dimension H13 of the measurement outlet 33c, and the height dimension H12 of the curved surface 45 is larger than the height dimension H13 of the measurement outlet 33c. In the height direction Y, the curved surface 45 and the measurement outlet 33c are disposed at an intermediate position of the flat surface 44, and the measurement outlet 33c is disposed at an intermediate position of the flat surface 44. In that case, both one end portion of the curved surface 45 on the housing tip side and the other end portion on the housing base end side are included in the lateral boundary 131b.

On the outer peripheral surface of the housing 21, there is the vertical boundary 131a between the outer peripheral upstream end 132a and the outer peripheral downstream end 132b, and the vertical boundary 131a is located closer to the outer peripheral upstream end 132a. In that case, in the depth direction Z, a length dimension L11 of the flat surface 44 is larger than a length dimension L12 of the curved surface 45. A length dimension L13 of the measurement outlet 33c is smaller than both the length dimension L11 of the flat surface 44 and the length dimension L12 of the curved surface 45. The depth direction Z is an alignment direction of the outer peripheral upstream end 132a and the outer peripheral downstream end 132b, and the flat surface 44 extends in the alignment direction. Among the directions extending along the flat surface 44, the height direction Y corresponds to a direction orthogonal to the alignment direction.

The measurement outlet 33c is disposed at a position closer to the outer peripheral upstream end 132a in the depth direction Z. In that case, a separation distance L14 between the measurement outlet 33c and the outer peripheral upstream end 132a is smaller than a separation distance L15 between the measurement outlet 33c and the outer peripheral downstream end 132b. In this example, when an upstream end portion of the measurement outlet 33c is referred to as an outlet upstream end 134a, and a downstream end portion of the measurement outlet 33c is referred to as an outlet downstream end 134b, a vertical boundary 131a is located closer to the outlet upstream end 134a in the depth direction Z. In that case, in the depth direction Z, a separation distance L16 between the outlet upstream end 134a and the vertical boundary 131a is smaller than a separation distance L17 between the outlet downstream end 134b and the vertical boundary 131a.

The inner peripheral surface of the measurement flow channel 32 has defining surfaces 135a to 135c that define the measurement outlet 33c. A through hole for forming the measurement outlet 33c is provided in the outer peripheral portion of the housing 21, and the defining surfaces 135a to 135c are included in the inner peripheral surface of the through hole. The upstream defining surfaces 135a forms the outlet upstream end 134a of the measurement outlet 33c, and is orthogonal to the flat surface 44 because the upstream defining surface 135a faces the downstream side in a state of being orthogonal to the depth direction Z. The downstream defining surface 135b forms the outlet downstream end 134b, and is inclined with respect to the flat surface 44 by being inclined toward the upstream side in a state of being inclined toward the outer peripheral side. A pair of the connection defining surfaces 135c connect the upstream defining surface 135a and the downstream defining surface 135*b*, and the pair of the defining surfaces 135*a* and 135*b* are provided to sandwich the defining surfaces 135*a* and 135*b*. Each connection defining surface 135*c* is orthogonal to the height direction Y.

The downstream defining surface 135*b* is an inclined surface extending straight from the outlet downstream end 134*b* toward the inner peripheral side of the housing 21, and is not orthogonal to the downstream flat portion 137*a*. The downstream defining surface 135*b* provided on each of the front side and the back side of the housing 21 is a tapered surface in which the housing 21 is thinned toward the outlet upstream end 134*a* of the measurement outlet 33*c*. An inclination angle θ1 of the downstream defining surface 135*b* with respect to the flat surface 44 such as the downstream flat portion 137*a* is, for example, 30 degrees. The inclination angle θ1 may be larger or smaller than 30 degrees, but is preferably equal to or smaller than 30 degrees.

The flat surface 44 has a downstream flat portion 137*a*, a tip-side flat portion 137*b*, and a base end-side flat portion 137*c*. The downstream flat portion 137*a* extends from the measurement outlet 33*c* toward the outer peripheral downstream end 132*b* in the depth direction Z. The tip-side flat portion 137*b* extends from the downstream flat portion 137*a* toward the housing tip side, and the base end-side flat portion 137*c* extends from the downstream flat portion 137*a* toward the housing base end side. In that case, the downstream flat portion 137*a* is disposed between the tip-side flat portion 137*b* and the base end-side flat portion 137*c* in the height direction Y.

The tip-side flat portion 137*b* also has a portion of the measurement outlet 33*c* and the curved surface 45 which goes around the housing tip side, and the portion extends toward the housing tip side from the measurement outlet 33*c* and the curved surface 45. The base end-side flat portion 137*c* also includes a portion of the measurement outlet 33*c* and the curved surface 45 which goes around the housing base end side, and the portion extends toward the housing base end side from the measurement outlet 33*c* and the curved surface 45.

The degree of bending of the curved surface 45 is not uniform, and a portion having the largest degree of bending of the curved surface 45 is disposed at a position closer to the outer peripheral upstream end 132*a* in the depth direction Z. For that reason, since the measurement outlet 33*c* is disposed at a position extending across the vertical boundary 131*a*, the measurement outlet 33*c* is disposed at a portion having the smallest degree of bending which is the downstream end portion of the curved surface 45, and when the measurement outlet 33*c* is viewed from the upstream side, the measurement outlet 33*c* appears as an elongated shape extending in the depth direction Z. In that case, unlike the present embodiment, the width dimension W11 of the measurement outlet 33*c* in the width direction X is smaller than, for example, a configuration in which the measurement outlet 33*c* is disposed at a position separated from the downstream end portion of the curved surface 45 toward the outer peripheral upstream end 132*a*.

The curved surface 45 has an upstream curved portion 138*a*, a tip-side curved portion 138*b*, and a base end-side curved portion 138*c*. The upstream curved portion 138*a* extends from the measurement outlet 33*c* toward the outer peripheral upstream end 132*a* in the depth direction Z. The tip-side curved portion 138*b* extends from the upstream curved portion 138*a* toward the housing tip side, and the base end-side curved portion 138*c* extends from the upstream curved portion 138*a* toward the housing base end side. In that case, the upstream curved portion 138*a* is disposed between the tip-side curved portion 138*b* and the base end-side curved portion 138*c* in the height direction Y.

The tip-side curved portion 138*b* has a portion of the measurement outlet 33*c* which extends around the housing tip side, and the portion enters between the measurement outlet 33*c* and the tip-side flat portion 137*b*, and extends from the measurement outlet 33*c* toward the housing tip side. The base end-side curved portion 138*c* has a portion of the measurement outlet 33*c* which extends around the housing base end side, and the portion enters between the measurement outlet 33*c* and the base end-side flat portion 137*c*, and extends from the measurement outlet 33*c* toward the housing base end side.

The flat surface 44 corresponds to an outer peripheral flat surface, and the curved surface 45 corresponds to an outer peripheral inclined surface inclined with respect to the outer peripheral flat surface. In the flat surface 44, the tip-side flat portion 137*b* and the base end-side flat portion 137*c* correspond to an extended flat portion, and in the curved surface 45, the upstream curved portion 138*a* corresponds to an upstream inclined portion, and the tip-side curved portion 138*b* and the base end-side curved portion 138*c* correspond to an extended inclined portion. The vertical boundary 131*a* corresponds to an outer peripheral boundary.

In addition, when the width direction X is referred to as a first direction, and the respective surfaces located on both sides of the housing 21 in the first direction is referred to as a first surface and a second surface, the flat surface 44 and the curved surface 45 are included in each of the first surface and the second surface. When the depth direction Z is referred to as a second direction, the outer peripheral upstream end 132*a* is referred to as a third surface, and the outer peripheral downstream end 132*b* is referred to as a fourth surface, the third surface and the fourth surface are located on both sides of the housing 21 in the second direction. The measurement outlet 33*c* is provided on each of the first surface and the second surface, and is opened toward the outside of the housing 21 so as not to face the fourth surface side in the second direction.

Next, a flow of the intake air generated on the outer peripheral side of the housing 21 in the intake passage 12 will be described with reference to FIG. 28.

Of the intake air flowing forward through the intake passage 12, an air AF1 reaching the outer peripheral upstream end 132*a* of the housing 21 reaches the measurement outlet 33*c* while changing a flow direction of the intake air flowing along the upstream curved portion 138*a* of the curved surface 45. In that instance, when the air AF1 reaches the measurement outlet 33*c*, the flow direction of the air AF1 is closer to an alignment direction of the outlet upstream end 134*a* and the outlet downstream end 134*b*, and the air AF1 is less likely to flow into the measurement outlet 33*c*. For that reason, a backflow in which the air AF1 flows into the measurement outlet 33*c* is less likely to occur, and the measurement outlet 33*c* is less likely to receive a dynamic pressure from the air AF1 at the time of a forward flow.

Further, the air whose flow direction is gradually changed by proceeding along the curved surface 45 is less likely to be separated from the flat surface 44 when reaching the flat surface 44. For that reason, in the periphery of the measurement outlet 33*c* and the periphery of the vertical boundary 131*a*, a turbulence of the air flow attributable to the separation of the air flow from the flat surface 44 is less likely to occur, and the flow of the air is more likely to be stabilized. In that case, since the pressure applied from the air to the measurement outlet 33*c* is likely to be stabilized, the flow of the air in the measurement flow channel 32 is also likely to be stabilized.

The air AF2 flowing along the downstream flat portion 137*a* of the flat surface 44 travels in the depth direction Z even after passing through the downstream end portion of the downstream flat portion 137*a*, so that the air is separated from the outer peripheral surface of the housing 21. Along with the separation of the air AF2, the turbulence of the air flow such as a vortex is likely to occur in the periphery of the outer peripheral downstream end 132*b* or the like on the downstream side of the downstream flat portion 137*a*. Due to the turbulence of the air flow, an air AF3 that flows backward toward the outer peripheral downstream end 132*b* may occur in the vicinity of the outer peripheral downstream end 132*b*. In the present embodiment, the backflow of only a part of the air such as the air AF3 is referred to as a partial backflow.

Unlike the present embodiment, for example, in the configuration in which the measurement outlet is provided at the outer peripheral downstream end 132*b* or the like downstream of the downstream flat portion 137*a*, the backflow of the airflow AF3 flowing into the measurement outlet is likely to occur. On the other hand, since the measurement outlet 33*c* of the present embodiment is not disposed downstream of the downstream flat portion 137*a*, the airflow AF3 does not flow into the measurement outlet 33*c*.

When the entire backflow in which the intake air flows backward in the entire intake passage 12 occurs, when an air AF4 flowing backward in the intake passage 12 reaches the outer peripheral downstream end 132*b*, the outer peripheral downstream end 132*b* receives a dynamic pressure from the air AF4. For that reason, unlike the present embodiment, in the configuration in which the measurement outlet opened toward the downstream side is provided at the outer peripheral downstream end 132*b* or the like, the measurement outlet receives the dynamic pressure from the air AF4. On the other hand, since the measurement outlet 33*c* of the present embodiment is not provided at the outer peripheral downstream end 132*b* and is not open toward the downstream side, the measurement outlet 33*c* does not receive the dynamic pressure from the air AF4. In addition, a backflow of the air AF4 flowing into the measurement outlet 33*c* does not occur.

After flowing into the inflow port 33*a*, an air AF5 flowing out from the measurement outlet 33*c* through the measurement flow channel 32 flows along the downstream defining surface 135*b*, so that the air easily flows along the downstream flat portion 137*a* after flowing out from the measurement outlet 33*c*. In that instance, after the air AF5 has flowed out from the measurement outlet 33*c*, the air AF5 is less likely to separate from the downstream flat portion 137*a*, and the turbulence of the air flow such as a vortex flow is less likely to be generated in the vicinity of the measurement outlet 33*c* with the separation of the air flow AF5 from the downstream flat portion 137*a*.

Unlike the present embodiment, for example, in a configuration in which the downstream defining surface 135*b* is orthogonal to the flat surface 44 similarly to the upstream defining surface 135*a*, the air AF6 flowing out from the measurement outlet 33*c* proceeds in a direction orthogonal to the flat surface 44. In this example, it is considered that a turbulence of the air flow such as a vortex flow is likely to occur in the vicinity of the measurement outlet 33*c* due to, for example, a large difference between a traveling direction of the air AF6 and a traveling direction of the air flowing forward in the depth direction Z from the outer peripheral side of the housing 21. Further, in that instance, it can be considered that the air AF6 flows out from the measurement outlet 33*c* to be separated from the downstream flat portion 137*a*, and the turbulence of the air flow is likely to occur in the vicinity of the measurement outlet 33*c* in association with the separation of the air.

In the configuration group B according to the present embodiment, the measurement outlet 33*c* is not opened toward the outer peripheral downstream end 132*b*. For that reason, even if a partial backflow of the air AF3 or the like or an entire backflow of the air AF4 or the like occurs in the intake passage 12, the intake air is less likely to flow into the measurement outlet 33*c* in association with the backflow. In that case, since the flow of the intake air in the measurement flow channel 32 is not likely to be disturbed by the partial backflow or the entire backflow, the deterioration of the accuracy of the flow rate detection by the flow rate detector 22 can be inhibited. Further, even if the entire backflow occurs, the dynamic pressure due to the entire backflow is less likely to be received by the measurement outlet 33*c*, so that the flow of the intake air in the measurement flow channel 32 is less likely to be disturbed by the entire backflow. This also makes it possible to inhibit the deterioration of the accuracy of the flow rate detection by the flow rate detector 22. Therefore, the measurement accuracy of the intake air amount by the air flow meter 14 can be improved.

According to the present embodiment, in the flat surface 44, since the downstream flat portion 137*a* extends from the measurement outlet 33*c* toward the downstream side, a configuration can be realized in which the measurement outlet 33*c* is not opened toward the downstream side. In that case, the measurement outlet 33*c* and the outer peripheral downstream end 132*b* are separated from each other in the depth direction Z by an amount corresponding to the downstream flat portion 137*a*. For that reason, even if the turbulence of the air due to the partial backflow or the entire backflow occurs around the outer peripheral downstream end 132*b* in the intake passage 12, the downstream flat portion 137*a* can inhibit the turbulence from reaching the measurement outlet 33*c*.

According to the present embodiment, on the outer peripheral surface of the housing 21, the tip-side flat portion 137*b* and the base end-side flat portion 137*c* are also disposed between the measurement outlet 33*c* and the outer peripheral downstream end 132*b* in addition to the downstream flat portion 137*a*. For that reason, even if the turbulence of the air flow occurs at a position closer to the housing tip side or the housing base end side than the measurement outlet 33*c* in the position around the outer peripheral downstream end 132*b*, the flat portions 137*b* and 137*c* can inhibit the turbulence from reaching the measurement outlet 33*c*.

According to the present embodiment, in the flat surface 44, the upstream curved portion 138*a* extends from the measurement outlet 33*c* toward the upstream side. For that reason, the forward flow air such as the air AF1 reaching the outer peripheral upstream end 132*a* of the housing 21 flows along the upstream curved portion 138*a*, so that the forward flow air is likely to flow along the measurement outlet 33*c*, and is less likely to flow into the measurement outlet 33*c*. In that case, since the dynamic pressure due to the forward flow air is less likely to be applied to the measurement outlet 33*c*, the turbulence of the air flow in the measurement flow channel 32 due to the dynamic pressure and the deterioration of the detection accuracy of the flow rate detector 22 can be inhibited.

In addition, in the depth direction Z, the measurement outlet 33*c* is disposed at the downstream end portion of the curved surface 45 in the curved surface 45 in which a portion having the largest degree of bending is disposed at the position closer to the outer peripheral upstream end 132a. In that case, since the measurement outlet 33c is hardly opened toward the upstream side, the probability that the air, which has proceeded straight in the depth direction Z among the forward flow air, directly reaches the measurement outlet 33c is low. This makes it difficult to cause the forward flow air to flow into the measurement outlet 33c and to apply the dynamic pressure to the measurement outlet 33c.

According to the present embodiment, on the outer peripheral surface of the housing 21, the tip-side curved portion 138b and the base end-side curved portion 138c are also disposed between the measurement outlet 33c and the outer peripheral upstream end 132a in addition to the upstream curved portion 138a. For that reason, among the forward flow air flowing along the curved surface 45, the air flowing obliquely to the depth direction Z also flows along the curved portions 138b and 138c, so that the traveling direction in the width direction X is changed so as to be less likely to flow into the measurement outlet 33c. In that case, the dynamic pressure due to the forward flow air can be made less likely to be applied to the measurement outlet 33c.

According to the present embodiment, the downstream defining surface 135b defining the outlet downstream end 134b of the measurement outlet 33c is not orthogonal to the depth direction Z, but inclined toward the outer peripheral side of the housing 21. For that reason, since the air AF5 flowing out from the measurement outlet 33c flows along the downstream defining surface 135b, the traveling direction of the air is likely to come closer to the traveling direction of the forward flow air flowing through the intake passage 12. In that instance, since the air AF5 is less likely to be separated from the downstream flat portion 137a, the turbulence of the air flow attributable to the separation is less likely to occur around the measurement outlet 33c. Therefore, the detection accuracy of the flow rate detector 22 can be inhibited from being deteriorated due to the fact that the air flowing through the measurement flow channel 32 is less likely to flow out from the measurement outlet 33c.

According to the present embodiment, the measurement outlet 33c is disposed at a position closer to the outer peripheral upstream end 132a in the depth direction Z. In that case, since the separation distance between the outer peripheral downstream end 132b and the measurement outlet 33c in the housing 21 is as large as possible, even if turbulence of the air flow accompanied by the backflow occurs around the outer peripheral downstream end 132b, the turbulence can be more reliably inhibited from reaching the measurement outlet 33c.

According to the present embodiment, since the open area of the measurement outlet 33c is smaller than the open area of the inflow port 33a, the forward flow air such as the air AF1 is more likely to flow into the measurement outlet 33c than into the inflow port 33a. For that reason, the forward flow air can be inhibited from flowing into the measurement outlet 33c.

According to the present embodiment, the measurement outlet 33c has a flat shape extending in the height direction Y. For that reason, when a placement region in which the measurement outlet 33c is necessarily to be placed is set in the intake passage 12, even if an insertion depth of the air flow meter 14 into the airflow insertion hole 12b varies somewhat from vehicle to vehicle, a part of the measurement outlet 33c can be reliably placed in the placement region. In that case, unlike the present embodiment, for example, a separation distance between the measurement outlet 33c and the outer peripheral downstream end 132b in the depth direction Z is larger than that in the configuration in which the measurement outlet 33c is flat and extends in the depth direction Z. Therefore, even if turbulence of the air flow occurs around the outer peripheral downstream end 132b in the intake passage 12, the flat surface 44 can inhibit the turbulence from reaching the measurement outlet 33c.

<Description of Configuration Group C>

A configuration group C relating to a positional relationship between the housing attachment and the position holder will be described with reference to FIGS. 29 and 30 and the like. In FIG. 30, the connector terminals 28a, the SA protrusions 71a and 71b, and the width housing protrusion 72a are not shown.

Figure 29:
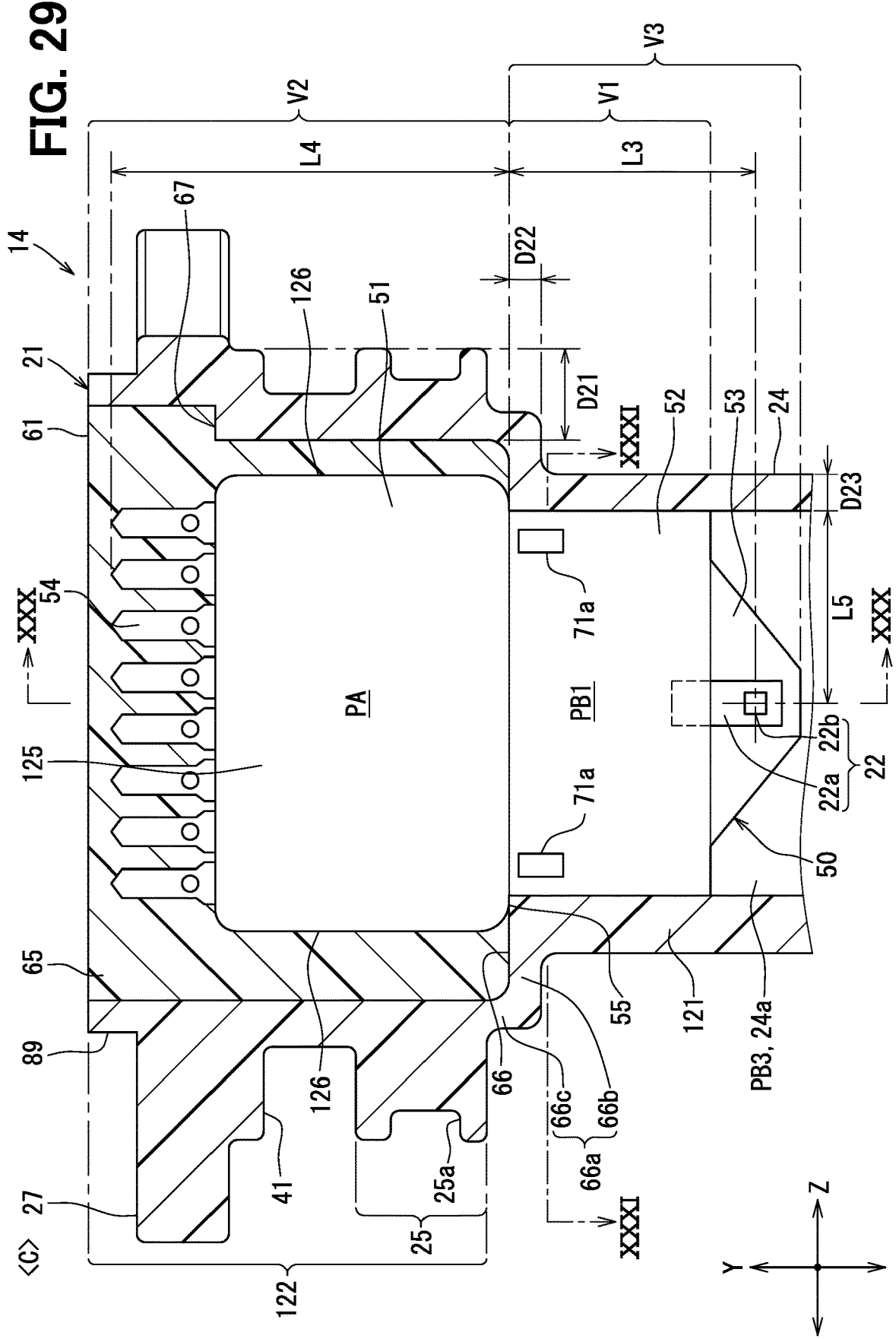
FIG. 29 is an enlarged view of a periphery of a sensor SA in FIG. 8 in a configuration group C.
Figure 30:
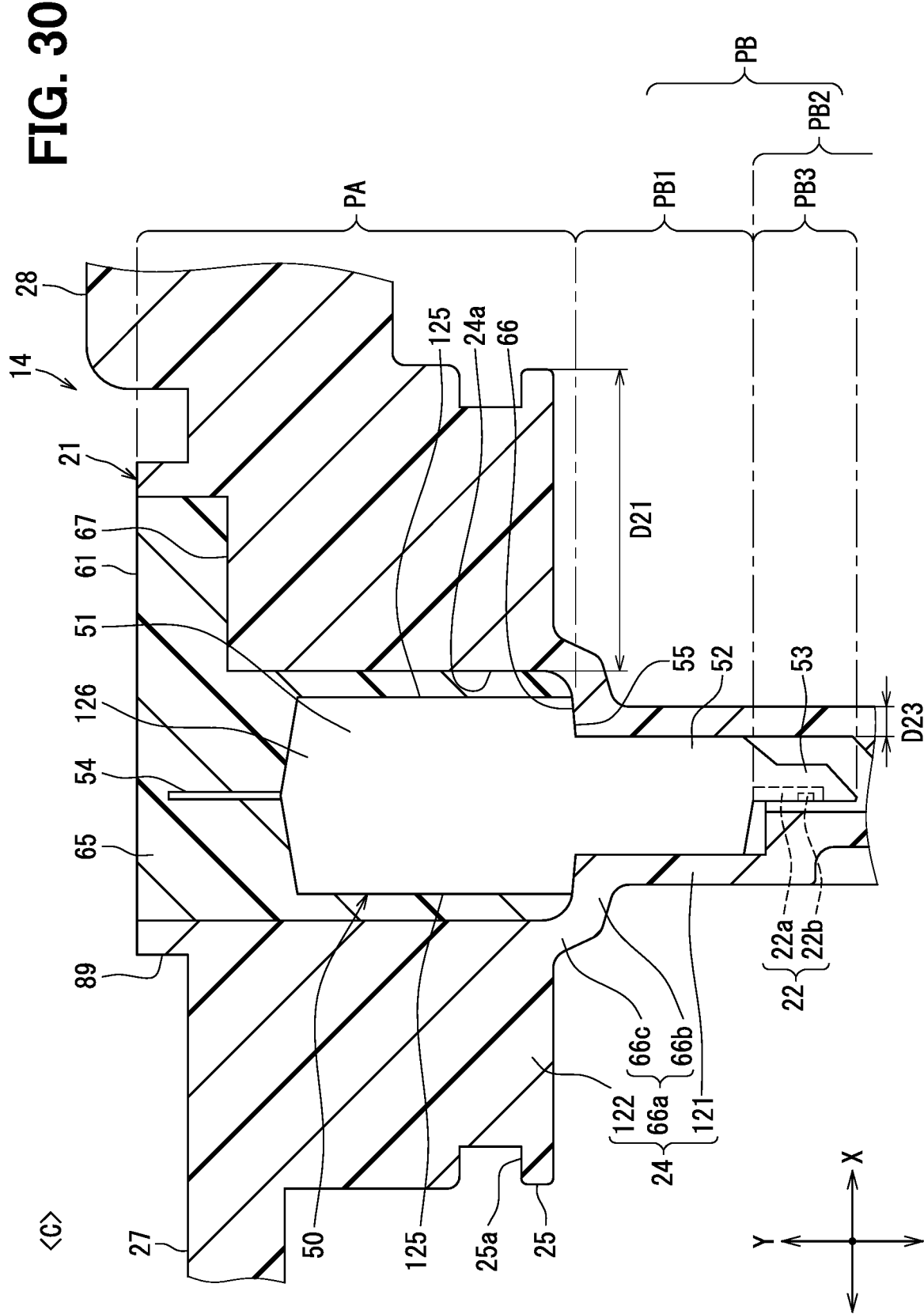
FIG. 30 is a cross-sectional view taken along a line XXX-XXX of FIG. 29.

As shown in FIG. 8, FIG. 29, and FIG. 30, in the housing 21, the region step surface 66 is disposed closer to the housing tip side than the ring holding portion 25.

The housing body 24 has an accommodation wall portion 121 defining the accommodation region PB1 and a sealing wall portion 122 defining the sealing region PA, and both of the wall portions 121 and 122 are cylindrical portions extending in the height direction Y. The sealing wall portion 122 is provided closer to the housing base end side than the accommodation wall portion 121, and the sealing wall portion 122 and the accommodation wall portion 121 are connected to each other by an overhanging portion 66a. In that case, the overhanging portion 66a is also included in the housing body 24, and the overhanging portion 66a corresponds to a housing connector. The accommodation wall portion 121 corresponds to a housing wall portion.

The sealing wall portion 122 has an inner peripheral surface disposed closer to the outer peripheral side than the inner peripheral surface of the accommodation wall portion 121, and has an outer peripheral surface disposed closer to the outer peripheral side than the outer peripheral surface of the accommodation wall portion 121. In the overhanging portion 66a, an intermediate portion between the accommodation wall portion 121 and the sealing wall portion 122 bulges to the outer peripheral side. The overhanging portion 66a has a lateral extending portion 66b extending from the accommodation wall portion 121 toward the outer peripheral side and a vertical extending portion 66c extending from the sealing wall portion 122 toward the housing tip side, and the connection portions of those extending portions 66b and 66c are chamfered by curved surfaces. The lateral extending portion 66b corresponds to an orthogonal portion extending in a direction orthogonal to the height direction Y.

In the housing 21, a housing attachment attached to the intake pipe 12a includes the ring holding portion 25, the flange portion 27, and the sealing wall portion 122. The ring holding portion 25, the flange portion 27, and the sealing wall portion 122 have a shape in which the housing attachment as a whole extends in the width direction X and the depth direction Z along the peripheral portion of the housing 21. In that case, the height direction Y is orthogonal to a direction in which the housing attachment extends. The ring holding portion 25 is fixed to the intake pipe 12a through an O-ring 26, and the flange portion 27 is fixed to the intake pipe 12a through the bosses 12d. In that case, a load for fixing the air flow meter 14 to the intake pipe 12a is applied to the sealing wall portion 122 through the ring holding portion 25 and the flange portion 27. Therefore, since the sealing wall portion 122 is thickened as a whole, a strength of the sealing wall portion 122 is increased.

In the sealing wall portion 122, an outer peripheral end of a lateral cross section is generally circular, while an inner peripheral end of the lateral cross section is generally rectangular. The sealing wall portion 122 enters the airflow insertion hole 12*b* of the intake pipe 12*a*, and the outer peripheral surface of the sealing wall portion 122 such as the ring holding portion 25 faces the inner peripheral surface of the airflow insertion hole 12*b* and the inner peripheral surface of the pipe flange 12*c*. In this example, the airflow insertion hole 12*b* is formed in a circular shape, and the outer peripheral end of the sealing wall portion 122 is formed in a circular shape in accordance with the shape of the airflow insertion hole 12*b*. In this case, since the separation distance between the outer peripheral surface of the sealing wall portion 122 and the inner peripheral surface of the airflow insertion hole 12*b* is made uniform, the O-ring 26 can easily secure the airtightness between the outer peripheral surface and the inner peripheral surface.

On the other hand, as described above, the sensor SA 50 is inserted into the internal space 24*a* defined by the inner peripheral surface of the housing body 24, and the inner peripheral surface of the sealing wall portion 122 faces the outer peripheral surface of the sensor SA 50. In this example, the sensor SA 50 has a flat cross-sectional shape due to the plate shape of the sensor SA 50 as a whole, and the inner peripheral end of the sealing wall portion 122 is formed in a flat shape in accordance with the cross-sectional shape of the sensor SA 50. The lateral cross section of the sealing wall portion 122 is a cross section extending in a direction orthogonal to the height direction Y. The internal space 24*a* corresponds to an accommodation space in which the sensor SA 50 is accommodated.

As described above, the outer circumference of the sealing wall portion 122 is circular and the inner circumference of the sealing wall portion 122 is flat, as a result of which the thickness dimension D21 of the sealing wall portion 122 is not uniform in the circumferential direction. A pair of SA plate surfaces 125, which are a pair of plate surfaces, and a pair of SA side surfaces 126, which are a pair of side surfaces, are included in the outer peripheral surface of the sensor SA 50, which is a plate shape as a whole. The SA plate surface 125 as a whole extends in the depth direction Z, and the SA side surface 126 as a whole extends in the width direction X. In the sealing wall portion 122, a portion of the sensor SA 50 facing the SA plate surface 125 is thicker as a whole than a portion facing the SA side surface 126. In this case, in the sealing wall portion 122, a portion having the largest thickness dimension D21 is included in a portion facing the SA plate surface 125. The SA plate surface 125 is also a plate surface extending in the height direction Y in the sensor SA 50.

The ring holding portion 25 is formed by a holding groove 25*a* provided in the sealing wall portion 122. In this example, if the holding groove 25*a* is formed by a pair of groove defining portions, the tip end faces of those groove defining portions are included in the outer peripheral surface of the sealing wall portion 122. For that reason, the thickness dimension D21 of the sealing wall portion 122 is a separation distance between the inner peripheral surface of the sealing wall portion 122 and the tip end face of the groove defining portion. The pair of groove defining portions may protrude from the outer peripheral surface of the sealing wall portion 122. In this case, since the groove defining portion is not included in the sealing wall portion 122, the thickness dimension D21 of the sealing wall portion 122 is a separation distance between the inner peripheral surface of the sealing wall portion 122 and the bottom surface of the holding groove 25*a*. Further, the O-ring 26 is a sealing member which is in close contact with the sealing wall portion 122 side and the intake pipe 12*a* side to restrict the intake air from leaking out of the airflow insertion hole 12*b*, and the O-ring 26 can also be referred to as a packing member. In this case, the ring holding portion 25 corresponds to a sealing holder.

In the accommodation wall portion 121, both the outer peripheral end and the inner peripheral end of the lateral cross section are flattened as a whole. This is because, unlike the sealing wall portion 122, the outer peripheral surface of the accommodation wall portion 121 does not face the inner peripheral surface of the airflow insertion hole 12*b*, and the shape of the outer peripheral end of the sealing wall portion 122 does not need to be matched with the shape of the airflow insertion hole 12*b*. Since both the outer peripheral end and the inner peripheral end of the accommodation wall portion 121 are flattened in this manner, the thickness dimension D22 of the accommodation wall portion 121 is substantially uniform in the circumferential direction. In other words, in the accommodation wall portion 121, in order to make the thickness dimension D22 uniform in the circumferential direction, the shape of the outer peripheral surface is set in accordance with the shape of the inner peripheral surface.

The accommodation wall portion 121 is thinner as a whole than the sealing wall portion 122. As compared between the wall thicknesses of the accommodation wall portion 121 and the sealing wall portion 122, there is a portion in which the sealing wall portion 122 is thicker than the accommodation wall portion 121, but there is no portion in which the sealing wall portion 122 is thinner than the accommodation wall portion 121. In other words, the thickness dimension D21 of the thickest portion of the sealing wall portion 122 is larger than the thickness dimension D22 of any portion of the accommodation wall portion 121, and the thickness dimension D21 of the thinnest portion of the sealing wall portion 122 is not smaller than the thickness dimension D22 of any portion of the accommodation wall portion 121.

The overhanging portion 66*a* is not only thinner than the sealing wall portion 122, but also thinner as a whole than the accommodation wall portion 121. As compared between the wall thicknesses of the overhanging portion 66*a* and the accommodation wall portion 121, there is a portion in which the accommodation wall portion 121 is thicker than the overhanging portion 66*a*, but there is no portion in which the accommodation wall portion 121 is thinner than the overhanging portion 66*a*.

In the housing 21, the region step surface 66 is formed by an end face of the housing base end side of the accommodation wall portion 121. As described above, the circuit step surface 55 of the sensor SA 50 is caught by the region step surface 66, and the region step surface 66 is held in position in the height direction Y so as not to move the sensor SA 50 toward the housing because the region step surface 66 is in contact with the sensor SA 50. The region step surface 66 is a surface orthogonal to the height direction Y and corresponds to a third holding portion. The circuit step surface 55 corresponds to a unit contact portion that is in contact with the region step surface 66. The region step surface 66 may be referred to as a positioning surface for determining and obtaining the position of the sensor SA 220.

The region step surface 66 is also formed by an end face of the accommodation wall portion 121 on the housing base end side and a surface of the lateral extending portion 66*b* on the housing base end side. For that reason, if the circuit step surface 55 of the sensor SA 50 is caught by the region step surface 66, the circuit step surface 55 may touch not only the accommodation wall portion 121 but also the lateral extending portion 66b.

Figure 31:
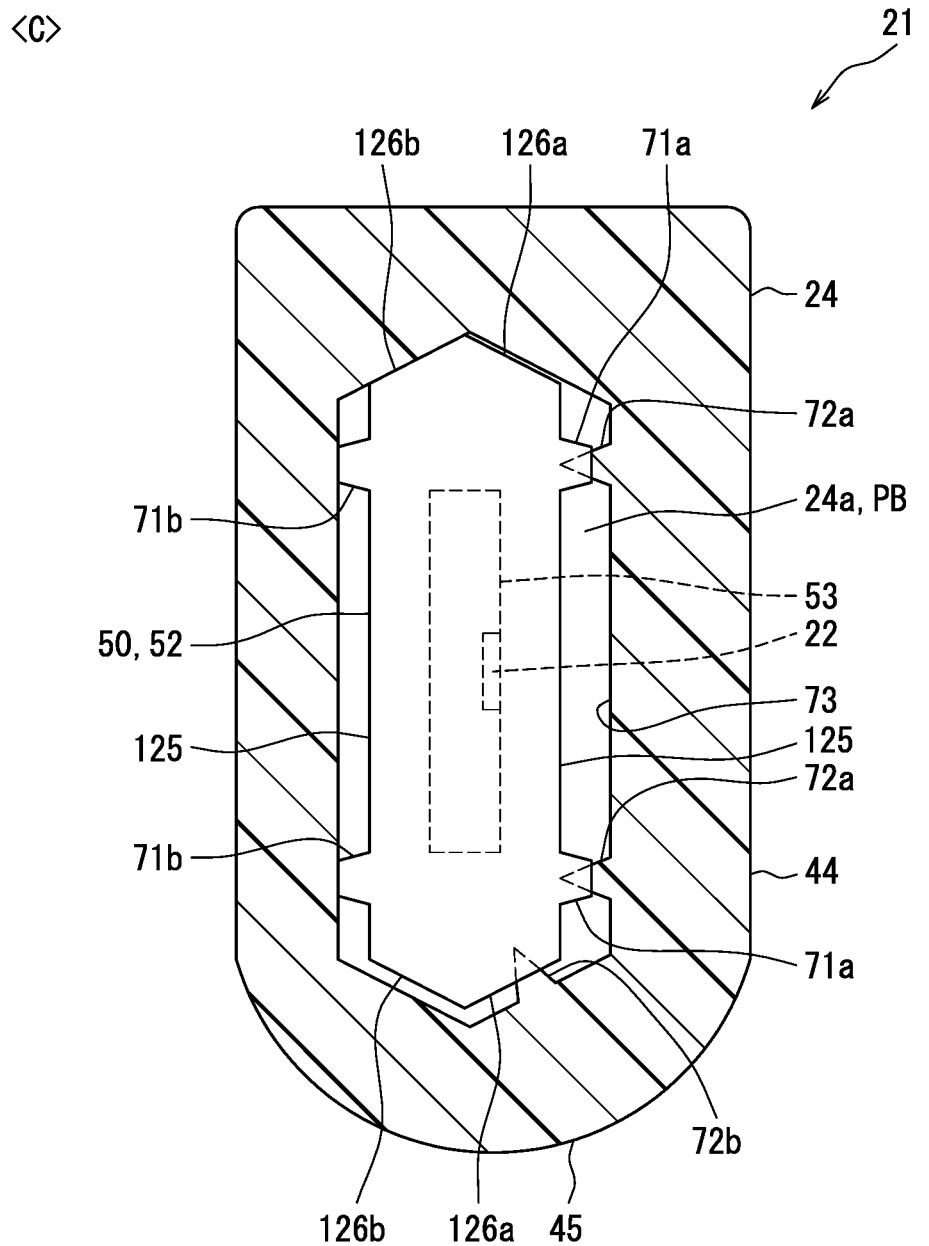
FIG. 31 is a cross-sectional view taken along a line XXXI-XXXI of FIG. 29.

As described above, the housing body 24 has housing protrusions 72a and 72b for holding the sensor SA 50 in place (refer to FIGS. 14 and 15), and the housing protrusions 72a and 72b are included in the accommodation wall portion 121. As shown in FIG. 31, the SA side surface 126 of the sensor SA 50 includes inclined surfaces 126a and 126b that are inclined without being perpendicular to the depth direction Z. The inclined surfaces 126a and 126b are included in the outer peripheral surface of the junction portion 52 of the sensor SA 50. The front inclined surface 126a faces the front side of the sensor SA 50, and the back inclined surface 126b faces the back side of the sensor SA 50.

When the width direction X corresponds to a first direction, the width housing protrusion 72a comes in contact with the SA plate surface 125, thereby holding the sensor SA 50 in position in the width direction X and corresponds to a first holding portion. This is because the SA plate surface 125 is orthogonal to the width direction X. On the other hand, when the depth direction Z corresponds to a second direction, the depth housing protrusion 72b comes in contact with the front inclined surface 126a, thereby holding the sensor SA 50 in position in both the width direction X and the depth direction Z, and corresponds to both the first holding portion and the second holding portion. This is because the front inclined surface 126a is inclined with respect to both the width direction X and the depth direction Z.

In this manner, the sensor SA 50 comes in contact with the region step surface 66 of the accommodation wall portion 121 and the housing protrusions 72a and 72b, and is thus held in position in all of the width direction X, the height direction Y, and the depth direction Z. In that case, the accommodation wall portion 121 has a first holding portion, a second holding portion, and a third holding portion, and corresponds to a position holder. At least a part of the contact portion between the accommodation wall portion 121 and the sensor SA 50 is bonded by bonding using an adhesive or welding using a molten resin. For example, the region step surface 66 of the accommodation wall portion 121 and the circuit step surface 55 of the sensor SA 50 are joined to each other, and the joining portion extends annularly along the peripheral portion of the sensor SA 50. In that case, since a space between the region step surface 66 and the circuit step surface 55 is sealed by an adhesive or molten resin, a thermosetting resin is prevented from leaking from the sealing region PA through the space between the region step surface 66 and the circuit step surface 55 when the potting portion 65 is formed.

As described above, when the housing 21 is molded with resin using a molten resin obtained by melting a thermoplastic resin, unintentional deformation may occur in the housing 21 as the molten resin is cured. Examples of unintentional deformation include sinks and sores, and sinks are depressions, cavities, and the like generated by curing of the molten resin, and sores are deformation after injection and the like caused by a residual stress or a residual strain caused by a temperature difference or the like when the molten resin is cured.

The unintentional deformation due to the resin molding is more likely to occur in the thicker portion of the housing 21. For example, because the sealing wall portion 122 as a whole is thicker than the accommodation wall portion 121, deformation due to resin molding is more likely to occur in the sealing wall portion 122 than in the accommodation wall portion 121. For that reason, unlike the present embodiment, for example, in the configuration in which the region step surface 66 and the housing protrusions 72a and 72b are provided on the sealing wall portion 122, the possibility of unintentional deformation of the region step surface 66 and the housing protrusions 72a and 72b during resin molding is increased. In this instance, the positions of the sensor SA 50 and the flow rate detector 22 are deviated from designed positions due to unintentional deformation of the region step surface 66 and the housing protrusions 72a and 72b, and the detection accuracy of the flow rate detector 22 is lowered.

On the other hand, since the accommodation wall portion 121 is thinner as a whole than the sealing wall portion 122, deformation due to resin molding is less likely to occur than the sealing wall portion 122. Therefore, in the present embodiment, as described above, the region step surface 66 and the housing protrusions 72a and 72b are included in the accommodation wall portion 121 instead of the sealing wall portion 122. In other words, the region step surface 66 and the housing protrusions 72a and 72b are provided closer to the housing tip side than the ring holding portion 25 and the flange portion 27. In that instance, the positional deviation of the sensor SA 50 and the flow rate detector 22 are less likely to occur due to unintentional deformation due to resin molding, and the detection accuracy of the flow rate detector 22 is less likely to be lowered.

Even in the configuration in which the region step surface 66 and the housing protrusions 72a and 72b are included in the accommodation wall portion 121, it is conceivable that the deformation caused by the resin molding may occur in the accommodation wall portion 121 to cause the positional deviations of the sensor SA 50 and the flow rate detector 22 to occur. For example, when the position of the sensor SA 50 is deviated so as to rotate in the width direction X and the depth direction Z with the contact portions with the region step surface 66 and the housing protrusions 72a and 72b as fulcrums, the flow rate detector 22 may deviate in the width direction X and the depth direction Z.

Therefore, in the sensor SA 50 according to the present embodiment, in the height direction Y, a separation distance L3 between the flow rate detector 22 and the circuit step surface 55 is smaller than a separation distance L4 between the end portion on the housing base end side and the circuit step surface 55. In other words, in the height direction Y, the circuit step surface 55 is provided at a position closer to the flow rate detector 22. In this example, when the sensor SA 50 rotates with the contact portion with the accommodation wall portion 121 as a fulcrum, as a rotation radius of the flow rate detector 22 is smaller, a positional deviation amount of the flow rate detector 22 in the width direction X and the depth direction Z is smaller. As described above, as the separation distance L3 between the circuit step surface 55 and the flow rate detector 22 in the height direction Y is smaller, the positional deviation amount of the flow rate detector 22 is smaller, and the detection accuracy of the flow rate detector 22 is less likely to be lowered.

In the present embodiment, the separation distance between the center portion of the detection element 22b of the flow rate detector 22 and the circuit step surface 55 in the height direction Y is defined as the separation distance L3. However, the separation distance L3 may be a value indicating the degree of separation between the flow rate detector 22 and the circuit step surface 55, and may be, for example, a separation distance between the end portion of the flow rate detector 22 on the housing base end side and the circuit step surface 55 in the height direction Y.

In the internal space 24a of the housing body 24, a volume V1 of the accommodation region PB1 is smaller than a volume V2 of the sealing region PA because the separation distance L3 is smaller than the separation distance L4. In other words, when the volume V1 of the accommodation region PB1 is smaller than the volume V2 of the sealing region PA, there is a high possibility that the circuit step surface 55 is provided at a position closer to the flow rate detector 22 in the height direction Y in the sensor SA 50. Further, in the internal space 24a, when a region between the region step surface 66 and the end portion of the sensor SA 50 on the housing tip side in the height direction Y is referred to as a detection region PB3 in which the flow rate detector 22 is accommodated, a volume V3 of the detection region PB3 is smaller than the volume V2 of the sealing region PA. On the other hand, the volume V3 of the detection region PB3 is larger than the volume V1 of the accommodation region PB1. The detection region PB3 is a region including the entire accommodation region PB1 and a portion of the measurement region PB2 on the housing base end side.

If any deformation caused by the molding of the resin slightly occurs in the accommodation wall portion 121, when the operator inserts the sensor SA 50 into the accommodation wall portion 121 at the time of manufacturing the air flow meter 14, the sensor SA 50 may be distorted in accordance with the deformation of the accommodation wall portion 121. For example, when the upstream side portion and the downstream side portion of the region step surface 66 are displaced in the height direction Y, the sensor SA 50 may be distorted such that the upstream side portion and the downstream side portion of the circuit step surface 55 are displaced in the height direction Y. If the position of the flow rate detector 22 deviates from a designed position due to the distortion of the sensor SA 50, the detection accuracy of the flow rate detector 22 is likely be lowered.

Therefore, in the sensor SA 50 of the present embodiment, the flow rate detector 22 is disposed at a position as far as possible from the circuit step surface 55. Specifically, in the height direction Y, the separation distance L3 between the flow rate detector 22 and the region step surface 66 is larger than the thickness dimension D22 of the lateral extending portion 66b. In other words, the flow rate detector 22 is disposed closer to the housing tip side than the overhanging portion 66a. In that instance, for example, even if a portion of the sensor SA 50 in the vicinity of the circuit step surface 55 is distorted due to the occurrence of the deformation caused by resin molding in the region step surface 66 of the housing body 24, the distortion is less likely to reach the flow rate detector 22. For that reason, even if the deformation due to resin molding occurs in the region step surface 66 of the accommodation wall portion 121, the flow rate detector 22 is less likely to be displaced.

In the sensor SA 50, the SA protrusions 71a and 71b are provided between the circuit step surface 55 and the flow rate detector 22 in the height direction Y, and from the above viewpoint, it is conceivable that the flow rate detector 22 is disposed as far as possible from the circuit step surface 55. In particular, the SA protrusions 71a and 71b extend in the height direction Y, and a spacing dimension between the circuit step surface 55 and the flow rate detector 22 in the height direction Y is larger than the longitudinal dimension of the SA protrusions 71a and 71b. Therefore, even if deformation due to resin molding occurs in the region step surface 66, the distortion is less likely to reach the flow rate detector 22 in the sensor SA 50.

Since the flow rate detector 22 is located as far as possible from the circuit step surface 55, the flow rate detector 22 is also separated from the ring holding portion 25. In that case, in the air flow meter 14, even if a heat is applied from the internal combustion engine 11 or the like to the housing body 24, the flange portion 27, and the potting portion 65 outside the intake pipe 12a, the heat is less likely to be transmitted to the flow rate detector 22. For that reason, the detection accuracy of the flow rate detector 22 is less likely to be lowered by a heat from the outside of the intake pipe 12a.

In the sensor SA 50 of the present embodiment, as shown in FIG. 29, the flow rate detector 22 is disposed at a position as far as possible from the accommodation wall portion 121 in the depth direction Z. Specifically, a separation distance L5 between the flow rate detector 22 and the accommodation wall portion 121 in the depth direction Z is larger than the thickness dimension D23 of the accommodation wall portion 121. The separation distance L5 is larger than a thickness dimension D23 of the thickest portion of the accommodation wall portion 121. The flow rate detector 22 is disposed at the center position of the accommodation region PB1 in the depth direction Z, and for that reason, the separation distance L5 is ½ of the depth dimension D6 of the accommodation region PB1 in the depth direction Z (refer to FIG. 8). In addition, in a portion of the accommodation wall portion 121 where the housing protrusions 72a and 72b are present, the protrusion dimensions of the housing protrusions 72a and 72b are included in the thickness dimension D23.

In that instance, for example, even if a portion of the sensor SA 50 in the vicinity of the outer peripheral surface of the junction portion 52 is distorted due to the deformation caused by the resin molding occurring in the depth housing protrusion 72b of the accommodation wall portion 121, the distortion is less likely to reach the flow rate detector 22. For that reason, even if the deformation due to resin molding occurs in the depth housing protrusion 72b of the accommodation wall portion 121, the flow rate detector 22 is hardly displaced.

In the present embodiment, the separation distance between the central portion of the flow rate detector 22 and the inner peripheral surface of the accommodation wall portion 121 in the depth direction Z is defined as a separation distance L5. However, the separation distance L5 may be a value indicating the degree of separation between the flow rate detector 22 and the accommodation wall portion 121 in the depth direction Z, and may be, for example, a spacing dimension between the flow rate detector 22 and the accommodation wall portion 121 in the depth direction Z.

Next, a manufacturing method of the air flow meter 14 will be described with reference to FIGS. 14, 29, and 30, focusing on a process of mounting the sensor SA 50 to the housing 21.

After the housing 21 has been molded with resin by using the mold device 90, the sensor SA 50 is inserted into the internal space 24a through the housing opening 61. When the junction portion 52 of the sensor SA 50 is fitted into the accommodation wall portion 121, the front SA protrusion 71a deforms the width housing protrusion 72a, and the junction portion 52 deforms the depth housing protrusion 72b. When the sensor SA 50 is inserted into the internal space 24a and the circuit step surface 55 of the sensor SA 50 is pressed against the region step surface 66 of the housing 21, the insertion of the sensor SA 50 is terminated. The housing opening 61 corresponds to an accommodation opening for accommodating the sensor SA 50 in the internal space 24a.

In that instance, since the tip end face of the width housing protrusion 72a comes in contact with the tip end face of the front SA protrusion 71a, the sensor SA 50 is restricted from moving toward the width housing protrusion 72*a* in the width direction X. On the other hand, the sensor SA 50 is prevented from moving away from the width housing protrusion 72*a* because the back SA protrusion 71*b* of the sensor SA 50 comes in contact with the inner peripheral surface of the accommodation wall portion 121. In that case, the tip end face of the width housing protrusion 72*a* and a portion of the inner peripheral surface of the accommodation wall portion 121 which comes in contact with the back SA protrusion 71*b* can be referred to as a positioning surface.

Further, in that instance, since the tip end face of the depth housing protrusion 72*b* comes in contact with the upstream side end face of the junction portion 52, the sensor SA 50 is restricted from moving toward the depth housing protrusion 72*b* in both the width direction X and the depth direction Z. On the other hand, the sensor SA 50 is restricted from moving away from the depth housing protrusion 72*b* because the downstream side surface of the sensor SA 50 comes in contact with the inner peripheral surface of the accommodation wall portion 121. In that instance, a portion of the tip end face of the depth housing protrusion 72*b* or the inner peripheral surface of the accommodation wall portion 121, with which the downstream side end face of the sensor SA 50 comes in contact may be referred to as a positioning surface.

Further, since the circuit step surface 55 of the sensor SA 50 comes in contact with the region step surface 66 of the housing 21, the sensor SA 50 is restrained from moving toward the housing tip side in the height direction Y. On the other hand, the movement of the sensor SA 50 toward the housing base end side is restricted by fitting the junction portion 52 of the sensor SA 50 into the accommodation wall portion 121.

After the sensor SA 50 has been inserted into the internal space 24*a*, a thermosetting resin such as a potting resin is injected into the internal space 24*a*, and the thermosetting resin is cured to form the potting portion 65. In this instance, the movement of the sensor SA 50 toward the housing base end side is also restricted by the potting portion 65.

In the configuration group C, according to the present embodiment, in the housing 21, the accommodation wall portion 121 is separated from the ring holding portion 25 toward the housing tip side. For that reason, the ring holding portion 25 can be thickened to improve the strength, while the accommodation wall portion 121 can be thinned so as not to be deformed by resin molding. As described above, since the accommodation wall portion 121 is thinned, the shapes of the accommodation wall portions 121 are less likely to vary from product to product, and therefore, the position of the sensor SA 50 positioned by the accommodation wall portion 121 is less likely to vary. Therefore, the detection accuracy of the flow rate detector 22 can be inhibited from varying from product to product.

According to the present embodiment, the housing opening 61 is provided closer to the housing base end side than the region step surface 66. In this example, there is a concern that the housing body 24 is unintentionally deformed due to the relatively low strength of the portion of the housing 21 where the housing opening 61 is provided. On the other hand, in the housing 21, the strength of the housing 21 is enhanced by the sealing wall portion 122, the ring holding portion 25, and the flange portion 27 on the housing base end side of the region step surface 66. Therefore, the housing opening 61 is provided in a portion of the housing 21 where the strength on the housing base end side is more easily secured than the region step surface 66, thereby being capable of inhibiting unintentional deformation of the housing body 24 due to the presence of the housing opening 61. As a result, the positional deviation of the sensor SA 50 caused by the deformation of the housing body 24 can be inhibited.

According to the present embodiment, both the width housing protrusion 72*a* for regulating the movement of the sensor SA 50 in the width direction X and the depth housing protrusion 72*b* for regulating the movement of the sensor SA 50 in the depth direction Z are included in the accommodation wall portion 121. In this instance, since the housing protrusions 72*a* and 72*b* of the accommodation wall portion 121 are less likely to be deformed by the resin molding, the position of the sensor SA 50 in the width direction X and the depth direction Z can be inhibited from varying from product to product.

According to the present embodiment, a large part of the inner peripheral surface of the accommodation wall portion 121 does not come in contact with the outer peripheral surface of the sensor SA 50, but limited parts such as the tip portions of the housing protrusions 72*a* and 72*b* come in contact with the outer peripheral surface of the sensor SA 50. In that case, even if the deformation attributable to the resin molding occurs in the accommodation wall portion 121, the housing protrusions 72*a* and 72*b* are not necessarily displaced in position or the housing protrusions 72*a* and 72*b* themselves are deformed by the deformation of the accommodation wall portion 121. For that reason, even if the shape variation of each product occurs in the accommodation wall portion 121, the position of the sensor SA 50 does not easily vary due to the deformation variation. This makes it possible to more reliably inhibit variations in the position of the sensor SA 50 from product to product.

According to the present embodiment, the accommodation wall portion 121 includes the region step surface 66 that restricts the sensor SA 50 from moving toward the housing tip side in the height direction Y. In this instance, in the accommodation wall portion 121, since the deformation of the region step surface 66 due to the resin molding is less likely to be generated, the position of the sensor SA 50 in the height direction Y can be inhibited from varying from product to product.

According to the present embodiment, in the sensor SA 50, the circuit step surface 55 is provided between the lead terminals 54 and the flow rate detector 22 at a position closer to the flow rate detector 22. In this instance, even if the sensor SA 50 is deviated in position so as to rotate about the contact portion with the region step surface 66 as a fulcrum, the amount of positional deviation of the flow rate detector 22 can be reduced as compared with a configuration in which the circuit step surface 55 is provided at a position closer to the lead terminals 54, for example. For that reason, the deterioration of the detection accuracy of the flow rate detector 22 can be inhibited.

According to the present embodiment, since the ring holding portion 25 and the accommodation wall portion 121 are connected to each other by the overhanging portion 66*a*, a configuration can be realized in which the accommodation wall portion 121 is separated from the ring holding portion 25 toward the housing tip side. In that case, even if the deformation caused by the resin molding occurs in the ring holding portion 25, the deformation is absorbed by the overhanging portion 66*a*, so that the position and the shape of the accommodation wall portion 121 are less likely to change with the deformation of the ring holding portion 25. For that reason, the positioning accuracy of the sensor SA 50 by the region step surface 66 and the housing protrusions 72*a* and 72*b* can be inhibited from being deteriorated.

According to the present embodiment, since the separation distance L3 between the flow rate detector 22 and the region step surface 66 is larger than the thickness dimension D22 of the lateral extending portion 66b, a configuration can be realized in which the flow rate detector 22 is moved away as far as possible from the region step surface 66 in the height direction Y. According to the above configuration, even if the deformation caused by the resin molding is generated in the region step surface 66, the distortion generated in the sensor SA 50 by fitting the sensor SA 50 inside the accommodation wall portion 121 is less likely to reach the flow rate detector 22. For that reason, even if the sensor SA 50 is distorted when the sensor SA 50 is assembled to the housing 21, the positional deviation of the flow rate detector 22 can be inhibited.

According to the present embodiment, since the separation distance L5 between the flow rate detector 22 and the accommodation wall portion 121 is larger than the thickness dimension D23 of the accommodation wall portion 121, a configuration can be realized in which the flow rate detector 22 is moved away as far as possible from the accommodation wall portion 121 in the depth direction Z. According to the above configuration, even if the housing protrusions 72a and 72b are deformed due to the resin molding, the distortion generated in the sensor SA 50 is less likely to reach the flow rate detector 22 by fitting the housing protrusions 72a and 72b inside the accommodation wall portion 121. This makes it possible to inhibit the positional deviation of the flow rate detector 22 from occurring due to the distortion of the sensor SA 50.

According to the present embodiment, the sensor SA 50 is inserted into the internal space 24a through the housing opening 61. As described above, even when the sensor SA 50 is added to the resin-molded housing 21 later, the positioning accuracy of the sensor SA 50 by the accommodation wall portion 121 can be enhanced because the deformation due to the resin molding is less likely to be generated in the accommodation wall portion 121.

<Description of Configuration Group D>

A configuration group D relating to the configuration of the passage flow channel will be described with reference to FIGS. 32, 33, and the like.

Figure 32:
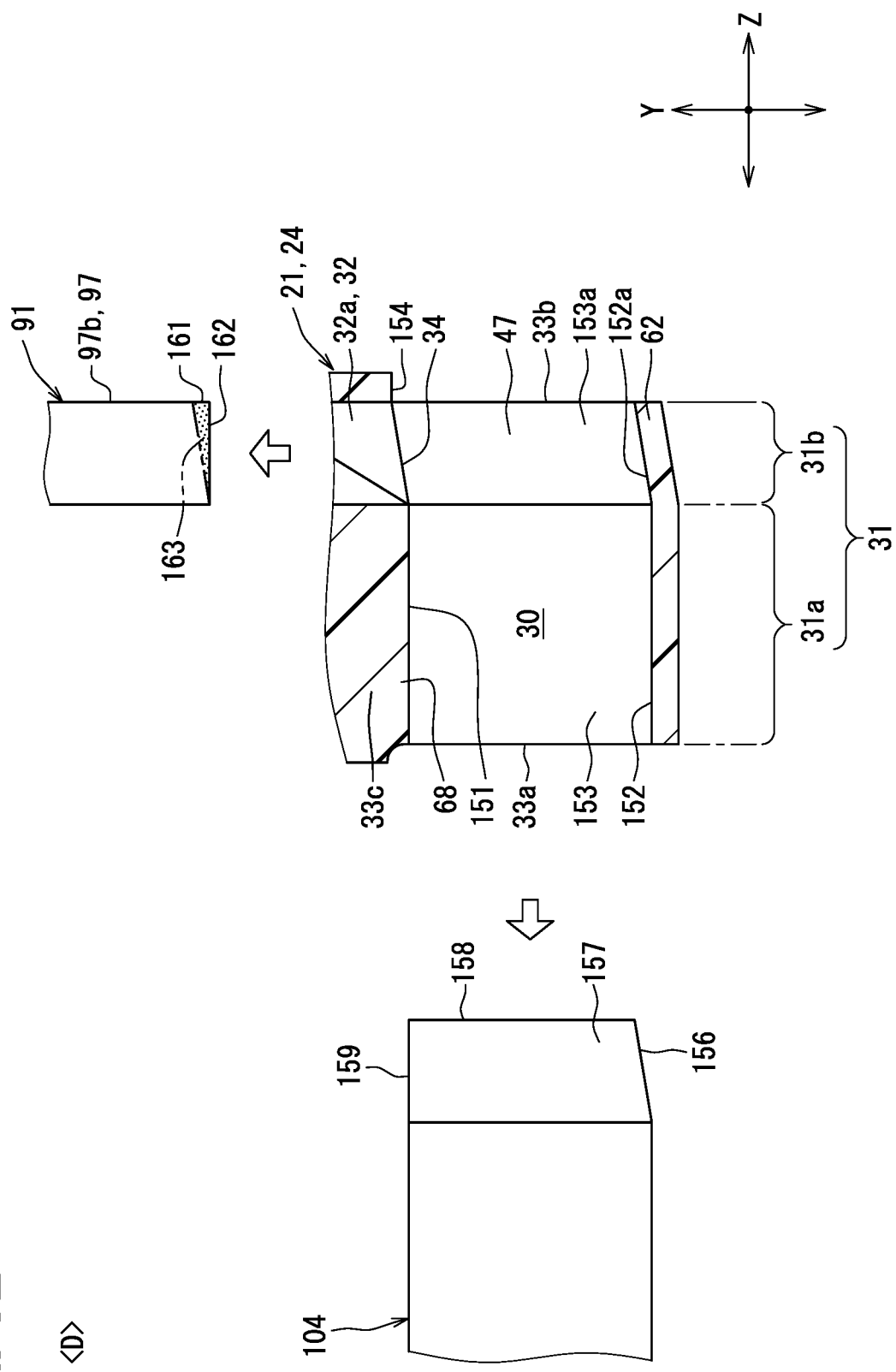
FIG. 32 is a view showing a state in which the measurement molding portion and the passage mold portion are removed from the housing in a configuration group D.

As shown in FIG. 32, the passage flow channel 31 does not extend downstream of the flow channel boundary portion 34 in the depth direction Z. In other words, in the passage flow channel 31, a portion between the flow channel boundary portion 34 and the inflow port 33a in the depth direction Z is the inflow passage 31a, and there is no portion between the flow channel boundary portion 34 and the outflow port 33b in the depth direction Z. In that case, a part of the flow channel boundary portion 34 and a part of the outflow port 33b overlap with each other, and the flow channel boundary portion 34 extends from the outflow port 33b toward the inflow port 33a in the depth direction Z. The flow channel boundary portion 34 corresponds to a branch boundary.

The inner peripheral surface of the passage flow channel 31 has a passage ceiling surface 151, a passage floor surface 152, and a passage wall surface 153. The passage ceiling surface 151 and the passage floor surface 152 are opposed to each other across the passage flow channel 31 in the height direction Y, and the passage ceiling surface 151 is disposed closer to the housing base end side than the passage flow channel 31. The passage ceiling surface 151 faces the housing tip side, and the passage floor surface 152 faces the housing base end side. The pair of passage wall surfaces 153 are provided across the passage ceiling surface 151 and the passage floor surface 152 in the width direction X, and those passage wall surfaces 153 are opposed to each other in a state of being directed in the width direction X.

The inner peripheral surface of the passage flow channel 31 has throttle surfaces 152a and 153a that throttle the passage flow channel 31 from the inflow port 33a toward the outflow port 33b. In that case, the flow channel area of the passage flow channel 31 gradually decreases toward the outflow port 33b. The throttle surfaces 152a and 153a are included in the inner peripheral surface of the outflow passage 31b, and extend from the outflow port 33b toward the inflow passage 31a. The throttle surfaces 152a and 153a are inclined with respect to the depth direction by being directed toward the inflow port 33a side. The throttle surfaces 152a and 153a extend over the upstream end portion and the downstream end portion of the outflow passage 31b, and are not included in the inner peripheral surface of the inflow passage 31a. The flow path cross section of the passage flow channel 31 is smaller in the portion closer to the outflow port 33b in the outflow passage 31b.

The floor throttle surface 152a is included in the passage floor surface 152, and the wall throttle surface 153a is included in the passage wall surface 153. The floor throttle surface 152a is an inner peripheral surface of a portion of the housing bottom portion 62 which is inclined with respect to the depth direction Z. The wall throttle surface 153a is an inner peripheral surface of the passage throttle portion 47, and a pair of the wall throttle surfaces 153a are provided across the floor throttle surface 152a in the width direction X. The floor throttle surface 152a and the wall throttle surface 153a correspond to a passage throttle surface.

The flow channel boundary portion 34 is inclined with respect to the depth direction Z by being directed toward the outflow port 33b. In other words, the flow channel boundary portion 34 is inclined with respect to the passage ceiling surface 151. The flow channel boundary portion 34 faces the floor throttle surface 152a across the outflow port 33b, and extends in parallel with the floor throttle surface 152a.

The outer peripheral surface of the housing 21 includes an eaves surface 154 extending toward the outer peripheral side from an overlapping portion of the inflow port 33a and the flow channel boundary portion 34. The eaves surface 154 is disposed on the opposite side of the passage ceiling surface 151 across the flow channel boundary portion 34 in the depth direction Z, and extends in the depth direction Z similarly to the passage ceiling surface 151. For that reason, the floor throttle surface 152a is also inclined with respect to the eaves surface 154. The eaves surface 154 does not define the passage flow channel 31 because the passage wall surface 153 is not connected to the eaves surface 154.

Next, the passage mold portion 104 of the mold device 90 will be described.

Figure 33:
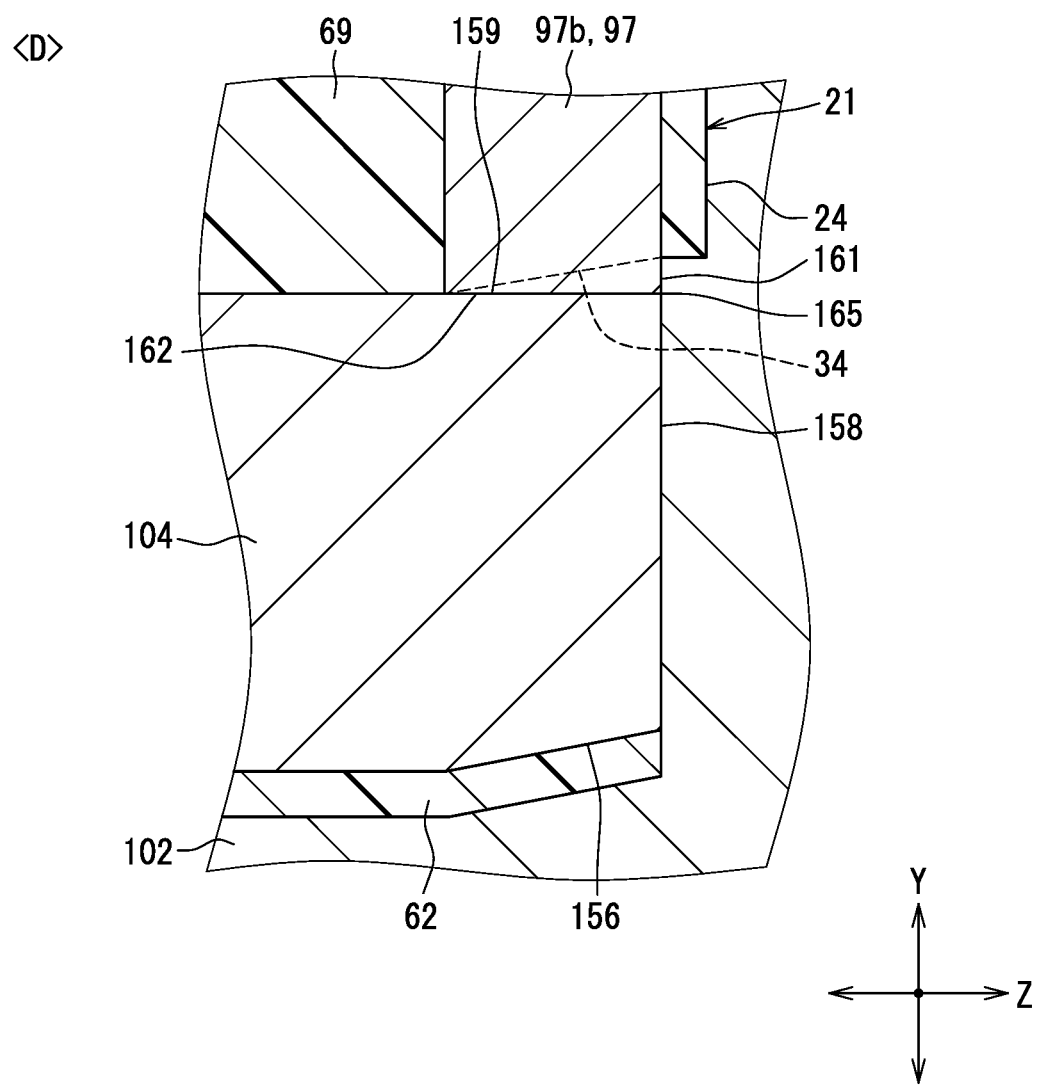
FIG. 33 is a diagram illustrating the molding of the passage flow channel by the measurement molding portion and the passage mold portion.

As shown in FIGS. 32 and 33, the outer peripheral surface of the passage mold portion 104 has a floor throttle molding surface 156 for molding the floor throttle surface 152a and a wall throttle molding surface 157 for molding the wall throttle surface 153a. The passage mold portion 104 has an outer passage surface 158 that abuts against the outer peripheral mold portions 102 and 103 in an assembled state of the mold device 90, and the outer passage surface 158 is a tip portion or a tip end face of the passage mold portion 104. The floor throttle molding surface 156 and the wall throttle molding surface 157 extend in the depth direction Z from the outer passage surface 158 of the passage mold portion 104. With the provision of the molding surfaces 156 and 157, the passage mold portion 104 is thinner in a portion closer to the outer passage surface 158. A pair of the wall throttle molding surfaces 157 are provided across the floor throttle molding surface 156 in the width direction X. The floor throttle molding surface 156 and the wall throttle molding surface 157 correspond to a mold throttle portion.

The outer peripheral surface of the passage mold portion 104 has an inner passage surface 159 that abuts against the introduction molding portion 97b in a state in which the mold device 90 is assembled. The inner passage surface 159 is disposed on the opposite side of the passage mold portion 104 across the wall throttle molding surface 157 and the outer passage surface 158, and is perpendicular to the outer passage surface 158. The floor throttle molding surface 156 is inclined with respect to the inner passage surface 159. As described above, the introduction molding portion 97b is included in the measurement molding portion 97, and the measurement molding portion 97 is included in the inner peripheral mold portion 91. The inner peripheral mold portion 91 corresponds to a measurement mold portion and a branch mold portion for molding the inner peripheral surface of the measurement flow channel 32.

In the assembled state of the mold device 90, the measurement molding portion 97 abuts against both the passage mold portion 104 and the outer peripheral mold portions 102 and 103. The outer peripheral surface of the measurement molding portion 97 has an outer measurement surface 161 that abuts against the outer peripheral mold portions 102 and 103 in the mold device 90, and an inner measurement surface 162 that abuts against the inner passage surface 159 of the passage mold portion 104. Before the mold device 90 is removed from the resin-molded housing 21, the outer measurement surface 161 and the inner measurement surface 162 are disposed inside the passage flow channel 31 because the tip portion of the measurement molding portion 97 enters the passage flow channel 31. In that case, the outer passage surface 158 of the passage mold portion 104 and the outer measurement surface 161 of the measurement molding portion 97 form the same plane, and the plane is included in the outflow port 33b. In the measurement molding portion 97, a portion entering the passage flow channel 31 is referred to as an entry portion 163, and the entry portion 163 is indicated by dot hatching in FIG. 32.

When a portion of the measurement molding portion 97 abutting against the first outer peripheral mold portion 102 will be described with reference to an illustration of FIG. 33, the mold device 90, is formed with a mold boundary 165, which is a boundary between the measurement molding portion 97, the passage mold portion 104, and the first outer peripheral mold portion 102. The mold boundary 165 extends in the width direction X, and the mold boundary 165 includes a boundary between the outer measurement surface 161 and the inner measurement surface 162 of the measurement molding portion 97. The mold boundary 165 is disposed at the outflow port 33b of the passage flow channel 31 in the housing 21. In a portion of the measurement molding portion 97 abutting against the second outer peripheral mold portion 103, a boundary of three mold portions, that is, the measurement molding portion 97, the passage mold portion 104, and the second outer peripheral mold portion 103, may be referred to as a mold boundary 165.

As described above, when the mold device 90 is detached from the resin-molded housing 21, after the passage mold portion 104 is extracted from the inflow port 33a of the housing 21, the outer peripheral mold portions 102 and 103 are detached from the outer peripheral surface of the housing 21. Either the operation of detaching the inner peripheral mold portion 91 from the housing 21 or the operation of detaching the passage mold portion 104 from the housing 21 may be performed first.

In the configuration group D, according to the present embodiment, the inner peripheral surface of the passage flow channel 31 is integrally molded by using the mold device 90 at the time of molding the housing 21 with resin. For that reason, there is no need to provide the passage flow channel 31 by separately molding multiple members with resin and then combining those members together. In that case, it is difficult to generate a step on the inner peripheral surface of the passage flow channel 31 at the boundary between the members, or to cause the shape and size of the passage flow channel 31 to vary from product to product. With a reduction in the manufacturing variation in this manner, the detection accuracy of the flow rate detector 22 can be enhanced.

According to the present embodiment, when the mold device 90 is detached from the resin-molded housing 21, after the passage mold portion 104 has been extracted from the inflow port 33a of the housing 21, the outer peripheral mold portions 102 and 103 are detached from the outer peripheral surface of the housing 21. In this case, when the passage mold portion 104 is extracted from the inflow port 33a in the depth direction Z, the outer peripheral portion of the housing 21 is protected by the outer peripheral mold portions 102 and 103. For that reason, even if the passage mold portion 104 is extracted from the inflow port 33a while being twisted so that the tip portion of the passage mold portion 104 is swung in the width direction X and the height direction Y, the housing 21 is less likely to be deformed from the inner peripheral side by the passage mold portion 104. This makes it possible to inhibit the housing 21 from being deformed or damaged unintentionally when the passage mold portion 104 is detached from the housing 21.

According to the present embodiment, before the mold device 90 is removed from the resin-molded housing 21, the entry portion 163 of the measurement molding portion 97 enters the passage flow channel 31. In other words, the mold boundary 165 is formed inside the passage flow channel 31. In this manner, a part of the inner peripheral surface of the passage flow channel 31 is molded by the measurement molding portion 97, in the mold device 90 in which the passage mold portion 104 is not extracted from the outflow port 33b, the degree of freedom of design and manufacturing relating to the shape of the passage flow channel 31 can be enhanced. For that reason, the housing 21 in which the flow channel boundary portion 34 faces the outflow port 33b side can be realized as in the present embodiment.

According to the present embodiment, the passage mold portion 104 gradually tapers toward the tip portion forming the outer passage surface 158. In other words, the passage mold portion 104 has a shape that does not become thicker. For that reason, when the housing 21 is molded with resin in a state in which the passage mold portion 104 and the outer peripheral mold portions 102 and 103 are assembled to each other, the passage mold portion 104 can be pulled out from the inflow port 33a of the housing 21 toward the side opposite to the outer passage surface 158. In this case, the inner peripheral surface of the passage flow channel 31 can be integrally molded by using the passage mold portion 104.

According to the present embodiment, since the floor throttle molding surface 156 and the wall throttle molding surface 157 are included in the outer peripheral surface of the passage mold portion 104, a shape can be realized in which the passage mold portion 104 gradually narrows toward the outer passage surface 158. In this case, in the inner peripheral surface of the passage flow channel 31, an area of a portion of the passage mold portion 104 extending in parallel to the depth direction Z, which is a drawing direction of the passage mold portion 104, is reduced by an amount corresponding to the floor throttle molding surface 156 and the wall throttle molding surface 157. For that reason, the passage mold portion 104 can be easily pulled out from the inside of the passage flow channel 31.

According to the present embodiment, in the depth direction Z, the passage flow channel 31 is not narrowed from the outflow port 33b toward the inflow port 33a. In that case, since the passage mold portion 104 can be extracted from the inflow port 33a when the housing 21 is molded with resin using the mold device 90, there is no need to define the passage flow channel 31 by combining multiple members. Unlike the present embodiment, for example, in the configuration in which the intermediate portion of the passage flow channel 31 is the thickest, it is difficult to extract the passage mold portion 104 from the inflow port 33a due to the passage mold portion 104 being caught on the inner peripheral surface of the passage flow channel 31. In the above configuration, since the passage flow channel 31 is defined by combining multiple members together, the manufacturing variation of the passage flow channel 31 as described above is likely to occur.

According to the present embodiment, since the floor throttle surface 152a and the wall throttle surface 153a are included in the inner peripheral surface of the passage flow channel 31, the degree of throttling of the passage flow channel 31 can be increased toward the outflow port 33b. In addition, since the floor throttle surface 152a and the wall throttle surface 153a extend from the outflow port 33b toward the inflow port 33a, the degree of throttling of the outflow port 33b can be maximized in the passage flow channel 31. As a result, even in the configuration in which the outflow port 33b extends from the flow channel boundary portion 34, a flow velocity of the air in the measurement flow channel 32 can be appropriately increased by narrowing the outflow port 33b.

According to the present embodiment, since the outflow port 33b extends from the flow channel boundary portion 34, there is no need to extend the passage mold portion 104 to the outflow port 33b side of the flow channel boundary portion 34 when molding the housing 21 with resin. In that case, a portion of the passage flow channel 31 which is aligned with the flow channel boundary portion 34 in the height direction Y can be molded not only by the passage mold portion 104 but also by the measurement molding portion 97. For that reason, when the housing 21 is formed using the mold device 90 in which the passage mold portion 104 is not extracted from the outflow port 33b, the degree of freedom of design and manufacturing relating to the positional relationship between the flow channel boundary portion 34 and the outflow port 33b can be increased.

According to the present embodiment, since the flow channel boundary portion 34 extends from the outflow port 33b, in the configuration in which the inner peripheral surface of the passage flow channel 31 is integrally molded, the flow channel boundary portion 34 can be inclined with respect to the depth direction Z so as to face the outflow port 33b side. In that case, a foreign matter that has entered the passage flow channel 31 from the inflow port 33a cannot reach the flow channel boundary portion 34 only by advancing straight toward the outflow port 33b. This makes it possible to inhibit the foreign matter from entering the measurement flow channel 32 from the passage flow channel 31.

<Configuration Group E>

Figure 34:
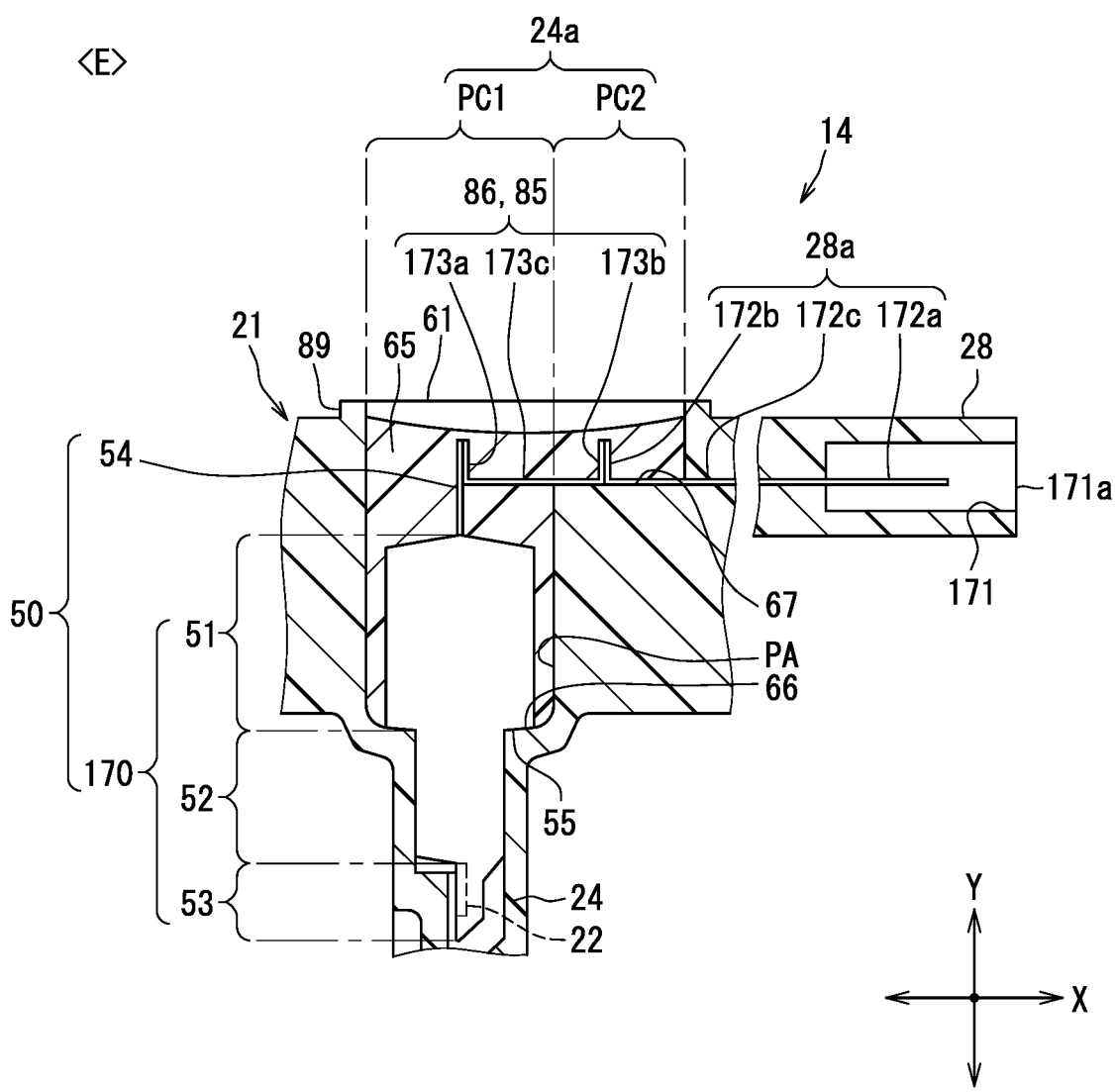
FIG. 34 is an enlarged view of a periphery of the sensor SA in FIG. 30 in a configuration group E.

A configuration group E relating to the position of the connector terminals will be described with reference to FIGS. 34 to 39 and the like. In FIG. 34, the SA protrusions 71a and 71b, the width housing protrusion 72a, and the terminal fixing portion 87 are omitted, and in FIG. 35, the potting portion 65 is omitted.

As shown in FIG. 34, the connector portion 28 of the air flow meter 14 has a connector recess portion 171 in which a tip end face of the connector portion 28 is recessed. When an open end of the connector recess portion 171 is referred to as a connector opening 171a, the connector opening 171a opens an internal space of the connector recess portion 171 in the depth direction Z. In the present embodiment, the height direction Y corresponds to a direction in which the detection unit and the housing opening are aligned. The connector opening 171a may open the internal space of the connector recess portion 171 in the width direction X or the height direction Y.

The connector terminal 28a extends between the connector recess portion 171 and the internal space 24a. The connector terminal 28a has a first terminal portion 172a disposed inside the connector recess portion 171, a second terminal portion 172b disposed in the internal space 24a, and a connection terminal portion 172c connecting the terminal portions 172a and 172b. In the connector terminal 28a, one end portion is included in the first terminal portion 172a, and the other end portion is included in the second terminal portion 172b. The first terminal portion 172a extends toward the connector opening 171a inside the connector recess portion 171. The second terminal portion 172b extends toward the housing opening 61 in the internal space 24a, but does not protrude outward from the housing opening 61.

In the connector terminals 28a, a portion protruding from the inner peripheral surface of the housing 21 into the connector recess portion 171 is the first terminal portion 172a, and a portion protruding from the inner peripheral surface of the housing 21 into the internal space 24a is the second terminal portion 172b. For that reason, the entire connection terminal portion 172c is buried in the housing 21 between the internal space 24a and the connector recess portion 171. At least a part of the connection terminal portion 172c may be embedded in the housing 21. Even in this case, a configuration in which the connection terminal portion 172c is fixed to the housing 21 can be realized.

In the sensor SA 50, a portion including the circuit accommodation portion 51, the junction portion 52, and the sensing portion 53 is referred to as an SA main body 170, and the SA main body 170 includes the flow rate detector 22. The lead terminal 54 extends from the SA main body 170 toward the housing opening 61 in the height direction Y, but does not protrude outward from the housing opening 61. The SA main body 170 corresponds to a unit main body.

The internal space 24a has a main body region PC1 in which the SA main body 170 is accommodated, and a connector region PC2 in which the second terminal portion 172b of the connector terminals 28a is accommodated. The main body region PC1 and the connector region PC2 are aligned laterally in the width direction X, which is a direction perpendicular to the height direction Y, and both of the main body region PC1 and the connector region PC2 extend from the housing opening 61 toward the housing tip side. The main body region PC1 includes a region that extends over the region step surface 66 and the housing opening 61 in the height direction Y, and the connector region PC2 is a region that extends over the sealing step surface 67 and the housing opening 61 in the height direction Y. In the width direction X, which is a direction perpendicular to the height direction Y, a boundary between the region step surface 66 and the sealing step surface 67 is included in a boundary between the main body region PC1 and the connector region PC2. A pair of the region step surfaces 66 is provided across the internal space 24a in the width direction X.

The connector region PC2 is disposed at a position spaced apart from the SA main body 170 toward the housing opening 61 in the height direction Y. This is because the sealing step surface 67 is disposed between the housing opening 61 and the SA main body 170 in the height direction Y.

In the connector region PC2, the second terminal portion 172b of the connector terminal 28a extends from the sealing step surface 67 toward the housing opening 61. In the connector terminal 28a, the connection terminal portion 172c is not exposed to the connector region PC2. In this instance, a part of a portion extending from the connection terminal portion 172c toward the housing opening 61, which is disposed in the connector region PC2, forms the second terminal portion 172b. The second terminal portion 172b corresponds to a protrusion terminal portion and a longitudinal terminal portion.

In the internal space 24a, the connector terminal 28a is not inserted between the housing opening 61 and the sensor SA 50 in the height direction Y. This is because the second terminal portion 172b does not protrude from the connector region PC2 to the main body region PC1. In other words, the connector terminal 28a does not protrude into the main body region PC1.

In the internal space 24a, the circuit step surface 55 of the sensor SA 50 is caught by the region step surface 66 from the housing opening 61. The bridge terminal 86 of the terminal unit 85 is caught by the sealing step surface 67 from the housing opening 61 side. As described above, both the region step surface 66 and the sealing step surface 67 are included in the inner peripheral surface of the housing 21. The region step surface 66 corresponds to a unit holding surface that holds the position of the sensor SA 50 in the height direction Y, and the sealing step surface 67 corresponds to a terminal holding surface that holds the position of the bridge terminal 86 in the height direction Y. The bridge terminal 86 corresponds to a connection terminal.

The bridge terminal 86 has a first bridge portion 173a connected to the lead terminal 54, a second bridge portion 173b connected to the connector terminals 28a, and a connection bridge portion 173c connected to the bridge portions 173a and 173b. The bridge terminal 86 extends across the boundary between the main body region PC1 and the connector region PC2 in the width directions X. The first bridge portion 173a extends along the lead terminal 54 in the main body region PC1, and the second bridge portion 173b extends along the second terminal portion 172b of the connector terminals 28a in the connector region PC2. The connection bridge portion 173c is bridged between the main body region PC1 and the connector region PC2.

The second bridge portion 173b enters between the sealing step surface 67 and the housing opening 61, and at least one of the second bridge portion 173b and the connection bridge portion 173c comes in contact with the sealing step surface 67. In this case, the sealing step surface 67 supports the connection portion between the second bridge portion 173b and the second terminal portion 172b. The first bridge portion 173a includes a second connection portion 86b (refer to FIG. 18, and so on), and a portion including the second connection portion 86b is a connection portion between the first bridge portion 173a and the lead terminal 54. The second bridge portion 173b includes a first connection portion 86a (refer to FIG. 18, and so on), and a portion including the first connection portion 86a is a connection portion between the second bridge portion 173b and the second terminal portion 172b.

Figure 35:
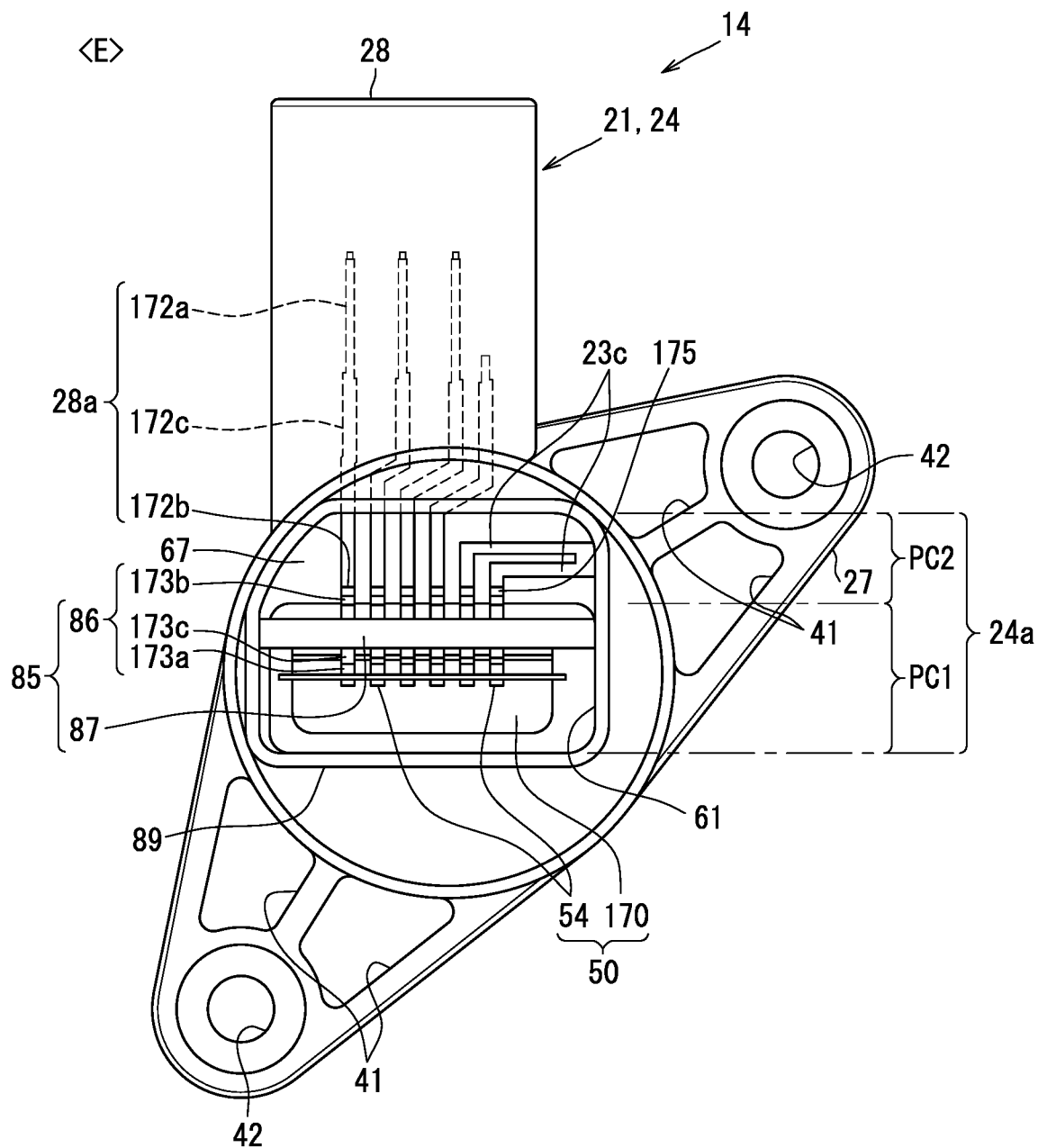
FIG. 35 is a top view of the air flow meter showing an internal structure of the housing.

As shown in FIG. 35, the multiple lead terminals 54 included in the sensor SA 50 include a terminal electrically connected to the intake air temperature terminal 23c in addition to a terminal electrically connected to the connector terminal 28a. Like the connector terminal 28a, the intake air temperature terminal 23c is also connected to the lead terminal 54 through the bridge terminal 86. Like the second terminal portion 172b of the connector terminals 28a, the intake air temperature terminals 23c has an intake air temperature terminal portion 175 protruding from the sealing step surface 67 to the connector region PC2 and extending toward the housing opening 61. In this instance, the intake air temperature terminal portion 175 is also disposed in the connector region PC2 so as not to protrude into the main body region PC1, similarly to the second terminal portion 172b.

Figure 36:
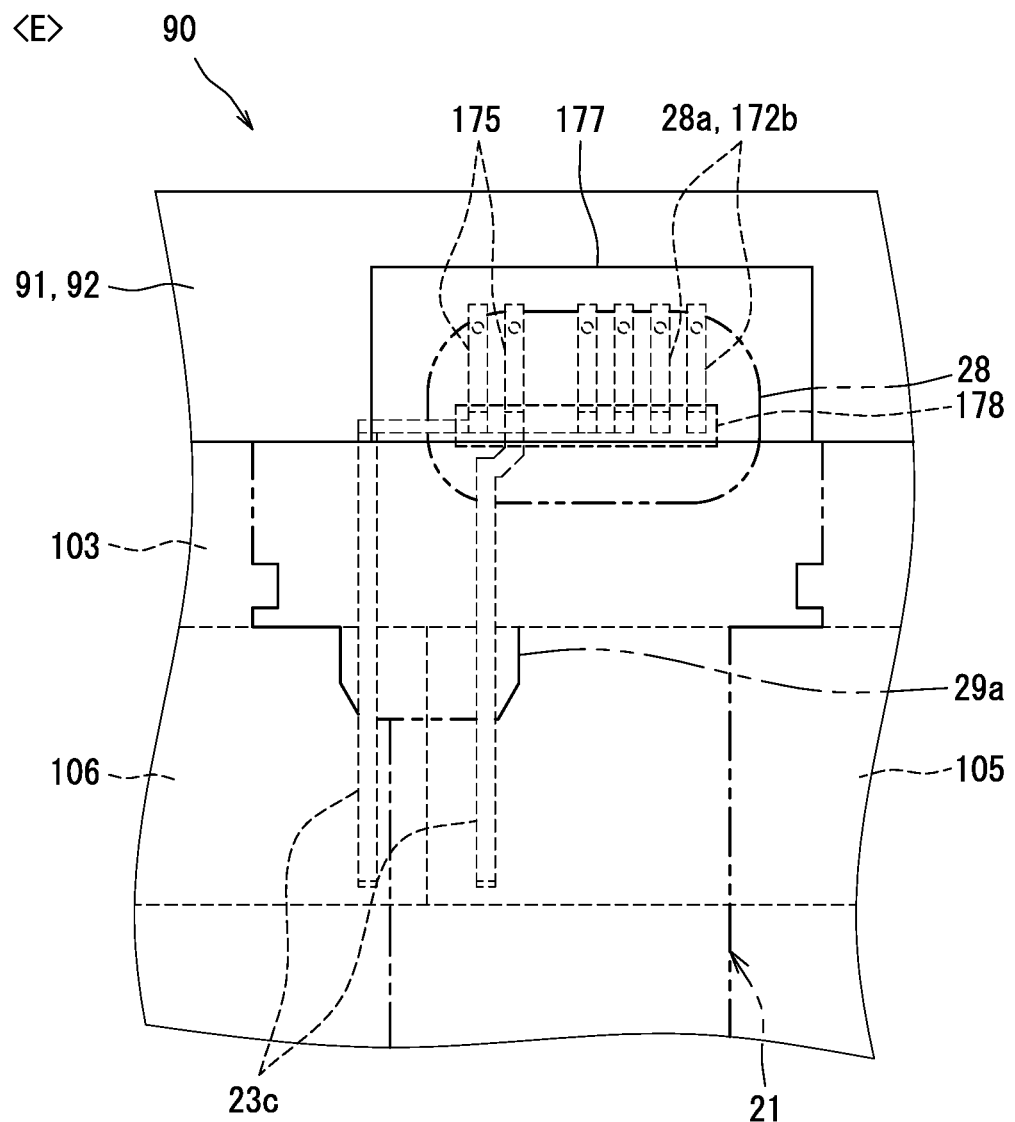
FIG. 36 is an enlarged view of the periphery of the connector mold portion in a mold device.

Next, the mold device 90 will be described with reference to FIGS. 22 and 36. FIG. 36 illustrates the mold device 90 when the outer peripheral surface of the second outer peripheral mold portion 103 is viewed from the side opposite to the first outer peripheral mold portion 102.

As shown in FIGS. 22 and 36, the mold device 90 has a connector mold portion 177 which is assembled to the inner peripheral mold portion 91 and the second outer peripheral mold portion 103. The connector mold portion 177 is assembled to the outer peripheral surface of the second outer peripheral mold portion 103 in a state of being inserted into the inner peripheral mold portion 91, thereby molding the inner peripheral surface of the connector portion 28. The connector mold portion 177 according to the present embodiment is formed as a separate member from the inner peripheral mold portion 91 and the second outer peripheral mold portion 103. The connector mold portion 177 may be integrally attached to the inner peripheral mold portion 91 or the second outer peripheral mold portion 103, and in this case, the connector mold portion 177 is included in the inner peripheral mold portion 91 or the second outer peripheral mold portion 103.

In the assembled state of the mold device 90, the connector terminal 28a and the intake air temperature terminal 23c are already mounted on the mold device 90. The mold device 90 has a temporary support portion 178 for temporarily supporting the connector terminal 28a and the intake air temperature terminal 23c, and the connector terminal 28a and the intake air temperature terminal 23c can be temporarily attached to the temporary support portion 178. The temporary support portion 178 is included in, for example, the connector mold portion 177, and the connector terminals 28a and the intake air temperature terminal 23c can be detachably attached. The temporary support portion 178 can transition to a support state capable of supporting the terminals 28a and 23c and a releasing state for releasing the support of the terminals 28a and 23c.

In the mold device 90, the connector terminal 28a is accommodated inside the connector mold portion 177, while the intake air temperature terminal 23c is in a state of being extended over the connector mold portion 177, the second outer peripheral mold portion 103, and the root mold portions 105 and 106.

Next, a manufacturing method of the air flow meter 14 will be described with reference to FIGS. 36 to 39, and so on, focusing on a procedure after the housing 21 has been molded with resin.

In the present embodiment, insert molding is performed by resin molding the housing in which the connector terminal 28a and the intake air temperature terminal 23c are embedded. In the insert molding, in a process of assembling the mold device 90, as shown in FIG. 36, the connector terminal 28a and the intake air temperature terminal 23c are temporarily attached to the temporary support portion 178 of the connector mold portion 177. Then, the connector mold portion 177 in this state is assembled to the inner peripheral mold portion 91, the outer peripheral mold portions 102, 103, and the like. Thereafter, a molten resin is injected into the mold device 90, the molten resin is cured to mold the housing 21, and then the mold device 90 is removed from the housing 21.

In this step, the connector terminal 28a and the intake air temperature terminal 23c are detached from the temporary support portion 178 by shifting the temporary support portion 178 to the released state, and the connector mold portion 177 is detached from the connector portion 28 of the housing 21. In addition, the inner peripheral mold portion 91 and the outer peripheral mold portions 102 and 103 are also removed from the housing 21. In the resin-molded housing 21, a part of each of the connector terminal 28a and the intake air temperature terminal 23c is embedded in the housing 21.

Figure 37:
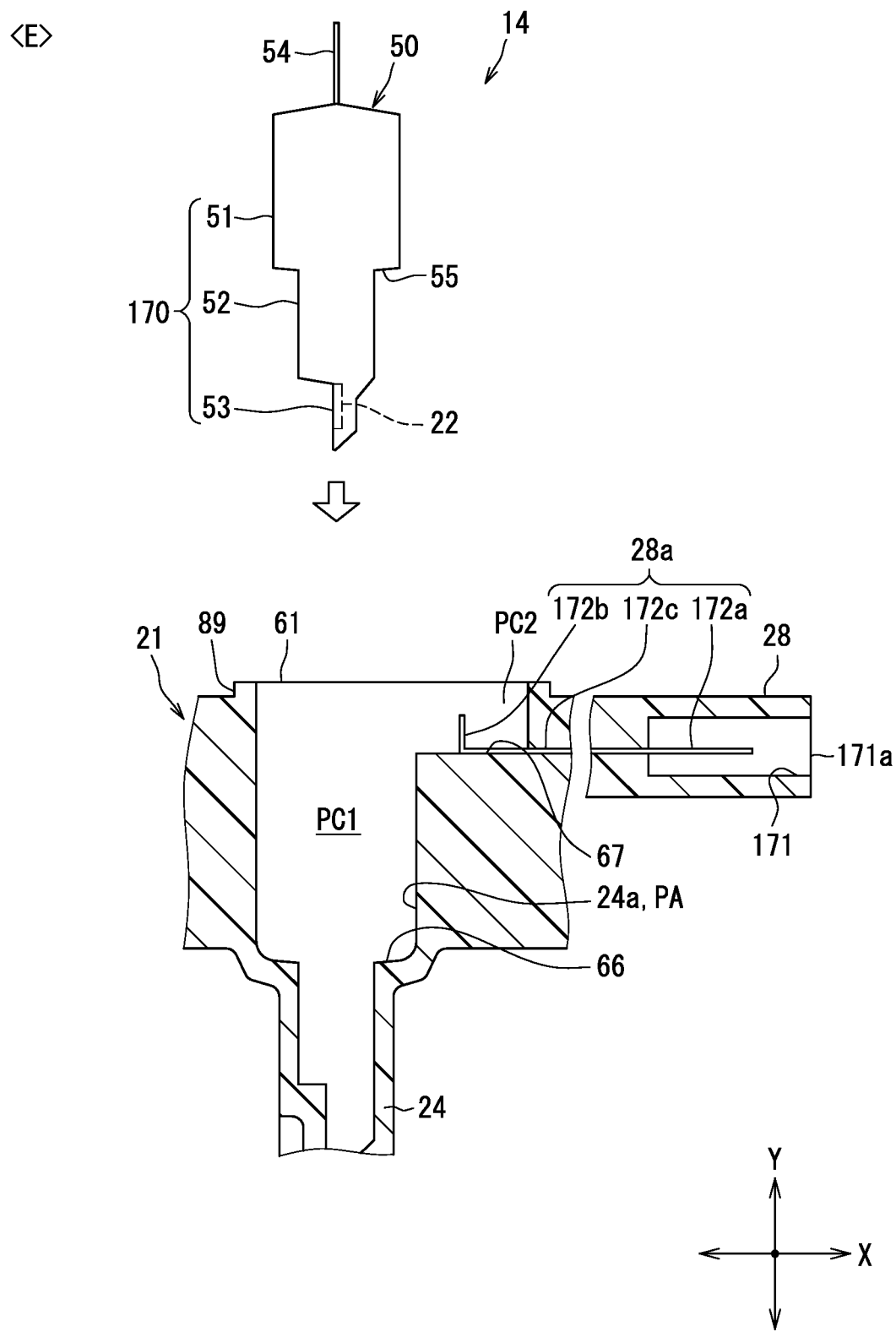
FIG. 37 is a view illustrating the attachment of the sensor SA to the housing.

Then, as shown in FIG. 37, a step of installing the sensor SA 50 in the internal space 24a of the housing 21 is performed. In this step, the sensor SA 50 is inserted into the main body region PC1 of the internal space 24a from the housing opening 61, and the sensor SA 50 is pushed in until the circuit step surface 55 of the sensor SA 50 is caught by the region step surface 66 of the housing 21. With the insertion of the lead terminal 54 into the housing opening 61 from the sensing portion 53 of the sensor SA 50, the lead terminal 54 is disposed in the sealing region PA of the internal space 24a.

In the mold device 90, the housing 21 is resin-molded so that the entire connection terminal portion 172c of the connector terminal 28a is embedded in the housing 21. For that reason, in the configuration in which the inner peripheral surfaces of the main body region PC1 and the connector region PC2 are molded by the inward portion 93 of the inner peripheral mold portion 91, the main body region PC1 and the connector region PC2 can be molded by simply pulling out the inward portion 93 from the housing opening 61.

Unlike the present embodiment, for example, in order to resin-mold the housing 21 in which the connection terminal portion 172c is separated from the sealing step surface 67 toward the housing opening 61, there is a need to make a part of the inward portion 93 go around between the connection terminal portion 172c and the sealing step surface 67. In this configuration, since it becomes difficult to remove the inward portion 93 from the housing opening 61, the housing 21 is not integrally molded, but multiple members must be assembled together and manufactured.

As described above, the second terminal portion 172b and the intake air temperature terminal portion 175 of the connector terminal 28a are installed in the connector region PC2 so as not to protrude into the main body region PC1. For that reason, when the sensor SA 50 is inserted into the main body region PC1, the sensor SA 50 is less likely to come into contact with the second terminal portion 172b and the intake air temperature terminal portion 175. In the main body region PC1, the region step surface 66 faces the housing opening 61. For that reason, the operator can easily install the sensor SA 50 in the main body region PC1 so as not to come in contact with the second terminal portion 172b and the intake air temperature terminal portion 175 by inserting the sensor SA 50 aiming at a space between the pair of region step surfaces 66.

Figure 38:
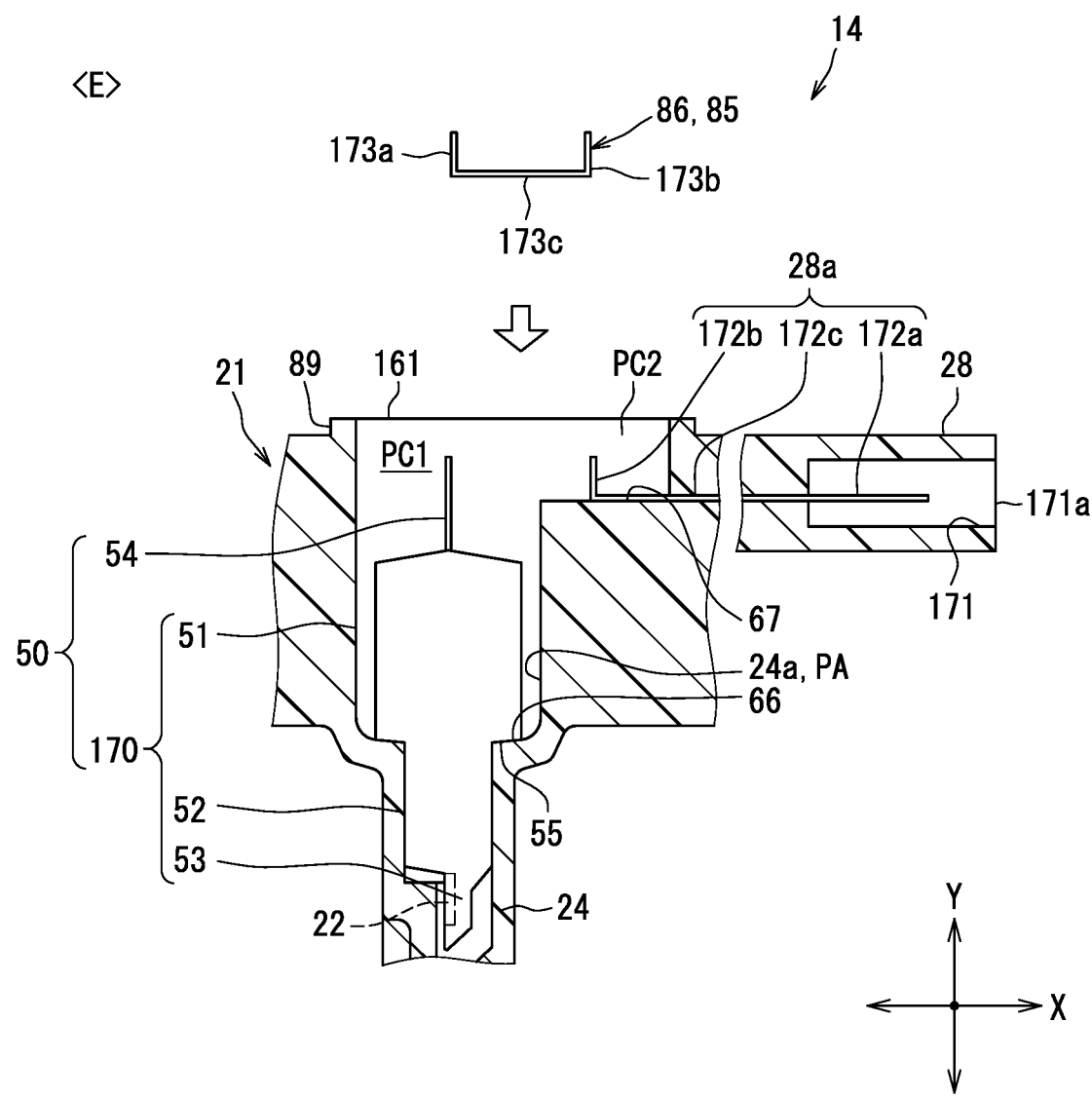
FIG. 38 is a diagram illustrating the attachment of a bridge terminal to the sensor SA.

Thereafter, as shown in FIG. 38, the terminal unit 85 is inserted into the internal space 24a from the housing opening 61 and pushed between the lead terminal 54 and the second terminal portion 172b of the connector terminal 28a. In this example, the bridge terminal 86 is temporarily attached to the housing 21 by bringing the bridge terminal 86 in contact with the sealing step surface 67.

The operation of joining the bridge terminal 86 to each of the lead terminal 54 and the connector terminal 28a by welding or the like is performed using a joining tool such as a welding device having a pair of welding electrodes. In this example, a pair of welding electrodes are inserted into the internal space 24a from the housing opening 61, and the lead terminal 54 and the first bridge portion 173a are sandwiched between the welding electrodes to perform welding between the lead terminal 54 and the first bridge portion 173a. With the above joining operation, a connection portion between the lead terminal 54 and the bridge terminal 86 is formed. The second terminal portion 172b and the second bridge portion 173b are welded by sandwiching the second terminal portion 172b and the second bridge portion 173b with a pair of welding electrodes. With the above joining operation, a connection portion between the connector terminals 28a and the bridge terminals 86 is formed.

Figure 39:
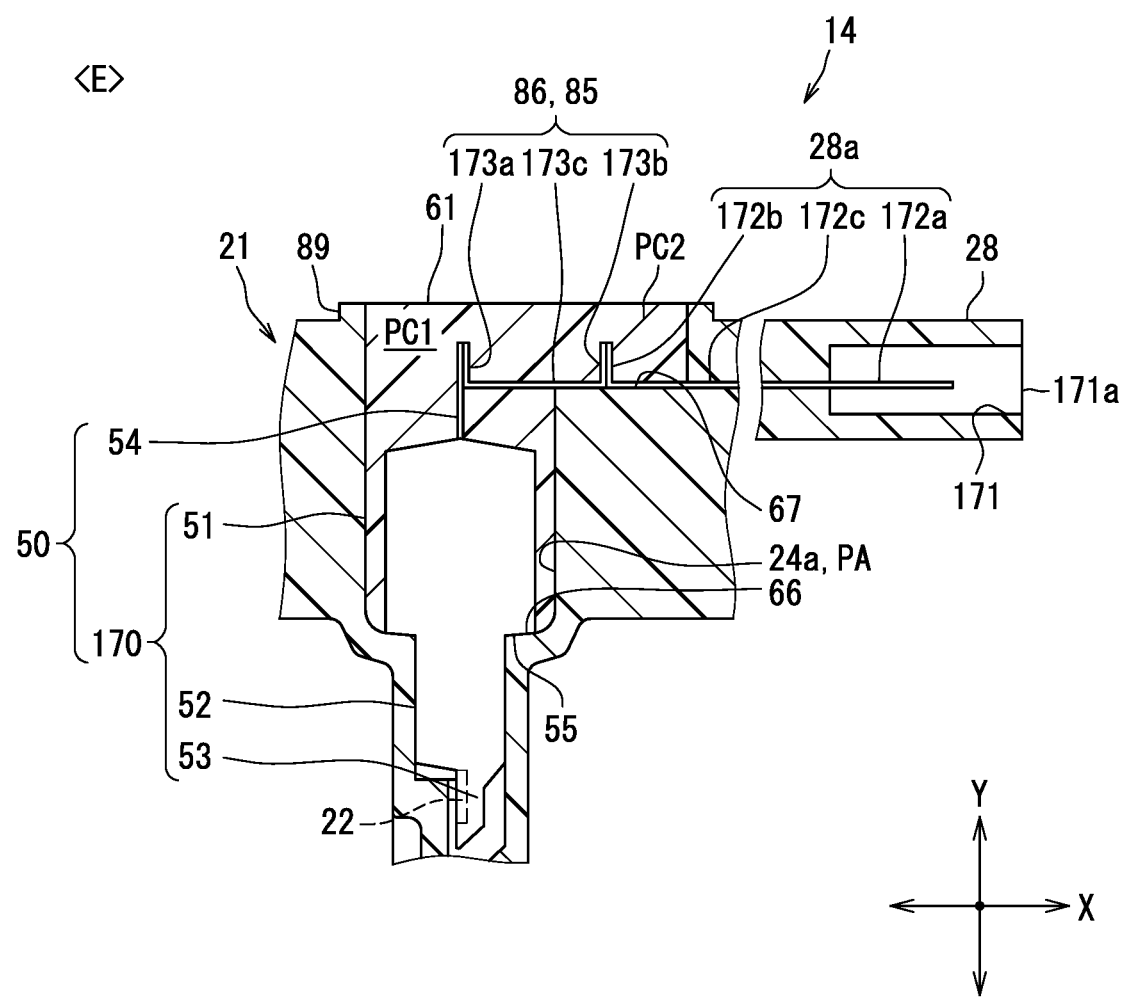
FIG. 39 is a diagram illustrating filling of a thermosetting resin into an internal space of the housing.

In FIG. 39, after the operation of electrically connecting the lead terminal 54 and the connector terminal 28a through the bridge terminal 86 has been completed, a thermosetting resin such as potting resin is injected from the housing opening 61 into the sealing region PA of the internal space 24a. Then, the potting portion 65 is formed by applying a heat to the thermosetting resin and curing the thermosetting resin. In this example, not only the SA main body 170 is covered with the thermosetting resin, but also the lead terminal 54, the bridge terminal 86, and the connector terminal 28a are covered with the thermosetting resin. In this case, the connection portion between the lead terminal 54 and the bridge terminal 86 and the connection portion between the bridge terminal 86 and the connector terminal 28a are protected by the potting portion 65.

In the configuration group E, according to the present embodiment, in the internal space 24a of the housing 21, the connector terminal 28a does not enter between the housing opening 61 and the sensor SA 50 in the height direction Y. For that reason, after the connector terminal 28a has been attached to the housing 21, the sensor SA 50 can be inserted into the internal space 24a through the housing opening 61. This eliminates a need for attaching the connector terminal 28a to the housing 21 after the sensor SA 50 has been installed in the internal space 24a. For that reason, the sensor SA 50 can be inhibited from being positionally deviated due to an impact or the like caused by the attachment of the connector terminal 28a to the housing 21.

In this example, when the positional deviation of the sensor SA 50 occurs in the internal space 24a, the position of the flow rate detector 22 in the measurement flow channel 32 is also unintentionally deviated. In this case, the detection accuracy of the flow rate detector 22 is likely to be lowered because the amount and speed of the intake air flowing along the flow rate detector 22 in the measurement flow channel 32 deviate from design values. On the other hand, according to the present embodiment, since an unintended positional deviation of the sensor SA 50 is less likely to occur as described above, the detection accuracy of the flow rate detector 22 can be inhibited from varying from product to product.

According to the present embodiment, in the internal space 24*a*, the second terminal portion 172*b* of the connector terminal 28*a* is accommodated in the connector region PC2 without protruding into the main body region PC1. For that reason, a configuration can be realized in which the second terminal portion 172*b* is not inserted between the housing opening 61 and the sensor SA 50 in the height direction Y. When the sensor SA 50 is inserted from the housing opening 61 into the main body region PC1, the operator simply prevents the sensor SA 50 from entering the connector region PC2, thereby being capable of preventing the sensor SA 50 from coming in contact with the second terminal portion 172*b*. This makes it possible to inhibit the sensor SA 50 and the connector terminal 28*a* from being damaged or deformed by contacting each other with the attachment of the sensor SA 50 to the housing 21.

According to the present embodiment, the connector region PC2 is disposed at a position closer to the housing opening 61 than the SA main body 170 of the sensor SA 50. Accordingly, the second terminal portion 172*b* of the connector terminal 28*a* is also disposed at a position closer to the housing opening 61 than the SA main body 170. In that case, since there is a need to insert a joining tool for joining the second terminal portion 172*b* and the bridge terminal 86 deeply into the internal space 24*a*, a work load for joining can be reduced. Further, as compared with a configuration in which the joining tool is inserted deeply into the internal space 24*a*, the SA main body 170 and the housing 21 can be inhibited from being damaged or deformed due to a contact of the joining tool with the SA main body 170 or the housing 21.

According to the present embodiment, in the internal space 24*a*, the second terminal portion 172*b* of the connector terminal 28*a* is supported by the sealing step surface 67 from the side opposite to the housing opening 61. In this case, when the second terminal portion 172*b* and the second bridge portion 173*b* are joined to each other, unintentional displacement of the second terminal portion 172*b* is less likely to occur. This makes it possible to inhibit that the second terminal portion 172*b* is relatively displaced with respect to the second bridge portion 173*b* during the joining operation, which makes it difficult to properly join the second terminal portion 172*b* and the second bridge portion 173*b*.

According to the present embodiment, the bridge terminal 86 is supported by the sealing step surface 67 from the side opposite to the housing opening 61. In this case, when the bridge terminal 86 is temporarily attached to the housing 21, a state in which the bridge terminal 86 is held in position can be created. For that reason, when the bridge terminals 86 is joined to the lead terminal 54 and the connector terminal 28*a*, the work load can be reduced by an amount that the work of holding the bridge terminals 86 in position is not required.

According to the present embodiment, on the inner peripheral surface of the housing 21, the sealing step surface 67 that supports the second terminal portion 172*b* of the connector terminal 28*a* is disposed at a position closer to the housing opening 61 than the region step surface 66 that supports the sensor SA 50. In that case, since the protrusion dimension of the second terminal portion 172*b* from the sealing step surface 67 becomes as small as possible, the second terminal portion 172*b* is less likely to be unintentionally deformed when the housing 21 is molded with resin or the like. In that case, since the joint portion between the connector terminal 28*a* and the bridge terminal 86 is disposed between the sealing step surface 67 and the housing opening 61, there is no need to insert the joining tool to a position deeper than the sealing step surface 67 in the internal space 24*a*. For that reason, the joining operation can be facilitated and the breakage and deformation of the SA main body 170 and the housing 21 caused by the contact with the joining tool can be realized.

According to the present embodiment, the second terminal portion 172*b* extends from the sealing step surface 67 toward the housing opening 61. In this case, when the second terminal portion 172*b* and the second bridge portion 173*b* are sandwiched between the bonding tool such as the welding electrodes, there is no need to insert the joining tool into the back side of the second terminal portion 172*b* and the second bridge portion 173*b* when viewed from the housing opening 61. For that reason, when the second terminal portion 172*b* and the second bridge portion 173*b* are joined together by using the joining tool, the joining operation can be facilitated.

According to the present embodiment, the connector terminal 28*a* is temporarily attached to the temporary support portion 178 of the mold device 90, so that the housing 21 which is in a state in which the connector terminal 28*a* is embedded is molded with resin. For that reason, the connector terminal 28*a* can be inhibited from being positionally deviated with respect to the housing 21.

According to the present embodiment, the sensor SA 50, the connector terminal 28*a* and the bridge terminal 86 are hidden by the thermosetting resin injected into the internal space 24*a* from the housing opening 61. For that reason, the positional deviation of the sensor SA 50 and the deformation or breakage of the lead terminal 54, the connector terminal 28*a*, and the bridge terminal 86 can be inhibited by the potting portion 65 made of the thermosetting resin.

<Configuration Group F>

A configuration group F relating to covering the detection unit will be described with reference to FIGS. 40 to 42 and the like.

Figure 40:
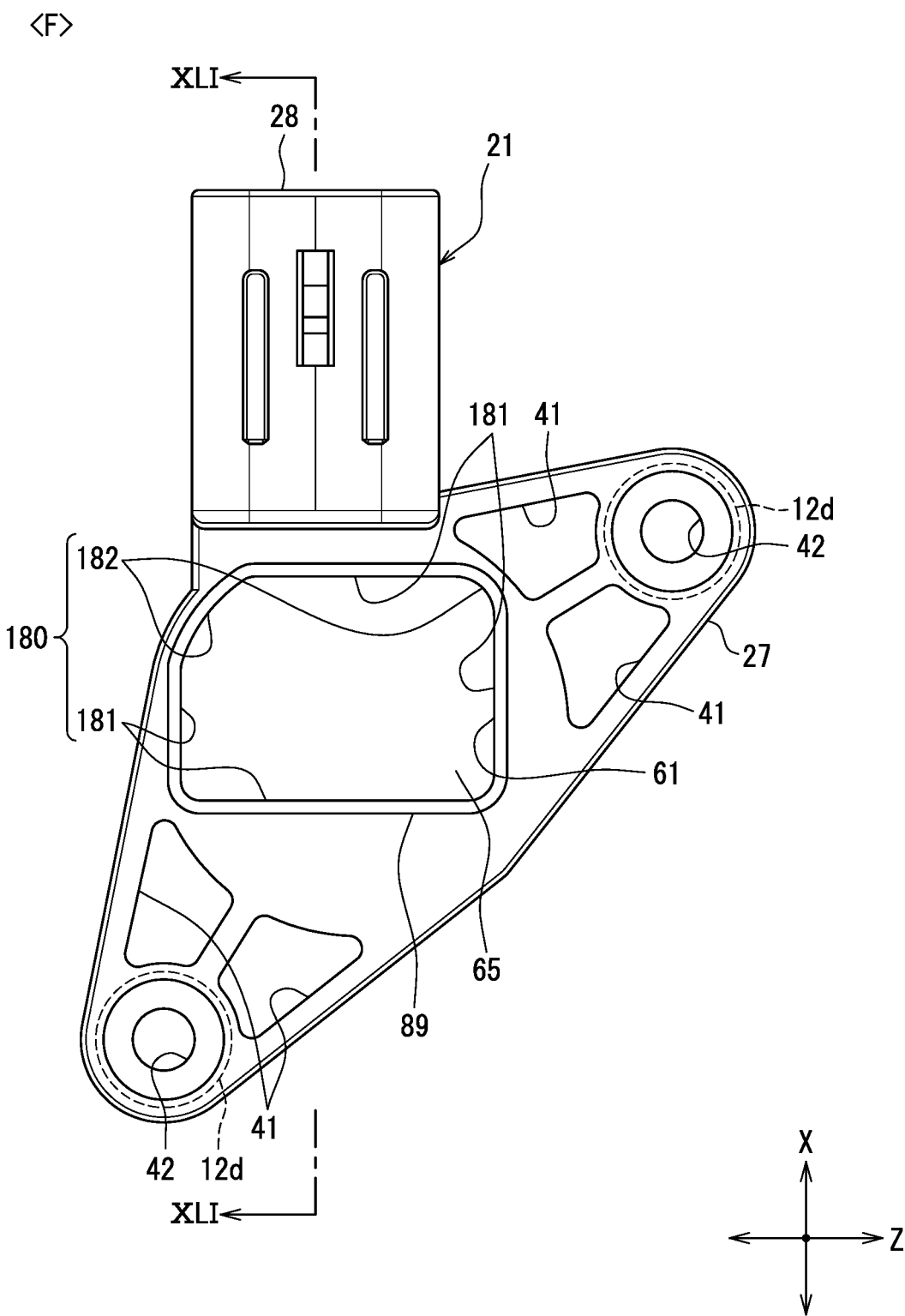
FIG. 40 is a top view of the air flow meter in a configuration group F.
Figure 41:
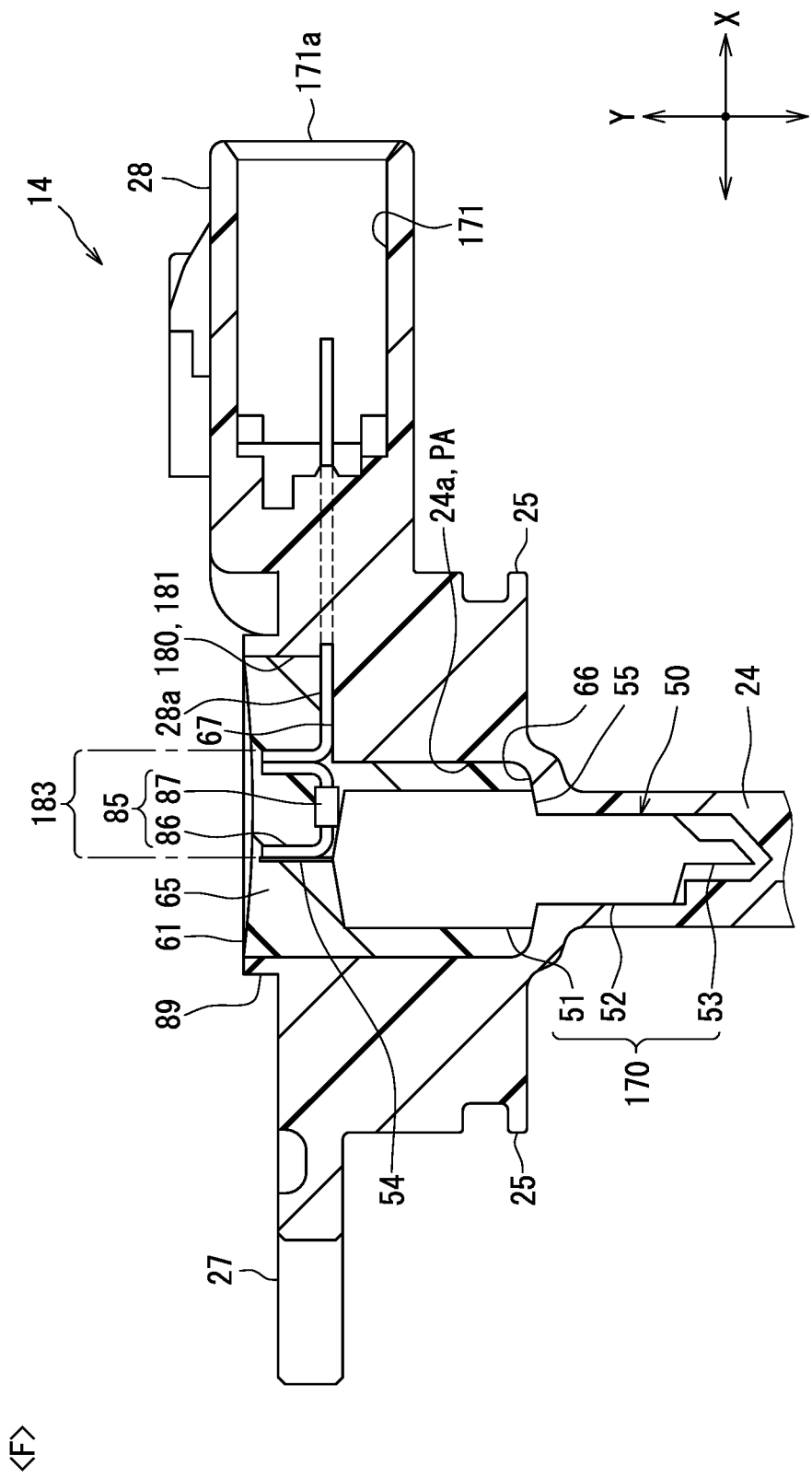
FIG. 41 is a cross-sectional view taken along a line XLI-XLI of FIG. 40.

As shown in FIGS. 40 and 41, the inner peripheral surface of the lip 89 and the inner peripheral surface of the housing body 24 are flush with each other, and the inner peripheral surface 180 of the sealing region PA extends straight in the height direction Y from the region step surface 66 and the sealing step surface 67 toward the housing opening 61. The lip 89 extends along the peripheral portion of the internal space 24*a* to form the housing opening 61, and corresponds to an open rib portion.

As described above, the sealing region PA including the housing opening 61 is formed in a rectangular shape as a whole in top view, but four corners are curved. In that case, the inner peripheral surface 180 of the sealing region PA has a flat inner peripheral flat surface 181 extending in the width direction X and the depth direction Z in the housing opening 61, and an inner peripheral curved surface 182 curved so as to connect the inner peripheral flat surfaces 181 crossing each other. The inner peripheral curved surface 182 is curved so as to bulge toward the outer peripheral side so that an acute angle or a right-angled corner portion is not formed in the housing opening 61. The inner peripheral curved surface 182 corresponds to an inner peripheral curved surface that is bent so as to bulge toward the outer peripheral side of the sealing region PA.

In the inner peripheral surface 180 of the sealing region PA, the inner peripheral flat surface 181 is disposed at a position corresponding to the four sides of the housing opening 61, and the inner peripheral curved surface 182 is disposed at a position corresponding to the four corners. Since the inner peripheral flat surface 181 and the inner peripheral curved surface 182 are continuous with each other, no step is formed at the boundary between the inner peripheral flat surface 181 and the inner peripheral curved surface 182. The inner peripheral flat surface 181 and the inner peripheral curved surface 182 extend from the housing opening 61 toward the region step surface 66 and the sealing step surface 67.

As described above, in the housing 21, the flange portion 27 extends from the housing body 24 in the width direction X and the depth direction Z, and the ring holding portion 25 is disposed closer to the housing tip side than the flange portion 27. On the other hand, the lip 89 extends from the housing body 24 toward the housing base end side. In this case, if the housing attachment is configured to include the ring holding portion 25 and the flange portion 27, the lip 89 is disposed on the opposite side of the bypass flow channel 30 and the inflow port 33a across the housing attachment. In other words, in the height direction Y, the housing opening 61 is disposed on the opposite side of the inflow port 33a across the sensor SA 50.

As described above, the lead terminal 54 of the sensor SA 50 and the connector terminal 28a are connected to each other, and the connection portion 183 is accommodated in the sealing region PA. The connection portion 183 includes each portion of the lead terminal 54 connected to the bridge terminals 86, a portion of the connector terminal 28a connected to the bridge terminal 86, and the entire bridge terminal 86. The connection portion 183 may include the whole of the second terminal portion 172b of the connector terminal 28a (refer to FIG. 34) and the whole of the lead terminal 54.

Next, a manufacturing method of the air flow meter 14 will be described focusing on a procedure for creating the potting portion 65. The potting portion 65 corresponds to a filling portion.

First, the sensor SA 50 is installed in the internal space 24a of the housing 21, and the lead terminals 54 and the connector terminal 28a are connected to each other with the use of the terminal unit 85. Then, as shown in FIG. 42, a step of injecting the potting material 185, which is a thermosetting resin, into the internal space 24a through the housing opening 61 is performed so that the potting material 185 does not overflow from the internal space 24a. In this injection step, the internal space 24a is sealed by filling the internal space 24a with a liquid or fluid potting material 185. In this example, the potting material 185 may also be referred to as a sealing material. In the present embodiment, for example, epoxy resin is used as the potting material 185, and the potting material 185 corresponds to a filler.

The potting material 185 corresponds to a potting resin and a curable resin. As the potting material 185, a urethane resin or a silicone resin may be used. When the urethane resin or the silicone resin is used as the potting material 185, the potting portion 65 tends to be softer than when the epoxy resin is used as the potting material 185.

In this injection step, an injection operation is performed so that a mass of air such as a void or a gap is not formed in the potting material 185 filled in the sealing region PA. In this example, in the sealing region PA, an acute angle or a right-angled inward portion does not exist due to the inner circumference curved surface 182. In this case, a gap is less likely to occur between the potting material 185 and the inner peripheral surface 180 of the sealing region PA, and a phenomenon that the potting material 185 creeps up toward the housing opening 61 along the inner peripheral surface 180 of the sealing region PA is less likely to occur.

In the injecting step, the potting material 185 is filled in the sealing region PA so that the sensor SA 50, the connection portion 183, and the connector terminal 28a are hidden from the housing opening 61. In this example, in the inner peripheral surface 180 of the sealing region PA, it is considered that the creep-up phenomenon occurs somewhat even if the creep-up phenomenon of the potting material 185 is less likely to occur due to the inner curved surface 182. Therefore, the injection amount of the potting material 185 is set so that the center portion of the surface of the potting material 185 is positioned slightly inward from the housing opening 61 so that the potting material 185 does not overflow from the housing opening 61 even if the creep-up phenomenon occurs.

In the internal space 24a, the connection portion between the lead terminal 54 and the intake air temperature terminal 23c is also covered with the potting material 185. The connection portion between the lead terminal 54 and the intake air temperature terminal 23c includes a connection portion between the lead terminal 54 and the bridge terminal 86 in the intake air temperature terminal 23c, and the entire bridge terminal 86.

After the potting material 185 has been injected, the potting material 185 is heated and cured to form the potting portion 65. In this example, the hardness and the like of the potting portion 65 differ depending on the component and the like of the type of the potting material 185. Regardless of the hardness of the potting portion 65, the potting portion 65 can inhibit the occurrence of positional deviation of the sensor SA 50 in the internal space 24a, but as the potting portion 65 is harder, the inhibiting effect against the positional deviation of the sensor SA 50 is higher. In addition, the potting portion 65 is softer, the potting portion 65 more easily adheres to the sealing region PA, the sensor SA 50, and the connection portion 183, so that the sealing property of the potting portion 65 can be enhanced.

The potting portion 65 covers the sensor SA 50 from the housing opening 61, and corresponds to the cover portion. In that case, the potting portion 65 covers the connection portion between the lead terminal 54 and the connector terminal 28a from the housing opening 61 side. The potting material 185 corresponds to a covering material.

In the configuration group F, according to the present embodiment, since the potting portion 65 is formed by injecting the potting material 185 into the internal space 24a, a pressure is less likely to be applied to the internal space 24a when the internal space 24a is sealed. In this case, since the positional deviation of the sensor SA 50 is inhibited from being unintentionally generated by the pressure applied to the internal space 24a, the positional deviation of the sensor SA 50 is less likely to be generated from product to product. Therefore, the detection accuracy of the flow rate detector 22 can be inhibited from varying from product to product.

According to the present embodiment, the housing opening 61 is defined by the lip 89 protruding from the housing body 24. For that reason, the depth dimensions of the internal space 24a and the sealing region PA in the height direction Y can be changed by simply changing the protrusion dimension of the lip 89 without changing the shape or size of the housing body 24. In this instance, the depth dimensions of the internal space 24a and the sealing region PA can be appropriately set in accordance with the length dimension of the sensor SA 50 in the height direction Y without decreasing the versatility of the housing body 24. This makes it possible to avoid that the sensor SA 50 is too long relative to the internal space 24a and a part of the sensor SA 50 protrudes from the potting material 185 even though the internal space 24a is sealed by the potting material 185.

According to the present embodiment, the inner peripheral curved surface 182 is included in the inner peripheral surface 180 of the sealing region PA. This makes it possible to inhibit a gap from being generated between the potting material 185 and the inner peripheral surface 180, or the potting material 185 from creeping up along the inner peripheral surface 180 and overflowing from the housing opening 61. Therefore, the sealing performance of the internal space 24a by the potting material 185 can be appropriately exhibited.

According to the present embodiment, in the air flow meter 14, the housing opening 61 is disposed on the opposite side to the inflow port 33a across the ring holding portion 25. For that reason, a configuration can be realized in which the housing opening 61 is disposed outside the intake pipe 12a instead of the intake passage 12. In this case, since the potting portion 65 is not always exposed to the intake air flowing through the intake passage 12, damage or deterioration of the potting portion 65 can be inhibited. As a result, the sealing performance of the internal space 24a by the potting portion 65 can be exhibited for a long period of time.

According to the present embodiment, in the internal space 24a, the connection portion 183 between the lead terminal 54 and the connector terminal 28a is covered with the potting portion 65 in addition to the sensor SA 50. For that reason, not only the sensor SA 50 but also the connection portion 183 can be protected by the sealing performance of the potting portion 65.

<Configuration Group G>

A configuration group G relating to an information portion will be described with reference to FIG. 43 and the like.

As shown in FIG. 43, in the housing 21, when one end face is referred to as a housing tip end face 191 and the other end face is referred to as a housing base end face 192, the housing opening 61 is provided in the housing base end face 192. The housing base end face 192 is formed by the outer peripheral surfaces of the housing body 24, the flange portion 27, and the connector portion 28, and the housing opening 61 is disposed in the outer peripheral surface of the housing body 24. The housing base end face 192 is provided with the multiple thinned portions 41 and the screw holes 42 in addition to the housing opening 61, and the thinned portions 41 and the screw holes 42 are disposed in the outer peripheral surface of the flange portion 27. The housing base end face 192 corresponds to a housing face which is one surface of the housing. Further, the housing tip end face 191 and the housing base end face 192 are aligned in the height direction Y.

The housing opening 61 is an open end portion of the internal space 24a, and as described above, the internal space 24a is sealed from the housing opening 61 side by the potting portion 65. In the potting portion 65, a potting surface 193, which is an outer surface thereof, faces a side opposite to the sensor SA 50 in the height direction Y like the housing base end face 192. Further, as described above, the potting material 185 filled in the internal space 24a creeps up the inner peripheral surface 180 of the sealing region PA, so that the peripheral portion of the potting surface 193 is easily curved. However, most of the potting surface 193 is flat surface except for the peripheral portion. In this case, the potting portion 65 corresponds to a sealing portion, and the potting surface 193 corresponds to an outer surface of the sealing portion.

In the housing 21, the housing opening 61 is disposed on the side opposed to the inflow port 33a across the sensor SA 50 in the height direction Y. In this case, the inflow port 33a is disposed inside the intake pipe 12a in the intake passage 12, while the potting portion 65 is disposed outside the intake pipe 12a. In the potting portion 65, the potting surface 193 faces a side opposite to the intake pipe 12a in the height direction Y.

As described above, the housing opening 61 is formed in a rectangular shape as a whole. In this case, the housing opening 61 has a pair of first side portions 195, which are long sides, and a pair of second side portions 196, which are short sides, and has a flat shape extending in the depth direction Z as a whole. In this case, the first side portions 195 extend in the depth direction Z, and the second side portions 196 extend in the width direction X. The housing opening 61 is chamfered at four corners, and the chamfered portions are curved toward the outer peripheral side in a state in which the first side portions 195 and the second side portions 196 are connected to each other. The first side portions 195 correspond to opposite sides. Also, the chamfered portions may extend straight, rather than curved, or may be bent. The chamfered portions may not be disposed at all four corners of the housing opening 61.

The potting surface 193 is provided with an information portion 194 indicating predetermined information determined in advance. The information portion 194 has numbers, characters, marks, and the like, the marks include symbols, logos, storing marks, and the like, and the storage marks include two-dimensional codes and the like. Various types of information are stored in the storage marks, and the various types of information include correction values used for correction of detection signals of the flow rate detector 22, the intake air temperature sensor 23, and the like when the detection signals are corrected by the circuit chip 81 or the ECU 20. In addition to the correction values, the various types of information include a characteristic map indicating the characteristics of the flow rate detector 22, the intake air temperature sensor 23, the air cleaner 19, and the like.

The information portion 194 is formed of ink, paint, and unevenness applied to the potting surface 193. As a method of applying the information portion 194 to the potting surface 193, laser marking, ink marking, or the like can be given. The information portion 194 has a number string or a character string formed by multiple numbers or characters to indicate various information, and the number strings or the character strings are aligned along the first side portions 195. In this case, since the user or the like only needs to read the information displayed by the information portion 194 along the first side portion 195, the content of the information portion 194 is hardly erroneously read. The information portion 194 is arranged in a wide range of the potting surface 193, but is basically arranged in a flat portion of the potting surface 193.

In the configuration group G, according to the present embodiment, since the potting portion 65 is formed by injecting the potting material 185 into the internal space 24a, most of the potting surface 193 can be flattened. In addition, since the housing opening 61 and the internal space 24a are large enough to allow the sensor SA 50 to be inserted into the housing opening 61 and the internal space 24a, the potting surface 193 is less likely to be insufficient for displaying the information portion 194. In this manner, since the potting surface 193 is flattened and enlarged, the visibility of the information portion 194 imparted to the potting surface 193 can be enhanced.

According to the present embodiment, in the internal space 24a of the housing 21, the SA main body 170 of the sensor SA 50 and the connector terminals 28a are aligned laterally in the width direction X. For that reason, the width dimension of the internal space 24a and the width dimension of the housing opening 61 are increased in the width direction X to such an extent that the SA main body 170 and the connector terminals 28a can be aligned laterally. In other words, the width dimension of the potting surface 193 increases in the width direction X. In that case, since the size of the information portion 194 can be enlarged on the potting surface 193, the visibility of the information portion 194 can be enhanced.

According to the present embodiment, since the housing opening 61 is disposed on the side opposed to the inflow port 33a across the sensor SA 50 in the height direction Y, the potting surface 193 is disposed outside the intake pipe 12a. In that case, the operator can visually recognize the potting surface 193 and the information portion 194 while the air flow meter 14 is attached to the intake pipe 12a. Therefore, when visually recognizing the information portion 194, a labor of detaching the air flow meter 14 from the intake pipe 12a can be saved.

According to the present embodiment, since the housing opening 61 is flattened as a whole so that the pair of first side portions 195 are long sides, the alignment direction of the information portions 194 can be clarified. In this case, since the number string and the character string of the information portion 194 are aligned along the first side portions 195 on the potting surface 193, the operator can be inhibited from reading the number string and the character string incorrectly. In this manner, the visibility of the information portion 194 can be enhanced by the shape of the potting surface 193.

According to the present embodiment, the housing base end face 192 is provided with the thinned portions 41. In this example, if an attempt is made to secure a flat surface on the housing base end face 192 which is large enough not to cause insufficient visibility of the information portion 194, there is a fear that the thinned portions 41 on the housing base end face 192 will be insufficient. If there is a shortage of the thinned portions 41 at the housing base end face 192, there is a fear that the housing 21 is thickened, and the unintentional deformation of the housing 21 may occur due to curing of the molten resin when the housing 21 is molded with resin. On the other hand, in the present embodiment, since the information portion 194 is provided to the potting surface 193, there is no need to secure a flat surface suitable for display of the information portion 194 on the housing base end face 192. In this case, the sufficient thinned portions 41 is disposed on the housing base end face 192, so that deformation of the housing 21 due to resin molding can be inhibited, and visibility of the information portion 194 on the potting surface 193 can be enhanced.

According to the present embodiment, the sensor SA 50 is covered with the potting portion 65 in the internal space 24a of the housing 21. In this example, unlike the present embodiment, for example, in a configuration in which a lid member resin molded as a separate member from the housing 21 is attached to the housing opening 61, as the housing opening 61 is larger in size, the lid member becomes larger in size. When the lid member is increased in size, it is considered that the lid member needs to be formed to be thick enough so that the lid member can retain its own shape, and on the other hand, it is also considered that there is a need to form a thinned portion in the lid member so as not to cause deformation due to resin molding. This makes it difficult for the lid member to secure a flat surface to the extent that the information portion 194 can be provided.

On the other hand, according to the present embodiment, there is no need to form the thinned portions 41 in the potting portion 65 to which the information portion 194 is given because the resin molding is not performed. In addition, with the utilization of the phenomenon that the potting surface 193 is inevitably flattened with respect to the potting portion 65 filled in the internal space 24a, the information portion 194 can be disposed almost entirely on the potting surface 193. Therefore, the visibility of the information portion 194 can be enhanced on the potting surface 193.

<Configuration Group H>

A configuration group H related to correcting the detection result of the physical quantity detector will be described with reference to FIGS. 44 to 57 and the like.

Figure 44:
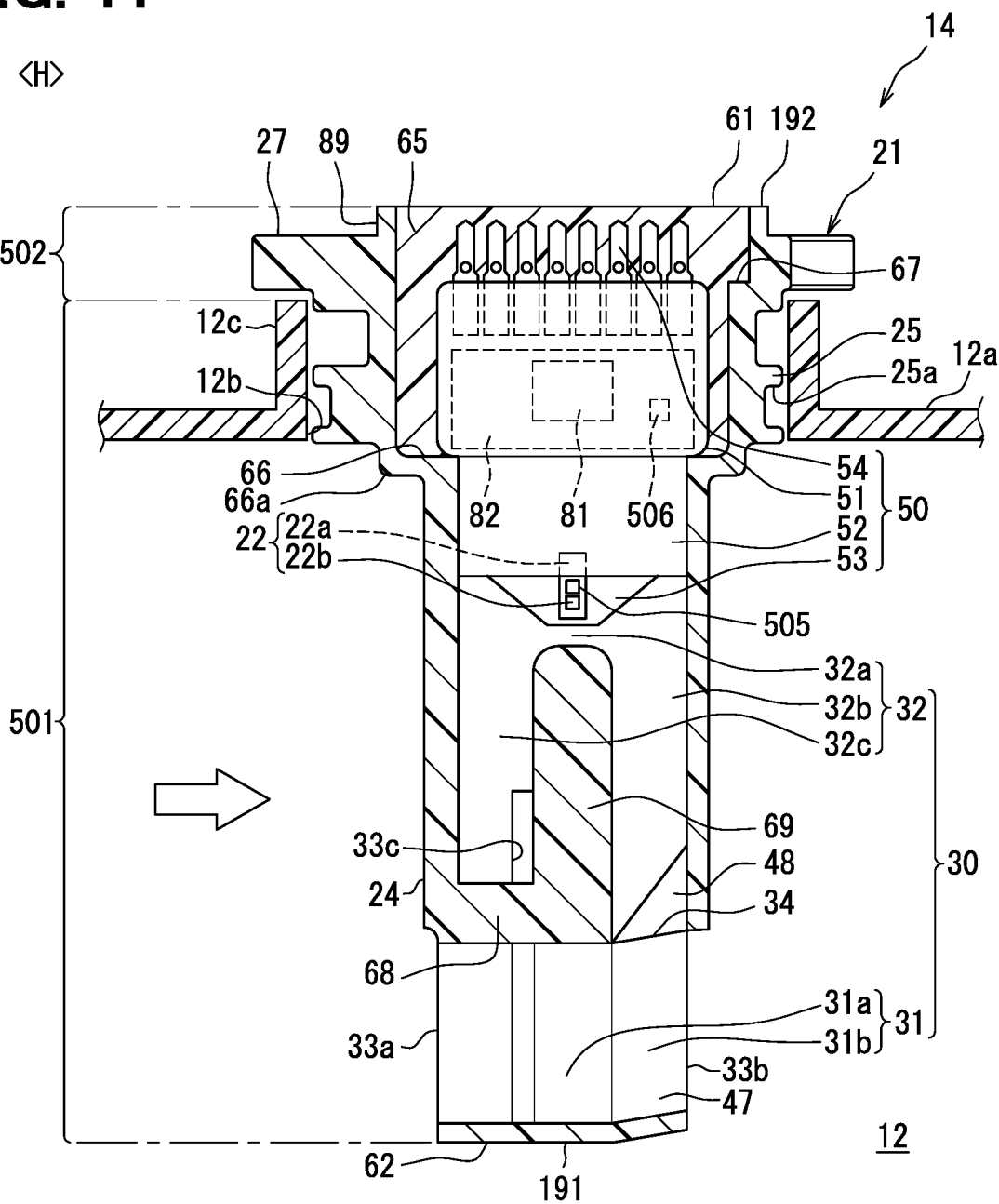
FIG. 44 is a vertical cross-sectional view of the air flow meter attached to an intake pipe in a configuration group H.

As shown in FIG. 44, the air flow meter 14 has an inward part 501 which enters the inside of the intake pipe 12a, and an outward part 502 which protrudes to the outside of the intake pipe 12a without entering the inside of the intake pipe 12a. The inward part 501 includes the bypass flow channel 30 and the ring holding portion 25, and the outward part 502 includes the housing opening 61, the flange portion 27, and the connector portion 28. The inward part 501 and the outward part 502 are aligned in the height direction Y to divide the air flow meter 14 into two portions, and a boundary of those parts 501 and 502 coincide with the open end of the pipe flange 12c. The housing body 24 and the sensor SA 50 extend across a boundary between the inward part 501 and the outward part 502 in the height direction Y.

In the air flow meter 14, the outward part 502 includes the housing base end face 192, and the inward part 501 includes the housing tip end face 191. In this case, in the housing 21, the housing base end face 192 may be referred to as the end on the side of the outward part 502, and the housing tip end face 191 may be referred to as the end on the side of the inward part 501. In addition, the inward part 501 and the outward part 502 are aligned in the height direction Y, and the height direction Y corresponds to a direction in which the inward part 501 and the outward part 502 are aligned.

The air flow meter 14 has temperature detectors 505 and 506 for detecting the temperature of intake air flowing through the intake passage 12, in addition to the flow rate detector 22. The temperature detectors 505 and 506 are sensors configured to include elements such as temperature detection elements mounted on a circuit board, and detect an internal temperature of the intake pipe 12a.

The first temperature detector 505 is provided in the measurement flow channel 32, and detects a temperature of the intake air in the measurement flow channel 32. The first temperature detector 505 detects the temperature of the intake air flowing in the intake passage 12 by detecting the temperature of the intake air flowing in the measurement flow channel 32. The first temperature detector 505 is disposed in the sensing portion 53 of the sensor SA 50, and specifically, the first temperature detector 505 is mounted on the detection board 22a together with the detection element 22b. In this case, the detection board 22a corresponds to a circuit board on which the elements of the first temperature detector 505 are mounted.

The second temperature detector 506 is disposed at a position closer to the housing opening 61 than the first temperature detector 505 in the height direction Y, and detects the internal temperature of the air flow meter 14. The second temperature detector 506 detects the internal temperature of the intake pipe 12a by detecting the internal temperature of the air flow meter 14 even if the second temperature detector 506 is disposed at a position where the second temperature detector 506 does not touch the intake air. The second temperature detector 506 is disposed between the housing base end face 192 and the first temperature detector 505 in the height direction Y by being disposed at a position closer to the housing opening 61 than the measurement flow channel 32. The second temperature detector 506 is disposed in the circuit accommodation portion 51 of the sensor SA 50, and specifically, the second temperature detector 506 is mounted on the lead frame 82 together with the circuit chip 81. In this case, the lead frame 82 corresponds to a circuit board on which the elements of the second temperature detector 506 are mounted.

In the internal space 24a of the housing 21, the first temperature detector 505 is disposed in the sealing region PA (refer to FIG. 8, and so on), and the second temperature detector 506 is disposed in the open region PB (refer to FIG. 8, and so on).

In this example, the internal combustion engine 11 or the like that generates a heat outside the intake pipe 12a is referred to as an external heat source, and it is assumed that the heat is applied from the external heat source to the air flow meter 14. In the air flow meter 14, it is considered that the heat from the external heat source is first applied to the outward part 502, and the heat is transferred from the outward part 502 to the inward part 501. In this case, since the heat from the external heat source is applied to the temperature detectors 505 and 506 in addition to the heat from the intake air, an error is likely to occur between the detected value, which is the detection result of the temperature detectors 505 and 506, and an actual temperature of the intake air flowing through the intake passage 12. Hereinafter, the actual temperature of the intake air flowing through the intake passage 12 is also referred to as an actual temperature of the intake air. The actual temperature may also be referred to as a steady value.

As described above, the first temperature detector 505 is disposed at a position farther from the outward part 502 than the second temperature detector 506. In addition, while the second temperature detector 506 is disposed at a position of hardly touching the intake air, the first temperature detector 505 is disposed at a position of easily touching the intake air in the measurement flow channel 32. Due to the above factors, the detected value of the first temperature detector 505 is less susceptible to the influence of the external heat source than the detected value of the second temperature detector 506, and tends to be a value close to the actual temperature of the intake air. In other words, the error of the first temperature detector 505 with respect to the actual temperature of the intake air is likely to be smaller than the error of the second temperature detector 506 with respect to the actual temperature of the intake air.

The circuit chip 81 according to the present embodiment performs a process of acquiring a temperature correction value obtained by correcting the detected value of the first temperature detector 505 as a temperature measurement value. The circuit chip 81 corresponds to a measurement control device that controls the air flow meter 14, such as acquiring a temperature correction value as a measured value. Like the ECU 20, the circuit chip 81 is an arithmetic processing circuit including a processor, a RAM, a storage medium such as a ROM and a flash memory, a microcomputer including an input and output unit, a power supply circuit, and the like. The circuit chip 81 is electrically connected to the flow rate detector 22, the intake air temperature sensor 23, and the temperature detectors 505 and 506, and the detection signals of the detectors 22, 505, and 506 and the sensor 23 are input to the circuit chip 81. The circuit chip 81 measures the flow rate and the temperature of the intake air flowing through the measurement flow channel 32 with the use of the detection signals of the detectors 22, 505, 506 and the sensor 23.

As shown in FIG. 45, the multiple connector terminals 28a of the air flow meter 14 include a signal terminal 521, a power supply terminal 522, a ground terminal 523, and an adjustment terminal 524. Each of the terminals 521 to 524 is electrically connected to the circuit chip 81, and the circuit chip 81 outputs measured values of temperatures and flow rates from the signal terminal 521 to the ECU 20 or the like. In this example, the circuit chip 81 stores the information on the temperature correction value in the storage medium in association with time information such as correction timing. The adjustment terminal 524 can be connected with an adjustment device as an external device capable of adjusting the correction accuracy by the circuit chip 81. In a state where the adjustment device is electrically connected to the adjustment terminal 524, the information on the temperature correction value stored in the storage medium can be rewritten.

Figure 46:
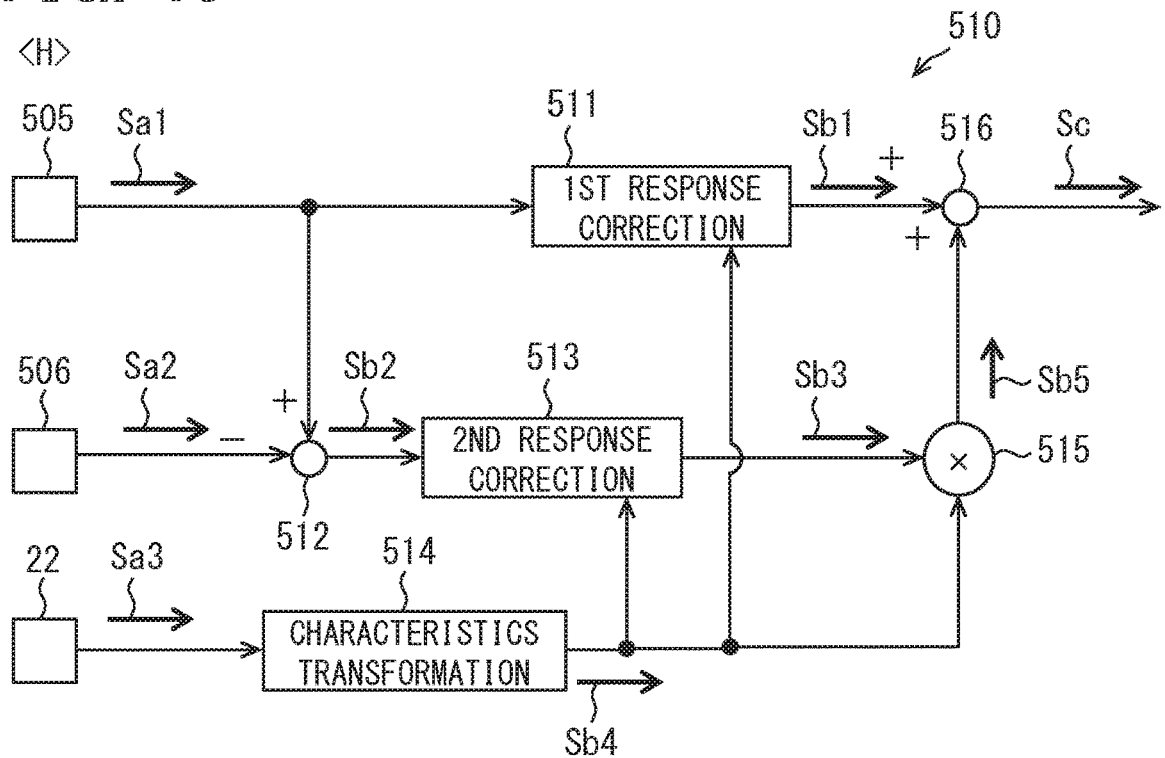
FIG. 46 is a block diagram showing an electrical configuration of a temperature correction unit.

The circuit chip 81 includes a temperature correction unit 510 that acquires a temperature correction value by correcting the detected value of the first temperature detector 505. As shown in FIG. 46, the temperature correction unit 510 includes multiple functional blocks such as a first correction unit 511, a temperature differential unit 512, a second correction unit 513, a characteristic transformation unit 514, a correction amount calculation unit 515, and a correction value calculation unit 516. In the temperature correction unit 510 corresponding to the physical quantity correction unit, the detection results of the flow rate detector 22 and the temperature detectors 505 and 506 are input to the first correction unit 511, the temperature differential unit 512, and the characteristic transformation unit 514. In the temperature correction unit 510, the detected value of the flow rate and the detected value of the temperature are acquired based on the detection signals of the flow rate detector 22 and the temperature detectors 505 and 506.

In the present embodiment, the first temperature signal Sa1 is corrected with the use of a first temperature signal Sa1 including the detected value of the first temperature detector 505, a second temperature signal Sa2 including the detected value of the second temperature detector 506, and a flow rate signal Sa3 including the detected value of the flow rate detector 22. In the temperature correction unit 510, the first temperature signal Sa1 is input to the first correction unit 511 and the temperature differential unit 512, the second temperature signal Sa2 is input to the temperature differential unit 512, and the flow rate signal Sa3 is input to the characteristic transformation unit 514.

The first temperature detector 505 corresponds to a physical quantity detector that detects a physical quantity called a temperature, and the first temperature signals Sa1 correspond to detection results of the physical quantity detector. The second temperature detector 506 corresponds to a same kind-quantity detector that detects a temperature having the same kind of physical quantity as the first temperature detector 505, and the second temperature signal Sa2 corresponds to detection results of the same kind-quantity detector. The flow rate detector 22 corresponds to a different kind-quantity detector that detects a flow rate which is a physical quantity of a different type from that of the first temperature detector 505, and the flow rate signals Sa3 correspond to detection results of the different kind-quantity detector. The second temperature signal Sa2 and the flow rate signal Sa3 correspond to correction parameters used for correction of the first temperature signal Sa1.

The first correction unit 511 calculates a first correction signal Sb1 by performing response correction of the first temperature signal Sa1. The temperature differential unit 512 calculates a difference, which is a difference between the first temperature signal Sa1 and the second temperature signal Sa2, as a temperature differential signal Sb2. The second correction unit 513 calculates a differential correction signal Sb3 by performing response correction of the temperature differential signal Sb2. The characteristic transformation unit 514 calculates a flow rate transformation signal sb4 by performing characteristic transformation of the flow rate signal Sa3. The correction amount calculation unit 515 calculates a correction amount signal Sb5 with the use of the differential correction signal Sb3 and the flow rate transformation signal sb4. The correction value calculation unit 516 calculates a correction value signal Sc with the use of the first correction signal Sb1 and the correction amount signal Sb5.

Figure 47:
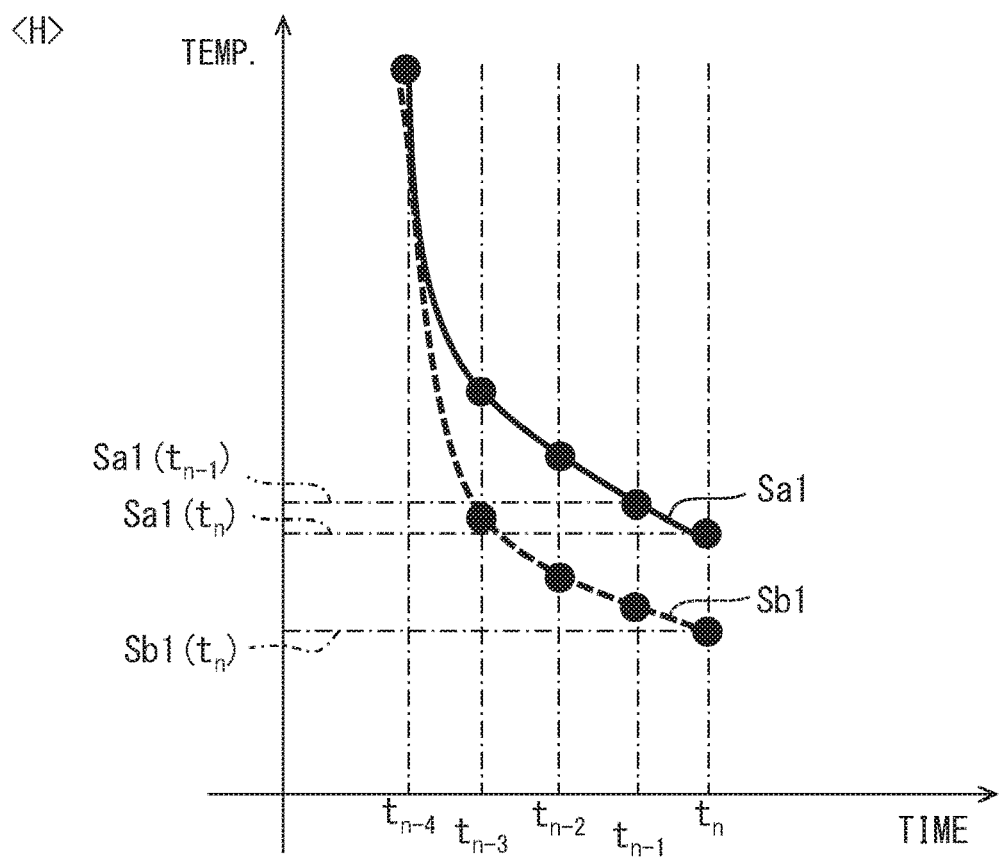
FIG. 47 is a diagram illustrating processing in a first correction unit.

The first correction unit 511 corrects the first temperature signal Sa1 based on a behavior of change of the first temperature signal Sa1, and acquires the correction value as the first correction signal Sb1. In this case, the first correction unit 511 corresponds to a change correction unit. In this example, a first-order delay correction is performed on the first temperature signal Sa1 as shown in FIG. 47 to obtain the first correction signal Sb1. For example, in the first temperature signal Sa1, a detected value Sa1(tn) at a timing tn, a past slope m, and a time constant A are acquired, and the detected value Sa1(tn) is added to the multiplication of the slope m and the time constant A, thereby calculating the correction value Sb1(tn) at the timing tn. In this manner, the first correction signal Sb1 is acquired by calculating the respective correction values Sb1(tn) with the use of the following (Expression 1).

$$Sb1(tn)=Sa1(tn)+m \times A \quad \text{(Ex. 1)}$$

In (Ex. 1), the slope m is calculated by dividing an amount of change ΔSa1 of the first temperature signal Sa1 in a minute time Δt by the minute time Δt. For example, the minute time Δt is calculated for timings tn and tn−1, and an amount of change ΔSa1 is calculated with the use of the detected values Sa1(tn) and Sa1(tn−1) at the timings tn and tn−1.

Figure 48:
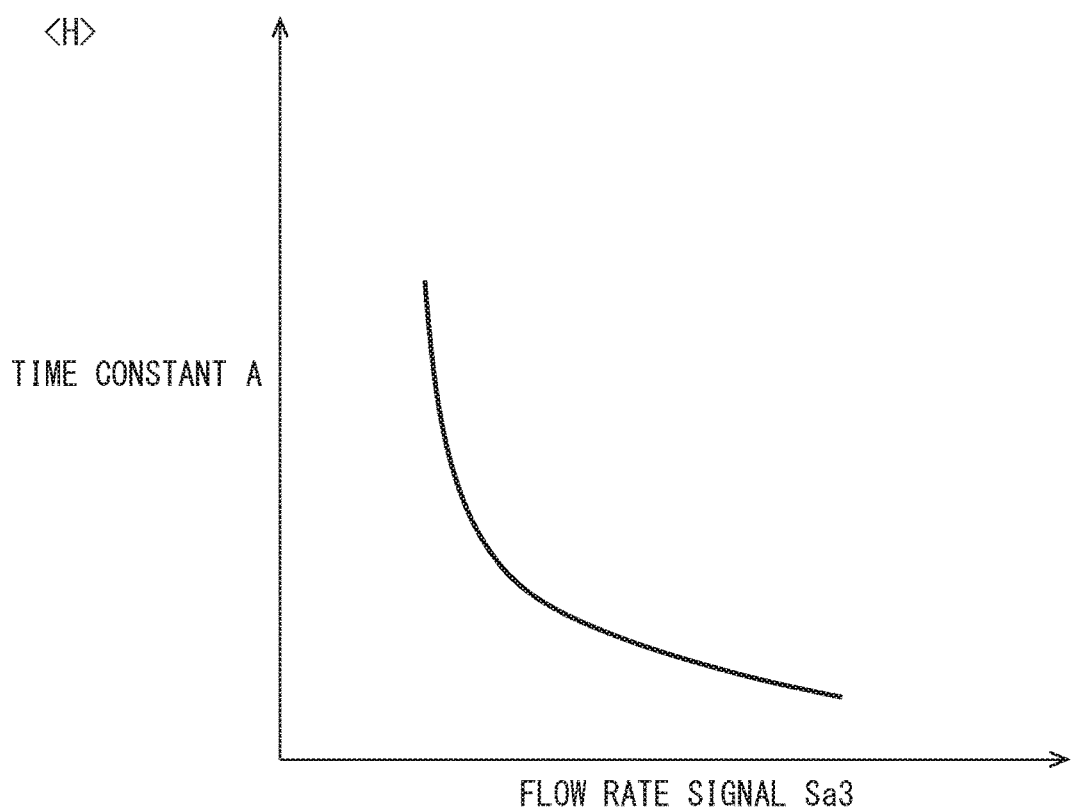
FIG. 48 is a diagram showing a relationship between a flow rate signal and a time constant.

The time constant A is set in accordance with a flow rate of intake air in the intake passage 12. For example, as shown in FIG. 48, the time constant A is set to a larger value as the flow rate signal Sa3 is smaller. Information indicating a relation between the flow rate signal Sa3 and the time constant A is stored as flow time information such as a map, data, and a mathematical expression in the storage medium of the circuit chip 81. The first correction unit 511 reads the flow time information from the storage medium or the like, and calculates the time constant A corresponding to the flow rate signal Sa3 with the use of the flow time information or the like. In this instance, the first correction unit 511 corrects the first temperature signal Sa1 with the use of a flow rate which is a physical quantity of a kind different from the temperature, and corresponds to a different king-quantity correction unit.

Figure 49:
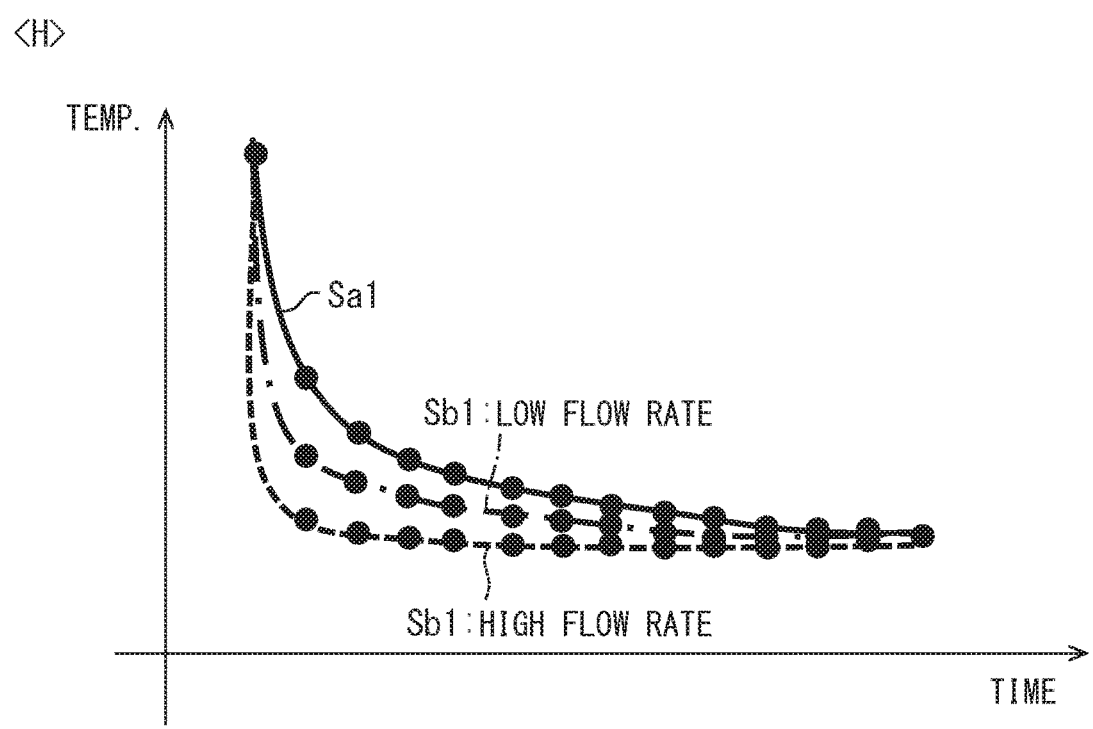
FIG. 49 is a diagram showing temporal changes of a first correction signal when a flow rate is large and when the flow rate is small.

The first temperature signal Sa1 converges to a convergence value corresponding to the actual temperature of the intake air and stabilizes at a convergence value even if the first temperature signal Sa1 is not corrected based on the behavior of change of the first temperature signal Sa1. As the flow rate of the intake air in the intake passage 12 increases more, the heat imparted to the air flow meter 14 from the external heat source is more likely to be released in the intake passage 12, the first temperature signal Sa1 is more likely to converge to the convergence value, and the response of the first temperature signal Sa1 becomes higher. For that reason, as shown in FIG. 49, when the flow rate of the intake air in the intake passage 12 is relatively large, the first correction signal Sb1 tends to converge to the convergence value even if the correction amount is relatively small. On the other hand, if the flow rate of the intake air in the intake passage 12 is relatively small, there is a need to relatively increase the correction amount in order to converge the first correction signal Sb1 to the convergence value. Therefore, as described above, it is preferable to set the time constant A to a larger value as the flow rate of the flow rate signal Sa3 and the like is smaller. The time constant A corresponds to a flow rate correction amount.

Figure 50:
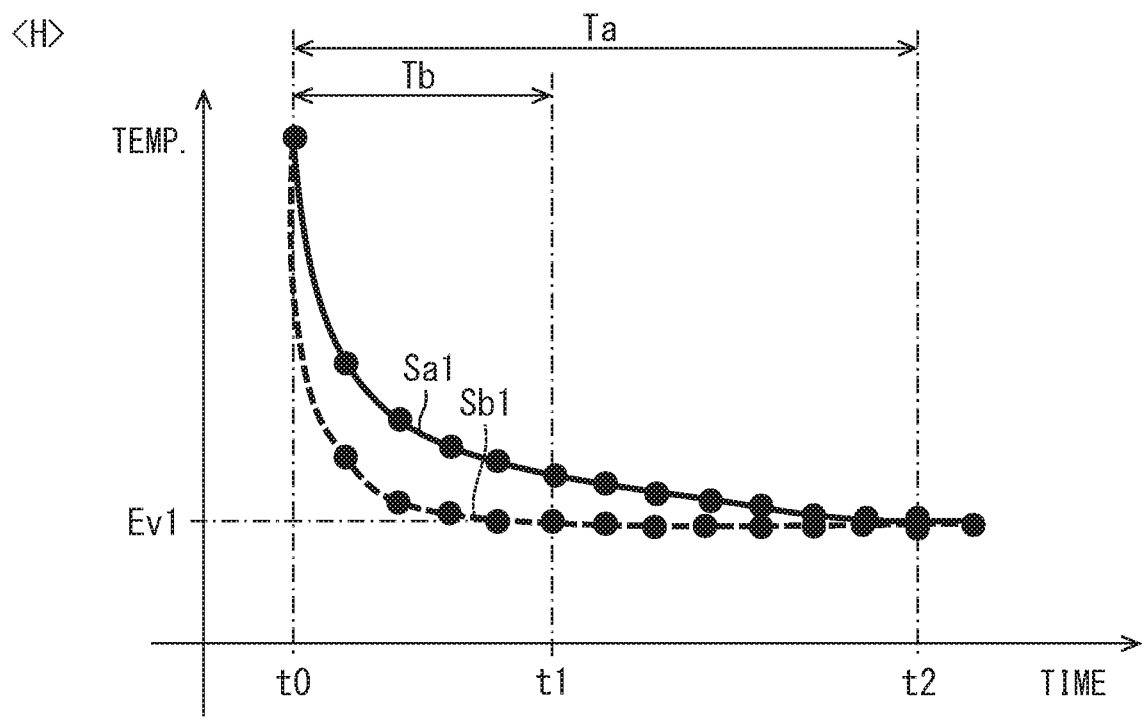
FIG. 50 is a diagram showing a temporal change of each of a first temperature signal and the first correction signal.

The response of the first correction signal Sb1 is enhanced by compensating the response of the first temperature signal Sa1 with the use of the behavior of change as the temporal change information included in the first temperature signal Sa1. As shown in FIG. 50, a time Tb required for the first correction signal Sb1 to reach a first convergence value Ev1, which is the convergence value for the first temperature signal Sa1, is shorter than the time Tb required for the first temperature signal Sa1 to reach the first convergence value Ev1. For example, when the first temperature signal Sa1 and the first correction signal Sb1 start to change at the timing t0 in accordance with a change in the actual temperature of the intake air, the first temperature signal Sa1 reaches the first convergence value Ev1 at a timing t2. On the other hand, the first correction signal Sb1 reaches the first convergence value Ev1 at a timing t1 earlier than the timing t2. As described above, the first correction signal Sb1 is higher in response than the first temperature signal Sa1. In other words, when the actual temperature of the intake air starts to change, the first correction signal Sb1 is smaller than the first temperature signal Sa1 in the error from the first convergence value Ev1, which means that the accuracy of the first correction signal Sb1 is higher. This is because the first correction unit 511 sets the time constant A to be larger as the flow rate signal Sa3 is smaller in a transient time of the actual temperature.

In this example, when the heat is applied to the air flow meter 14 from the external heat source, an error between the actual temperature and the first temperature signal Sa1 becomes larger, and in addition, the response of the first temperature signal Sa1 when the actual temperature of the intake air changes tends to decrease. This is because it is considered that the heat from the external heat source is transmitted from the housing 21 to the first temperature detector 505 through the mold portion 76 of the sensor SA 50 and the intake air in the measurement flow channel 32. On the other hand, even if the response of the first temperature signal Sa1 is lowered by the heat from the external heat source, the response of the first correction signal Sb1 is enhanced by the first correction unit 511.

When the response of the first correction signal Sb1 is increased more, the response of the correction value signal Sc is increased more. In this example, the correction value signal Sc is output from the circuit chip 81 to the ECU 20 as information on the temperature of the intake air, and the correction value signal Sc is used by the ECU 20 to control the combustion system 10. For that reason, if the response of the correction value signal Sc is enhanced, an improvement in fuel efficiency and emission can be realized, and erroneous diagnosis of a failure diagnosis device such as an OBD (On-board diagnostics) can be inhibited.

Figure 51:
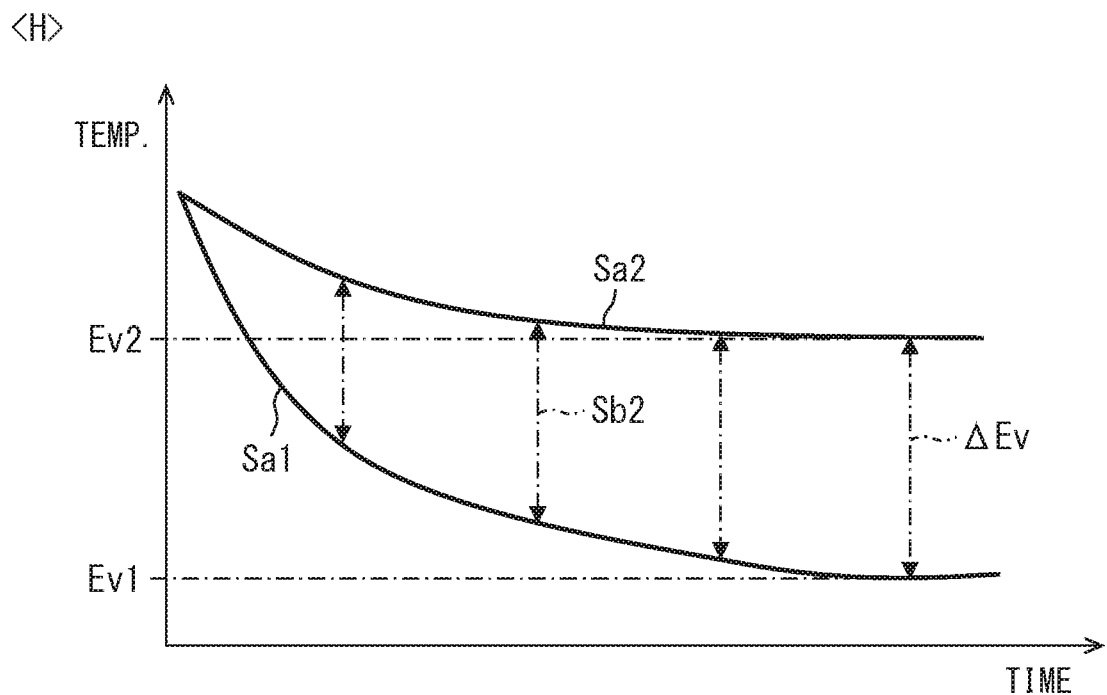
FIG. 51 is a diagram showing a temporal change of each of the first temperature signal and the second temperature signal.

The temperature differential unit 512 calculates the temperature differential signal Sb2 based on one of the first temperature signal Sa1 and the second temperature signal Sa2. The temperature differential unit 512 of the present embodiment uses the first temperature signal Sa1 as a reference, and as shown in FIG. 51, uses a value obtained by subtracting the first temperature signal Sa1 from the second temperature signal Sa2 as the temperature differential signal Sb2. In FIG. 51, the second convergence value Ev2, which is the convergence value for the second temperature signal Sa2, is larger than the first convergence value Ev1. As described above, a case in which the second convergence value Ev2 is larger than the first convergence value Ev1 includes a case in which the heat applied to the first temperature detector 505 from the external heat source is larger than the heat applied to the first temperature detector 505 from the intake air flowing through the measurement flow channel 32.

Figure 52:
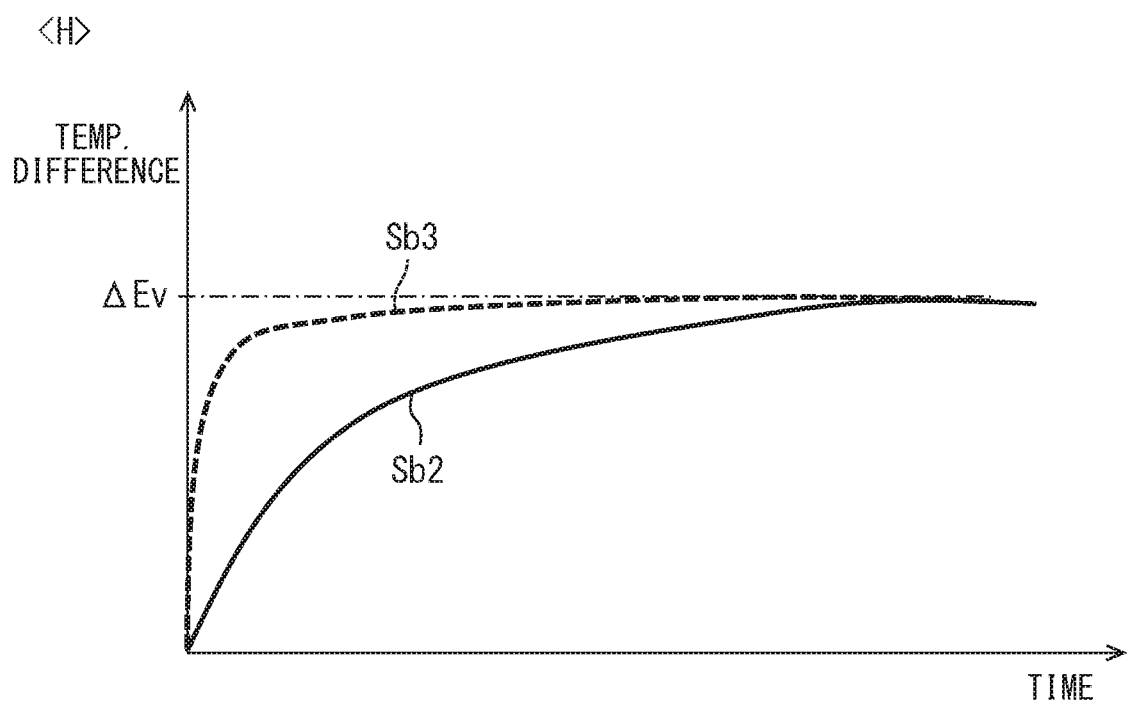
FIG. 52 is a diagram showing a temporal change of each of a temperature differential signal and a differential correction signal.

When the response of the second temperature signal Sa2 is higher than the response of the first temperature signal Sa1, as shown in FIG. 52, the temperature differential signal Sb2 gradually increases, and eventually reaches a neighborhood difference ΔEv, which is a difference between the first convergence value Ev1 and the second convergence value Ev2. In this example, because an error between the first temperature signal Sa1 and the first convergence value Ev1 is larger than an error between the second temperature signal Sa2 and the second convergence value Ev2, the temperature differential signal Sb2 gradually increases toward the neighborhood difference ΔEv with the first temperature signal Sa1 as a reference.

Figure 53:
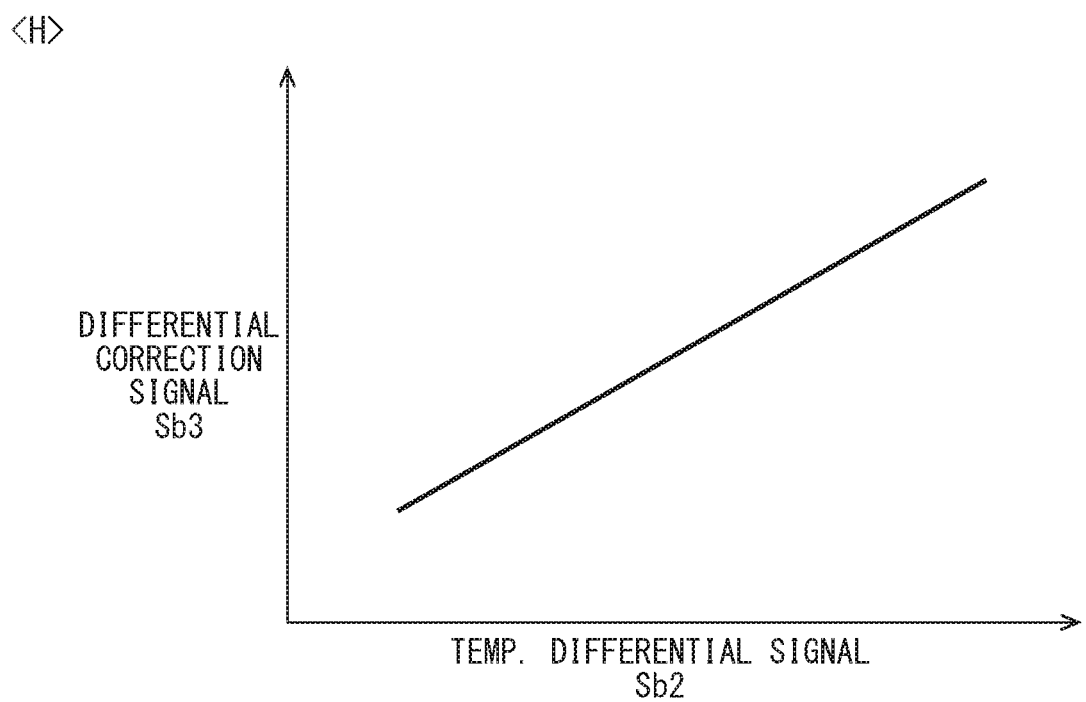
FIG. 53 is a diagram showing a relationship between the temperature differential signal and the differential correction signal.

The second correction unit 513 corrects the temperature differential signal Sb2 based on a behavior of change of the temperature differential signal Sb2, and acquires a correction value as the differential correction signal Sb3. The second correction unit 513 performs the first-order delay correction with the use of the present value and the past value, similarly to the first correction unit 511, for example, for the temperature differential signals Sb2. As a result, the response of the differential correction signal Sb3 is higher than the response of the temperature differential signal Sb2. Specifically, as shown in FIG. 52, a time required for the differential correction signal Sb3 to reach the neighborhood difference ΔEv is shorter than a time required for the temperature differential signal Sb2 to reach the neighborhood difference ΔEv. This is because, as shown in FIG. 53, the second correction unit 513 sets the differential correction amount of the correction amount signal Sb5 or the like to a larger value as the temperature differential signal Sb2 becomes larger at the transient time of the actual temperature.

Information indicating the relation between the temperature differential signal Sb2 and the differential correction signal Sb3 is stored as temperature compensation information such as a map, data, and a mathematical expression in the storage medium of the circuit chip 81. The second correction unit 513 reads the temperature compensation information from the storage medium or the like, and calculates the differential correction signal Sb3 corresponding to the temperature differential signal Sb2 with the use of the temperature compensation information or the like. In this instance, the second correction unit 513 corresponds to a differential correction unit, and the differential correction signal Sb3 corresponds to a differential correction amount.

Figure 54:
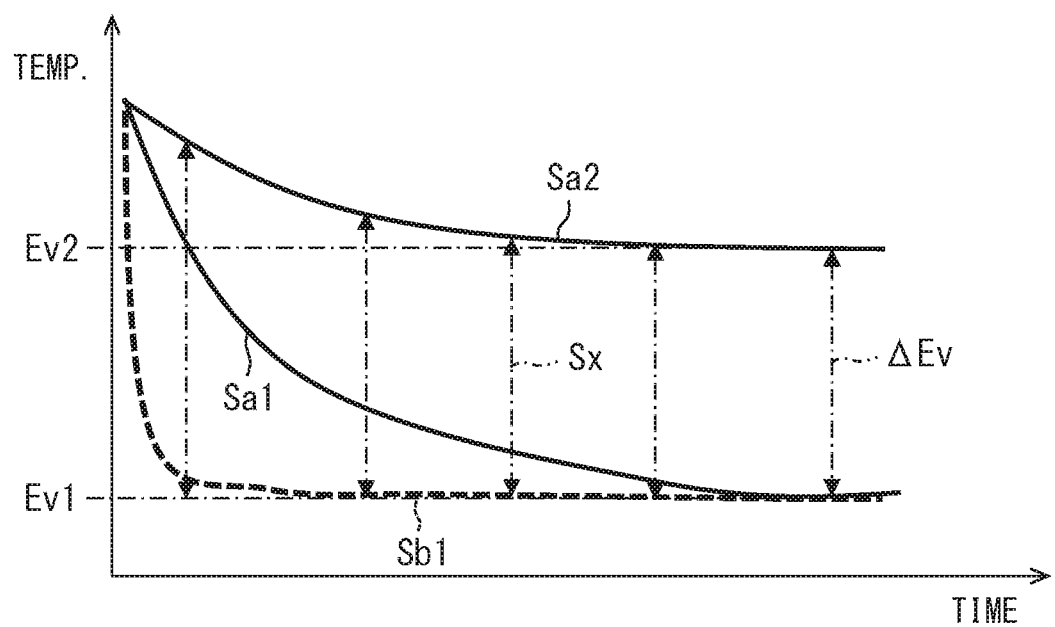
FIG. 54 is a diagram showing temporal changes of the first temperature signal, the second temperature signal, and the first correction signal in a configuration different from that of the first embodiment.
Figure 55:
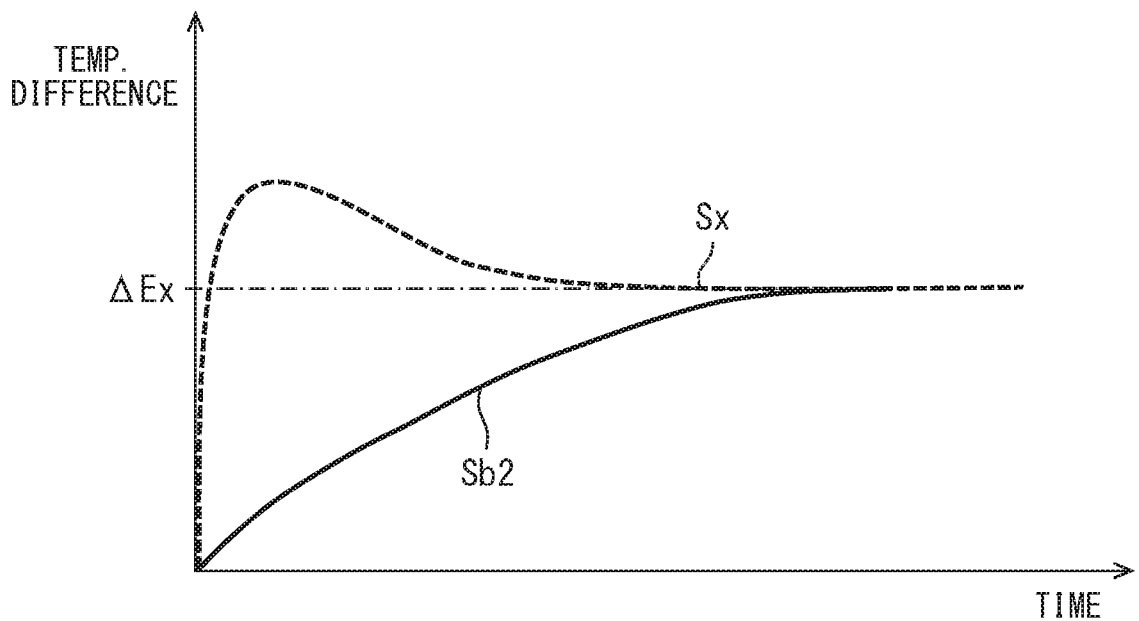
FIG. 55 is a diagram showing a temporal change of each of the temperature differential signal and the differential correction signal in a configuration different from that of the first embodiment.

As described above, after calculating the difference between the first temperature signal Sa1 and the second temperature signal Sa2, the temperature correction unit 510 calculates the differential correction signal Sb3 by performing the response correction of the difference. On the other hand, unlike the present embodiment, a configuration is conceivable in which the difference between the first correction signal Sb1 and the second temperature signal rather than the first temperature signal Sa1 is calculated as a differential correction signal Sx. In the above configuration, as shown in FIGS. 54 and 55, the differential correction signal Sx reaches the neighborhood difference ΔEv with a gradual decrease after the differential correction signal Sx once becomes larger than the neighborhood difference ΔEv. In other words, in the differential correction signal Sx, an overshoot occurs at an initial stage of the response. As described above, when the differential correction signal Sx includes an overshoot, the correction value signal also includes an overshoot. When it is assumed that the correction value signal is used for controlling the combustion system 10 in the ECU 20, there are concerns that the fuel efficiency and the emission are lowered, and that the diagnostic accuracy of the failure diagnosis device is lowered.

The time information of the differential correction signal Sb3 acquired by the second correction unit 513 matches the time information of the first correction signal Sb1 acquired by the first correction unit 511. For example, in the first correction unit 511, the temperature differential unit 512, and the second correction unit 513, various processes are performed on the first temperature signal Sa1, the second temperature signal Sa2, and the temperature differential signal Sb2, as a result of which some response delay occurs. On the other hand, the response delay time generated in the first correction unit 511 is the same as the total time of the response delay times generated in the temperature differential unit 512 and the second correction unit 513. In this instance, the first correction signal Sb1 and the differential correction signal Sb3 included in the correction value signal Sc have the same time information, and the measurement accuracy of the correction value signal Sc is improved as compared with, for example, a configuration in which the first correction signal Sb1 and the differential correction signal Sb3 have different time information.

The time information of the first correction signal Sb1 and the time information of the differential correction signal Sb3 may not coincide with each other. Even in this case, if the deviation of the time information is a slight deviation amount such as being included in an appropriate range, the measurement accuracy of the correction value signal Sc is kept in an appropriate range, and the measurement accuracy is inhibited from being remarkably lowered.

The characteristic transformation unit 514 performs characteristic transformation of the flow rate signal Sa3 so that the content of the flow rate signal Sa3 is reflected in the response correction in the first correction unit 511 and so that the content of the flow rate signal Sa3 is reflected in the response correction in the second correction unit 513, and calculates the flow rate transformation signal sb4. The characteristic transformation unit 514 is connected to each of the first correction unit 511 and the second correction unit 513, and outputs the flow rate transformation signal Sb4 to the correction units 511 and 513. For example, the flow rate transformation signal sb4 converts the flow rate signal Sa3 into a mode that is easily applied to the first temperature signal Sa1 or the flow time information as shown in FIG. 48.

The correction amount calculation unit 515 acquires, as the correction amount signal Sb5, a multiplied signal obtained by multiplying the differential correction signal Sb3 by the flow rate transformation signal sb4. In this instance, the correction amount calculation unit 515 calculates, as the correction amount signal Sb5, a value obtained by increasing or decreasing the differential correction signal Sb3 in accordance with the flow rate of the intake air in the measurement flow channel 32.

The correction value calculation unit 516 acquires an integrated signal obtained by adding the first correction signal Sb1 and the correction amount signal Sb5 as the correction value signal Sc. In this instance, the correction value calculation unit 516 calculates, as the correction value signal Sc, a value obtained by increasing or decreasing the first correction signal Sb1 in accordance with both the temperature difference between the first temperature detector 505 and the second temperature detector 506 and the flow rate of the intake air in the measurement flow channel 32. The correction value signal Sc may also be referred to as a temperature correction value or a temperature measurement value.

Figure 56:
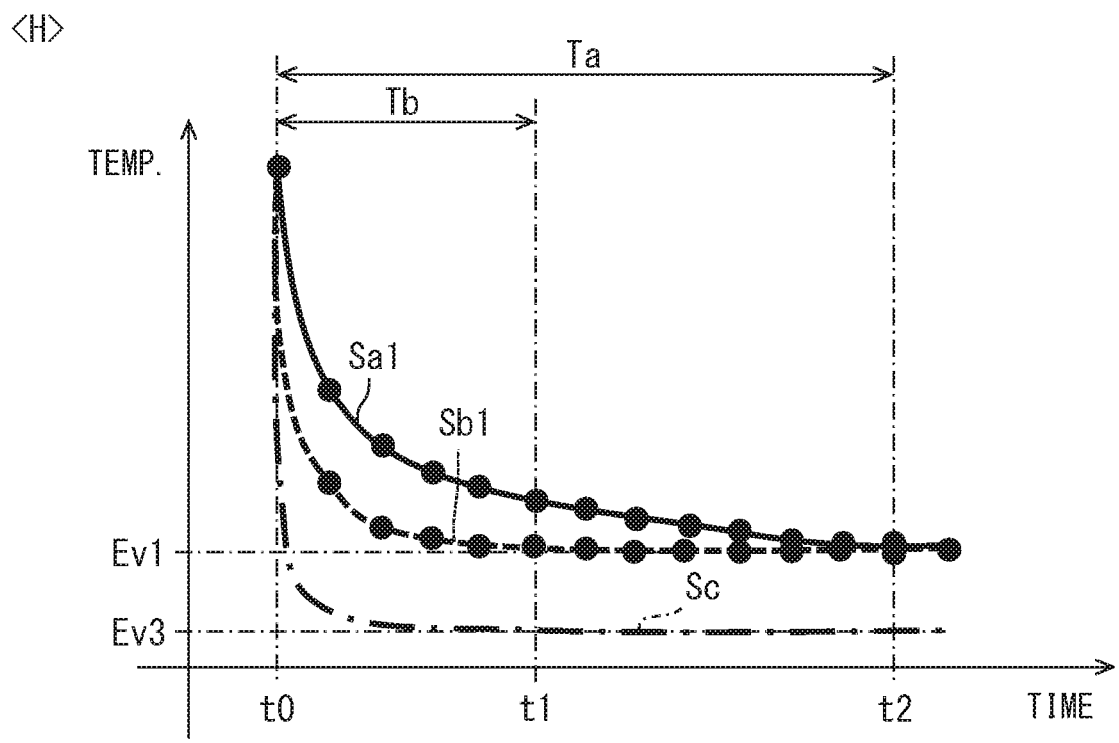
FIG. 56 is a diagram showing a temporal change of each of the first temperature signal, the first correction signal, and a correction value signal.
Figure 57:
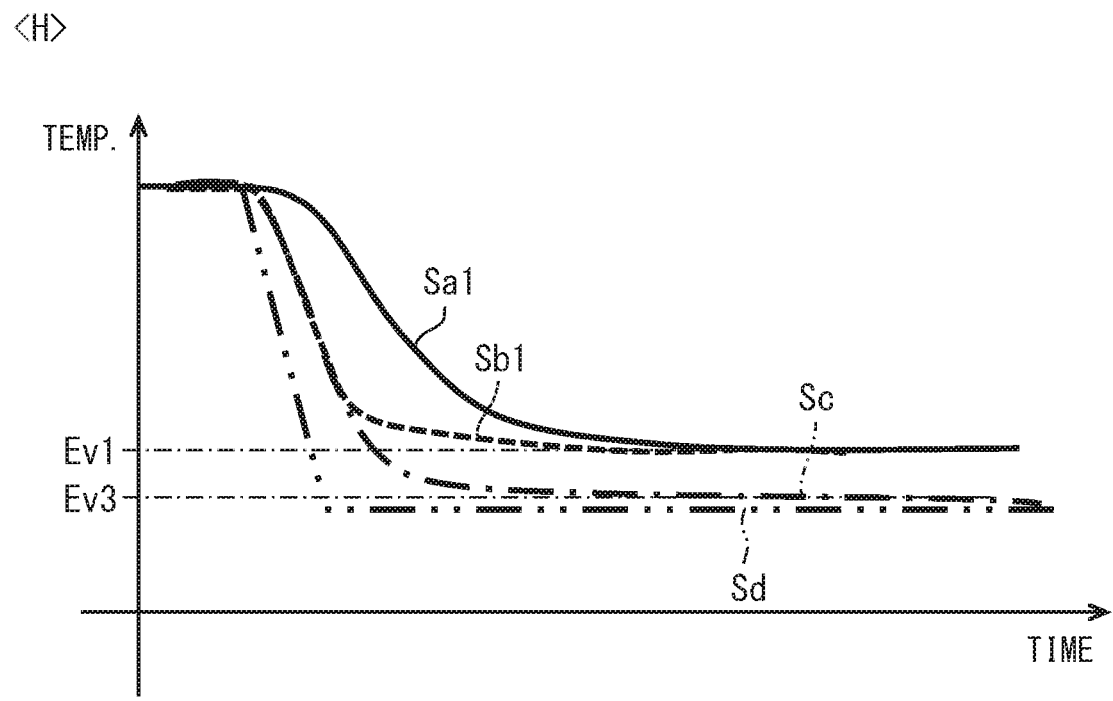
FIG. 57 is a diagram showing a temporal change of each of the first temperature signal, the first correction signal, the correction value signal, and an actual temperature.

As shown in FIGS. 56 and 57, a correction convergence value Ev3, which is the convergence value for the correction value signal Sc, is closer to the actual temperature Sd of the intake air than the first convergence value Ev1 for the first temperature signal Sa1. In this instance, an error between the correction value signal Sc and the actual temperature signal Sd is a difference between the correction convergence value Ev3 and the actual temperature Sd, and is smaller than a difference between the first convergence value Ev1 and the actual temperature Sd. Moreover, the time required for the correction value signal Sc to reach the correction convergence value Ev3 is the same as the time Tb required for the first correction signal Sb1 to reach the first convergence value Ev1. Therefore, the correction value signal Sc is higher in both the measurement accuracy and the response than the first temperature signal Sa1.

The circuit chip 81 has a function of executing processing of each functional block of the temperature correction unit 510. In this case, the function of executing the processing of the temperature correction unit 510 corresponds to a physical quantity correction unit, the function of executing the processing of the first correction unit 511 corresponds to a change correction unit and the different king-quantity correction unit, and the function of executing the processing of the second correction unit 513 corresponds to a differential correction unit.

The circuit chip 81 has a flow rate correction unit as a function of improving the measurement accuracy of the flow rate correction values by correcting the flow rate signals Sa3 of the flow rate detector 22. The flow rate correction unit is electrically connected to the intake air temperature sensor 23, and acquires a detection signal of the intake air temperature sensor 23. The flow rate correction unit uses the detection signal of the intake air temperature sensor 23 as a correction parameter for correction of the flow rate signal Sa3. In this example, since the intake air temperature sensor 23 is provided outside the housing 21, the degree of heat application from the external heat source is likely to be smaller than that of the flow rate detector 22. This is because, since the intake air temperature sensor 23 is exposed to the intake passage 12, a heat is likely to be applied to the intake air temperature sensor 23 from the intake air flowing through the intake air passage 12, while the heat applied to the housing 21 from an external heat source is less likely to be transmitted to the intake air temperature sensor 23. For that reason, the correction of the flow rate signal Sa3 is performed with the use of the detection signal of the intake air temperature sensor 23, which is less affected by the heat from the external heat source, as a correction parameter, so that the correction accuracy can be improved.

In the configuration group H, according to the present embodiment, the second temperature detector 506 is disposed between the housing base end face 192 and the first temperature detector 505 in the height direction Y. In that case, the degree of heat application from the external heat source tends to be different between the first temperature detector 505 and the second temperature detector 506. In this instance, the first temperature signal Sa1 can be corrected by the second temperature signal Sa2 by leveraging the fact that the difference in degree of heat application on the temperature detectors 505 and 506 is easily reflected in the difference in the temperature signal Sa1 and Sa2, which is the detection result of the temperature detectors 505 and 506. This makes it possible to improve the measurement accuracy of the correction value signal Sc which is the temperature measurement value.

According to the present embodiment, both the first temperature detector 505 and the second temperature detector 506 are disposed in the inward part 501 of the air flow meter 14. For that reason, the heat applied from the external heat source to the temperature detectors 505 and 506 is not excessively large as compared with the heat applied from the intake air flowing through the intake passage 12. In other words, the difference between each of the first temperature signal Sa1 and the second temperature signal Sa2, and the actual temperature Sd of the intake air is not excessively large. In this instance, since the first temperature signal Sa1 tends to have an appropriate value as the detected value and the second temperature signal Sa2 tends to have an appropriate value as the correction value, the measurement accuracy of the correction value signal Sc can be enhanced.

According to the present embodiment, both the first temperature detector 505 and the second temperature detector 506 are included in the sensor SA 50. In this instance, the detection board 22a, the lead frame 82, and the like in the sensor SA 50 can be used as a circuit board for installing the temperature detectors 505 and 506, and therefore, there is no need to install a dedicated circuit board in the housing 21. For that reason, as compared with a configuration in which at least one of the temperature detectors 505 and 506 is not mounted on the sensor SA 50, the design load, the cost load, and the like can be reduced.

According to the present embodiment, the air flow meter 14 includes the flow rate detector 22 in addition to the temperature detectors 505 and 506. For that reason, the first temperature signal Sa1 can be corrected with the use of a correction parameter of the flow rate, which is a physical quantity different from that of the air. For example, the flow rate signal Sa3 can be used for correcting the first temperature signal Sa1 by leveraging the phenomena that the convergence of the first temperature signal Sa1 to the first convergence value Ev1 is easily changed in accordance with the flow rate signal Sa3 indicating the amount of intake air flowing through the intake passage 12. The measurement accuracy of the correction value signal Sc can be enhanced by the flow rate signal Sa3.

According to the present embodiment, both the first temperature detector 505 and the flow rate detector 22 are provided in the measurement flow channel 32. When the circuit board on which the first temperature detector 505 is mounted, and the circuit board on which the flow rate detector 22 is mounted can be shared, so that the cost burden of the sensor SA 50 can be reduced. In addition, since both the first temperature signal Sa1 and the flow rate signal Sa3 are intended to detect the intake air flowing through the measurement flow channel 32, the intake air is likely to be the same as the detection target of the first temperature signal Sa1 and the detection target of the flow rate signal Sa3. Therefore, in the configuration in which the first temperature signal Sa1 to be corrected is corrected by the flow rate signal Sa3 as the correction parameter, the correction accuracy can be enhanced.

According to the present embodiment, since the first temperature signal Sa1 is corrected using the second temperature signal Sa2 as a correction parameter, the correction accuracy of the correction value signal Sc can be enhanced. In addition, since the temperature differential signal Sb2 is used as the correction parameter, the correction accuracy of the correction value signal Sc can be enhanced by using a relatively changing mode of the second temperature signal Sa2 to the first temperature signal Sa1.

According to the present embodiment, correction of the temperature differential signal Sb2 is performed so that as the temperature differential signal Sb2 is larger, the differential correction signal Sb3 is larger. For that reason, the error of the correction value signal Sc with respect to the actual temperature Sd of the intake air can be reduced more than the error of the first temperature signal Sa1 with respect to the actual temperature Sd. In other words, the measurement accuracy of the correction value signal Sc can be enhanced.

According to the present embodiment, the flow rate signal Sa3 is used to correct the first temperature signal Sa1 together with the second temperature signal Sa2. For that reason, the second temperature signal Sa2 can improve the measurement accuracy of the correction value signal Sc, while the flow rate signal Sa3 can improve the response of the correction value signal Sc.

According to the present embodiment, the temperature is detected as the same kind of physical quantity by the two detectors, that is, the first temperature detector 505 and the second temperature detector 506. For that reason, the first temperature signal Sa1 can be corrected with high accuracy after the degree of heat application from the external heat source is properly grasped by the temperature signals Sa1 and Sa2. In other words, the measurement accuracy of the correction value signal Sc can be enhanced.

According to the present embodiment, the first temperature signal Sa1 is corrected based on the behavior of change of the first temperature signal Sa1. Since a future value of the first temperature signal Sa1 can be predicted, a time required for the first correction signal Sb1 to reach the first convergence value Ev1 can be shortened more than a time required for the first temperature signal Sa1 to reach the first convergence value Ev1. Therefore, the response of the correction value signal Sc can be enhanced. Moreover, both of the behavior of change of the first temperature signal Sa1 and the second temperature signal Sa2 are used for the first temperature signal Sa1, thereby being capable of enhancing both of the response and the measurement accuracy of the correction value signal Sc.

According to the present embodiment, the flow rate signal Sa3 is used for correcting the first temperature signal Sa1 together with the behavior of change of the first temperature signal Sa1. For that reason, the response of the correction value signal Sc enhanced by the behavior of change of the first temperature signal Sa1 can be further enhanced by the flow rate signal Sa3. In addition, since the behavior of change of the first temperature signal Sa1 is used for the correction of the second temperature signal Sa2 together with the second temperature signal Sa2, the response of the correction value signal Sc, which is less likely to be improved by the second temperature signal Sa2, can be enhanced.

According to the present embodiment, as the flow rate signal Sa3 is smaller, the correction amount signal Sb5 is larger. For that reason, the response of the correction value signal Sc can be enhanced by leveraging the phenomena that the response of the first temperature signal Sa1 tends to decrease more as the flow rate of the intake air decreases more, for example, when the flow velocity of the intake air in the intake passage 12 is smaller.

Second Embodiment

In the first embodiment, the shape of the longitudinal partition wall 69 is set irrespective of the shape of the detection throttle portion 59, but in a second embodiment, a shape of a longitudinal partition wall 69 is set according to a shape of a detection throttle portion 59. In the present embodiment, differences from the first embodiment will be mainly described.

Figure 58:
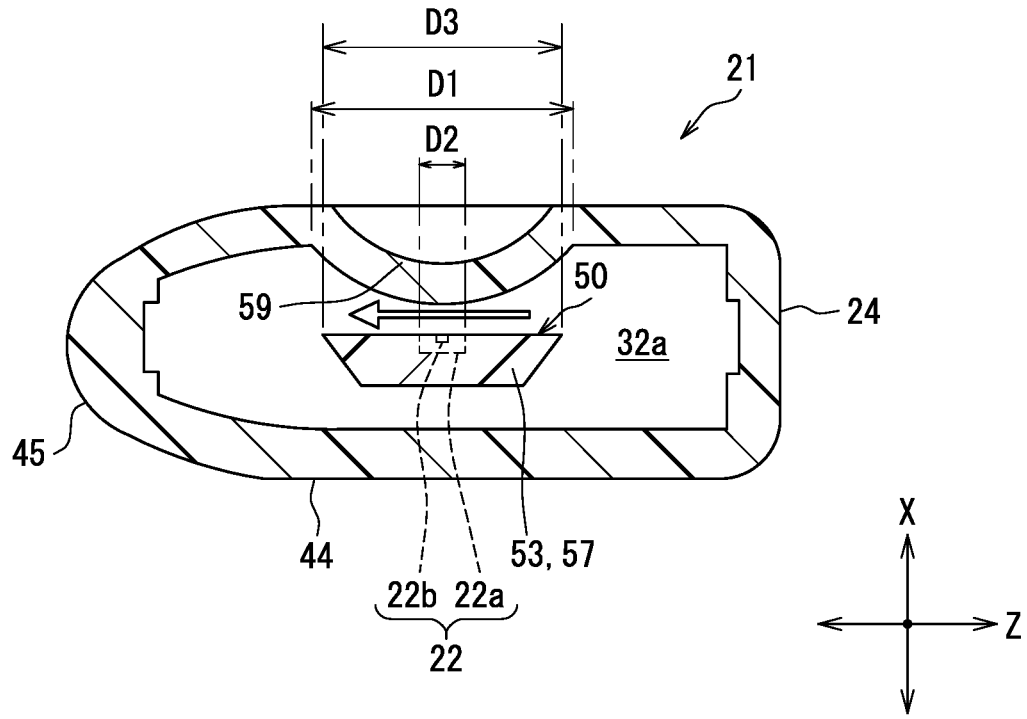
FIG. 58 is a horizontal cross-sectional view of the housing around a detection throttle portion according to a second embodiment.
Figure 59:
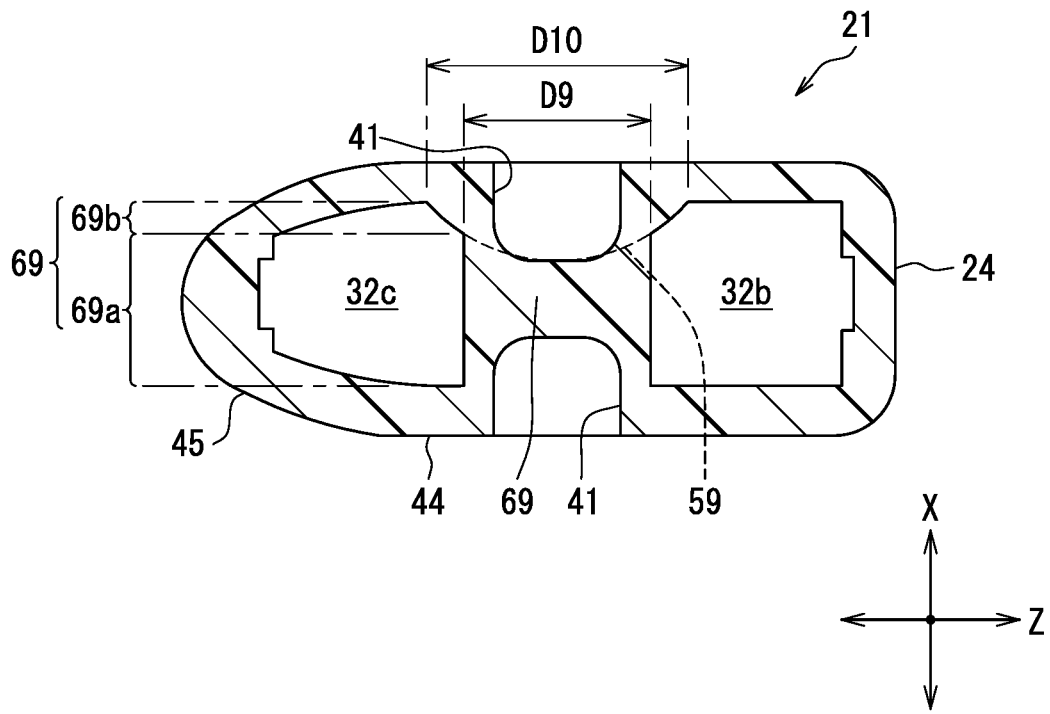
FIG. 59 is a horizontal cross-sectional view of the housing around a longitudinal partition wall.

As shown in FIGS. 58 and 59, the longitudinal partition wall 69 has a wall main body 69a and a wall bulging portion 69b. The wall main body 69a and the wall bulging portion 69b are aligned in the width direction X, and the wall bulging portion 69b is arranged on a front side of a sensor SA 50 in the width direction X. The wall bulging portion 69b extends from the detection throttle portion 59 toward a housing tip side in the height direction Y, and has the same shape as the shape of a portion of the detection throttle portion 59 on a front side of the wall main body 69a.

In the depth direction Z, a depth dimension D9 of the wall main body 69a is smaller than a depth dimension D1 of the detection throttle portion 59, and a depth dimension D10 of the wall bulging portion 69b is the same as or larger than the depth dimension D1 of the detection throttle portion 59. Also, in the present embodiment, when it is assumed that the longitudinal partition wall 69 and the detection throttle portion 59 are integral parts, even if the part as a whole comes closer to a housing opening 61, the part does not become thick. For that reason, at the time of molding the housing 21 with resin, an inward portion 93 of an inner peripheral mold portion 91 that enters an internal space 24a can be removed from the detection throttle portion 59 and the longitudinal partition wall 69, and the inward portion 93 can be extracted from the housing opening 61.

Third Embodiment

In the first embodiment, the width housing protrusion 72a of the housing body 24 is provided at a position facing the front surface of the sensor SA 50, whereas in a third embodiment, a width housing protrusion 72a is provided at a position facing a back surface of a sensor SA 50. In the present embodiment, differences from the first embodiment will be mainly described.

Figure 60:
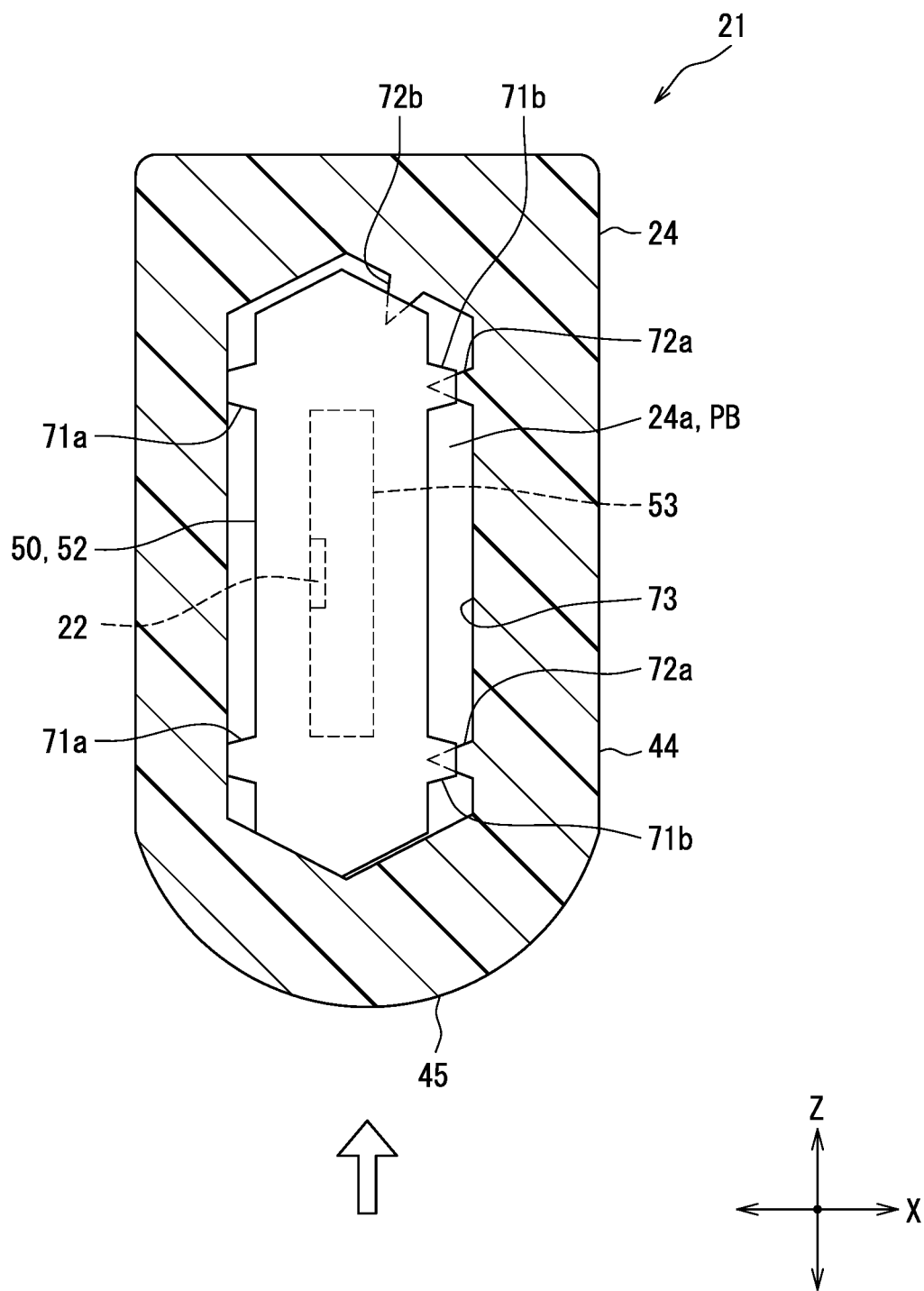
FIG. 60 is a horizontal cross-sectional view of an air flow meter around a housing protrusion according to a third embodiment.

As shown in FIG. 60, the width housing protrusion 72a abuts against a back SA protrusion 71b, not a front SA protrusion 71a of the sensor SA 50. For that reason, the front SA protrusion 71a of the sensor SA 50 abuts against a front surface of an inner peripheral surface of a housing body 24. In FIG. 60, a flow rate detector 22 is exposed on a left side surface of the sensor SA 50, and the left side surface is referred to as a front surface, and a right side surface is referred to as a back surface. On the other hand, in FIG. 14 of the first embodiment, the flow rate detector 22 is exposed on the right side surface of the sensor SA 50, and the right side surface is referred to as the front surface, and the left side surface is referred to as the back surface.

In the present embodiment, as described above, since the front SA protrusion 71a abuts against the front surface of the inner peripheral surface of the housing body 24, a separation distance between the front surface and the flow rate detector 22 is defined by a protrusion dimension of the front SA protrusion 71a. In other words, the separation distance between the inner peripheral surface of the detection path 32a and the flow rate detector 22 is defined regardless of the width housing protrusion 72a. For that reason, even in a configuration in which the back SA protrusion 71b deforms the width housing protrusion 72a with the insertion of the sensor SA 50 into the internal space 24a, the separation distance between the inner peripheral surface of the detection path 32a and the flow rate detector 22 is set regardless of the degree of deformation of the width housing protrusion 72a. In this case, since a manufacturing variation hardly occurs in the separation distance between the inner peripheral surface of the detection path 32a and the flow rate detector 22, the detection accuracy by the flow rate detector 22 can be inhibited from varying from product to product.

In addition, a depth housing protrusion 72b of the present embodiment is provided at a position facing the sensor SA 50 in the downstream-side outer peripheral portion of the housing body 24, not the upstream-side outer peripheral portion. The depth housing protrusion 72b extends toward a curved surface 45 of the housing body 24 in a direction inclined with respect to the depth direction Z. In the above configuration, the sensor SA 50 is pressed against the curved surface 45 in the internal space 24a by the deformation of the depth housing protrusion 72b pressed by the end face of a junction portion 52 of the sensor SA 50. As a result, the positioning accuracy of the sensor SA 50 with respect to the housing 21 can be enhanced in the depth direction Z as well.

Fourth Embodiment

In the first embodiment, the housing opening 61 is opened in the height direction Y, but in the fourth embodiment, a housing opening 61 is opened in the width direction X. In the present embodiment, an air flow meter 200 is included in a combustion system instead of the air flow meter 14 as the physical quantity measurement device, and differences from the first embodiment will be mainly described.

As shown in FIGS. 61 and 62, the air flow meter 200 is provided in the intake passage 12. The air flow meter 200 is a physical quantity measurement device similar to the air flow meter 14 of the first embodiment, and is attached to an intake pipe 12a (refer to FIGS. 2 and 8). The air flow meter 200 includes a housing 201, a flow rate detector 202, and a sealing member 206, and the housing 201 includes a housing body 204, a sealing holder 205, a flange portion 207, and a connector portion 208. Those members and parts correspond to members and parts having the same names as those of the first embodiment.

In the housing 201, one end face is referred to as a housing tip end face 215, the other end face is referred to as a housing base end face 216, and further, in the height direction Y, the housing tip end face 215 side is referred to as a housing tip side, and the housing base end face 216 side is referred to as a housing base end side. In the present embodiment, the housing body 204, the sealing holder 205, the flange portion 207, and the connector portion 208 are arrayed in the stated order from the housing tip side, and the housing body 204 extends from the sealing holder 205 toward the housing tip side. In the air flow meter 200, the housing body 204 and a part of the sealing holder 205 are included in the inward part which enters the interior of the intake pipe 12a, and the housing tip end face 215 is further included in the inward portion. A part of the sealing holder 205, the flange portion 207, and the connector portion 208 are included in an outward part protruding to the outside of the intake pipe 12a, and a housing base end face 216 is further included in the protrusion portion. In this case, in the housing 201, the housing base end face 216 may be referred to as an end portion on the outward part side, and the housing tip end face 215 may be referred to as an end portion on the inward part side.

The sealing member 206 is provided between the sealing holder 205 and a pipe flange 12c of an intake pipe 12a, and is in close contact with the sealing holder 205 and the pipe flange 12c. Like an O-ring 26 of the first embodiment, the sealing member 206 is a member that restricts an intake air from leaking out of an airflow insertion hole 12b, and is formed in a rectangular annular shape in accordance with the shape of the sealing holder 205. In this case, an outer peripheral end of the sealing member 206 has a rectangular shape. In the present embodiment, while the sealing holder 205 does not have a groove portion, the flange portion 207 extends from the sealing holder 205 toward the outer peripheral side, and the sealing member 206 is also pressed against the flange portion 207. For that reason, even if the sealing holder 205 itself does not have a function of holding the sealing member 206, the sealing holder 205 and the flange portion 207 can hold the sealing member 206. In this case, the sealing member 206 may be referred to as a pressing packing.

The housing body 204 has a bypass flow channel 210. The bypass flow channel has a passage flow channel 211, a measurement flow channel 212, an inflow port 213a, an outflow port 213b, and a measurement outlet 213c. The flow rate detector 202 is included in the sensor SA 220. Those members and parts correspond to members and parts having the same names as those of the first embodiment. The sensor SA 220 includes an SA base portion 221, a detection support portion 223, and lead terminals 224 (refer to FIG. 63). The detection support portion 223 supports the flow rate detector 202, and the SA base portion 221 supports the detection support portion 223 and the lead terminals 224. The SA base portion 221 corresponds to the circuit accommodation portion 51 and the junction portion 52 of the first embodiment, and the detection support portion 223 and the lead terminals 224 are members or portions corresponding to the sensing portion 53 and the lead terminals 54. The sensor SA 220 may be referred to as a sensor module, a sensor assembly, or a sensor unit.

In the sensor SA 220, the flow rate detector 202, the SA base portion 221, and the detection support portion 223 configure an SA main body 225. In this instance, the sensor SA 220 includes an SA main body 225 and the lead terminals 224. In the sensor SA 220, the SA main body 225 is a portion having the flow rate detector 202, and the lead terminals 224 extend from the SA main body 225.

The detection support portion 223 extends from the SA base portion 221 toward the housing tip side, and the lead terminals 224 extend from the SA base portion 221 toward the housing base end side. The detection support portion 223 has a size and a shape capable of placing the flow rate detector 202 in the measurement flow channel 212, and the lead terminals 224 are electrically connected to connector terminals 208a (refer to FIG. 63) provided in the connector portion 208. Similarly to the connector terminals 28a of the first embodiment, the connector terminal 208a is electrically connected to the ECU 20 by inserting a plug portion into the connector portion 208.

The housing body 204 has an internal space 204a in which the sensor SA 220 is accommodated, and a housing opening 241 in which the internal space 204a is opened. The housing body 204 has wall portions 231 to 235 defining the internal space 204a, and those wall portions 231 to 235 are all plate-shaped. The upstream wall portion 231 on the upstream side of the internal space 204a and the downstream wall portion 232 on the downstream side of the internal space 204a are aligned in the depth direction Z, and are opposed to each other across the internal space 204a in a state in which the plate surfaces of the upstream wall portion 231 and the downstream wall portion 232 are directed in the depth direction Z. The front wall portion 233 opposed to the front surface of the sensor SA 220 and the back wall portion 234 opposed to the back surface of the sensor SA 220 are aligned in the width direction X, and are opposed to each other across the internal space 204a in a state where the respective plate surfaces of the front wall portion 233 and the back wall portion 234 are directed in the width direction X.

A tip wall portion 235 forms a tip end face of the housing body 204, and connects the wall portions 231 to 234 to each other. The tip wall portion 235 extends over the front wall portion 233 and the back wall portion 234 in the width direction X, and extends over the upstream wall portion 231 and the downstream wall portion 232 in the depth direction Z.

An opening direction of the housing opening 241 is different from an opening direction of the housing opening 61 of the first embodiment, and coincides with the width direction X. The housing opening 241 is defined in the front wall portion 233. The housing opening 241 is provided at a position closer to the sealing holder 205 in the height direction Y, and extends from the sealing holder 205 toward the housing tip side. In that case, the upstream wall portion 231, the downstream wall portion 232, and the back wall portion 234 extend from the sealing holder 205 toward the housing tip side, while the back wall portion 234 is disposed at a position spaced apart from the sealing holder 205 toward the housing tip side.

In the housing body 204, an inflow port 213a is provided in the upstream wall portion 231, an outflow port 213b is provided in the downstream wall portion 232, and a measurement outlet 213c is provided in each of the front wall portion 233 and the back wall portion 234.

The air flow meter 200 includes a potting portion 242 that closes the housing opening 241. The potting portion 242 covers the sensor SA 220 from the housing opening 241, and corresponds to a cover portion. The potting portion 242 is formed by curing a thermosetting resin such as a potting resin filled in the internal space 204a, similarly to the potting portion 65 of the first embodiment. The thermosetting resin is injected into the internal space 204a from the housing opening 241 in a fluid state to seal the internal space 204a. As in the first embodiment, the thermosetting resin may be formed of an epoxy resin, a urethane resin, a silicon resin, or the like.

Figure 63:
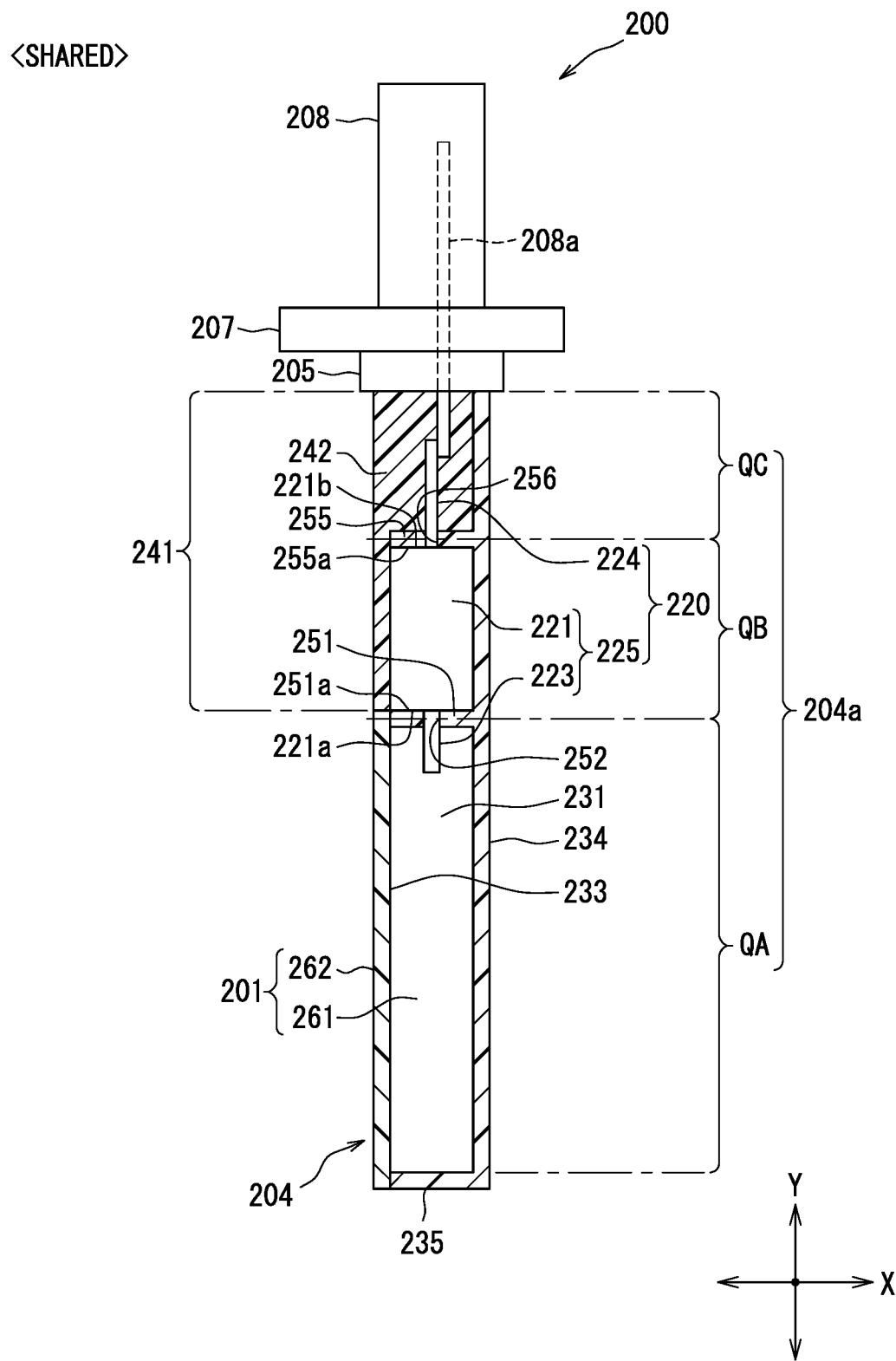
FIG. 63 is a cross-sectional view taken along a line LXIII-LXIII line of FIG. 61.
Figure 64:
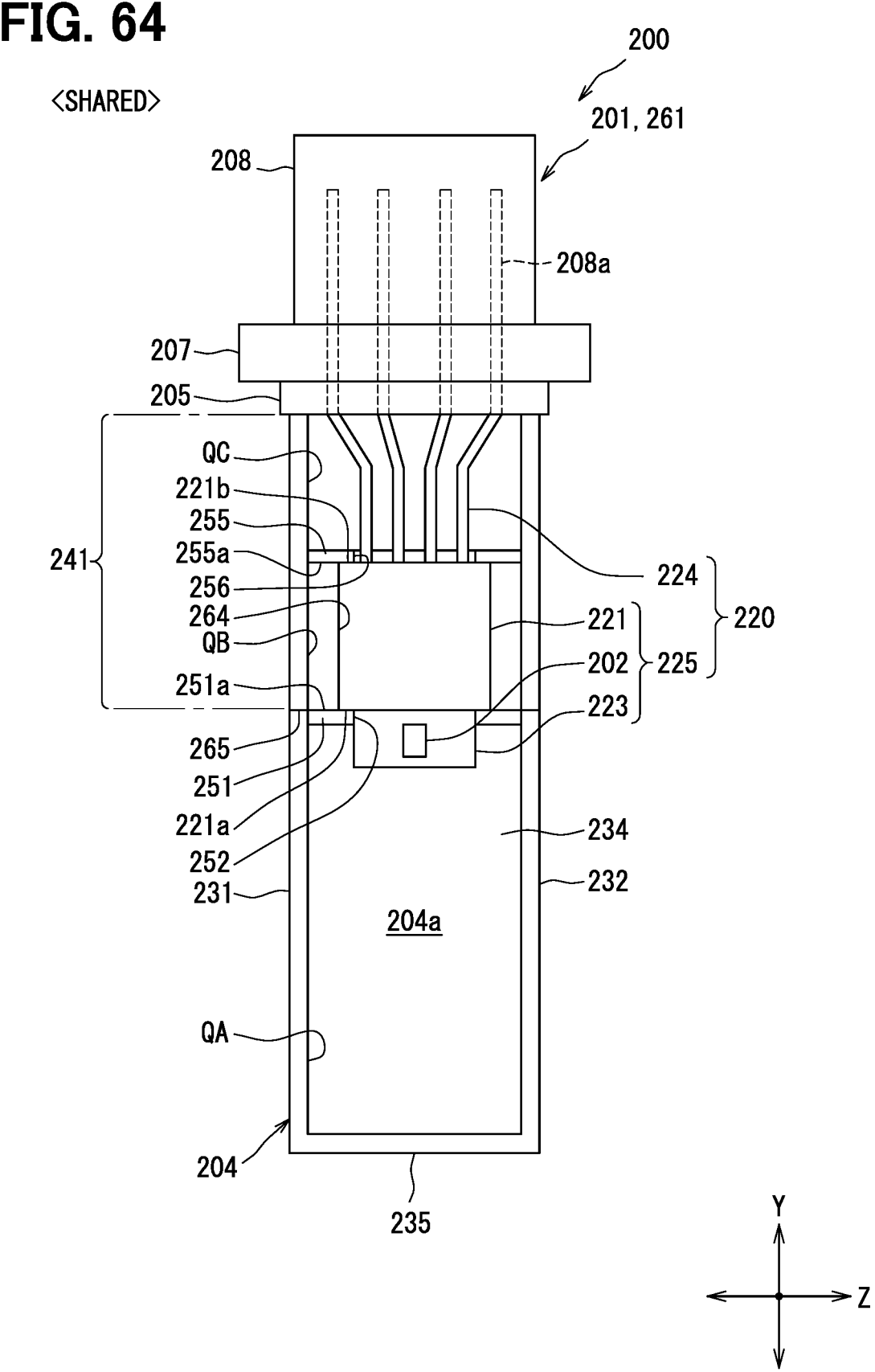
FIG. 64 is a view showing an internal structure of the housing in a state where the potting portion and the cover member are removed.

The sensor SA 220 is held in position so as not to be displaced in the internal space 204a. As shown in FIGS. 63 and 64, the housing body 204 includes regulation portions 251 and 255 for regulating positional deviation of the sensor SA 220. Each of the regulation portions 251 and 255 is formed in a plate shape, and is provided at a predetermined interval in the height direction Y in a state in which each plate surface of the regulation portions 251 and 255 is directed in the height direction Y. The regulation portions 251 and 255 are provided at an intermediate position of the housing body 204 in the height direction Y.

The regulation portions 251 and 255 are opposed to each other, and the sensor SA 220 is inserted between the regulation portions 251 and 255. The SA base portion 221 of the sensor SA 220 is fitted between the regulation portions 251 and 255, and the SA base portion 221 is caught by the regulation portions 251 and 251, thereby regulating the sensor SA 220 from moving in the height direction Y. The first regulation portion 251 is provided on the housing tip side of the SA base portion 221, and the second regulation portion 255 is provided on the housing base end side of the SA base portion 221. The sensor SA 220 is hardly moved in the width direction X and the depth direction Z because the SA base portion 221 is sandwiched between the regulation portions 251 and 255.

The internal space 204a has a flow channel region QA defining the bypass flow channel 210 (refer to FIG. 61), a support region QB accommodating the SA base portion 221, and a connector region QC accommodating connection portions between the connector terminals 208a and the lead terminals 224. In the height direction Y, the support region QB is disposed between the flow channel region QA and the connector region QC. The flow channel region QA and the support region QB are separated by the first regulation portion 251, and the support region QB and the connector region QC are separated by the second regulation portion 255. An end face of the sealing holder 205 on the housing base end side faces the second regulation portion 255 across the connector region QC, and the connector region QC is also partitioned by those sealing holders 205. In the height direction Y, a boundary between the flow channel region QA and the support region QB is disposed at the center of the first regulation portion 251, and a boundary between the support region QB and the connector region QC is disposed at the center of the second regulation portion 255.

The potting portion 242 is not filled in all regions of the internal space 204a, but is filled in the support region QB and the connector region QC, but is not filled in the flow channel region QA. The support region QB and the connector region QC are regions opened to the outside through the housing opening 241, and the operator can inject the thermosetting resin from the housing opening 241 into the support region QB and the connector region QC.

The first regulation portion 251 is provided between the front wall portion 233 and the back wall portion 234 in the width direction X, and extends over the wall portions 233 and 234. The first regulation portion 251 is provided between the upstream wall portion 231 and the downstream wall portion 232 in the depth direction Z, and extends over the wall portions 231 and 232. The first regulation portion 251 is provided with a first insertion portion 252 through which the detection support portion 223 of the sensor SA 220 is inserted. The first insertion portion 252 is a notch that penetrates through the first regulation portion 251 in the height direction Y, and extends from the front end portion of the first regulation portion 251 toward the back wall portion 234 at an intermediate position of the first regulation portion 251 in the depth direction Z. The first insertion portion 252 may be a through hole penetrating through the first regulation portion 251.

The sensor SA 220 and the first regulation portion 251 are in close contact with each other so that the thermosetting resin injected into the support region QB and the connector region QC does not leak into the flow channel region QA from between the sensor SA 220 and the first regulation portion 251 at the time of manufacturing the air flow meter 200. Specifically, an end face of the SA base portion 221 on the housing tip side and an outer peripheral surface of the first regulation portion 251 abut against each other so as to overlap with each other, and an inner peripheral surface of the first insertion portion 252 and an outer peripheral surface of the detection support portion 223 abut against each other so as to overlap with each other. In addition, because the SA base portion 221 and the front wall portion 233 are in contact with each other, the thermosetting resin is prevented from leaking from a gap between the detection support portion 223 and the front wall portion 233.

Like the first regulation portion 251, the second regulation portion 255 is provided between the upstream wall portion 231 and the downstream wall portion 232 in the depth direction Z, and extends over the wall portions 231 and 232. On the other hand, unlike the first regulation portion 251, the second regulation portion 255 extends from the back wall portion 234 toward the housing opening 241 in the width direction X, and is not connected to the front wall portion 233. The second regulation portion 255 is provided with a second insertion portion 256 through which the lead terminals 224 of the sensor SA 220 are inserted. The second insertion portion 256 is a notch that penetrates through the second regulation portion 255 in the height direction Y, and extends from the front end portion of the second regulation portion 255 toward the back wall portion 234 at an intermediate position of the second regulation portion 255 in the depth direction Z.

In the second regulation portion 255, as described above, the SA base portion 221 comes in contact with the second regulation portion 255, thereby regulating the sensor SA 220 from moving toward the housing base end side. The SA base portion 221 is sandwiched between the front wall portion 233 and the back wall portion 234. In this instance, the front surface of the SA base portion 221 comes in contact with the front wall portion 233, and the back surface of the SA base portion 221 comes in contact with the back wall portion 234, thereby regulating the sensor SA 220 from moving in the width direction X.

The back wall portion 234 is provided with an accommodating recess portion 264 for accommodating the back plate surface of the SA base portion 221. The accommodating recess portion 264 is defined by recessing the inner peripheral surface of the back wall portion 234 toward the outer peripheral side, and is disposed at an intermediate position between the upstream wall portion 231 and the downstream wall portion 232 in the depth direction Z. The SA base portion 221 is fitted in the accommodating recess portion 264, and the inner peripheral surface of the accommodating recess portion 264 regulates the sensor SA 220 from moving in the depth direction Z.

Unlike the housing 21 of the first embodiment, the housing 201 is formed by assembling multiple components together. The housing 201 includes a base member 261 and a cover member 262. The cover member 262 has at least a front wall portion 233 of the housing body 204, and is integrally molded as a member separate from the base member 261. The base member 261 includes a portion of the housing body 204 excluding the cover member 262, a sealing holder 205, a flange portion 207, and a connector portion 208, and those portions are integrally molded.

An internal space of the base member 261 is opened toward a side opposite to the back wall portion 234 across the upstream wall portion 231, the downstream wall portion 232, and the tip wall portion 235, because the base member 261 does not have the front wall portion 233. When the open portion is referred to as a base opening 263, the base opening 263 is closed by the cover member 262 and the potting portion 242 in a state where the housing 201 is completed.

An accommodation notch portion 265 accommodating the cover member 262 is provided in the base member 261 so that a step does not occur at the boundary between the base member 261 and the cover member 262 on the surface of the housing body 204. The accommodation notch portion 265 extends over the upstream wall portion 231, the downstream wall portion 232, the tip wall portion 235, and the first regulation portion 251, and notches the front end portion of the base member 261. Since the cover member 262 enters the accommodation notch portion 265, a portion formed by the upstream wall portion 231 and the downstream wall portion 232 and a portion formed by the cover member 262 are flush with each other on the surface of the housing body 204.

In the present embodiment, the flow rate detector 202 corresponds to a physical quantity detector, and the sensor SA 220 corresponds to a detection unit. In FIG. 63, FIG. 64, and the like, illustration of the bypass flow channel 210 is omitted. FIG. 63 is a partial cross-sectional view showing a cross section of only a portion of the housing 201 closer to the housing tip side than the sealing holder 205. FIG. 64 is a view of the housing 201 seen from the open side of the base member 261 in a state where the potting portion 242 and the cover member 262 are removed.

Next, referring to FIGS. 65 to 68, a manufacturing method of the air flow meter 200 will be described focusing on a procedure of mounting the sensor SA 220 to the housing 201.

Figure 65:
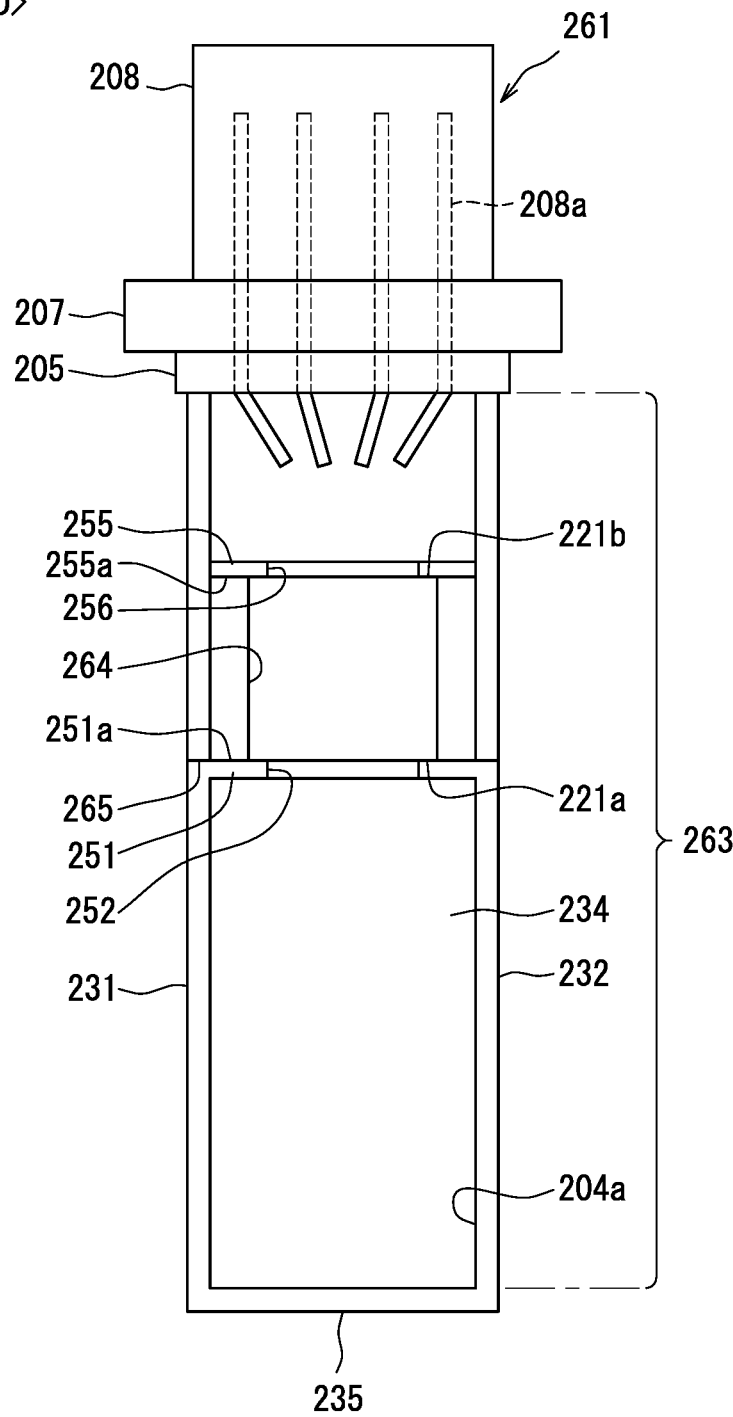
FIG. 65 is a view showing a base member.

In the housing body 204, the base member 261 and the cover member 262 are produced by performing resin molding. In the production of the base member 261, the base member 261, which is in a state where the connector terminals 208a are embedded, is molded with resin by temporarily detachably attaching the connector terminals 208a to a mold device such as a mold, and injecting molten resin into the mold device in this state, thereby molding the base member 261. When the mold device is to be removed from the base member 261, the temporary attachment of the connector terminals 208a to the mold device is released, and the mold device is removed from the base member 261. In the resin-molded base member 261, as shown in FIG. 65, one end portions of the connector terminals 208a protrude from the sealing holder 205 toward the housing tip side.

Figure 66:
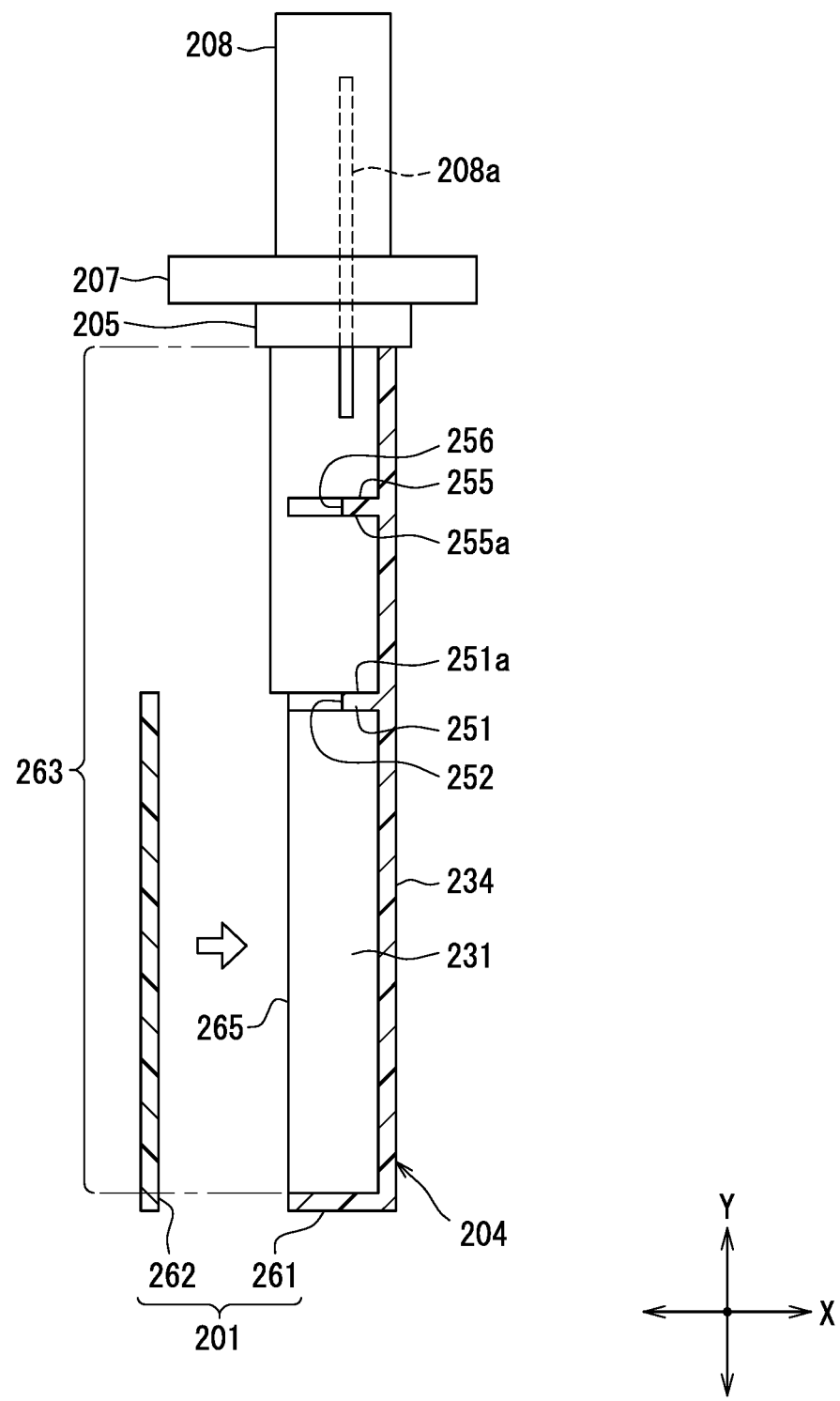
FIG. 66 is a view illustrating the attachment of a cover to the base member.

Then, as shown in FIG. 66, the cover member 262 is attached to the base member 261 so that a part of the base opening 263 is closed with the cover member 262. As a result, the housing 201, the housing body 204, and the housing opening 241 are produced. In this example, the base member 261 and the cover member 262 are joined to each other by bonding or welding in a portion where the base member 261 and the cover member 262 are in contact with each other.

Figure 67:
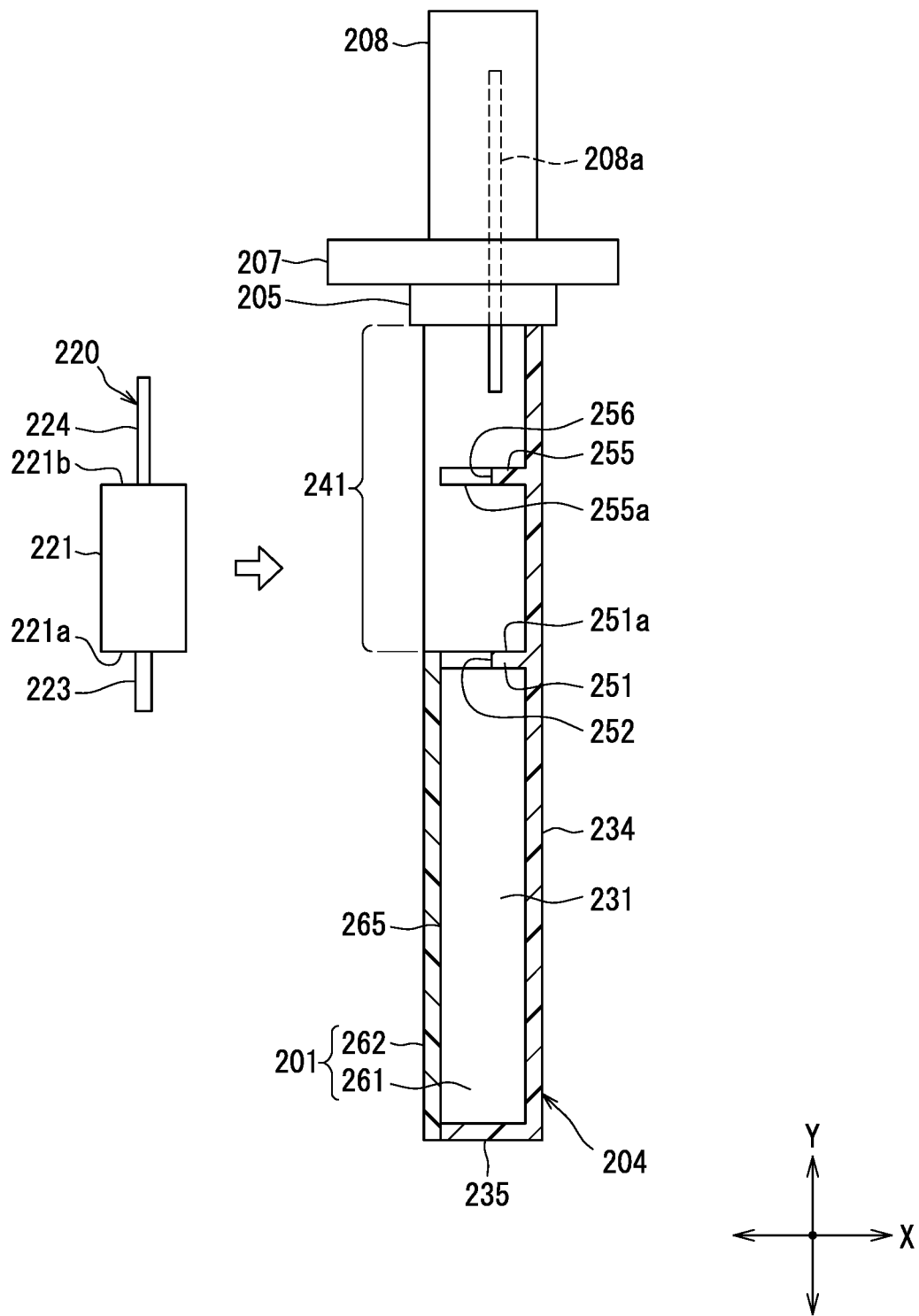
FIG. 67 is a view illustrating the attachment of a sensor SA to a housing body.

Subsequently, as shown in FIG. 67, the sensor SA 220 is attached to the housing body 204 by inserting the sensor SA 220 into the internal space 204a from the housing opening 241. In this example, the sensor SA 220 is pushed in such a manner that the SA base portion 221 is fitted between the first regulation portion 251 and the second regulation portion 255 while the detection support portion 223 is inserted into the first insertion portion 252, and the SA base portion 221 is also fitted into the accommodating recess portion 264.

Thereafter, the lead terminals 224 and the connector terminals 208a are electrically connected to each other by welding or the like.

Figure 68:
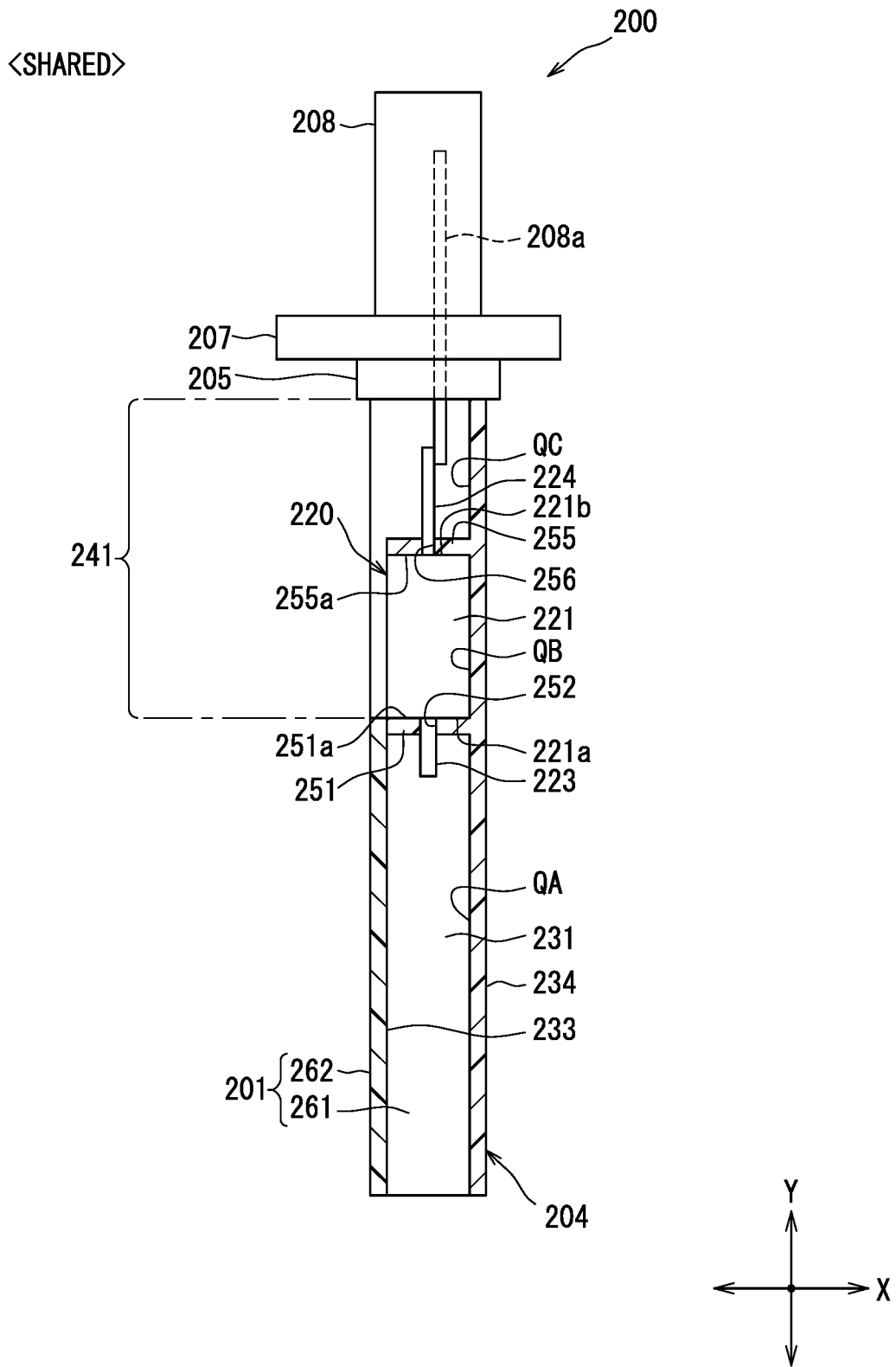
FIG. 68 is a view illustrating the formation of the potting portion in the housing.

As shown in FIG. 68, after the housing body 204 has been completed by assembling the cover member 262 to the base member 261, the thermosetting resin in a fluid state is injected from the housing opening 241 into the support region QB and the connector region QC. The support region QB and the connector region QC are filled with the thermosetting resin so that the connector terminals 208a, the lead terminals 224, and the sensor SA 220 are not exposed from the housing opening 241. Thereafter, the thermosetting resin is cured by heating to form the potting portion 242.

<Description of Configuration Group C>

Figure 69:
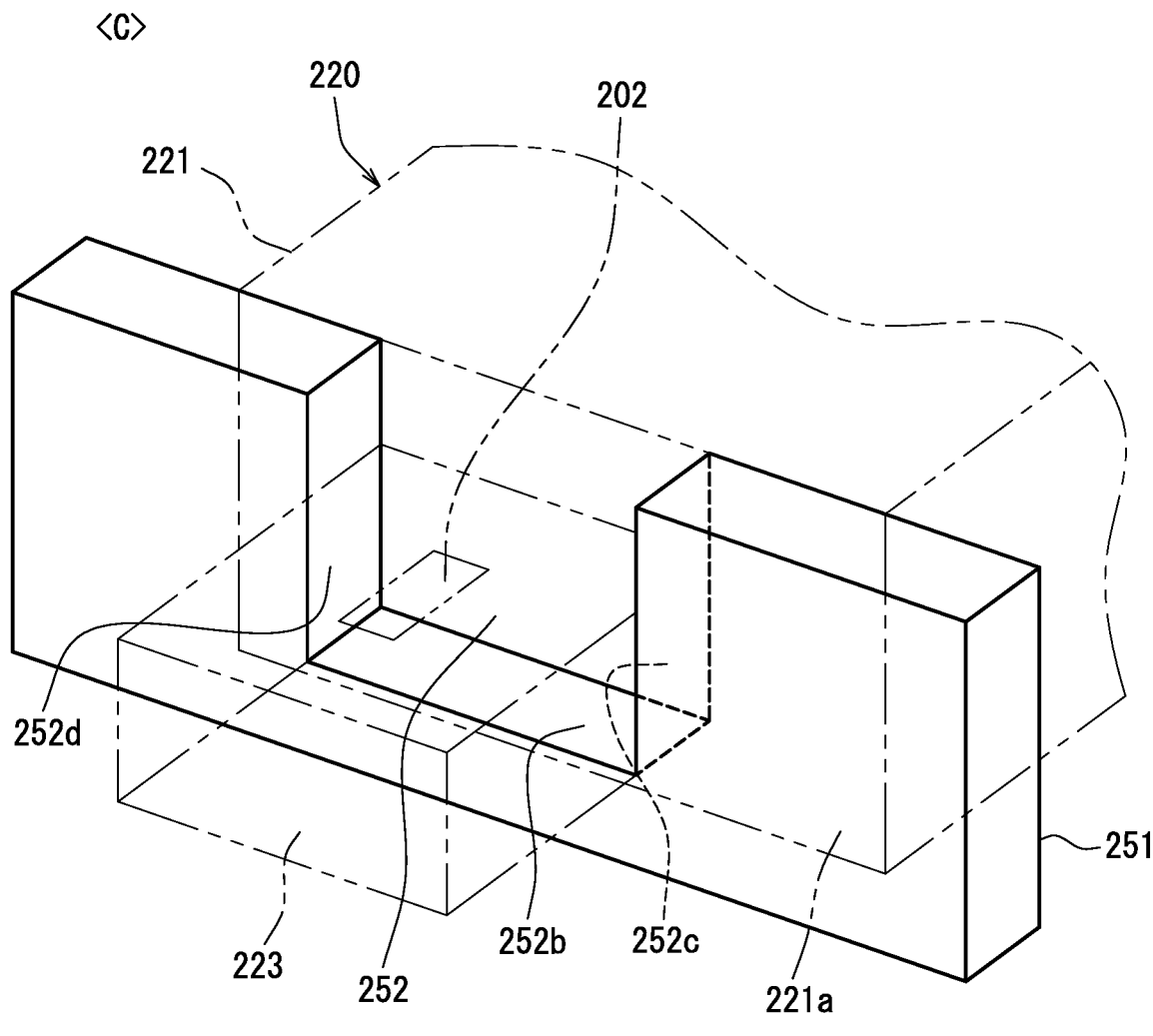
FIG. 69 is a perspective view of a first regulation portion in a configuration group C.

The configuration group C relating to the positional relationship between the housing attachment and the position holder will be described with reference to FIGS. 61 to 64, 69 to 71, and the like. In FIG. 69, the upstream wall portion 231, the downstream wall portion 232, the front wall portion 233, and the back wall portion 234 of the base member 261 of the housing body 204 are not illustrated.

In FIGS. 61 to 64, the sealing holder 205 is thicker than the housing body 204. In the sealing holder 205, like the ring holding portion 25 of the first embodiment, the outer peripheral end of the lateral cross section is circular, while the housing body 204 extending from the end face of the sealing holder 205 on the housing tip side is rectangular in lateral cross section. The sealing holder 205 is thick so as to be able to secure a strength necessary for supporting the air flow meter 200. In the housing 201, the housing attachment attached to the intake pipe 12a includes the sealing holder 205 and the flange portion 207.

As described above, in the housing body 204, the first regulation portion 251 and the second regulation portion 255 regulate the movement of the sensor SA 220, and each of the regulation portions 251 and 255 corresponds to a position holder. In the housing body 204, the upstream wall portion 231, the downstream wall portion 232, and the back wall portion 234 connect the sealing holder 205 and the regulation portions 251 and 255, and those wall portions 231, 232, and 234 correspond to a housing connector. The internal space 204a corresponds to an accommodation space in which the sensor SA 220 is accommodated.

In the first regulation portion 251, the plate surface 251a on the housing base end side comes in contact with the SA base portion 221, and the plate surface 251 regulates the sensor SA 220 from moving toward the housing tip side. In the second regulation portion 255, the plate surface 255a on the housing tip side comes in contact with the SA base portion 221, and the plate surface 255a regulates the sensor SA 220 from moving toward the housing base end side. In this instance, the plate surfaces 251a and 255a are positioned and held so that the sensor SA 220 does not move in the height direction Y, and in particular, the plate surface 251a of the first regulation portion 251 corresponds to a third holding portion.

In the SA base portion 221, the end face 221a on the housing tip side comes in contact with the plate surface 251a of the first regulation portion 251, and the end face 221b on the housing base end side comes in contact with the plate surface 255a of the second regulation portion 255. In this case, the end faces 221a and 221b of the SA base portion 221 correspond to a unit contact portion that is in contact with the third holding portion.

As described above, since the outer peripheral surface of the detection support portion 223 comes in contact with the inner peripheral surface of the first insertion portion 252, the sensor SA 220 is regulated from moving in the width direction X and the depth direction Z. As shown in FIG. 69, the inner peripheral surface of the first insertion portion 252 includes a front inner surface 252a, a back inner surface 252b, an upstream inner surface 252c, and a downstream inner surface 252d.

The front inner surface 252a and the back inner surface 252b are aligned in the width direction X, and the front inner surface 252a comes in contact with the front surface of the detection support portion 223, and the back inner surface 252b comes in contact with the back surface of the detection support portion 223. The front inner surface 252a and the back inner surface 252b hold the sensor SA 220 in position so as not to move in the width direction X, and correspond to a first holding portion. The upstream inner surface 252c and the downstream inner surface 252d are aligned in the depth direction Z, the upstream inner surface 252c is disposed on the upstream wall portion 231 side of the housing body 204, and the downstream inner surface 252d is disposed on the downstream wall portion 232 side. Both of the upstream inner surface 252c and the downstream inner surface 252d are in contact with the side surface of the detection support portion 223, so that the sensor SA 220 is held in position so as not to move in the depth direction Z, and correspond to a second holding portion.

In the present embodiment, as in the first embodiment, the width direction X corresponds to a first direction, and the depth direction Z corresponds to a second direction. The plate surface 251a of the first regulation portion 251 and the inner surfaces 252a to 252d of the first insertion portion 252 may also be referred to as positioning surfaces.

Figure 70:
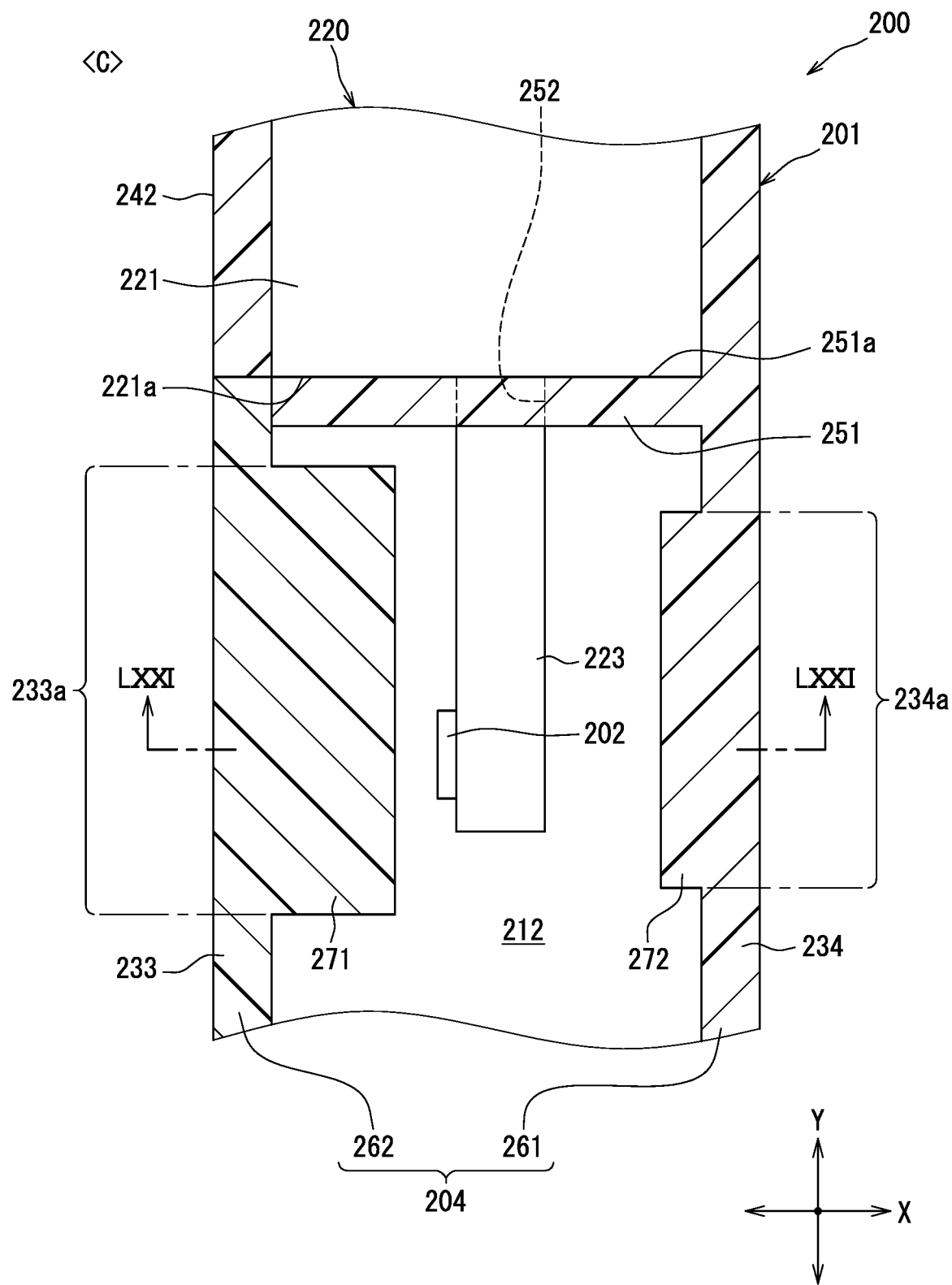
FIG. 70 is an enlarged view of the periphery of a flow rate detector in FIG. 63.
Figure 71:
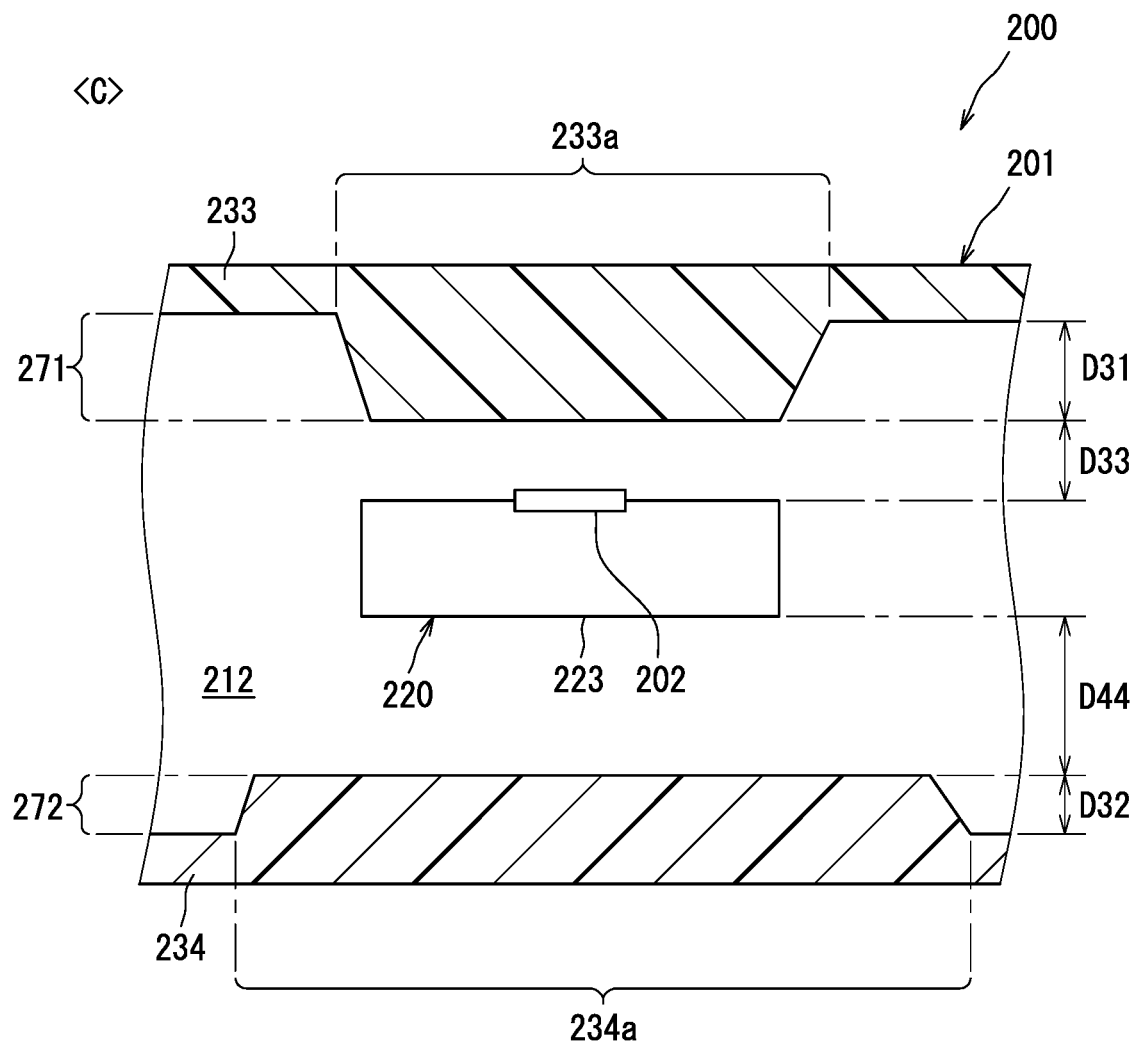
FIG. 71 is a cross-sectional view taken along a line LXXI-LXXI of FIG. 70.

As shown in FIGS. 70 and 71, the housing body 204 has throttle portions 271 and 272 for throttling the measurement flow channel 212 by reducing a flow channel area of the measurement flow channel 212. The front throttle portion 271 is a projection portion extending from the front wall portion 233 toward the back wall portion 234, and the back throttle portion 272 is a projection portion extending from the back wall portion 234 toward the front wall portion 233. The front throttle portion 271 and the back throttle portion 272 face each other across the detection support portion 223, and the flow rate detector 202 is disposed between the throttle portions 271 and 272. In this case, the flow rate detector 202 faces the front throttle portion 271.

In the measurement flow channel 212, a region around the flow rate detector 202 is narrowed by the throttle portions 271 and 272, so that the intake air reaching the flow rate detector 202 is regulated. In this case, turbulence is less likely to occur in the flow of the intake air in the vicinity of the flow rate detector 202, and the detection accuracy of the flow rate detector 202 can be inhibited from being lowered due to the turbulence. Like the flow rate detector 22 of the first embodiment, the flow rate detector 202 is a detector using the heat radiation amount of the heat generation portion, and it is preferable that the flow rate of the intake air in the vicinity of the flow rate detector 202 is large to some extent in order to keep the detection accuracy of the flow rate detector 202 appropriate. On the other hand, in the present embodiment, since the flow velocity of the intake air tends to increase because the measurement flow channel 212 is narrowed by the throttle portions 271 and 272 toward the flow rate detector 202, the detection accuracy of the flow rate detector 202 can be optimized.

When a portion of the front wall portion 233 where the front throttle portion 271 is formed is referred to as a front forming portion 233a, the front forming portion 233a is thicker than other portions of the front wall portion 233.

Similarly, a portion of the back wall portion 234 where the back throttle portion 272 is formed is referred to as a back forming portion 234a, and the back forming portion 234a is thicker than other portions of the back wall portion 234.

In this example, in the back wall portion 234, there is a concern that the deformation caused by the resin molding may occur in the back forming portion 234a at the time of manufacturing the air flow meter 200 since the back forming portion 234a is thick. On the other hand, in the base member 261 in which the back wall portion 234 and the first regulation portion 251 are integrally molded, the back throttle portion 272 is separated from the first regulation portion 251 toward the housing tip side in the height direction Y. In this case, even if the deformation caused by the resin molding occurs in the back forming portion 234a, it is considered that the deformation is absorbed in a portion between the first regulation portion 251 and the back forming portion 234a in the back wall portion 234. For that reason, the position and shape of the first regulation portion 251 are less likely to change with the deformation of the back forming portion 234a, as a result of which, the positional deviation of the flow rate detector 202 is reduced.

In the housing body 204, the front forming portion 233a is thicker than the back forming portion 234a. In this case, in the width direction X, a protrusion dimension D31 of the front throttle portion 271 from the front wall portion 233 is larger than a protrusion dimension D32 of the back throttle portion 272 from the back wall portion 234. For that reason, even if the front forming portion 233a is thinned as much as possible so as not to be deformed by the resin molding, the degree of throttling of the measurement flow channel 212 can be appropriately increased so that the detection accuracy of the flow rate detector 202 can be optimized by adjusting the thickness of the front forming portion 233a. As described above, the cover member 262 having the front forming portion 233a and the base member 261 having the first regulation portion 251 are separate members. In this case, even if the deformation attributable to the resin molding occurs in the front forming portion 233a, the position and shape of the first regulation portion 251 do not change due to the deformation, and therefore, the positional deviation of the flow rate detector 202 does not occur due to the thickness increase of the front forming portion 233a.

In the width direction X, a separation distance D33 between the front surface of the detection support portion 223 and the front throttle portion 271 is smaller than a separation distance D34 between the back surface of the detection support portion 223 and the back throttle portion 272. In the measurement flow channel 212, a region between the detection support portion 223 and the front throttle portion 271 has a larger degree of throttling than a region between the detection support portion 223 and the back throttle portion 272. If the measurement flow channel 212 is narrowed by the front throttle portion 271, the back throttle portion 272 is not necessarily provided.

In the configuration group C, according to the present embodiment, in the housing 201, the first regulation portion 251 and the second regulation portion 255 are separated from the sealing holder 205 toward the housing tip side. For that reason, the thickness of the sealing holder 205 can be increased to improve the strength, while the thickness of the regulation portions 251 and 255 can be reduced. Since the thinning of the regulation portions 251 and 255 is achieved in this manner, the shapes of the regulation portions 251 and 255 are less likely to vary from product to product, so that the position of the sensor SA 220 positioned by the regulation portions 251 and 255 is less likely to vary. Therefore, the detection accuracy of the flow rate detector 202 can be inhibited from varying from product to product.

According to the present embodiment, in the first regulation portion 251, the front inner surface 252a and the back inner surface 252b regulate the movement of the sensor SA 220 in the width direction X, and the upstream inner surface 252c and the downstream inner surface 252d regulate the movement of the sensor SA 220 in the depth direction Z. In this instance, in the first regulation portion 251, since the deformation caused by the resin molding is hardly generated in those inner surfaces 252a to 252d, the position of the sensor SA 220 in the width direction X and the depth direction Z can be inhibited from varying from product to product.

According to the present embodiment, in the first regulation portion 251, the plate surface 251a on the housing base end side regulates the movement of the sensor SA 220 toward the housing tip side. In this instance, in the first regulation portion 251, the plate surface 251a is also less likely to be deformed due to resin-molding, so that the position of the sensor SA 220 in the height direction Y can be inhibited from varying from product to product.

According to the present embodiment, in the sensor SA 220, the end face 221a at the housing tip side is provided between the lead terminals 224 and the flow rate detector 202 at a position closer to the flow rate detector 202. In this instance, even if the position of the sensor SA 220 is deviated so as to rotate about the contact portion with the first regulation portion 251 as a fulcrum, the amount of positional deviation of the flow rate detector 202 can be reduced as compared with a configuration in which the end face 221a is provided at a position closer to the lead terminals 224, for example. For that reason, the detection accuracy of the flow rate detector 202 can be inhibited from being deteriorated.

According to the present embodiment, since the sealing holder 205 is connected to the first regulation portion 251 and the second regulation portion 255 by the upstream wall portion 231, the downstream wall portion 232, and the back wall portion 234, a configuration can be realized in which the sealing holder 205 is separated from the regulation portions 251 and 255. In this case, even if the deformation caused by the resin molding occurs in the sealing holder 205, the deformation is absorbed by the wall portions 231, 232, and 234, so that the positions and shapes of the regulation portions 251 and 255 are less likely to change with the deformation of the sealing holder 205. For that reason, the positioning accuracy of the sensor SA 220 by the regulation portions 251 and 255 can be inhibited from being deteriorated.

According to the present embodiment, at the time of manufacturing the air flow meter 200, the sensor SA 220 is inserted into the base member 261 through the base opening 263. When the sensor SA 220 is attached to the base member 261 in this manner, the first regulation portion 251 of the base member 261 is less likely to be deformed by the resin molding, so that the positioning accuracy of the sensor SA 220 by the first regulation portion 251 can be improved.

<Description of Configuration Group E>

A configuration group E relating to the position of the connector terminals will be described with reference to FIG. 72 and the like.

As shown in FIG. 72, the connector terminals 208a extend between the connector portion 208 and the internal space 204a. The connector terminals 208a each include a first terminal portion 282a disposed in the connector portion 208, a second terminal portion 282b disposed in the internal space 204a, and a connection terminal portion 282c connecting the terminal portions 282a and 282b. In the connector terminal 208a, one end portion is included in the first terminal portion 282a, and the other end portion is included in the second terminal portion 282b. The first terminal portion 282a extends in the connector portion 208 in a direction away from the housing body 204. The second terminal portion 282b extends away from the connector portion 208 in the internal space 24a. The second terminal portion 282b is disposed between the housing opening 241 and the back wall portion 234.

In the connector terminal 208a, at least the connection terminal portion 282c is embedded in the housing 201. The connector terminal 208a is fixed to the housing 201 by the embedded portion. The connector terminal 208a does not protrude into the support region QB, and the entire second terminal portion 282b is accommodated in the connector region QC.

In the present embodiment, the second terminal portion 282b corresponds to a protrusion terminal portion. In the sensor SA 220, the lead terminal 224 corresponds to a detection terminal, and the SA main body 225 corresponds to a unit main body. The width direction X corresponds to a direction in which the detection unit and the housing opening are aligned.

In the sensor SA 220, the SA main body 225 is disposed at a position extending across the flow channel region QA and the support region QB in the height direction Y, and the lead terminals 224 are disposed at a position extending over a boundary between the support region QB and the connector region QC in the height direction Y. In this case, the flow channel region QA and the support region QB configure the main body region.

The lead terminals 224 and the connector terminal 208a are connected to each other in the connector region QC, and in the connection portion, the connector terminals 208a do not enter between the lead terminals 224 and the housing opening 241 in the width direction X. For example, in the connection portion, the lead terminals 224 are disposed between the connector terminals 208a and the housing opening 61 in the width direction X. The lead terminals 224 and the connector terminal 208a may be aligned laterally in the depth direction Z. In both cases, the connector terminals 208a do not enter the internal space 204a between the sensor SA 220 and the housing opening 241 in the width direction X.

Next, a manufacturing method of the air flow meter 200 will be described with reference to FIG. 72, center on the fact that the lead terminals 224 and the connector terminals 208a are directly connected to each other.

After the cover member 262 has been attached to the housing 201 molded with resin, the sensor SA 220 is inserted into the internal space 204a through the housing opening 241. In this example, the sensor SA 220 is pushed into the internal space 204a until the SA main body 225 is caught by the back wall portion 234 or the first regulation portion 251. In this example, it is assumed that the lead terminals 224 come into contact with the connector terminals 208a before the SA main body 225 is caught by the back wall portion 234 or the first regulation portion 251. On the other hand, at least one of the lead terminals 224 and the connector terminals 208a are deformed, so that the sensor SA 220 can be pushed into the internal space 204a further deeply. For that reason, even if the lead terminals 224 are disposed at the positions extending across the boundary between the flow channel region QA and the support region QB, the positional deviation of the sensor SA 220 is inhibited from occurring due to the lead terminals 224 being caught by the connector terminals 208a.

After the sensor SA 220 has been installed in the internal space 204a, a step of connecting the lead terminals 224 and the connector terminals 208a with the use of a joining tool is performed. In this step, as in the first embodiment, the lead terminals 224 and the second terminal portions 282b are directly joined to each other by sandwiching the lead terminals 224 and the second terminal portions 282b between a pair of welding electrodes. Thereafter, a thermosetting resin is injected into the internal space 204a to form the potting portion 242.

In the configuration group E, according to the present embodiment, in the internal space 204a of the housing 201, the connector terminals 208a do not enter between the housing opening 241 and the sensor SA 220 in the width direction X. For that reason, after the connector terminals 208a have been attached to the housing 201, the sensor SA 220 can be inserted into the internal space 204a from the housing opening 241. This eliminates the need for attaching the connector terminals 208a to the housing 201 after the sensor SA 220 has been installed in the internal space 204a. For that reason, the sensor SA 220 can be inhibited from being positionally deviated due to an impact or the like caused by the attachment of the connector terminals 208a to the housing 201.

According to the present embodiment, in the internal space 204a, the second terminal portions 282b of the connector terminals 208a are accommodated in the flow channel region QA and the support region QB in a state where the second terminal portions 282b do not protrude into the connector region QC. For that reason, a configuration can be realized in which the second terminal portions 282b are not inserted between the housing opening 241 and the sensor SA 220 in the width direction X. When inserting the sensor SA 220 into the internal space 204a from the housing opening 241, the operator simply prevents the SA main body 225 from entering the connector region QC, thereby being capable of preventing the SA main body 225 from coming in contact with the second terminal portions 282b. This makes it possible to inhibit the SA main body 225 and the connector terminals 208a from being damaged or deformed when the SA main body 225 and the connector terminals 208a are contacted with each other due to the attachment of the sensor SA 220 to the housing 201.

According to the present embodiment, in the internal space 204a, the lead terminals 224 of the sensor SA 220 are disposed at positions that extend across the boundary between the support region QB and the connector region QC. In this case, the lead terminals 224 can be connected directly to the connector terminals 208a. For that reason, the number of welding operations performed in the internal space 204a for electrically connecting the lead terminals 224 and the connector terminals 208a can be minimized. For that reason, the positional deviation of the sensor SA 220 can be inhibited from occurring due to the weld operation in the internal space 204a.

According to the present embodiment, the connector terminals 208a are temporarily attached to the mold device used for resin molding of the base member 261, so that the base member 261 can be molded in a state in which at least a part of the connector terminals 208a is embedded. For that reason, the positional deviation of the connector terminal 208a with respect to the base member 261 can be inhibited from occurring.

According to the present embodiment, the sensor SA 220 and the connector terminals 208*a* are covered with the thermosetting resin injected into the internal space 204*a* from the housing opening 241. For that reason, the positional deviation of the sensor SA 220 and the deformation or breakage of the lead terminals 224 and the connector terminals 208*a* can be inhibited by the potting portion 242 made of the thermosetting resin.

<Description of Configuration Group F>

A configuration group F relating to covering the detection unit will be described with reference to FIG. 72 and the like.

As shown in FIG. 61, the housing opening 241 is disposed between the sealing holder 205 and the inflow port 213*a* in the height direction Y. In this example, if the housing attachment is configured to include the sealing holder 205 and the flange portion 207, the housing opening 241 is disposed between the housing attachment and the inflow port 213*a*. As described above, in FIG. 72, the lead terminals 224 of the sensor SA 220 and the connector terminals 208*a* are connected to each other, and a connection portion 291 is accommodated in the connector region QC. The support region QB and the connector region QC configure a sealing region, and the potting portion 242 corresponds to a filling portion. A thermosetting resin which is filled in the internal space 204*a* and then cured to form the potting portion 242 corresponds to a filler.

In the configuration group F, according to the present embodiment, since the potting portion 242 is formed by injecting the thermosetting resin into the internal space 204*a*, when the internal space 204*a* is sealed, a pressure is hardly applied to the internal space 204*a*. In this case, since the positional deviation of the sensor SA 220 is inhibited from being unintentionally caused by the pressure applied to the internal space 204*a*, the positional deviation of the sensor SA 220 hardly varies from product to product. Therefore, the detection accuracy of the flow rate detector 202 can be inhibited from varying from product to product.

According to the present embodiment, in the internal space 204*a*, in addition to the sensor SA 220, the connection portion 291 between the lead terminals 224 and the connector terminals 208*a* is covered with the potting portion 242. For that reason, not only the sensor SA 220 but also the connection portion 291 can be protected by a sealing performance of the potting portion 242.

According to the present embodiment, the housing opening 241 is disposed between the sealing holder 205 and the inflow port 213*a* in the height direction Y. For that reason, a configuration can be realized in which the housing opening 241 is disposed in the intake passage 12 which is not outside the intake pipe 12*a* but inside the intake pipe 12*a*. In this case, since a heat is hardly directly applied to the potting portion 242 from a heat source such as the internal combustion engine 11, the deterioration of the potting portion 242 due to heat can be reduced. As a result, the sealing performance of the internal space 204*a* by the potting portion 242 can be exhibited for a long period of time.

<Description of Configuration Group G>

A configuration group G relating to the information portion will be described with reference to FIG. 73 and the like.

Figure 73:
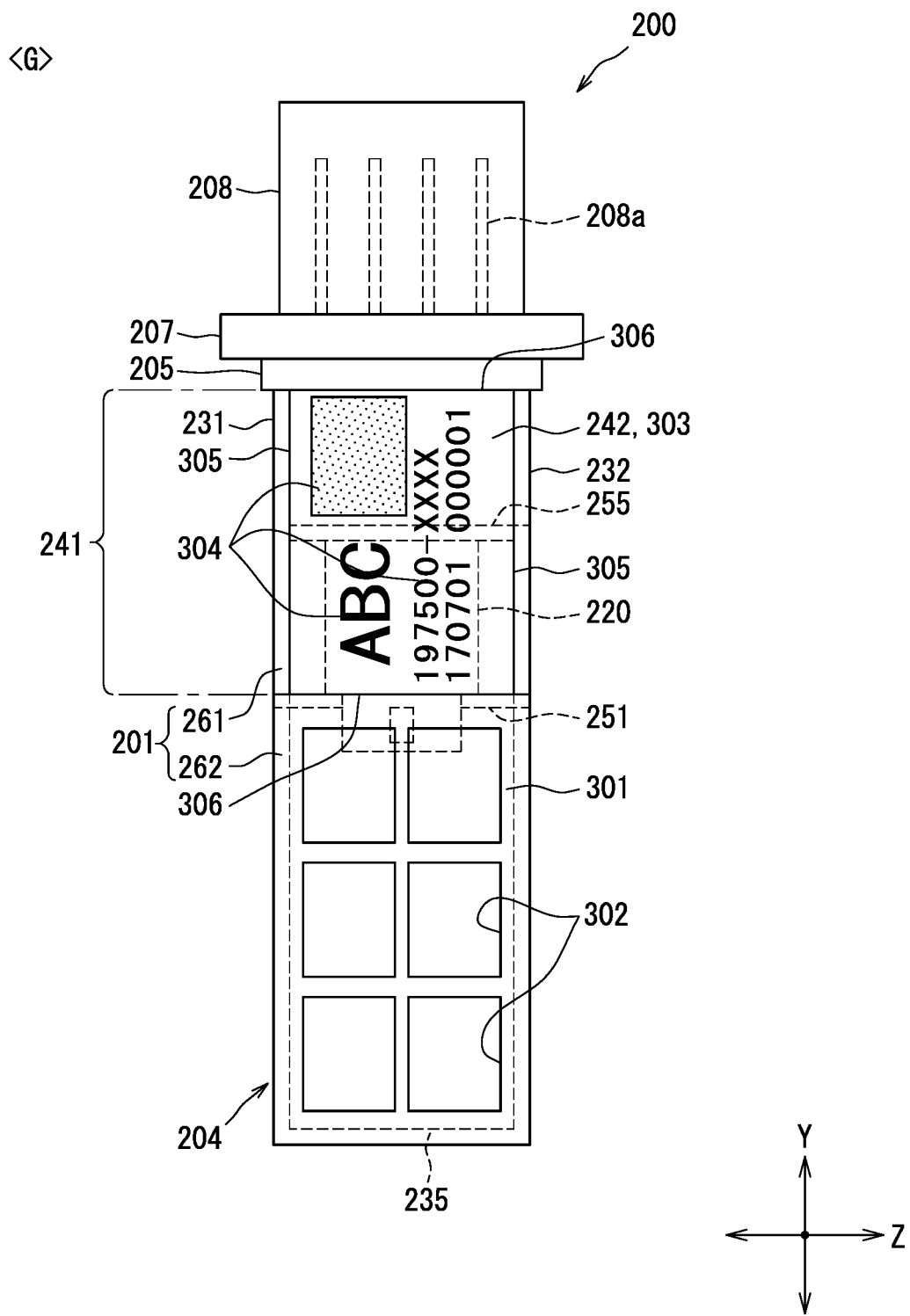
FIG. 73 is a front view of an air flow meter in a configuration group G.

As shown in FIG. 73, in the housing 201, when an outer surface of the front wall portion 233 is referred to as a housing front face 301 and an outer surface of the back wall portion 234 is referred to as a housing back face, the housing opening 241 is provided in the housing 201. A plurality of thinned portions 302 recessed toward the back wall portion 234 are provided on the housing front face 301. The thinned portions 302 are provided on the cover member 262 forming the housing front face 301. The housing front face 301 corresponds to a housing front face which is one surface of the housing.

The housing opening 241 is an open end portion of the internal space 204*a*, and as described above, the internal space 204*a* is sealed from the housing opening 241 side by the potting portion 242. In the potting portion 242, the potting surface 303, which is an outer surface thereof, faces away from the sensor SA 50 in the width direction X, as with the housing front face 301. Further, the potting material filled in the internal space 204*a* creeps up the inner peripheral surfaces of the support region QB and the connector region QC, so that the peripheral portion of the potting surface 303 is easily curved. However, as a whole of the potting surface 303, most portions except for the peripheral portion are flat surfaces. In this case, the potting portion 242 corresponds to a sealing portion, and the potting surface 303 corresponds to an outer surface of the sealing portion.

In the housing 201, the housing opening 241 is disposed between the sealing holder 205 and the inflow port 213*a* in the height direction Y. In this case, in a state in which the air flow meter 200 is attached to the intake pipe 12*a*, both the inflow port 213*a* and the potting portion 242 are disposed in the intake passage 12 inside the intake pipe 12*a*.

The housing opening 241 is formed in a rectangular shape as a whole. In this case, the housing opening 241 has a pair of first side portions 305, which are long sides, and a pair of second side portions 306, which are short sides, and has a flat shape extending in the height direction Y as a whole. In this case, the first side portions 305 extend in the height direction Y, and the second side portions 306 extend in the depth direction Z. In the present embodiment, the four corners of the housing opening 241 are not chamfered, and the first side portions 305 and the second side portions 306 are directly connected to each other. The first side portions 305 correspond to opposite sides.

The potting surface 303 is provided with an information portion 304 similar to the information portion 194 in the first embodiment. In the information portion 304, a number string and a character string are aligned along the first side portions 305.

In the configuration group G, according to the present embodiment, since the potting portion 242 is formed by injecting the potting material into the internal space 204*a*, most of the potting surface 303 can be flattened. In addition, since the housing opening 241 and the internal space 204*a* are large enough to allow the sensor SA 220 to be inserted from the plate surface of the SA main body 225, the housing opening 241 and the internal space 204*a* are unlikely to cause a shortage of the potting surface 303 in displaying the information portion 304. As described above, since the potting surface 303 is planarized and enlarged, the visibility of the information portion 304 imparted to the potting surface 303 can be enhanced.

According to the present embodiment, in the internal space 204*a* of the housing 201, the SA main body 225 of the sensor SA 220 and the connector terminals 208*a* are aligned side by side in the height direction Y. For that reason, the width dimension of the internal space 204*a* and the width dimension of the housing opening 241 are increased in the height direction Y to such an extent that the SA main body 225 and the connector terminals 208*a* can be disposed laterally. In other words, the width dimension of the potting surface 303 increases in the height direction Y. In this case, since the size of the information portion 304 can be enlarged on the potting surface 303, the visibility of the information portion 304 can be enhanced.

According to the present embodiment, since the housing opening 241 is flattened as a whole so that the pair of first side portions 305 are long sides, an alignment direction of the information portions 304 can be clarified. In this case, since the number string and the character string of the information portion 304 are aligned along the first side portions 305 on the potting surface 303, the operator can be inhibited from reading the number string and the character string incorrectly. In this manner, the visibility of the information portion 304 can be enhanced by the shape of the potting surface 303.

According to the present embodiment, the housing front face 301 is provided with thinned portions 302. In this example, if an attempt is made to secure a flat surface on the housing front face 301 that is large enough to prevent the visibility of the information portion 304 from being insufficient, there is a fear that the thinned portions 302 on the housing front face 301 will be insufficient. If the housing front face 301 is short of the thinned portions 302, the cover member 262 becomes thick, which may cause unintentional deformation of the cover member 262 due to curing of the molten resin when molding the cover member 262. On the other hand, in the present embodiment, since the information portion 304 is provided on the potting surface 303, there is no need to secure a flat surface suitable for display of the information portion 304 on the housing front face 301. In this case, when a sufficient amount of the thinned portions 302 are disposed on the housing front face 301, the deformation of the cover member 262 due to resin molding can be reduced, and the visibility of the information portion 304 on the potting surface 303 can be enhanced.

According to the present embodiment, in the internal space 204a of the housing 201, the sensor SA 220 is covered with the potting portion 242. In this example, unlike the present embodiment, for example, in a configuration in which a lid member molded of resin as a member different from the housing 201 is attached to the housing opening 241, as the housing opening 241 is larger, the lid member becomes larger. When the lid member is increased in size, there is a need to form the thinned portions 302 on the lid member as well as on the cover member 262, which makes it difficult to secure a flat surface to the extent that the information portion 304 can be provided by the lid member.

On the other hand, according to the present embodiment, the potting portion 242 to which the information portion 304 is added does not need to form the thinned portions 302 because the resin molding is not performed. Moreover, in the potting portion 242 filled in the internal space 204a, the phenomenon that the potting surface 303 is inevitably flattened is leveraged, thereby being capable of disposing the information portion 304 almost entirely on the potting surface 303. Therefore, the visibility of the information portion 304 can be enhanced on the potting surface 303.

Fifth Embodiment

In the first embodiment, a part of the flow channel boundary portion 34 and a part of the outflow port 33b overlap with each other, but in a fifth embodiment, a flow channel boundary portion 34 and an outflow port 33b are separated from each other in the depth direction Z. The present embodiment will be described with reference to FIGS. 74 to 79 focusing on differences from the first embodiment.

<Description of Configuration Group D>

Figure 75:
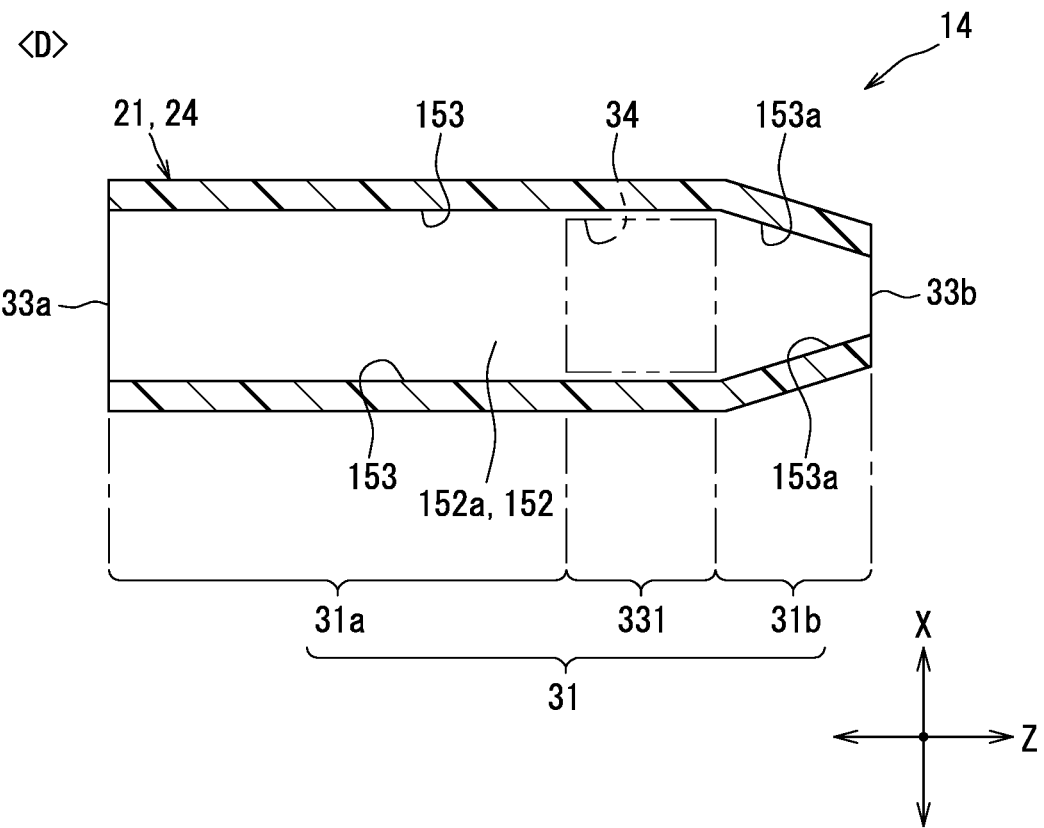
FIG. 75 is a cross-sectional view taken along a line LXXV-LXXV of FIG. 74.

A configuration group D relating to the configuration of the passage flow channel will be described. As shown in FIGS. 74 and 75, a passage flow channel 31 has a shape extending downstream of the flow channel boundary portion 34 in the depth direction Z. In this case, in addition to an inflow passage 31a and an outflow passage 31b, the passage flow channel 31 has a connection passage 331 that connects the inflow passage 31a and the outflow passage 31b. The connection passage 331 is provided between the inflow passage 31a and the outflow passage 31b, and extends from the flow channel boundary portion 34 toward a passage floor surface 152. In this case, the outflow passage 31b is located between the flow channel boundary portion 34 and the outflow port 33b in the depth direction Z.

In the passage flow channel 31, the whole of the passage floor surface 152 is a floor throttle surface 152a. In this case, the floor throttle surface 152a is in a state of extending over the inflow port 33a and the outflow port 33b. The floor throttle surface 152a corresponds to a floor inclined surface. The wall throttle surface 153a is provided between the flow channel boundary portion 34 and the outflow port 33b in the depth direction Z, and is disposed in the entire outflow passage 31b in the depth direction Z. In this case, the wall throttle surface 153a extends over the connection passage 331 and the outflow port 33b.

A passage ceiling surface 151 has an inflow ceiling portion 332a provided on the inflow port 33a side of the flow channel boundary portion 34, and an outflow ceiling portion 332b provided on the outflow port 33b side of the flow channel boundary portion 34. The inflow ceiling portion 332a extends across the inflow port 33a and the flow channel boundary portion 34, and extends in the depth direction Z which is a direction in which the inflow port 33a and the outflow port 33b are aligned. The outflow ceiling portion 332b extends over the flow channel boundary portion 34 and the outflow port 33b, and is inclined with respect to the inflow ceiling portion 332a by being directed toward the inflow port 33a side.

The flow channel boundary portion 34 is inclined with respect to the inflow ceiling portion 332a by being directed toward the outflow port 33b side in the same manner as that in the first embodiment. The floor throttle surface 152a is also inclined with respect to the inflow ceiling portion 332a. An inclination angle 83 of the floor throttle surface 152a with respect to the inflow ceiling portion 332a is equal to or larger than an inclination angle 82 of the flow channel boundary portion 34 with respect to the inflow ceiling portion 332a. As described above, the flow channel boundary portion 34 corresponds to a branch boundary. In addition, similarly to the first embodiment, even if a person looks into the passage flow channel 31 from the inflow port 33a in the depth direction Z, the flow channel boundary portion 34 is hidden on the back side of a ceiling surface of the inflow passage 31a and is not visible. In this case, even if foreign matter such as dust, dust, waterdrops, and oil droplets fly along with an intake air, the foreign matter easily travels straight along the passage flow channel 31 and is discharged from the outflow port 33b. For that reason, the foreign matter does not reach the flow rate detector 22, thereby being capable of preventing the detection element 22b from being damaged due to the foreign matter, and the detection accuracy of the flow rate detector 22 from being deteriorated due to the accumulation of the foreign matter.

Next, the mold device 90 will be described with reference to FIGS. 76 and 77.

Figure 76:
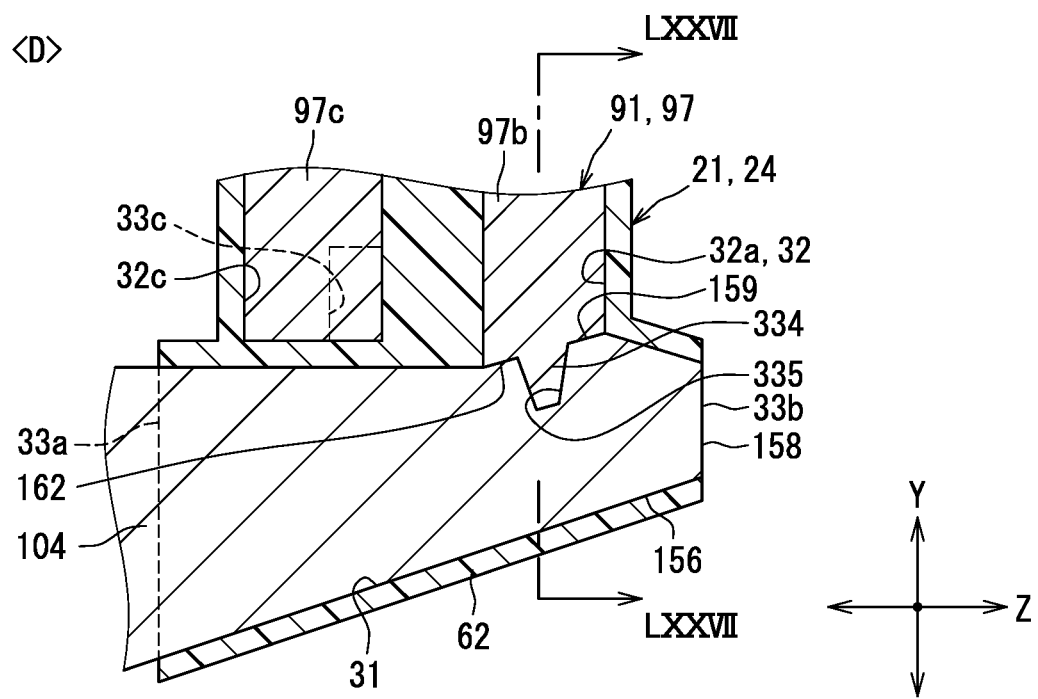
FIG. 76 is a diagram illustrating the molding of the passage flow channel by the measurement molding portion and the passage mold portion.
Figure 77:
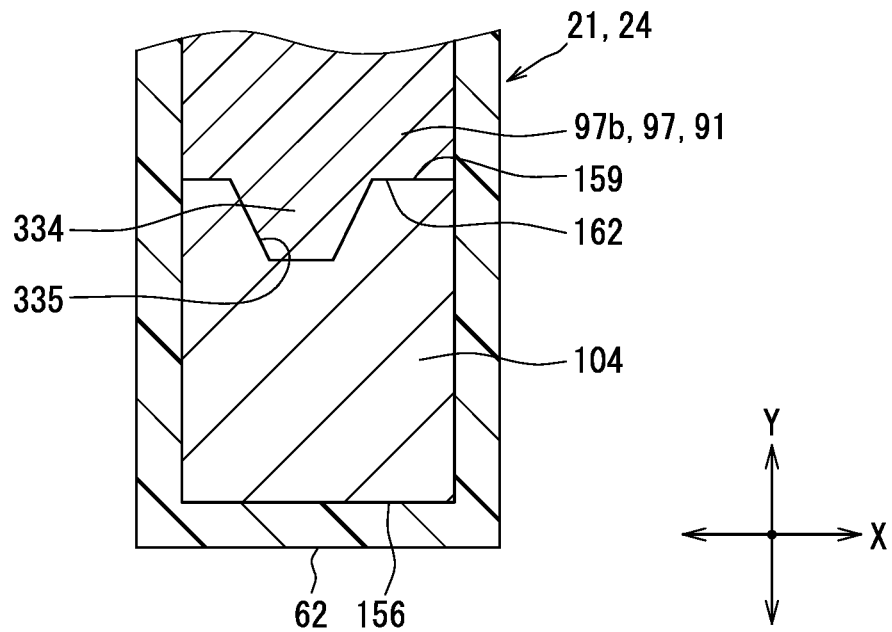
FIG. 77 is a cross-sectional view taken along a line LXXVII-LXXVII of FIG. 76.

As shown in FIGS. 76 and 77, an introduction molding portion 97b of a measurement molding portion 97 does not reach the outflow port 33*b*, and does not abut against outer peripheral mold portions 102 and 103. For that reason, unlike the first embodiment, the introduction molding portion 97*b* does not have an outer measurement surface 161 that abuts against the outer peripheral mold portions 102 and 103. An inner measurement surface 162 of the measurement molding portion 97 and an inner passage surface 159 of the passage mold portion 104 abut against each other as in the first embodiment, and are further caught by each other.

The measurement molding portion 97 has a mold projection portion 334 in which the inner measurement surface 162 protrudes toward the inner passage surface 159, and the passage mold portion 104 has a mold recess portion 335 in which the inner passage surface 159 is recessed toward the opposite side of the inner measurement surface 162. In both the width direction X and the depth direction Z, the mold projection portion 334 is disposed at an intermediate position of the inner measurement surface 162, and the mold recess portion 335 is disposed at an intermediate position of the inner passage surface 159. In that case, since the mold projection portion 334 is fitted into the mold recess portion 335, so that the four sides of the mold projection portion 334 are surrounded by an inner peripheral surface of the mold recess portion 335. For that reason, the mold projection portion 334 is caught on the inner peripheral surface of the mold recess portion 335 to restrict the movement of the measurement molding portion 97 and the passage mold portion 104 relative to each other in the width direction X and the depth direction Z.

The inner measurement surface 162 of the measurement molding portion 97 and the inner passage surface 159 of the passage mold portion 104 are in contact with each other at the flow channel boundary portion 34. On the other hand, the mold projection portion 334 passes the flow channel boundary portion 34 and enters the passage flow channel 31, and the mold projection portion 334 and the mold recess portion 335 are fitted to each other in the passage flow channel 31. In this case, the passage mold portion 104 does not have a portion that has entered the measurement flow channel 32 side beyond the flow channel boundary portion 34.

Next, a description will be given of a procedure for removing the mold device 90 from the housing 21 molded with resin in the method of manufacturing the air flow meter 14.

Figure 78:
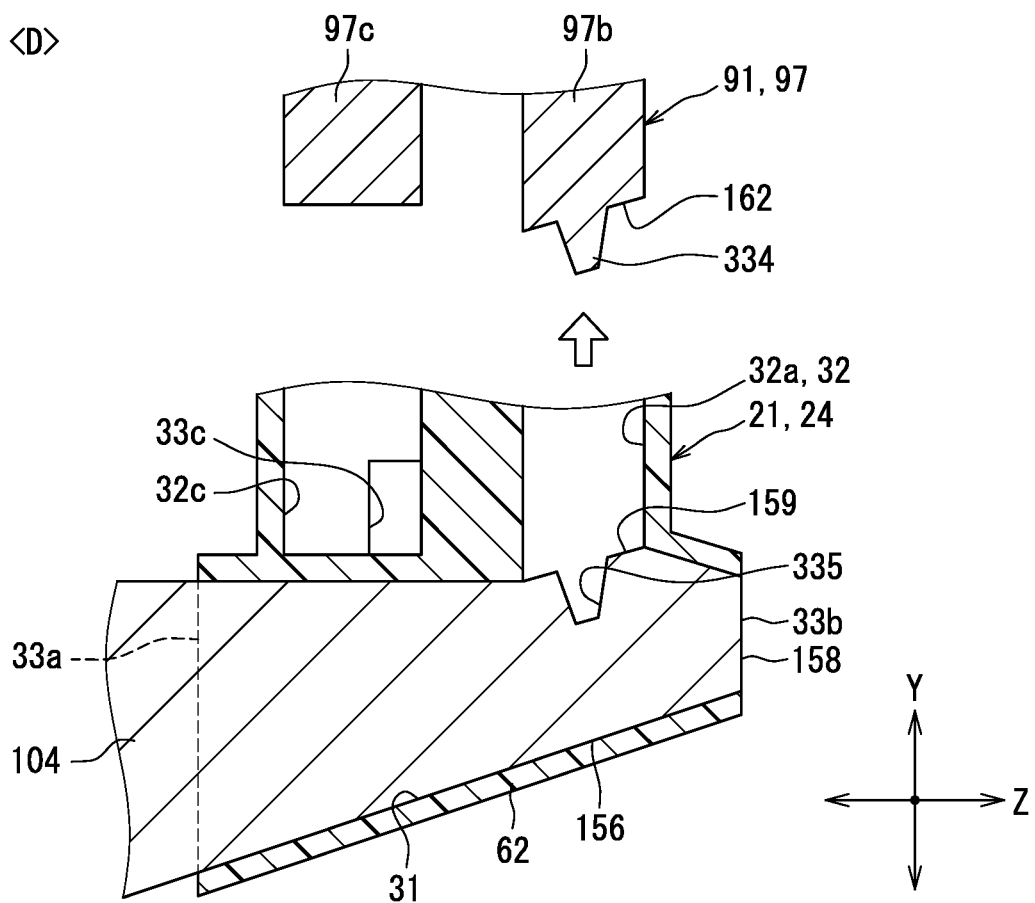
FIG. 78 is a view showing a state in which a measurement molding portion is removed from the housing prior to the passage mold portion.
Figure 79:
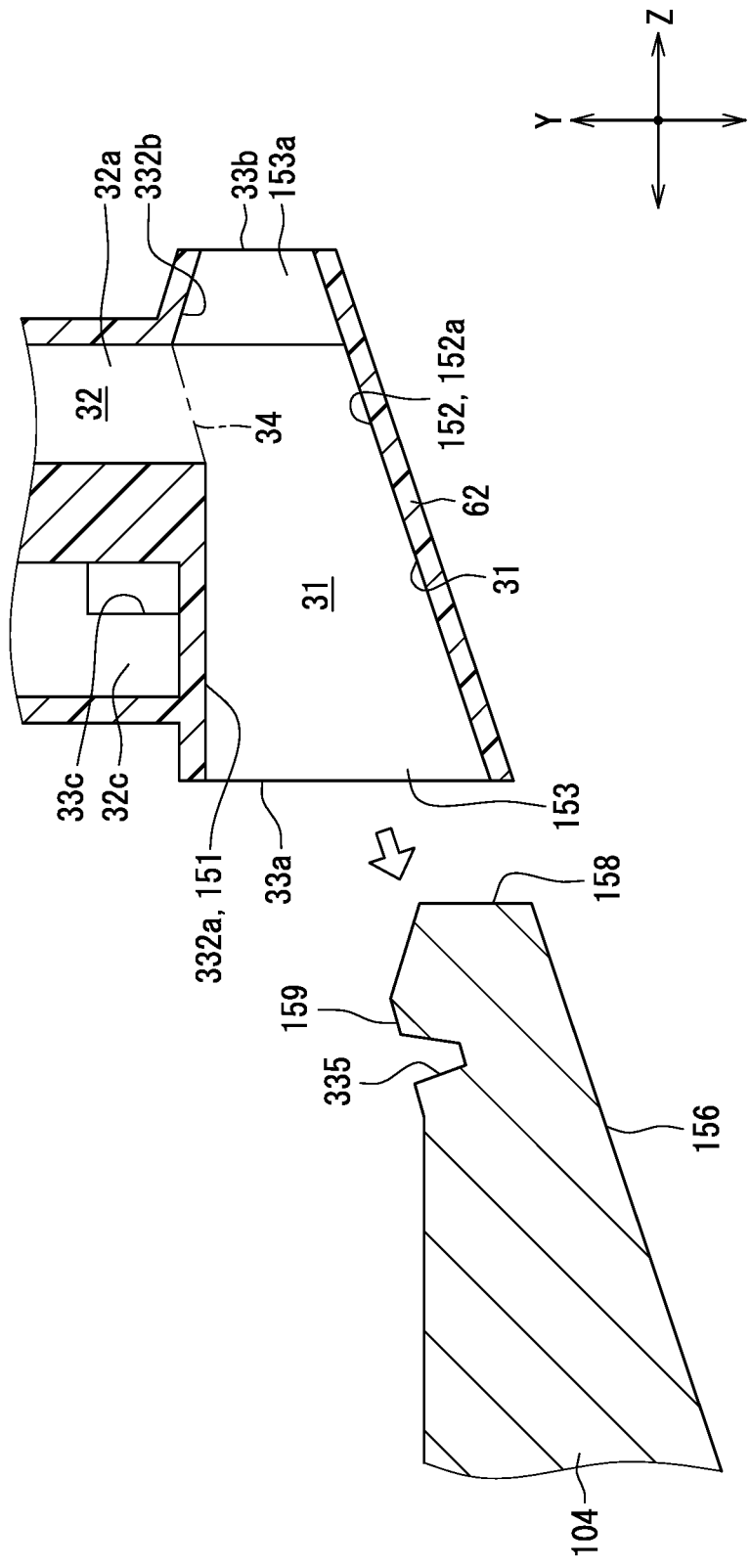
FIG. 79 is a view showing a state in which the passage mold portion is removed from the housing after the measurement molding portion.

As shown in FIG. 78, the measurement molding portion 97 is extracted from the measurement flow channel 32 of the housing 21 prior to the passage mold portion 104. This is because the passage mold portion 104 cannot be moved in the depth direction Z with respect to the measurement molding portion 97 because the mold projection portion 334 is in a state of entering the mold recess portion 335. As shown in FIG. 79, after the measurement molding portion 97 has been extracted from the housing 21, the passage mold portion 104 is extracted from the inflow port 33*a* of the housing 21.

When the passage mold portion 104 is extracted from the inflow port 33*a*, the passage mold portion 104 is moved to the inflow port 33*a* side along the floor throttle surface 152*a* of the passage flow channel 31. For example, when the passage mold portion 104 is moved to the inflow port 33*a* side along the inflow ceiling portion 332*a* of the passage flow channel 31, the inner passage surface 159 is caught by an upstream end portion of the inflow ceiling portion 332*a* and cannot be extracted from the inflow port 33*a*. This is because at least a part of the inner passage surface 159 of the passage mold portion 104 is disposed closer to a housing base end side than the inflow port 33*a* in the height direction Y.

In addition, unlike the present embodiment, in the configuration in which the inclination angle 83 of the floor throttle surface 152*a* is smaller than the inclination angle 82 of the flow channel boundary portion 34, the passage mold portion 104 is shaped to be thickened toward the outer passage surface 158. For that reason, even if the passage mold portion 104 is moved toward the inflow port 33*a* side along the floor throttle surface 152*a* of the passage flow channel 31, the passage mold portion 104 cannot be extracted from the inflow port 33*a*. In this case, in the passage mold portion 104, a separation distance between the floor throttle molding surface 156 and the inner passage surface 159 gradually increases toward the outer passage surface 158.

Further, unlike the present embodiment, even if the outflow ceiling portion 332*b* of the passage flow channel 31 does not face the inflow port 33*a* side, but faces the outflow port 33*b* side, the passage mold portion 104 becomes thicker toward the outer passage surface 158. For that reason, the passage mold portion 104 cannot be extracted from the inflow port 33*a*.

In the configuration group D, according to the present embodiment, since the mold projection portion 334 enters the mold recess portion 335 in the mold device 90, a relative positional deviation between the measurement molding portion 97 and the passage mold portion 104 can be regulated. Moreover, since the four sides of the mold projection portion 334 are surrounded by the inner peripheral surface of the mold recess portion 335, the relative positional deviation between the measurement molding portion 97 and the passage mold portion 104 can be regulated in both the width direction X and the depth direction Z. For that reason, the measurement molding portion 97 and the passage mold portion 104 are displaced from each other and a step is formed at the boundary between the mold portions 97 and 104, as a result of which a step can be inhibited from occurring on the inner peripheral surfaces of the passage flow channel 31 and the measurement flow channel 32. This makes it possible to inhibit that the air flow is disturbed by the step formed on the inner peripheral surface of the passage flow channel 31 or the measurement flow channel 32, and the detection accuracy of the flow rate detector 22 is lowered.

According to the present embodiment, the inclination angle 83 of the floor throttle surface 152*a* is equal to or larger than the inclination angle 82 of the flow channel boundary portion 34 with reference to the depth direction Z. For that reason, in order to inhibit the entry of the foreign matter into the measurement flow channel 32, even if the flow channel boundary portion 34 is inclined with respect to the depth direction Z so as to face the side of the outflow port 33*b*, a configuration can be realized in which the passage mold portion 104 can be extracted from the inflow port 33*a*.

Sixth Embodiment

In a sixth embodiment, a lead terminal 54 of a sensor SA 50 is connected to a connector terminal 28*a* through no bridge terminal 86. The present embodiment will be described with reference to FIGS. 80 and 81 focusing on differences from the first embodiment.

<Description of Configuration Group E>

Figure 80:
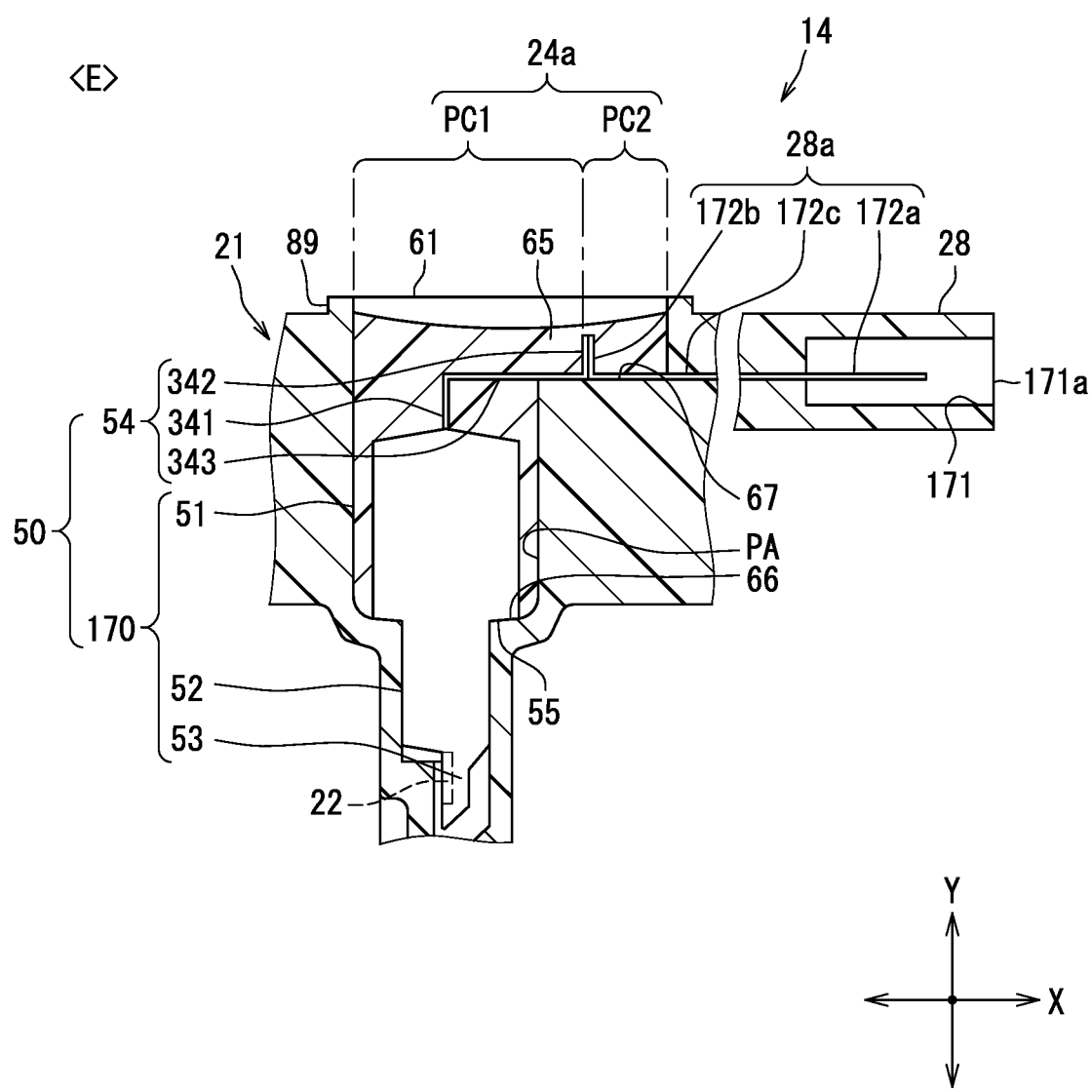
FIG. 80 is a vertical cross-sectional view of a housing in a configuration group E according to a sixth embodiment.

A configuration group E relating to the position of the connector terminal will be described. As shown in FIG. 80, the lead terminal 54 of the sensor SA 50 does not extend straight toward a housing opening 61 in the height direction Y, but is bent so as to extend toward the connector terminal 28*a*.

The lead terminal 54 has a first lead portion 341 extending from an SA main body 170, a second lead portion 342 extending along a second terminal portion 172*b* of the connector terminal 28*a*, and a third lead portion 343 connecting the lead portions 341 and 342. The first lead portion 341 extends from the SA main body 170 toward a housing opening 61. The second lead portion 342 is disposed closer to the connector terminal 28*a* than the first lead portion 341, and extends from the third lead portion 343 toward the housing opening 61. The first lead portion 341 and the second lead portion 342 extend in the height direction Y in parallel with each other. The third lead portion 343 extends from the first lead portion 341 toward the connector terminal 28*a* in the width direction X. The first lead portion 341 corresponds to a detection lead portion. The second lead portion 342 and the third lead portion 343 configure a connection lead portion connected to the first lead portion 341.

The lead terminal 54 extends across a boundary between a main body region PC1 and a connector region PC2 in the width directions X. In the lead terminal 54, the first lead portion 341 is disposed in the main body region PC1, the second lead portion 342 is disposed in the connector region PC2, and the third lead portion 343 is disposed at a position extending across the boundary between the main body region PC1 and the connector region PC2 in the width directions X. The lead terminal 54 corresponds to a detection terminal.

The second lead portion 342 enters between a sealing step surface 67 and a housing opening 61 in the height direction Y, and at least one of the second lead portion 342 and the third lead portion 343 comes in contact with the sealing step surface 67. In this case, the sealing step surface 67 supports a connection portion between the second lead portion 342 and the second terminal portion 172*b*.

Next, a method of manufacturing an air flow meter 14 will be described with reference to FIGS. 80 and 81, focusing on the fact that the lead terminals 54 and the connector terminal 28*a* are directly connected to each other.

First, a procedure of manufacturing the sensor SA 50 will be described. In this example, the sensor SA having high versatility is referred to as a general purpose SA, and the general purpose SA has the SA main body 170 and the first lead portion 341, but does not have the second lead portion 342 and the third lead portion 343. In the present embodiment, the sensor SA 50 is manufactured by connecting the second lead portion 342 and the third lead portion 343 to the first lead portion 341 of the general purpose SA by welding or the like.

The sensor SA 50 is not manufactured by attaching the lead portions 342 and 343 to the general purpose SA, but may be manufactured by attaching the lead terminal 54 having the first lead portion 341, the second lead portion 342, and the third lead portion 343 to the SA main body 170. The first lead portion 341 of the general purpose SA is a portion corresponding to the lead terminals 54 of the sensor SA 50 of the first embodiment, and the sensor SA 50 of the first embodiment can also be referred to as a general purpose SA having high versatility.

Figure 81:
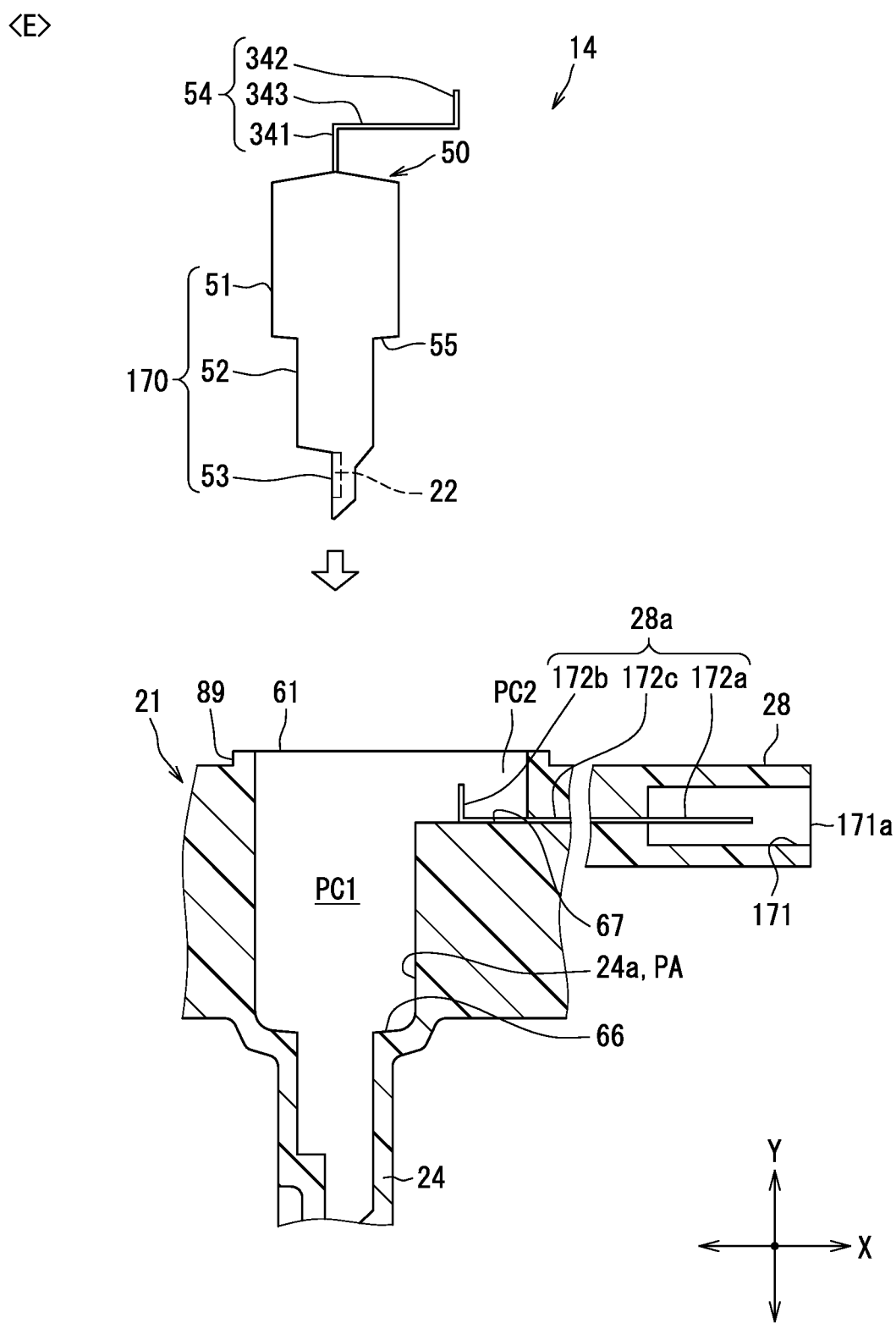
FIG. 81 is a view illustrating the attachment of the sensor SA to the housing.

After a housing 21 has been molded with resin, as shown in FIG. 81, the sensor SA 50 is inserted into an internal space 24*a* of the housing 21. In this example, similarly to the first embodiment, the sensor SA 50 inserted from the housing opening 61 is pushed into the internal space 24*a* until a circuit step surface 55 is caught by a region step surface 66. In this example, it is assumed that the second lead portion 342 and the third lead portion 343 of the lead terminal 54 are caught by the sealing step surface 67 before the SA main body 170 is caught by the region step surface 66. Even in this instance, the lead terminal 54 caught by the sealing step surface 67 is deformed as a whole, so that the sensor SA 50 can be pushed into the internal space 24*a* further deeply. For that reason, even if the lead terminal 54 is disposed at a position extending across a boundary between the main body region PC1 and the connector region PC2, the positional deviation of the sensor SA 50 is inhibited from occurring by the lead terminal 54 being caught by the sealing step surface 67.

After the sensor SA 50 has been installed in the internal space 24*a*, a step of connecting the lead terminal 54 and the connector terminal 28*a* with the use of a joining tool is performed. In this step, a pair of welding electrodes are inserted into the internal space 24*a* from the housing opening 61, the second bridge portion 173*b* and the second terminal portion 172*b* are sandwiched by those welding electrodes, and welding between the second bridge portion 173*b* and the second terminal portion 172*b* is performed. As described above, in the present embodiment, the lead terminal 54 and the connector terminal 28*a* are joined directly to each other, so that the number of joining portions requiring a joining operation after the sensor SA 50 has been installed in the internal space 24*a* is reduced as much as possible.

For example, in the configuration of indirectly connecting the lead terminal 54 and the connector terminal 28*a* as in the first embodiment, the welding operation for the lead terminal 54 and the welding operation for the connector terminal 28*a* are performed separately. Compared to the above configuration, in the present embodiment, since the lead terminal 54 and the connector terminal 28*a* are directly joined to each other, the number of joining portions requiring a joining operation after the sensor SA 50 has been installed in the internal space 24*a* is reduced to half.

In the configuration group E, according to the present embodiment, even if the lead terminal 54 does not extend straight toward the housing opening 61, if the lead terminal 54 extends generally toward the housing opening 61, the second lead portion 342 is disposed in the connector region PC2. In other words, the second lead portion 342 is disposed at a position closer to the housing opening 61 than the SA main body 170. In this case, since there is no need to insert a joining tool for joining the second lead portion 342 and the second terminal portion 172*b* deeply into the internal space 24*a*, a work load when joining can be reduced.

According to the present embodiment, in the internal space 24*a* of the housing 21, the lead terminal 54 of the sensor SA 50 is disposed at a position that extends across the boundary between the main body region PC1 and the connector region PC2. In this case, since the lead terminal 54 can be directly connected to the connector terminal 28*a*, the number of welding operations performed in the internal space 24*a* for electrically connecting the lead terminal 54 and the connector terminal 28*a* can be minimized. For that reason, the positional deviation of the sensor SA 50 can be inhibited from occurring due to the welding operation in the internal space 24*a*.

According to the present embodiment, since the second terminal portion 172*b* of the connector terminals 28*a* is supported by the sealing step surface 67, unintentional displacement of the second terminal portion 172*b* can be inhibited when the second terminal portion 172b and the second lead portion 342 are joined to each other. This makes it possible to inhibit that the second terminal portion 172b is relatively displaced with respect to the second lead portion 342 during the joining operation, which makes it difficult to properly join the second terminal portion 172b and the second lead portion 342.

According to the present embodiment, in the lead terminal 54, the second lead portion 342 inserted between the sealing step surface 67 and the housing opening 61 is supported by the sealing step surface 67 from the side opposite to the housing opening 61. In this example, in the sensor SA 50, the second lead portion 342 is easily displaced because the first lead portion 341 cantilevers the second lead portion 342 and the third lead portion 343. In this case, when the second lead portion 342 is joined to the second terminal portion 172b, the second lead portion 342 is relatively displaced with respect to the second terminal portion 172b, which may increase the difficulty of the joining operation or may prevent proper joining. On the contrary, according to the present embodiment, since the second lead portion 342 is supported by the sealing step surface 67, a state in which the first lead portion 341 cantilevers the second lead portion 342 and the third lead portion 343 is eliminated. For that reason, the joining operation between the second lead portion 342 and the second terminal portion 172b can be facilitated.

According to the present embodiment, the sealing step surface 67 supporting the second lead portion 342 of the sensor SA 50 is disposed at a position closer to the housing opening 61 than the region step surface 66. In this case, when the second lead portion 342 and the second terminal portion 172b are joined to each other, there is no need to insert the joining tool to a position deeper than the sealing step surface 67 in the internal space 24a, so that the joining tool can be inhibited from unintentionally coming into contact with the SA main body 170.

According to the present embodiment, the second terminal portion 172b and the second lead portion 342 extend from the sealing step surface 67 toward the housing opening 61. In this case, when the second terminal portion 172b and the second lead portion 342 are sandwiched between a joining tool such as welding electrodes, there is no need to insert the joining tool into a back side of the second terminal portion 172b and the second lead portion 342 when viewed from the housing opening 61. For that reason, when the second terminal portion 172b and the second lead portion 342 are joined to each other with the use of the joining tool, the joining operation can be facilitated.

According to the present embodiment, in the sensor SA 50, the lead terminal 54 is formed by connecting the second lead portion 342 and the third lead portion 343 to the first lead portion 341 extending from the SA main body 170. In this instance, the sensor SA 50 can be manufactured with the use of a general purpose SA that does not have the second lead portion 342 and the third lead portion 343. For that reason, after the connector terminal 28a has been fixed to the housing 21, the sensor SA 50 can be installed in the internal space 24a of the housing 21, and the costs for manufacturing the sensor SA 50 can be reduced.

Other Embodiments

Although a plurality of embodiments according to the present disclosure have been described above, the present disclosure is not construed as being limited to the above-mentioned embodiments, and can be applied to various embodiments and combinations within a scope not departing from the spirit of the present disclosure.

<Modification of Configuration Group A>

In Modification 1, the housing 21 does not need to have the passage flow channel 31. In other words, the bypass flow channel 30 may have only the measurement flow channel 32. For example, the longitudinal partition wall 69 extends to the housing bottom portion 62. In the above configuration, all of the intake air flowing in from the inflow port 33a is guided to the introduction path 32b of the measurement flow channel 32 and discharged from the measurement outlet 33c. In the above configuration, in order to prevent the outflow port 33b from being molded during resin molding of the housing 21, the tip portion of the passage mold portion 104 does not abut against the outer peripheral mold portions 102 and 103 in the mold device 90.

As Modification 2, in the measurement flow channel 32, the flow rate detector 22 may be provided in the introduction path 32b and the discharge path 32c. In this case, the detection path 32a serves as a connection path connecting the introduction path 32b and the discharge path 32c. For example, as a configuration in which the flow rate detector 22 is provided in the introduction path 32b, there is a configuration in which the sensing support portion 57 extends toward the housing tip side to the extent that the sensing support portion 57 reaches the introduction path 32b in the sensor SA 50. In this configuration, since the flow rate detector 22 is provided at a position close to the tip portion of the sensing support portion 57, the flow rate detector 22 can be disposed in the introduction path 32b.

As Modification 3, in the measurement flow channel 32, the introduction path 32b and the discharge path 32c may be aligned not in the depth direction Z but in the width direction X. In this configuration, the detection path 32a extends in the width direction X, but the flow rate detection by the flow rate detector 22 can be appropriately performed only with the flow direction of the intake air in the detection path 32a being not the depth direction Z.

In Modification 4, the boundary between the sealing region PA and the open region PB may coincide with the sensing step surface 56 instead of the circuit step surface 55 of the sensor SA 50. For example, the region step surface 66 of the housing 21 disposed at a position of abutting against the sensing step surface 56 of the sensor SA 50, and the sealing region PA and the accommodation region PB1 are sealed by the potting portion 65. In the above configuration, a gap is not defined between the outer peripheral surface of the junction portion 52 of the sensor SA 50 and the inner peripheral surface of the housing body 24 on the accommodation region PB1.

As Modification 5, the detection throttle portions 59 may be provided on both sides of the sensing support portion 57 in the width direction X. In this case, the housing 21 has a pair of detection throttle portions 59 aligned in the width direction X, and the sensing support portion 57 and the flow rate detector 22 are disposed between the detection throttle portions 59. Even in the above configuration, it is preferable that the pair of detection throttle portions 59 and the longitudinal partition wall 69 do not become thick even toward the housing opening 61 as a whole. As a result, the inner peripheral surface of the housing 21 can be integrally molded.

As Modification 6, in the mold device 90, the first outer peripheral mold portion 102 and the second outer peripheral mold portion 103 may be aligned in the depth direction Z instead of the width direction X. The number of mold portions for molding the outer peripheral surface of the housing 21 may be three or more instead of two as in the case of the outer peripheral mold portions 102 and 103. Further, if the housing 21 can be removed from the outer peripheral surface, one mold portion for molding the outer peripheral surface of the housing 21 may be used.

As Modification 7, when the housing 21 is molded with resin, a plurality of mold portions may be taken out from the housing opening 61, as well as one mold portion like the inner peripheral mold portion 91. For example, the first inner peripheral mold portion having the introduction molding portion 97b and the second inner peripheral mold portion having the discharge molding portion 97c are formed independently of each other, and in the mold device 90, those inner peripheral mold portions are combined with each other and inserted into the outer peripheral mold portions 102 and 103. Also, in the above configuration, it is preferable that the first inner peripheral mold portion and the second inner peripheral mold portion can be pulled out from the housing opening 61 collectively or sequentially.

As Modification 8, the outlet extension portion 113 for molding the measurement outlet 33c may be included in a dedicated mold portion independent of the outer peripheral mold portions 102 and 103, instead of being included in the outer peripheral mold portions 102 and 103. For example, a dedicated mold portion including the outlet extension portion 113 is provided between the first outer peripheral mold portion 102 and the second outer peripheral mold portion 103 in the mold device 90 in the same manner as the passage mold portion 104. With the use of the dedicated mold portion in this manner, the opening direction of the measurement outlet 33c can be easily changed not to the width direction X but to the depth direction Z.

In Modification 9, the measurement outlet 33c may be provided not in the discharge path 32c but in the detection path 32a. For example, the measurement outlet 33c is provided on the downstream side of the flow rate detector 22 in the detection path 32a. In the above configuration, the intake air that has passed through the flow rate detector 22 is discharged to the outside from the measurement outlet 33c without passing through the discharge path 32c. In this case, the discharge path 32c may not be provided. Even in a configuration in which the discharge path 32c is not provided, if the introduction path 32b is not narrowed even when the introduction path 32b approaches the housing opening 61 in the height direction Y, the inward portion 93 of the inner peripheral mold portion 91 can be extracted from the housing opening 61 at the time of resin molding of the housing 21. In the above configuration, the inward portion 93 does not have the discharge molding portion 97c.

As Modification 10, the configuration functioning as the control device of the combustion system is not the ECU 20, but may be a variety of calculation devices mounted in a vehicle, and multiple calculation devices may function as the control device in cooperation with each other. In addition, various programs may be stored in a non-transitory tangible storage medium such as a flash memory or a hard disk provided in each calculation device.

<Modifications of Configuration Group B>

Figure 82:
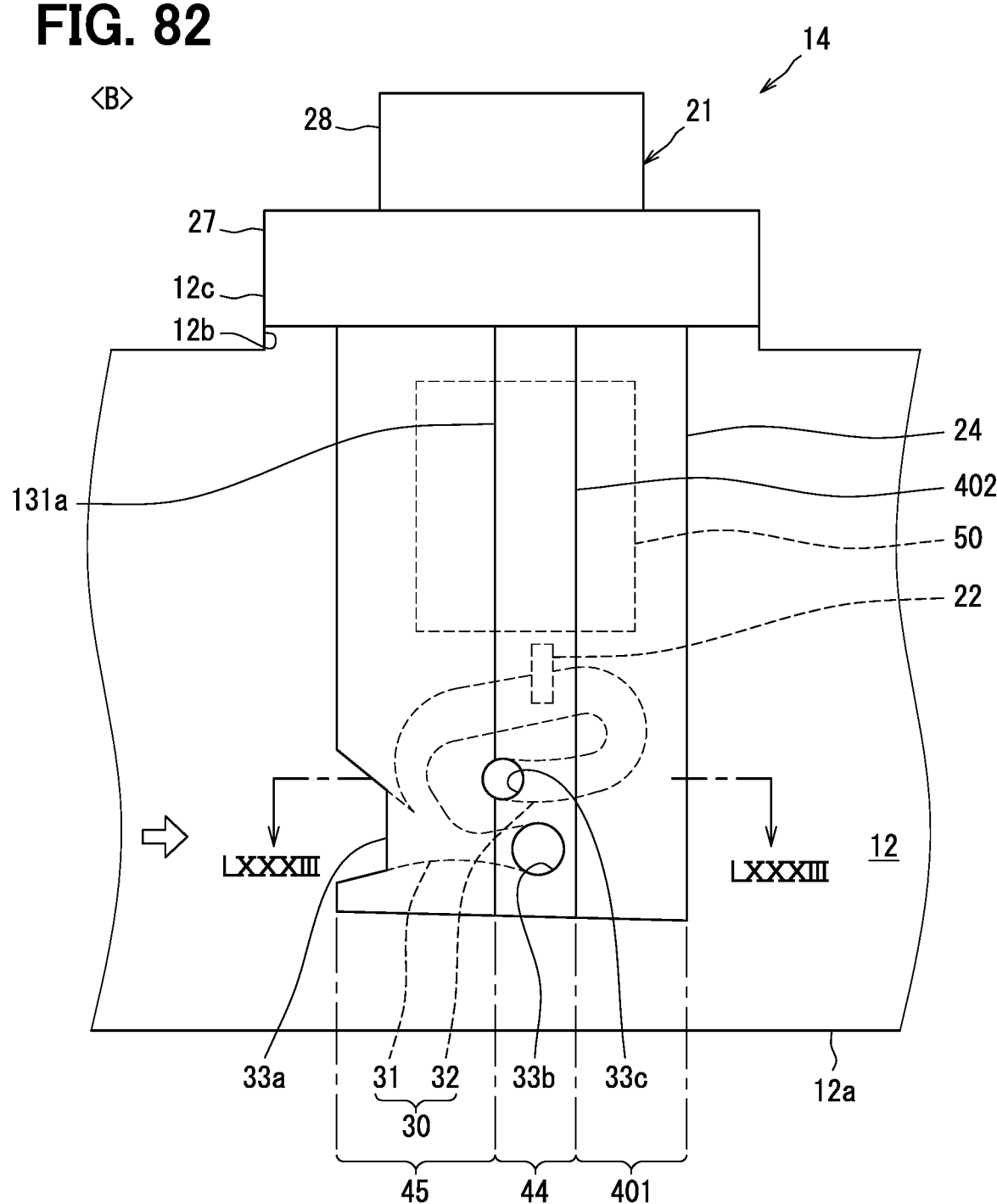
FIG. 82 is a side view of an air flow meter in a state of being attached to an intake pipe in Modification B1.

As Modification B1, in the first embodiment, the measurement outlet 33c may be provided on one of the front surface and the back surface of the housing 21, instead of the measurement outlet 33c provided on each of the front surface and the back surface. For example, as shown in FIGS. 82 and 83, the measurement outlet 33c is provided on the surface of the housing 21. In the above configuration, the housing 21 has an asymmetric shape on the front side and the back side, and the outflow port 33b is also provided on the surface of the housing 21, not on the outer peripheral downstream end 132b but on the surface of the housing 21 as with the measurement outlet 33c. The outflow port 33b and the measurement outlet 33c are not formed in a rectangular shape but formed in a circular shape.

In addition to the flat surface 44 and the curved surface 45, the surface of the housing 21 has a downstream tapered surface 401 that extends straight in a state inclined with respect to the depth direction Z from the outer peripheral downstream end 132b toward the upstream side. On the surface of the housing 21, since the flat surface 44 and the curved surface 45 are aligned horizontally in the depth direction Z, a vertical boundary 131a linearly extends from the flange portion 27 to the tip of the housing 21 in the height direction Y, and the vertical boundary 131a is not formed. In addition, the flat surface 44 and the downstream tapered surface 401 are aligned horizontally in the depth direction Z, and a tapered boundary 402, which is a boundary between the flat surface 44 and the downstream tapered surface 401, extends in parallel with the vertical boundary 131a. A back surface of the housing 21 does not have the downstream tapered surface 401, and the flat surface 44 extends in the depth direction Z from the outer peripheral downstream end 132b toward the curved surface 45.

On the surface of the housing 21, similarly to the first embodiment, the measurement outlet 33c is disposed at a position extending across the vertical boundary 131a in the depth direction Z. The outflow port 33b is provided on the flat surface 44 between the vertical boundary 131a and the tapered boundary 402, instead of the outer peripheral downstream end 132b. The outflow port 33b may be provided on the curved surface 45 or the downstream tapered surface 401, or may be provided at a position extending across the vertical boundary 131a in the depth direction Z similarly to the measurement outlet 33c.

Figure 85:
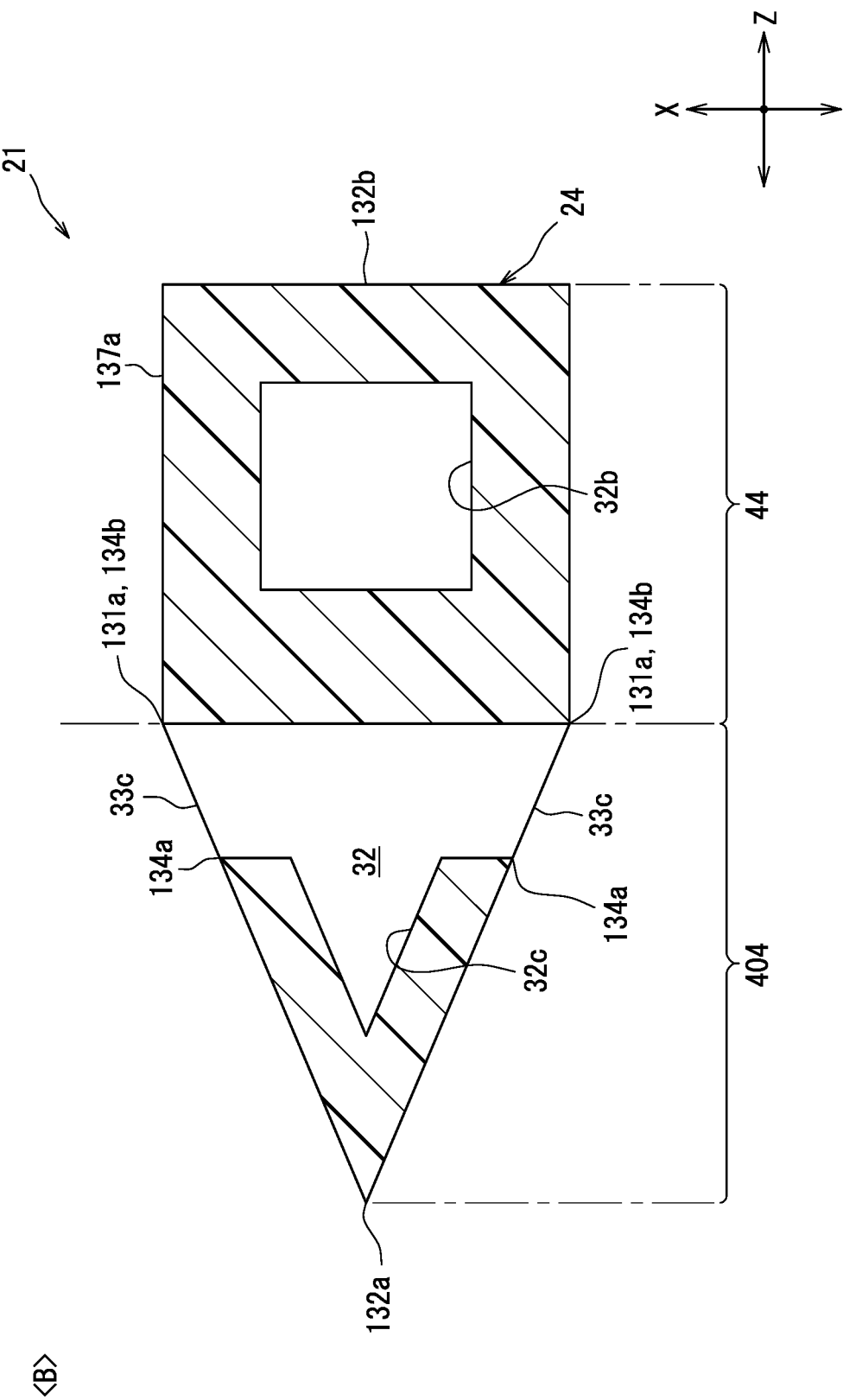
FIG. 85 is a horizontal cross-sectional view of the housing in Modifications B2 and B3.

As Modification B2, in the first embodiment, the curved surface 45 of the housing 21 may be an outer peripheral inclined surface inclined with respect to the depth direction Z. For example, as shown in FIG. 85, the outer peripheral inclined surface may be a tapered surface extending straight from the flat surface 44 toward the outer peripheral upstream end 132a. The outer peripheral inclined surface may be a surface curved so as to be recessed toward the inner peripheral side of the housing 21. In either case, since the measurement outlet 33c is disposed at a position extending across the vertical boundary 131a as the outer peripheral boundary, a configuration can be realized in which the measurement outlet 33c is not opened toward the downstream side.

Figure 84:
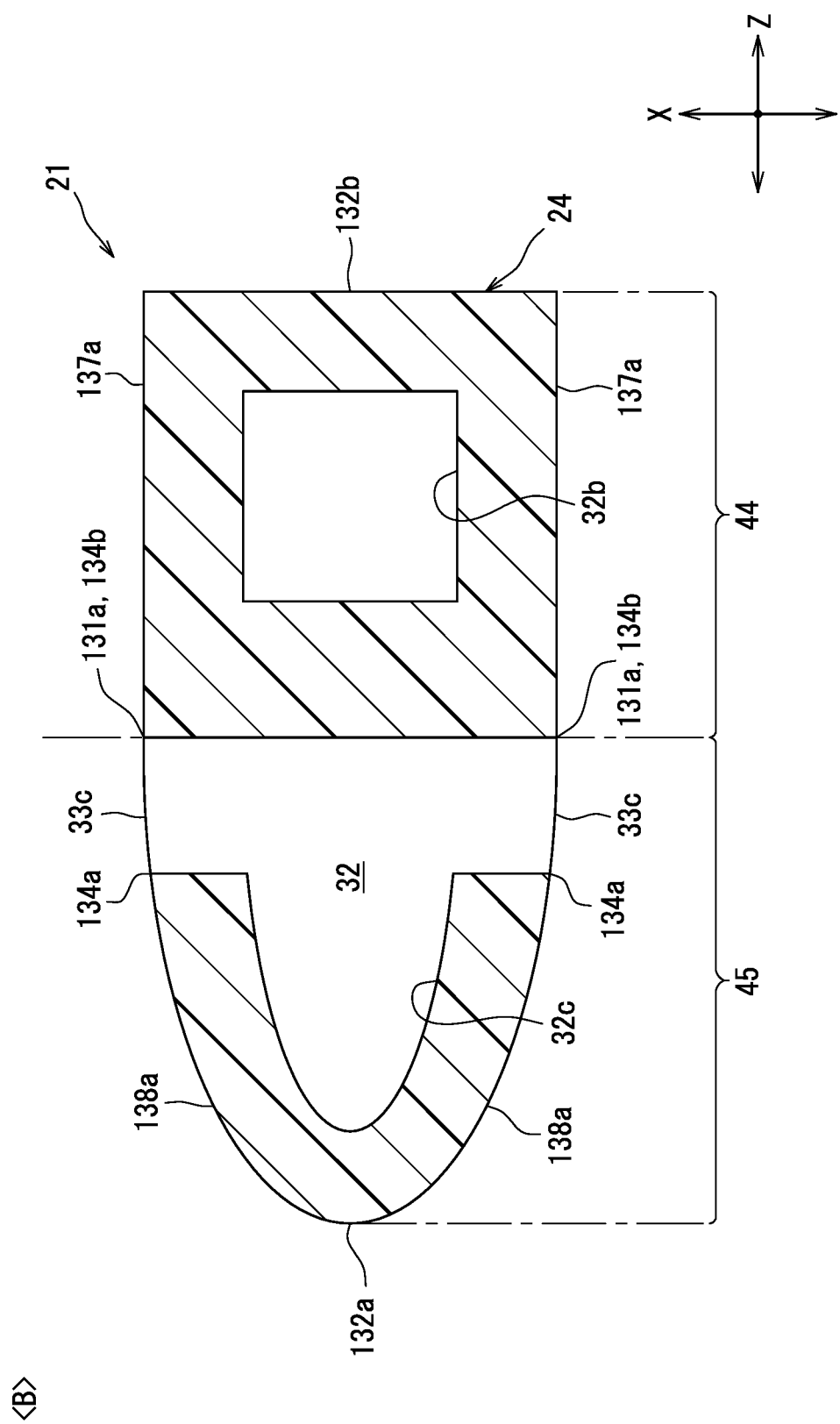
FIG. 84 is a horizontal cross-sectional view of a housing in Modification B3.

As Modification B3, the measurement outlet may be provided only on the outer peripheral inclined surface out of the outer peripheral flat surface and the outer peripheral inclined surface. For example, in the first embodiment, as shown in FIG. 84, the measurement outlet 33c is provided on the curved surface 45 so as not to protrude from the flat surface 44. In the above configuration, the measurement outlet 33c does not extends across the vertical boundary 131a in the depth direction Z, but extends from the vertical boundary 131a toward the outer peripheral upstream end 132a in the depth direction Z, and the outlet downstream end 134b of the measurement outlet 33c is included in the vertical boundary 131a.

Further, as shown in FIG. 85, the measurement outlet 33c is provided on an upstream tapered surface 404 as the outer peripheral inclined surface so as not to protrude to the flat surface 44. In the above configuration, an upstream tapered surface 404 is included in the outer peripheral surface of the housing 21 instead of the curved surface 45, and the boundary between the upstream tapered surface 404 and the flat surface 44 is the vertical boundary 131a. The upstream tapered surface 404 extends straight from the vertical boundary 131a toward the outer peripheral upstream end 132a, and is inclined with respect to the depth direction Z. Also, in the above configuration, the outlet downstream end 134b of the measurement outlet 33c is included in the vertical boundary 131a.

In either of the configurations of FIGS. 84 and 85, the measurement outlet 33c is disposed on the outer peripheral inclined surface and is not opened to the downstream side. For that reason, even if the turbulence of the air flow occurs around the outer peripheral downstream end 132b in the intake passage 12, the flat surface 44 can inhibit the turbulence from reaching the measurement outlet 33c. Further, as in the first embodiment, a forward flow air such as the air AF1 flows along the outer peripheral inclined surface before reaching the measurement outlet 33c, so that a traveling direction changes to a direction substantially perpendicular to the opening direction of the measurement outlet 33c, and therefore, the forward flow air hardly flows into the measurement outlet 33c.

Figure 86:
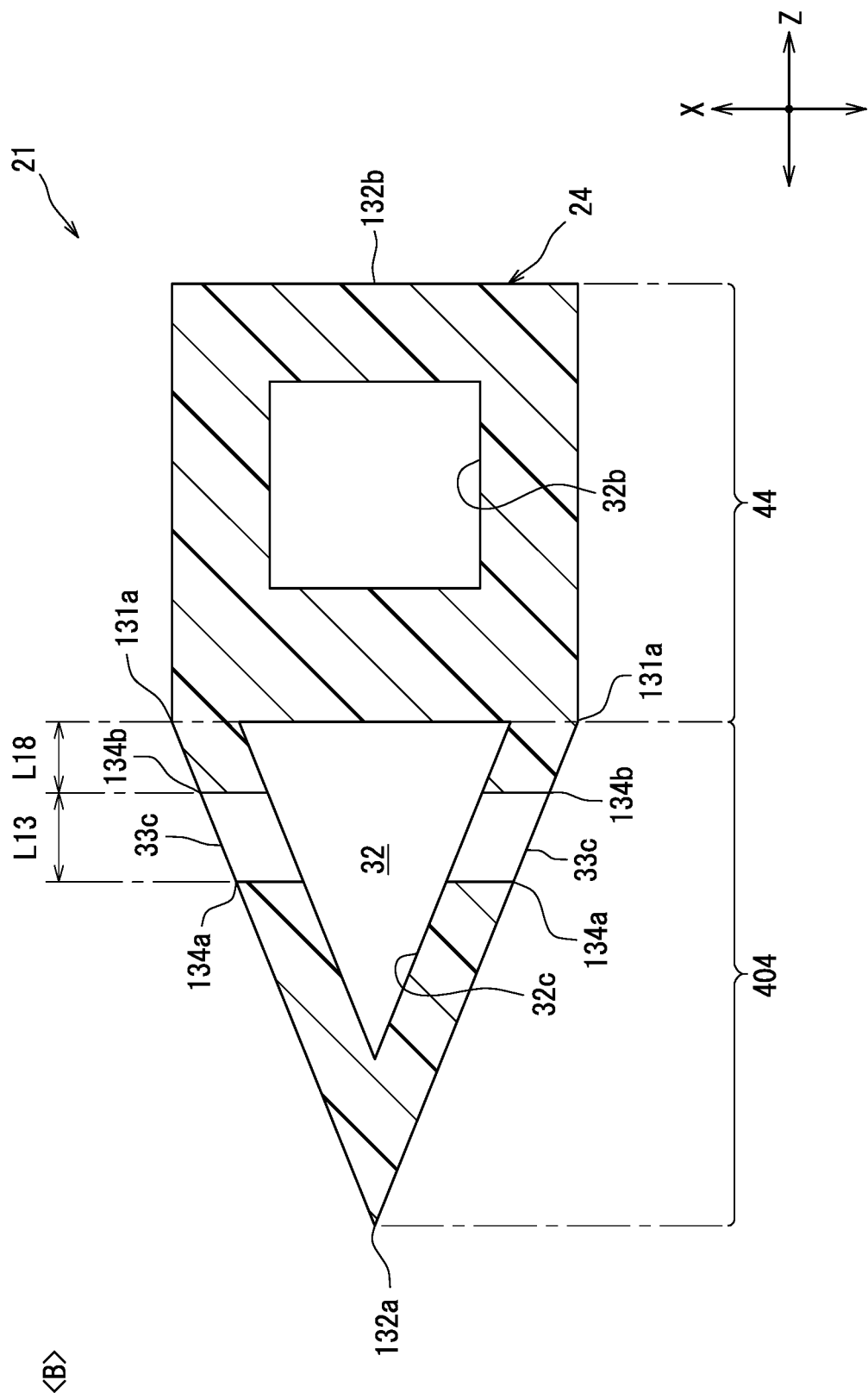
FIG. 86 is a horizontal cross-sectional view of the housing in Modification B3.

Further, as a configuration in which the measurement outlet 33c is provided on the curved surface 45, there is a configuration in which the measurement outlet 33c is disposed at an intermediate position of the outer peripheral inclined surface in the depth direction Z. For example, as shown in FIG. 86, the measurement outlet 33c is disposed between the outer peripheral upstream end 132a and the vertical boundary 131a. In the above configuration, the upstream end portion of the upstream tapered surface 404 is included in the outer peripheral upstream end 132a, the downstream end portion of the upstream tapered surface 404 is included in the vertical boundary 131a, and the measurement outlet 33c is disposed at a position closer to the vertical boundary 131a in the depth direction Z. Also, in the above configuration, similarly to Modification B11, the forward flow air flows along the upstream tapered surface 404 as the outer peripheral inclined surface before reaching the measurement outlet 33c, so that the forward flow air does not easily flow into the measurement outlet 33c.

From the viewpoint that the forward flow air hardly flows into the measurement outlet 33c, it is preferable that the measurement outlet 33c is placed as far as possible from the upstream end portion of the upstream tapered surface 404 or the outer peripheral upstream end 132a. For that reason, in the depth direction Z, it is preferable that a separation distance L18 between the vertical boundary 131a and the measurement outlet 33c is smaller than a length dimension L13 of the measurement outlet 33c.

The measurement outlet 33c may be disposed at a position closer to the outer peripheral upstream end 132a in the depth direction Z. Even, in this case, the measurement outlet 33c and the outer peripheral upstream end 132a are separated from each other in the depth direction Z, thereby being capable of making it difficult for the forward flow air to flow into the measurement outlet 33c.

As Modification B4, the measurement outlet may be provided only on the outer peripheral flat surface out of the outer peripheral flat surface and the outer peripheral inclined surface. For example, in the first embodiment, the measurement outlet 33c is provided on the flat surface 44 so as not to protrude from the curved surface 45. In the above configuration, the measurement outlet 33c does not extend across the vertical boundary 131a in the depth direction Z, but extends from the vertical boundary 131a toward the outer peripheral downstream end 132b in the depth direction Z, and the outlet upstream end 134a of the measurement outlet 33c is included in the vertical boundary 131a. Also, in the above configuration, if the outlet downstream end 134b of the measurement outlet 33c and the downstream end portion of the flat surface 44 are separated from each other in the depth direction Z, even if the turbulence of the air flow occurs in the periphery of the downstream end portion of the flat surface 44 or the periphery of the outer peripheral downstream end 132b, the turbulence can be inhibited from reaching the measurement outlet 33c.

Figure 120:
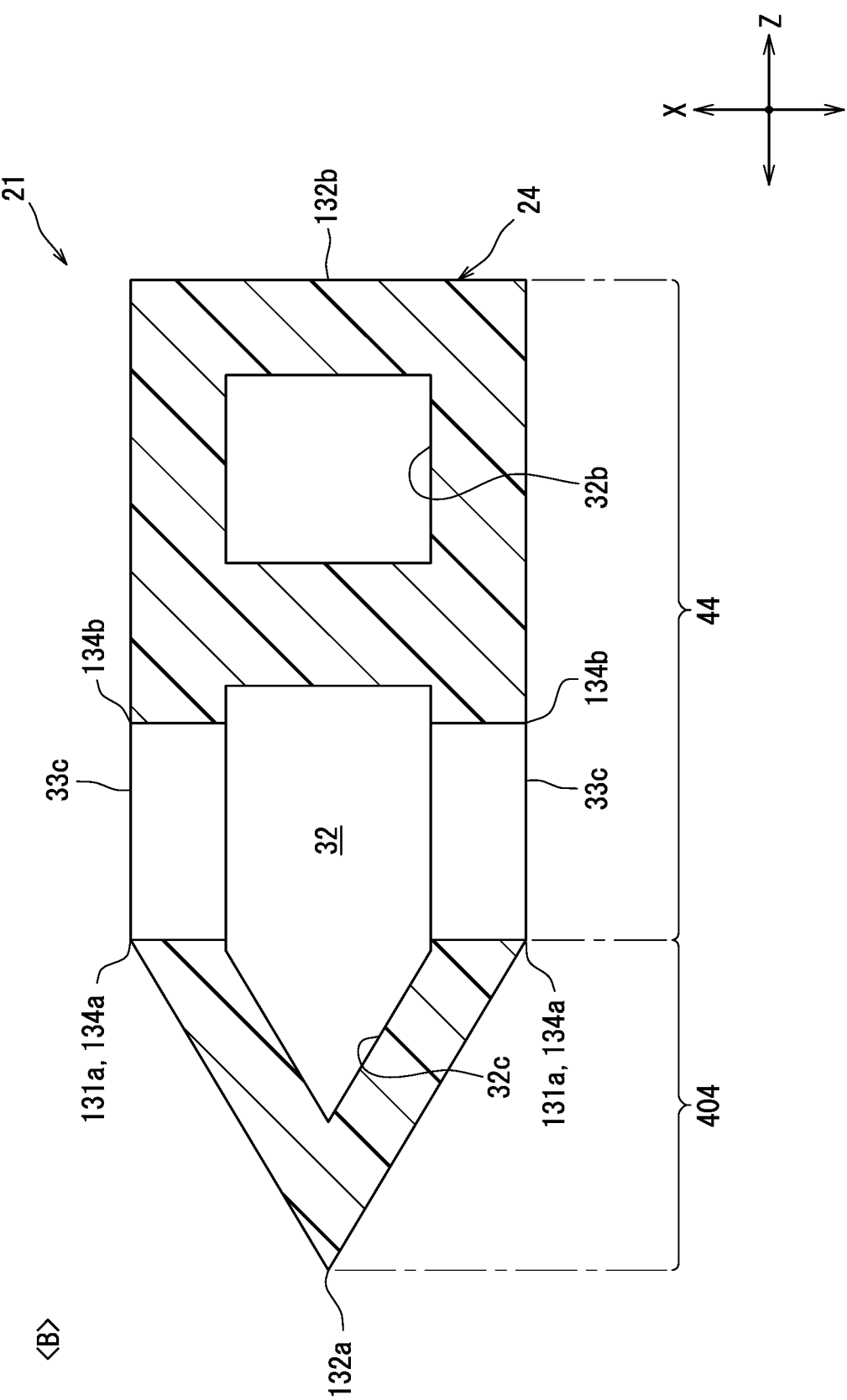

Further, as shown in FIG. 120, the measurement outlet 33c is provided on the flat surface 44 so as not to protrude from the upstream tapered surface 404 as the outer peripheral inclined surface. In the above configuration, as in FIG. 85, the upstream tapered surface 404 is included in the outer peripheral surface of the housing 21 instead of the curved surface 45, and the boundary between the upstream tapered surface 404 and the flat surface 44 is the vertical boundary 131a. Also, in the above configuration, the outlet upstream end 134a of the measurement outlet 33c is included in the vertical boundary 131a.

Figure 87:
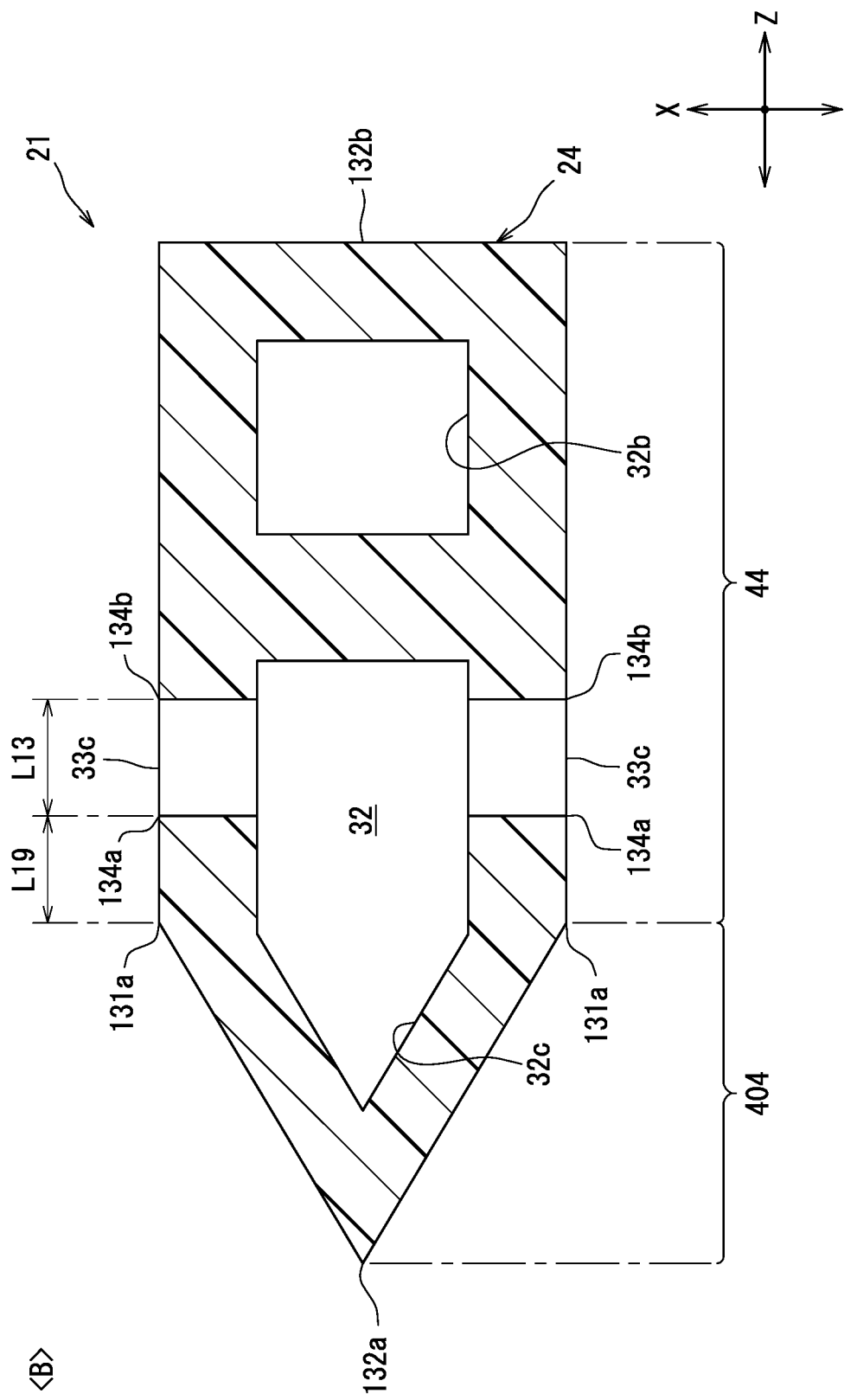
FIG. 87 is a horizontal cross-sectional view of a housing in Modification B4.

Further, as a configuration in which the measurement outlet 33c is provided on the flat surface 44, there is a configuration in which the measurement outlet 33c is disposed at an intermediate position of the flat surface 44 in the depth direction Z. For example, as shown in FIG. 87, the measurement outlet 33c is disposed between the vertical boundary 131a and the outer peripheral downstream end 132b. In the above configuration, the upstream end portion of the flat surface 44 is included in the vertical boundary 131a, the downstream end portion of the flat surface 44 is included in the outer peripheral downstream end 132b, and the measurement outlet 33c is disposed at a position close to the vertical boundary 131a in the depth direction Z. Also, in the above configuration, similarly to Modification B13 described above, even if the turbulence of the air flow occurs in the periphery of the downstream end portion of the flat surface 44 or the periphery of the outer peripheral downstream end 132b, the turbulence can be inhibited from reaching the measurement outlet 33c.

From the viewpoint of inhibiting the turbulence of the air flow generated in the downstream side of the measurement outlet 33c from reaching the measurement outlet 33c, it is preferable that the measurement outlet 33c is placed as far as possible from the downstream end portion of the flat surface 44 or the outer peripheral downstream end 132b. For that reason, in the depth direction Z, it is preferable that a separation distance L19 between the vertical boundary 131a and the measurement outlet 33c is smaller than a length dimension L13 of the measurement outlet 33c.

Figure 88:
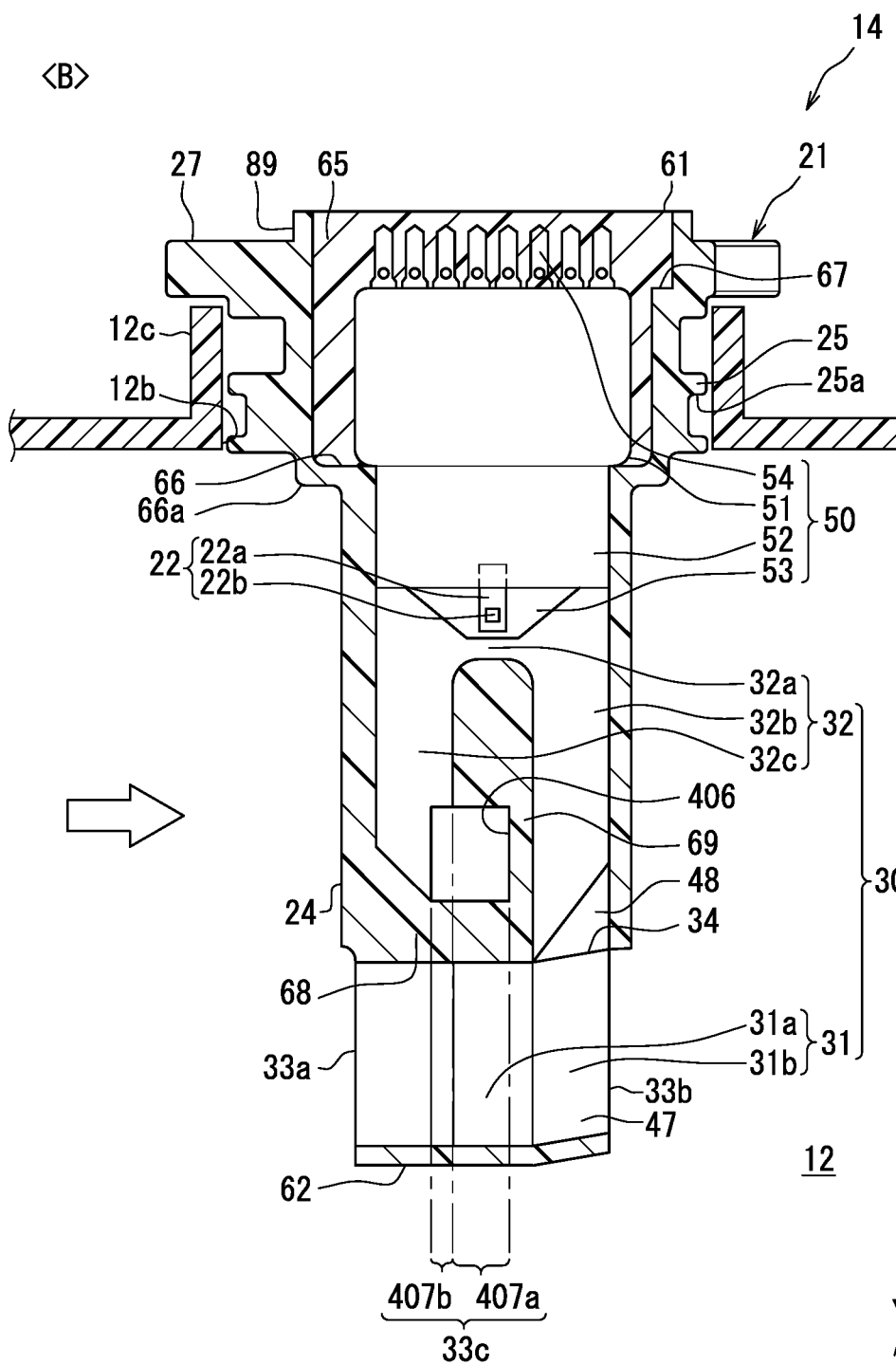
FIG. 88 is a vertical cross-sectional view of an air flow meter in a state of being attached to an intake pipe in Modification B5.

As Modification B5, in the first embodiment, the discharge path 32c of the measurement flow channel 32 may be narrowed toward the housing base end side in the height direction Y. For example, as shown in FIG. 88, a bulging region 406 in which a part of the discharge path 32c is bulged in the depth direction Z is included in the measurement flow channel 32. The bulging region 406 bulges toward the introduction path 32b side so as to keep a state in which the discharge path 32c and the introduction path 32b are separated from each other by the longitudinal partition wall 69, and is disposed at the end portion of the discharge path 32c on the housing tip side. The measurement outlet 33c has a portion 407a that opens the entirety of the bulging region 406 in the width direction X, and a portion 407b that protrudes from the longitudinal partition wall 69 toward the opposite side of the introduction path 32b. In this case, unlike the present modification, an open area of the measurement outlet 33c becomes large as compared with the configuration in which the measurement flow channel 32 does not have the bulging region 406, so that the discharge amount of the intake air from the measurement outlet 33c can be increased. As a result, a flow velocity of the air in the measurement flow channel 32 increases, so that the measurement accuracy of the flow rate detector 22 can be improved.

As Modification B6, in each of the embodiments described above such as the first embodiment, the flat surface 44 and the curved surface 45 may be included in the end face on the housing tip side or the end face on the housing base end side in the outer peripheral surface of the housing 21. In this case, the measurement outlet 33c is provided on the end face on the housing tip side and the end face on the housing base end side in the housing 21.

As Modification B7, in each of the embodiments described above, the positional relationship between the flat surface 44 and the curved surface 45 is not limited to the embodiments described above as long as the measurement outlet 33c is located at a position extending across the flat surface 44 and the curved surface 45. For example, in the first embodiment, the flat surface 44 may have at least one of the downstream flat portion 137a, the tip-side flat portion 137b, and the base end-side flat portion 137c. The curved surface 45 may have at least one of the upstream curved portion 138a, the tip-side curved portion 138b, and the base end-side curved portion 138c. In short, the flat surface 44 and the curved surface 45 may be disposed so that the vertical boundary 131a extends in the height direction Y. The vertical boundary 131a may be inclined with respect to the height direction Y.

As Modification B8, in each of the embodiments described above such as the first embodiment, the measurement outlet 33c may be disposed at a position of extending across the outer peripheral upstream end 132a in the width direction X on the outer peripheral surface of the housing 21. Even in this case, since the open area of the measurement outlet 33c is smaller than the open area of the inflow port 33a, a configuration can be realized in which the forward flow air hardly flows into the measurement outlet 33c.

Figure 6:
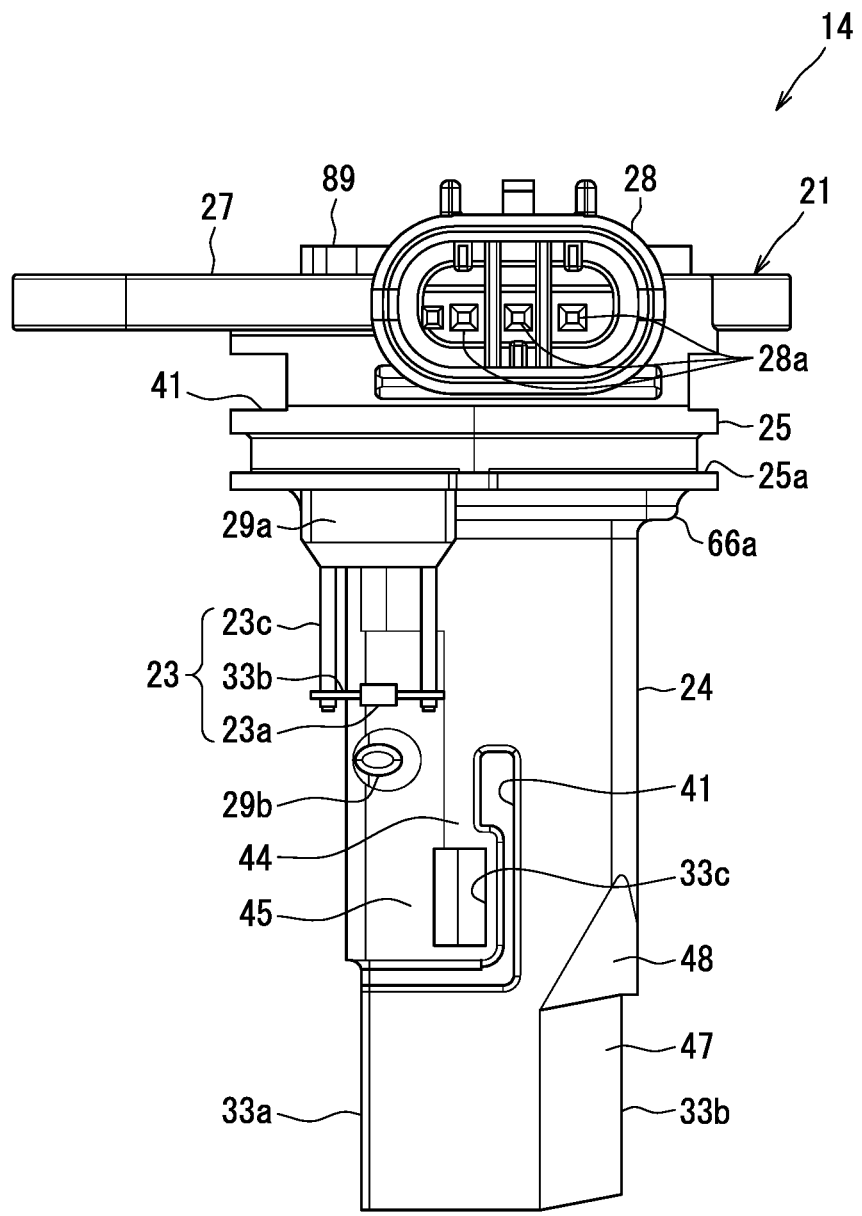
FIG. 6 is a side view of the air flow meter as viewed from a connector portion side.

As Modification B9, in the first embodiment, as shown in FIGS. 6 and 7, and the like, the thinned portions 41 may be provided on the flat surface 44. Even in this case, if the measurement outlet 33c and the thinned portions 41 are separated from each other in the depth direction Z, even if the turbulence of the air flow occurs around the thinned portions 41, the turbulence can be inhibited from reaching the measurement outlet 33c.

As Modification B10, in the first embodiment, the downstream defining surface 135b may be a curved surface instead of a tapered surface. In short, the downstream defining surface 135b may be an inclined surface inclined with respect to the flat surface 44. Further, in the configuration in which the downstream defining surface 135b is a curved surface, the curved surface may be curved so as to project toward the outer peripheral side of the housing 21, or may be curved so as to be recessed toward the inner peripheral side of the housing 21.

<Modifications of Configuration Group C>

Figure 89:
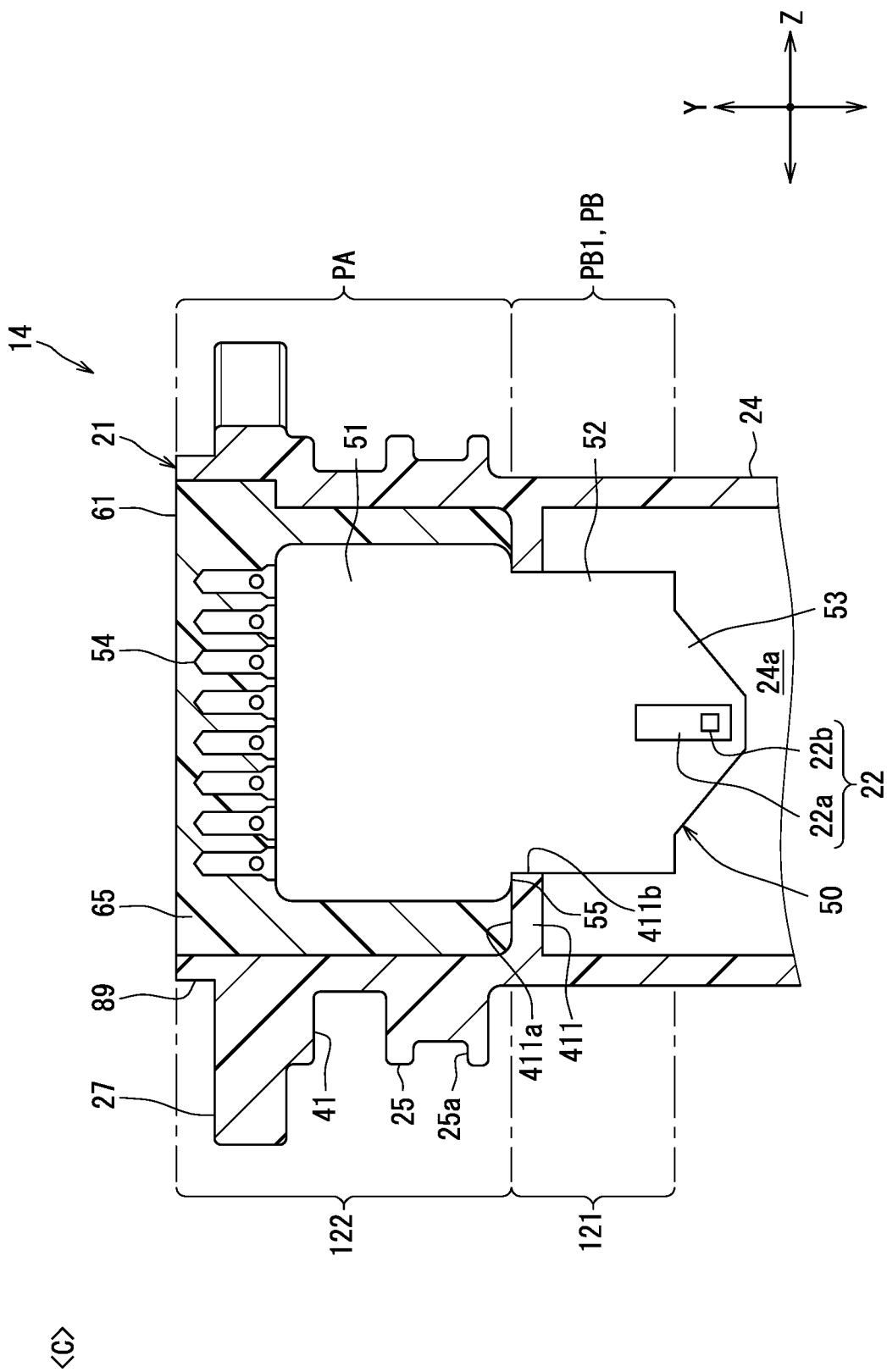
FIG. 89 is a vertical cross-sectional view of a periphery of a sensor SA in Modification C1.

As Modification C1, in the first embodiment, the accommodation wall portion 121 may not be a position holder. For example, as shown in FIG. 89, the housing body 24 has a positioning portion 411, and the positioning portion 411 protrudes from the accommodation wall portion 121 toward the inner peripheral side. In the above configuration, the housing body 24 does not have the overhanging portion 66a, and the accommodation wall portion 121 extends from the sealing wall portion 122 toward the housing tip side. For that reason, in the height direction Y, the boundary between the accommodation wall portion 121 and the sealing wall portion 122 coincides with the boundary between the sealing region PA and the accommodation region PB1.

The positioning portion 411 extends along the inner peripheral surface of the accommodation wall portion 121, and is disposed at the end portion of the accommodation wall portion 121 on the housing base end side. The positioning portion 411 is formed in a plate shape, and the plate surface 411a on the housing base end side in the positioning portion 411 comes in contact with the circuit step surface 55 of the sensor SA 50, similarly to the region step surface 66 of the first embodiment. The plate surface 411a restricts the sensor SA 50 from moving toward the housing tip side, and corresponds to a third holding portion. The tip end face 411b of the positioning portion 411 comes in contact with the outer peripheral surface of the junction portion 52 of the sensor SA 50, similarly to the tip end faces of the housing protrusions 72a and 72b of the first embodiment, thereby restricting the sensor SA 50 from moving in the width direction X and the depth direction Z. A portion of the tip end face 411b which faces in the width direction X corresponds to a first holding portion, and a portion which faces in the depth direction Z corresponds to a second holding portion.

The positioning portion 411 is provided at a position separated from the ring holding portion 25 toward the housing tip side. In this case, even if deformation due to resin molding occurs in the ring holding portion 25 and the sealing wall portion 122, it is considered that the deformation is absorbed in a portion between the ring holding portion 25 and the positioning portion 411 in the housing body 24. For that reason, the position and shape of the positioning portion 411 hardly changes with the deformation of the ring holding portion 25 and the sealing wall portion 122, as a result of which, the positional deviation of the flow rate detector 22 is inhibited.

Figure 90:
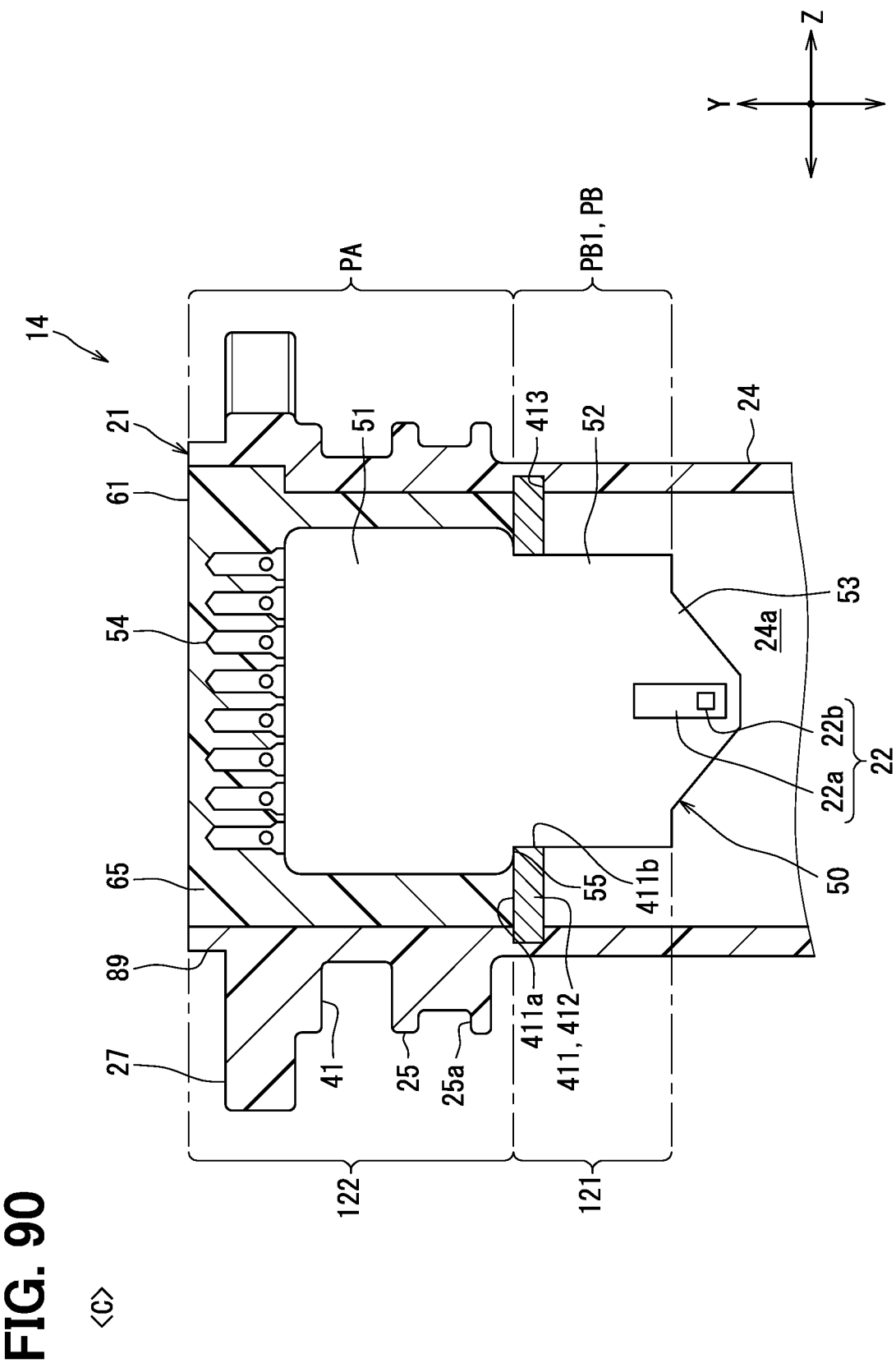
FIG. 90 is a vertical cross-sectional view of the periphery of the sensor SA in Modification C2.
Figure 91:
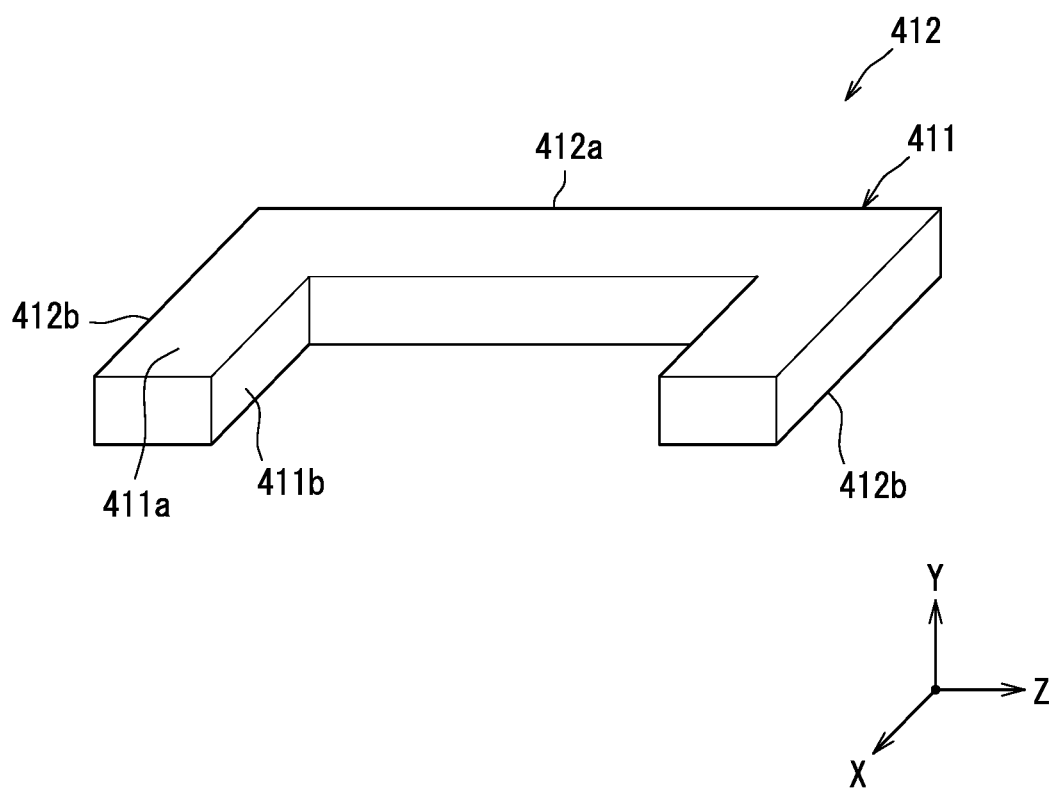
FIG. 91 is a perspective view of a positioning member.

As Modification C2, in the modification C1, the positioning portion 411 may be formed of a member different from the housing body 24. For example, as shown in FIGS. 90 and 91, the positioning member 412 forming the positioning portion 411 is attached to the housing body 24. Unlike the housing body 24, the positioning member 412 is formed of a conductive metal material or the like. Since the positioning member 412 has conductivity in this manner, static electricity charged in the housing body 24 having insulating properties is easily discharged by the positioning member 412. For that reason, the detection accuracy of the flow rate detector 22 can be inhibited from being lowered by static electricity.

The positioning member 412 has a depth portion 412a extending in the depth direction Z and a pair of width portions 412b extending in the width direction X, and each width portion 412b extends in the same direction from both ends of the depth portion 412a. In the positioning member 412, the plate surface 411a that comes in contact with the circuit step surface 55 of the sensor SA 50 is formed by the respective plate surfaces of the depth portion 412a and the width portions 412b. A tip end face 411b that comes in contact with the outer peripheral surface of the junction portion 52 of the sensor SA 50 is formed by the inner peripheral surface of the positioning member 412.

A support recess portion 413 for supporting the positioning member 412 is provided on the inner peripheral surface of the housing body 24. The support recess portion 413 is a recess portion recessed toward the outer peripheral side, and extends in a groove shape along the end portion of the housing base end side of the accommodation wall portion 121. The positioning member 412 is fitted into the support recess portion 413 with its outer peripheral end entering the support recess portion 413, and the positioning member 412 and the housing body 24 are bonded to each other by an adhesive or the like. The depth portion 412a of the positioning member 412 is disposed on the front surface side of the sensor SA 50, and is not disposed on the back surface side.

The housing 21 is not integrally molded as in the first embodiment, but is formed by assembling multiple members as in the fourth embodiment. For example, after the multiple members are each molded with resin and the positioning member 412 is molded with metal, the multiple members are assembled to each other so that the positioning member 412 is accommodated in the internal space 24a.

According to the present modification, since the positioning member 412 is a member separate from the housing body 24, the degree of freedom of selection of the material forming the positioning portion 411 can be increased. In addition, even when the shape and size are changed in accordance with a change in the specifications of the sensor SA 50, the existing housing 21 can be used by changing the shape and size of the positioning member 412.

As Modification C3, the sensor SAs 50 and 220 as detection units may include multiple physical quantity detectors. For example, in the fourth embodiment, the sensor SA 220 has two physical quantity detectors for detecting physical quantities that differ from each other. As shown in FIG. 92, the sensor SA 220 with the above configuration has a first detector 421 for detecting the flow rate of an air and a second detector 422 for detecting the temperature of the air as physical quantity detectors. As with the flow rate detector 202 according to the fourth embodiment, the first detector 421 is provided in the measurement flow channel 32 to detect the flow rate of the intake air in the measurement flow channel 32. As with the intake air temperature sensor 23 according to the first embodiment, the second detector 422 is provided outside the housing 201, to thereby detect the temperature of the intake air in the intake passage 12.

The sensor SA 220 includes a first support portion 423 that supports the first detector 421 and a second support portion 424 that supports the second detector 422. The first support portion 423 extends from the SA base portion 221 toward the housing tip side similarly to the detection support portion 223 in the fourth embodiment. The second support portion 424 extends from the SA base portion 221 toward the upstream wall portion 231 in the depth direction Z, and is disposed at a position closer to the end of the SA base portion 221 on the housing tip side. An outer peripheral insertion portion 426 into which the second support portion 424 is inserted is provided at the outer peripheral portion of the housing body 204, and the second detector 422 is disposed at a portion of the second support portion 424 exposed to the outside of the housing through the outer peripheral insertion portion 426.

The housing body 204 is provided with a housing recess portion 427 whose outer peripheral surface is formed to be recessed toward the downstream side. The housing recess portion 427 is disposed at an intermediate position of the housing body 204 in the height direction Y. In the upstream wall portion 231, the portion connecting the first regulation portion 251 and the second regulation portion 255 in the fourth embodiment is not provided. Instead of that portion, a regulating connection portion 428 for connecting the first regulation portion 251 and the second regulation portion 255 is provided at a position closer to the downstream wall portion 232 than the upstream wall portion 231, and a bottom surface of the housing recess portion 427 is formed by the outer peripheral surface of the regulating connection portion 428. Like the first regulation portion 251 and the second regulation portion 255, the regulating connection portion 428 is included in the base member 261, and is integrally molded with the regulation portions 251 and 255 and the like.

The outer peripheral insertion portion 426 is provided in the regulating connection portion 428. The outer peripheral insertion portion 426 is a through hole that penetrates through the regulating connection portion 428 in the depth direction Z, and an inner peripheral surface 426a of the outer peripheral insertion portion 426 comes in contact with the outer peripheral surface of the second support portion 424. In this case, the movement of the second support portion 424 in the width direction X and the height direction Y is restricted by the inner peripheral surface 426a of the outer peripheral insertion portion 426, and the inner peripheral surface 426a can be referred to as a positioning surface. The downstream-side plate surface of the regulating connection portion 428 is in contact with the outer peripheral surface of the SA base portion 221. In this instance, the movement of the sensor SA 220 toward the upstream side is regulated by the downstream-side plate surface of the regulating connection portion 428, and the downstream-side plate surface can be referred to as a positioning surface.

Further, as shown in FIG. 92, the housing 201 does not need to have the sealing member 206. Even in this case, the housing attachment is configured by the flange portion 207, and the wall thickness of the housing attachment is not changed. The housing attachment does not necessarily have to be thicker than the accommodation wall portion 121.

As Modification C4, in the fourth embodiment, the first regulation portion 251 and the second regulation portion 255 may be formed of a member different from the housing body 204. For example, a first regulation member forming the first regulation portion 251 is attached to the housing body 204. In the above configuration, the first regulation member is formed in a plate shape. A support recess portion for supporting the first regulation member is formed on the inner peripheral surface of the housing body 204, and the outer peripheral end of the first regulating member is fitted in the support recess portion. The first regulation member is made of a conductive metal material or the like. Since the first regulation member has conductivity in this manner, static electricity charged in the housing body 204 having insulating properties is easily discharged by the first regulating member. For that reason, the detection accuracy of the flow rate detector 202 can be inhibited from being lowered by static electricity.

As Modification C5, in the first embodiment, the depth housing protrusion 72b of the housing body 24 may have the function of only one of the first holding portion and the second holding portion. For example, in the SA side surface 126, the depth housing protrusion 72b is in contact with a portion orthogonal to the depth direction Z. The depth housing protrusion 72b with the above configuration holds the sensor SA 50 in position in the depth direction Z, and has the function of the first holding portion, but does not have the function of the second holding portion.

In addition, the width housing protrusion 72a may have the functions of both the first holding portion and the second holding portion. For example, the width housing protrusion 72a comes in contact with a portion of the outer peripheral surface of the sensor SA 50 inclined in both the width direction X and the depth direction Z. The width housing protrusion 72a with the above configuration holds the sensor SA 50 in position in both the width direction X and the depth direction Z, and has the functions of both the first holding portion and the second holding portion.

As Modification C6, the third holding portion may have at least one function of the first holding portion and the second holding portion. For example, in the first embodiment, the region step surface 66 of the housing body 24 is not orthogonal to the height direction Y, but inclined with respect to the height direction Y. In the above configuration, the region step surface 66 is inclined with respect to the width direction X and the depth direction Z so as to face the inner peripheral side, and the circuit step surface 55 of the sensor SA 50 is inclined with respect to the width direction X and the depth direction Z so as to face the outer peripheral side. In this instance, since the circuit step surface 55 enters the inside of the region step surface 66 and the circuit step surface 55 comes in contact with the region step surface 66, the sensor SA 50 is restricted from moving not only in the height direction Y but also in the width direction X and the depth direction Z. For that reason, the region step surface 66 has the functions of the first holding portion and the second holding portion in addition to the function of the third holding portion. The circuit step surface 55 and the region step surface 66 may be inclined by a tapered surface or may be inclined by a curved surface.

As Modification C7, in the detection units which are the sensor SAs 50 and 220, the portion that comes in contact with the position holder of the housing does not have to be located closer to the physical quantity detector such as the flow rate detectors 22 and 202 in the detection unit. For example, in the first embodiment, the separation distance L3 between the flow rate detector 22 and the circuit step surface 55 may be larger than the separation distance L4 between the base end portion of the sensor SA 50 and the circuit step surface 55.

As Modification C8, the physical quantity measurement device may be fixed to the intake pipe 12a through no sealing member such as the O-ring 26 or the sealing member 206. For example, the housing has a housing fitting portion that fits into the airflow insertion hole 12b, and the outer peripheral surface of the housing fitting portion and the inner peripheral surface of the airflow insertion hole 12b are in close contact with each other. In the above configuration, the housing fitting portion is included in the housing attachment, and the position holders such as the accommodation wall portion 121 and the first regulation portion 251 are provided closer to the housing tip side than the housing fitting portion.

As Modification C9, the entire portion of the housing which does not enter the intake passage 12 may be the housing attachment. For example, in the fourth embodiment, in addition to the sealing holder 205 and the flange portion 207, a portion of the housing 201 which does not enter the intake passage 12 is also included in the housing attachment. In the above configuration, a portion of the housing body 204 facing the inner peripheral surface of the airflow insertion hole 12b and the inner peripheral surface of the pipe flange 12c is included in the housing attachment. Also, in the above configuration, if the first regulation portion 251 as the position holder is located closer to the housing tip side than the housing attachment, even if deformation due to resin molding occurs in the housing attachment, the position and shape of the first regulation portion 251 due to the deformation can be inhibited from being unintentionally changed.

As Modification C10, the housing opening may be opened in the depth direction Z. For example, in the fourth embodiment, the housing opening 241 is provided in the upstream wall portion 231 or the downstream wall portion 232 of the housing body 204. Also, in the above configuration, the sensor SA 220 can be inserted into the internal space 204a from the housing opening 241, and the thermosetting resin can be injected into the internal space 204a from the housing opening 241.

As Modification C11, three or more members may be assembled to each other when forming the housing. For example, in the fourth embodiment, two cover members, that is, a front cover member and a back cover member, are assembled to the base member 261. In the above configuration, the front cover member is a cover member 262, and the back cover member is a member having at least a part of the back wall portion 234 of the housing body 204.

As Modification C12, not all of the detection units, which are the sensor SAs 50 and 220, may be accommodated in the internal space of the housing. In other words, at least a part of the detection unit may be accommodated in the internal space. For example, in the first embodiment, the tip portions of the lead terminals 54 of the sensor SA 50 protrude to the outside through the housing opening 61. Also, in the above configuration, the member covering the lead terminals 54 is attached to the housing 21, so that the lead terminals 54 and the connector terminals 28a can be protected.

As Modification C13, the position holder such as the accommodation wall portion 121 and the first regulation portion 251 may be provided closer to the housing base end side than the housing attachment as long as the position holder is separated from the housing attachment in the housing. Also, in the above configuration, since the position holder and the housing attachment are separated from each other, even if deformation due to resin molding occurs in the housing attachment, the position and shape of the position holder can be inhibited from changing due to the deformation.

As Modification C14, a physical quantity detector for detecting a physical quantity different from the flow rate of the intake air may be provided in the measurement flow channel. Examples of the physical quantity detector provided in the measurement flow channel include a detector for detecting a temperature, a detector for detecting a humidity, a detector for detecting a pressure, and the like in addition to the flow rate detectors 22 and 202. Those detectors may or may not be mounted on the sensor SAs 50 and 220 as the detection units. The physical quantity detector not mounted on the detection unit may be attached to the inner peripheral surface of the measurement flow channel, or may be attached to a projection portion or the like protruding from the inner peripheral surface of the measurement flow channel. In addition, the physical quantity detector may be provided in the bypass flow channels 30 and 210, not in the measurement flow channel. In other words, the physical quantity detector may be provided in the passage flow channel.

<Modification of Configuration Group D>

Figure 93:
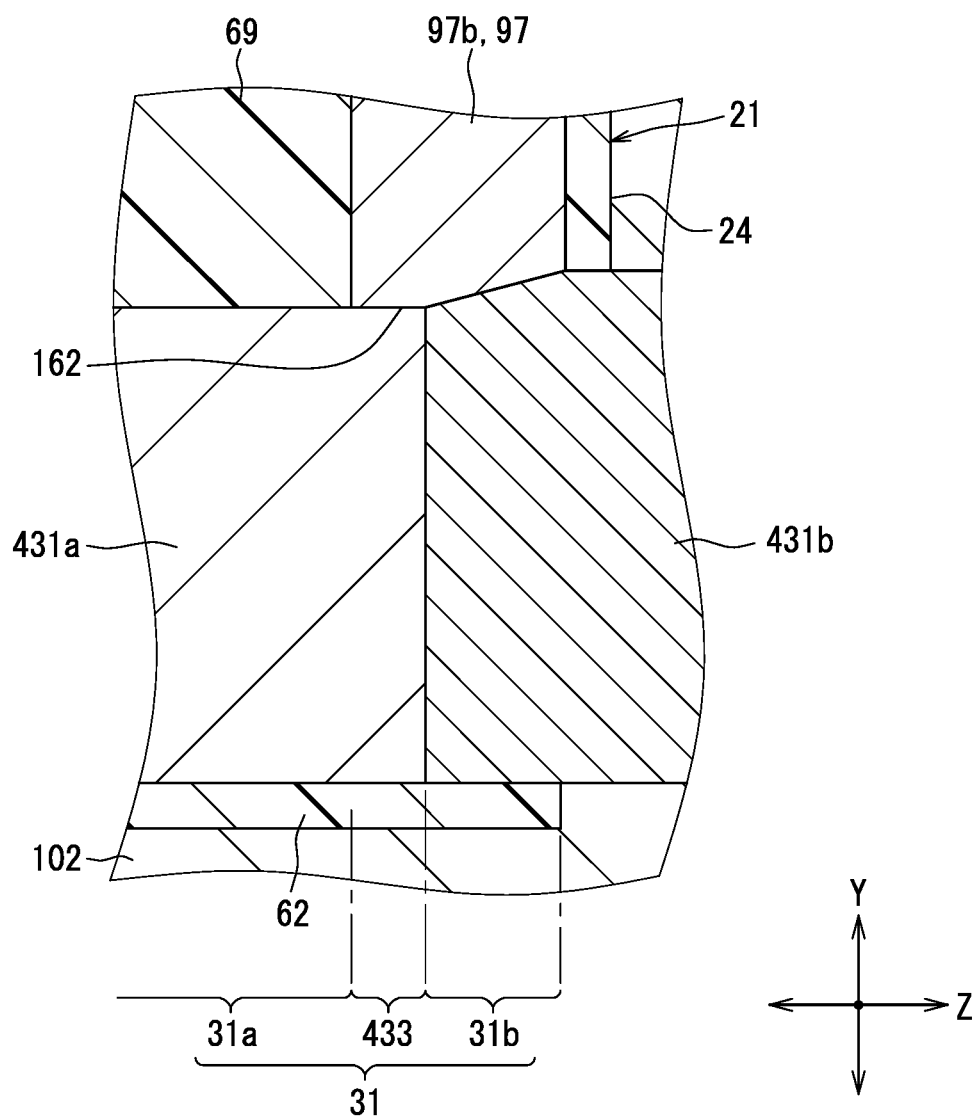
FIG. 93 is a diagram illustrating the molding of a passage flow channel by a measurement molding portion, an inflow passage mold portion, and an outflow passage mold portion in Modification D1.
Figure 94:
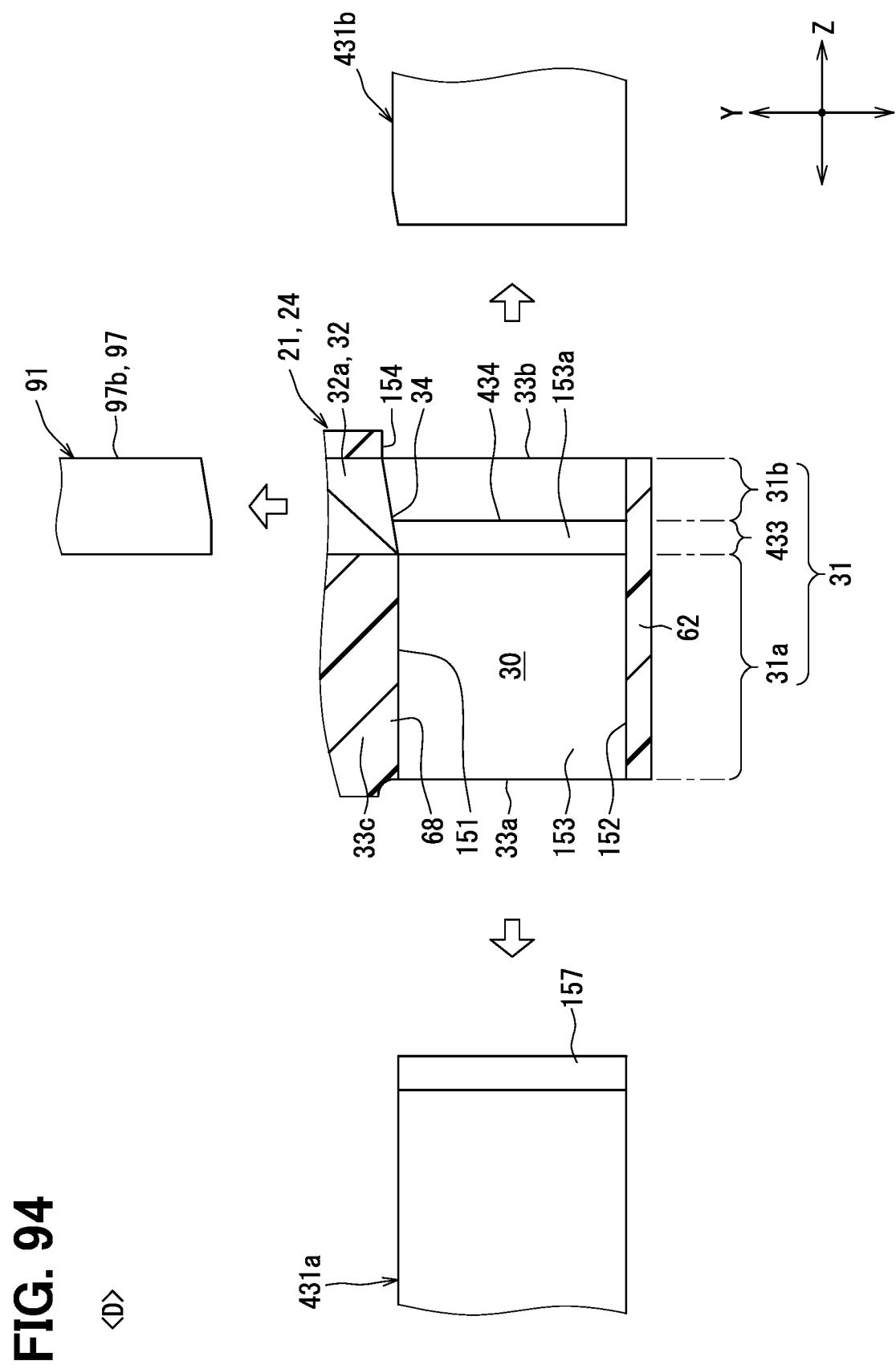
FIG. 94 is a view showing a state in which the measurement molding portion, the inflow passage mold portion, and the outflow passage mold portion are removed from the housing.

As Modification D1, the mold device may have multiple passage mold portions for molding the passage flow channel. For example, in the first embodiment, as shown in FIGS. 93 and 94, the passage flow channel 31 of the housing 21 is molded by the passage mold portions 431a and 431b.

The passage flow channel 31 with the above configuration has a throttle passage portion 433 provided between the inflow passage 31a and the outflow passage 31b. While the throttle passage portion 433 narrows the passage flow channel 31 toward the outflow port 33b, the outflow passage 31b does not narrow the passage flow channel 31 toward the outflow port 33b. For example, the inner peripheral surface of the throttle passage portion 433 includes the wall throttle surface 153a, while the inner peripheral surface of the outflow passage 31b does not include the wall throttle surface 153a. When the boundary between the throttle passage portion 433 and the outflow passage 31b is referred to as a throttle boundary 434, the passage flow channel 31 is not narrowed from the throttle boundary 434 toward either the inflow port 33a or the outflow port 33b.

The mold device 90 has an inflow passage mold portion 431a and an outflow passage mold portion 431b instead of the passage mold portion 104 of the first embodiment. In the mold device 90, the passage mold portions 431a and 431b abut against each other and also abut against the measurement molding portion 97. The inflow passage mold portion 431a and the outflow passage mold portion 431b abut against each other at their respective tip end faces, and the surfaces of the respective housing base end sides of the passage mold portions 431a and 431b abut against the tip end face of the measurement molding portion 97.

The inflow passage mold portion 431a and the outflow passage mold portion 431b do not thicken toward the respective tip end faces. For that reason, when the mold device 90 is removed from the resin molded housing 21, the inflow passage mold portion 431a can be extracted from the inflow port 33a, and the outflow passage mold portion 431b can be extracted from the outflow port 33b. The inflow passage mold portion 431a corresponds to an inflow mold portion, and the outflow passage mold portion 431b corresponds to an outflow mold portion.

According to the above modification, in the passage flow channel 31, a portion closer to the inflow port 33a side than the throttle boundary 434 is molded by the inflow passage mold portion 431a, and a portion closer to the outflow port 33b side than the throttle boundary 434 is molded by the outflow passage mold portion 431b. For that reason, there is no need to extract the inflow passage mold portion 431a from the outflow port 33b, and there is no need to extract the outflow passage mold portion 431b from the inflow port 33a, so that the degree of freedom in design and manufacturing relating to the shape and size of the passage flow channel 31 can be enhanced. Moreover, since the inflow passage mold portion 431a can be extracted from the inflow port 33a and the outflow passage mold portion 431b can be extracted from the outflow port 33b, the inner peripheral surface of the passage flow channel 31 can be integrally molded.

As Modification D2, in the configuration in which the positional deviation between the passage mold portion and the measurement mold portion is regulated by fitting the mold projection portion into the mold recess portion, either the passage mold portion or the measurement mold portion may have the mold projection portion. For example, in the fifth embodiment, the measurement molding portion 97 has the mold projection portion 334, and the passage mold portion 104 has the mold recess portion 335, but the measurement molding portion 97 may have the mold recess portion 335, and the passage mold portion 104 may have the mold projection portion 334.

Figure 95:
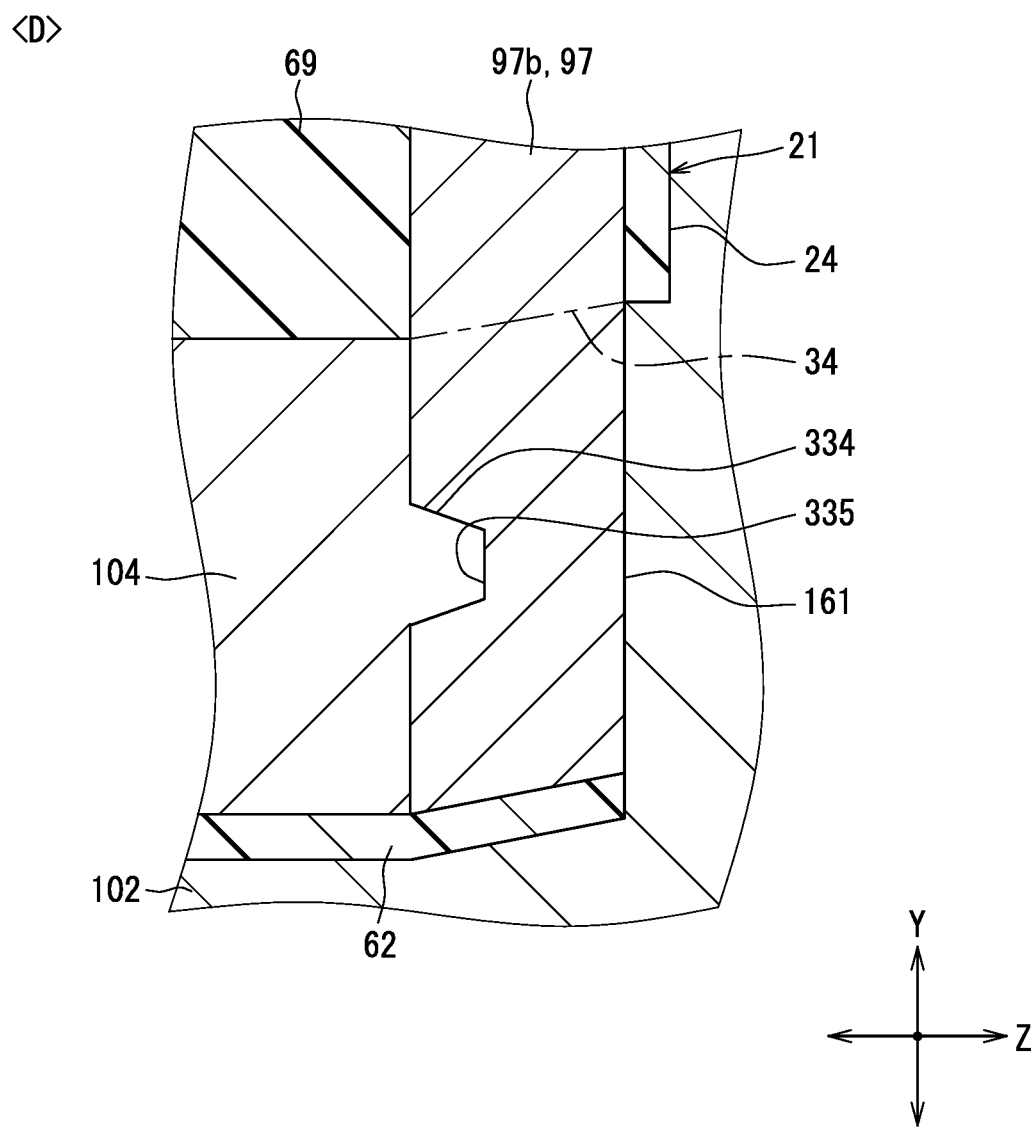
FIG. 95 is a diagram illustrating the molding of the passage flow channel by the measurement molding portion and the passage mold portion in Modification D2.

For example, in the first embodiment, as shown in FIG. 95, the tip end face of the passage mold portion 104 does not abut against the outer peripheral mold portions 102 and 103 but abuts against the measurement molding portion 97. In the above configuration, in a state before the mold device 90 is removed from the resin molded housing 21, the measurement molding portion 97 is inserted between the passage mold portion 104 and the outer peripheral mold portions 102 and 103 in the passage flow channel 31, and the tip end face of the passage mold portion 104 and the side surface of the measurement molding portion 97 abut against each other. In the abutment portion, the mold projection portion 334 is provided on the tip end face of the passage mold portion 104, and the mold recess portion 335 is provided on the side surface of the measurement molding portion 97. In this case, unlike the first embodiment, the measurement molding portion 97 is removed from the housing 21 after the passage mold portion 104 has been extracted from the inflow port 33a.

The configuration in which the mold projection portion fits into the mold recess portion may be applied to Modification D1 described above. For example, the mold recess portion 335 is provided in each of the inflow passage mold portion 431a and the outflow passage mold portion 431b, and the mold projection portion 334 fitted in each of the mold recess portions 335 of the passage mold portions 431a and 431b is provided in the measurement molding portion 97. One of the mold projection portion and the mold recess portion may be provided in the inflow passage mold portion 431a, and the other may be provided in the outflow passage mold portion 431b. In this case, the position deviation can be restricted between the inflow passage mold portion 431a and the outflow passage mold portion 431b in the width direction X and the height direction Y.

As Modification D3, in the fifth embodiment, the mold recess portion 335 does not have to surround the four sides of the mold projection portion 334. For example, the mold recess portion 335 is opened in the width direction X in the passage mold portion 104. In the above configuration, the mold recess portion 335 is a groove portion extending in the width direction X on the inner passage surface 159, and the mold projection portion 334 is shaped to extend along the groove portion. Also, in the above configuration, the mold projection portion 334 enters the mold recess portion 335, thereby restricting the relative movement between the passage mold portion 104 and the measurement molding portion 97 in the depth direction Z.

Figure 96:
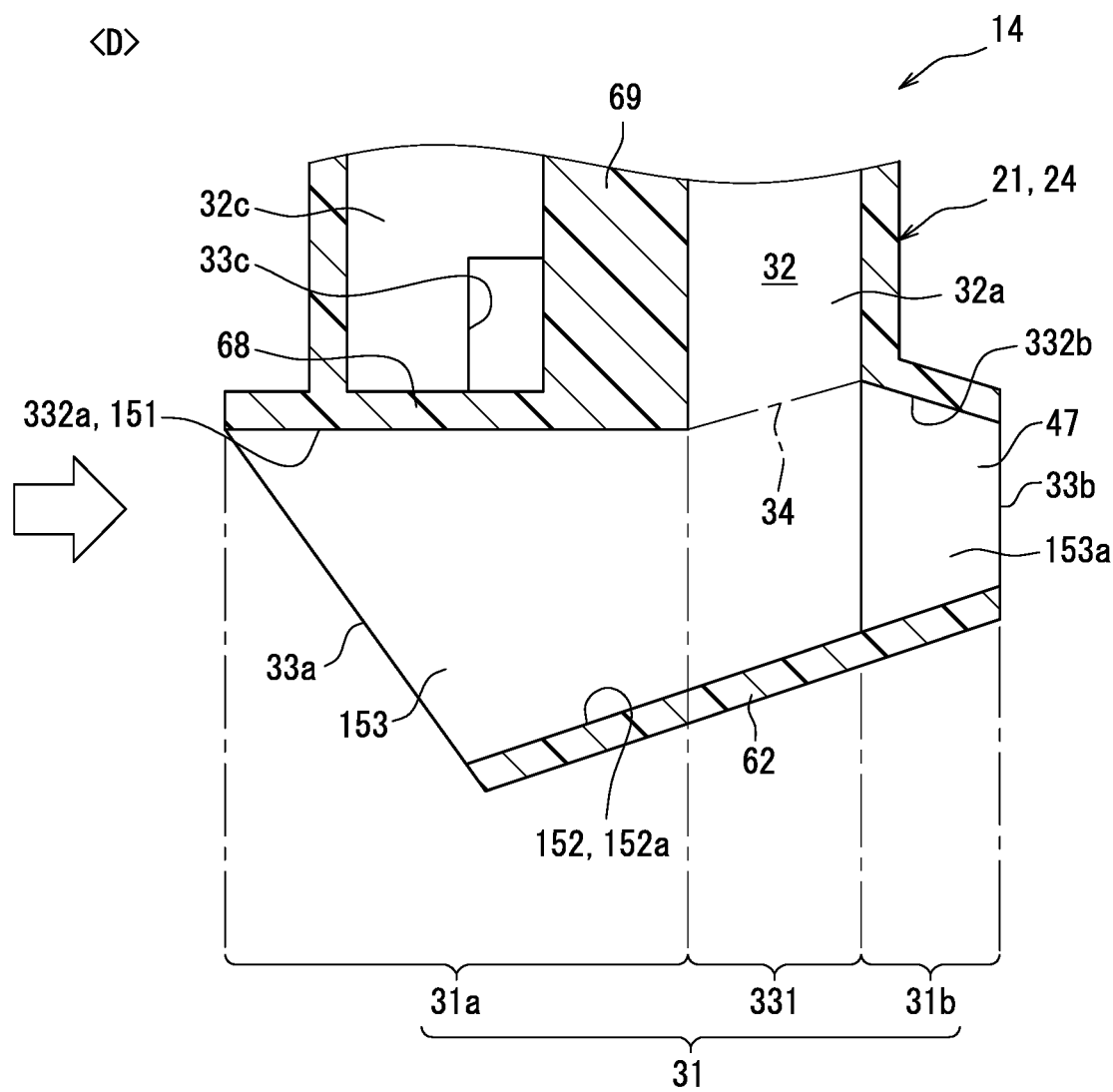
FIG. 96 is a vertical cross-sectional view of the housing around the passage flow channel in Modification D4.

As Modification D4, the inflow port may be opened in a direction inclined with respect to the depth direction Z. For example, the inflow port may be opened obliquely to the side opposite to the housing base end side. For example, in the fifth embodiment, as shown in FIG. 96, in the depth direction Z, the upstream end portion of the passage floor surface 152 is disposed at a position closer to the outflow port 33b than the upstream end portion of the passage ceiling surface 151.

In the above configuration, as compared with the fifth embodiment, the length dimension of the passage floor surface 152 is reduced in the depth direction Z, and the passage floor surface 152 is also reduced in the height direction Y by an amount corresponding to the reduction. For that reason, compared with the fifth embodiment, the height dimension of the inflow port 33a in the height direction Y is reduced, and a foreign matter is less likely to enter from the inflow port 33a by the amount of the reduction.

In the configuration in which the floor throttle surface 152a is included in the passage floor surface 152, it is considered that there is a foreign matter that can easily enter the measurement flow channel 32 instead by changing the direction of advancing against the floor throttle surface 152a. On the other hand, in the present modification, it is assumed that as the passage floor surface 152 is longer in the depth direction Z, the possibility that the advancing direction of the foreign matter is changed to the direction in which the foreign matter easily enters the measurement flow channel 32 is higher, and the portion disposed in the height direction Y is not provided at the upstream end portion of the passage ceiling surface 151 in the floor throttle surface 152a. In other words, in the floor throttle surface 152a, a portion having a high possibility of changing the advancing direction of the foreign matter to a direction in which the foreign matter easily enters the measurement flow channel 32 is deleted. This makes it possible to inhibit the foreign matter that has abutted against the floor throttle surface 152a from entering the measurement flow channel 32.

As Modification D5, the flow channel boundary portion 34 does not have to face the outflow port 33b side. For example, in the first embodiment, the flow channel boundary portion 34 extends in the depth direction Z similarly to the passage ceiling surface 151. In the above configuration, in the mold device 90, the boundary between the measurement molding portion 97 and the passage mold portion 104 coincides with the flow channel boundary portion 34.

As Modification D6, the passage mold portion may be extracted from the outflow port instead of the inflow port. For example, in the first embodiment, the passage mold portion 104 is extracted from the outflow port 33b. In the above configuration, the passage mold portion 104 is not thickened toward the tip portion of the passage mold portion 104 in the same manner as in the first embodiment, but the direction in which the passage mold portion 104 is assembled to the outer peripheral mold portions 102 and 103 is opposite to that in the first embodiment. Further, the passage flow channel 31 is configured not to be narrowed from the inflow port 33a toward the outflow port 33b, contrary to the first embodiment.

As Modification C7, in the fifth embodiment, the inclination angle 83 in the passage floor surface 152 may not be uniform depending on the location. Even in the above case, assuming a virtual line in which the upstream end portion and the downstream end portion of the passage floor surface 152 are connected straight to each other, the inclination angle of the virtual line with respect to the inflow ceiling portion 332a is larger than the inclination angle 82 of the flow channel boundary portion 34, so that a configuration in which the passage mold portion 104 can be extracted from the inflow port 33a can be realized.

<Modifications of Configuration Group E>

Figure 97:
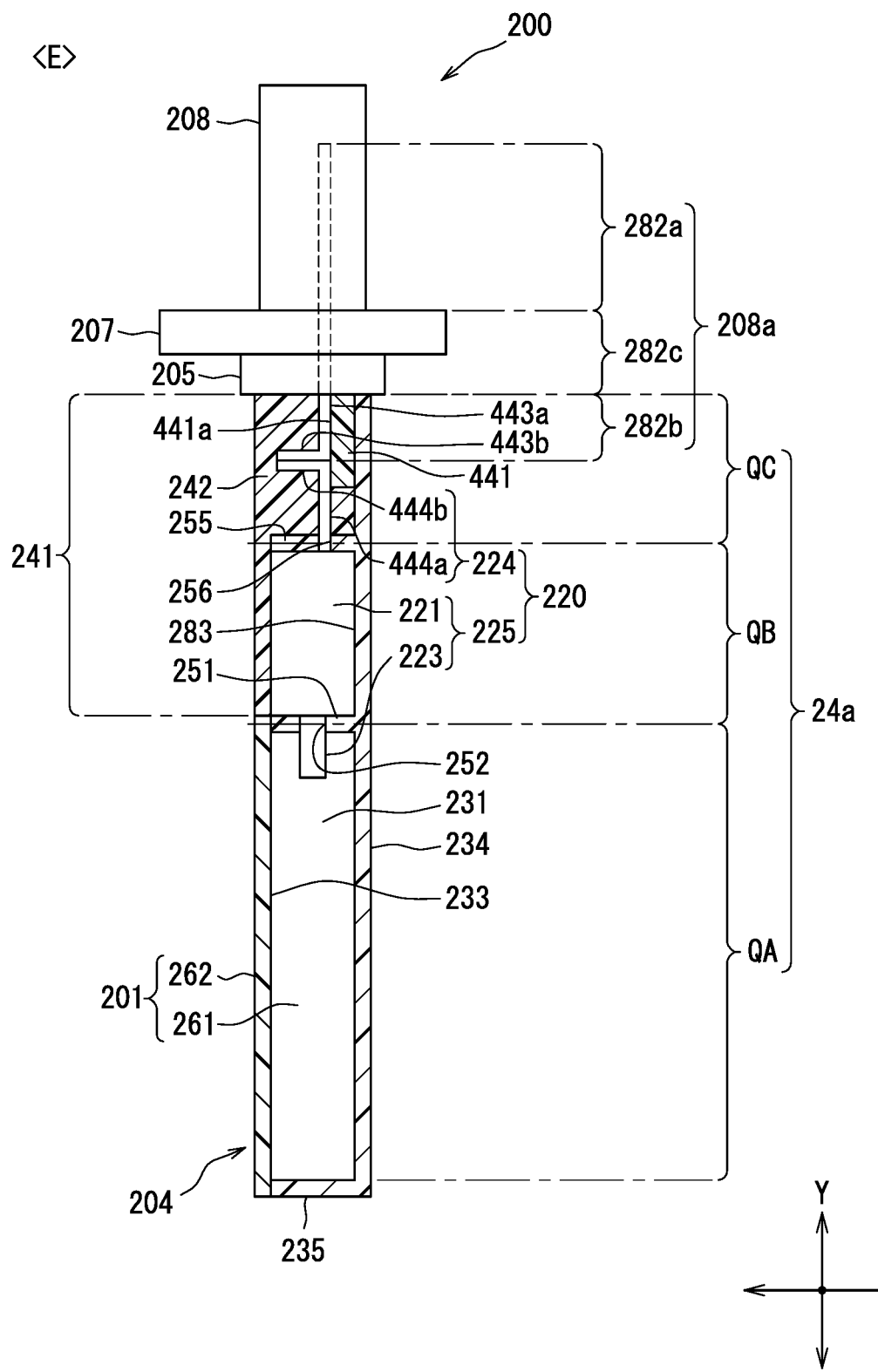
FIG. 97 is a vertical cross-sectional view of a housing in Modifications E1 and E2.
Figure 98:
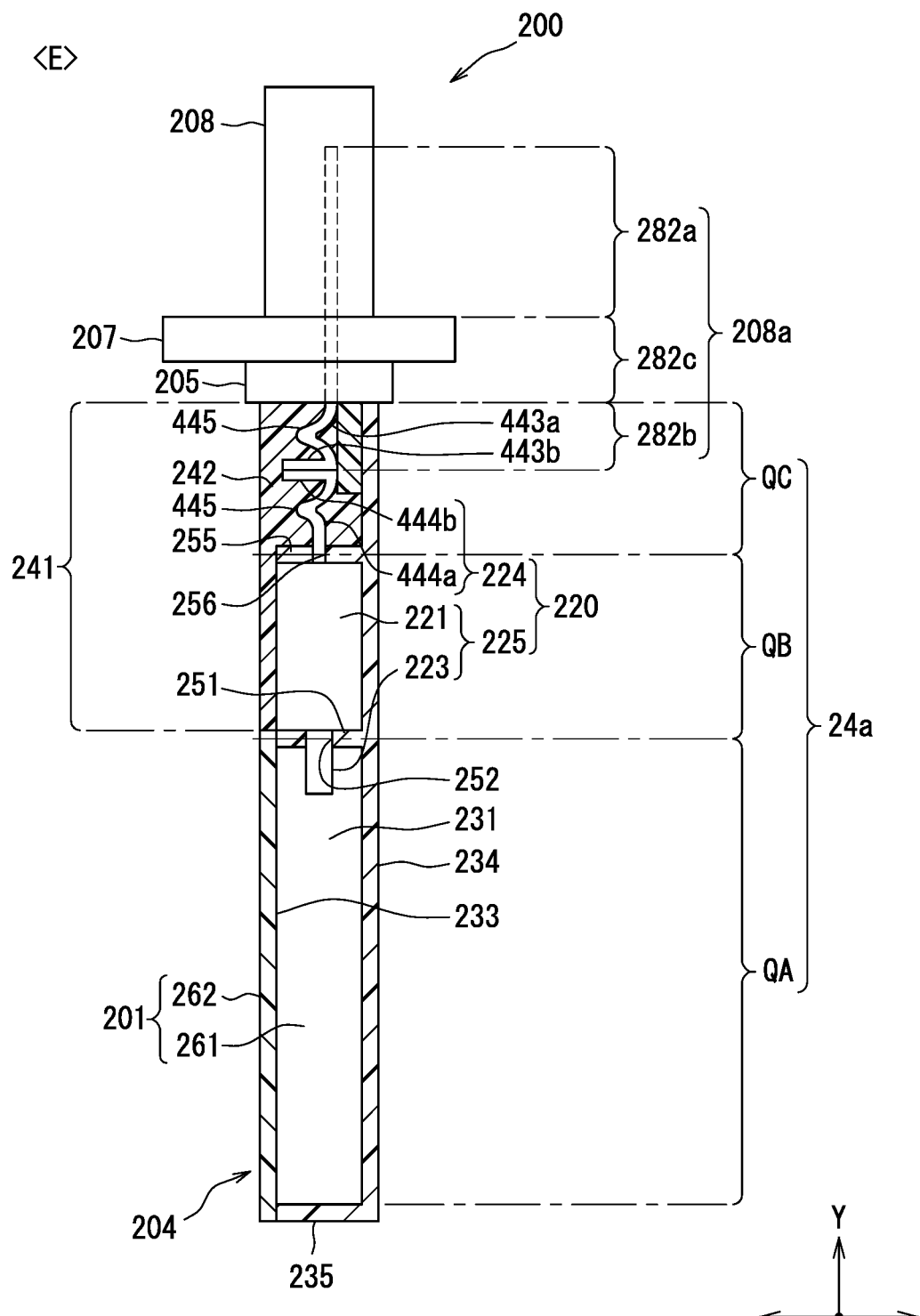
FIG. 98 is a vertical cross-sectional view of the housing in Modifications E1 to E3.
Figure 99:
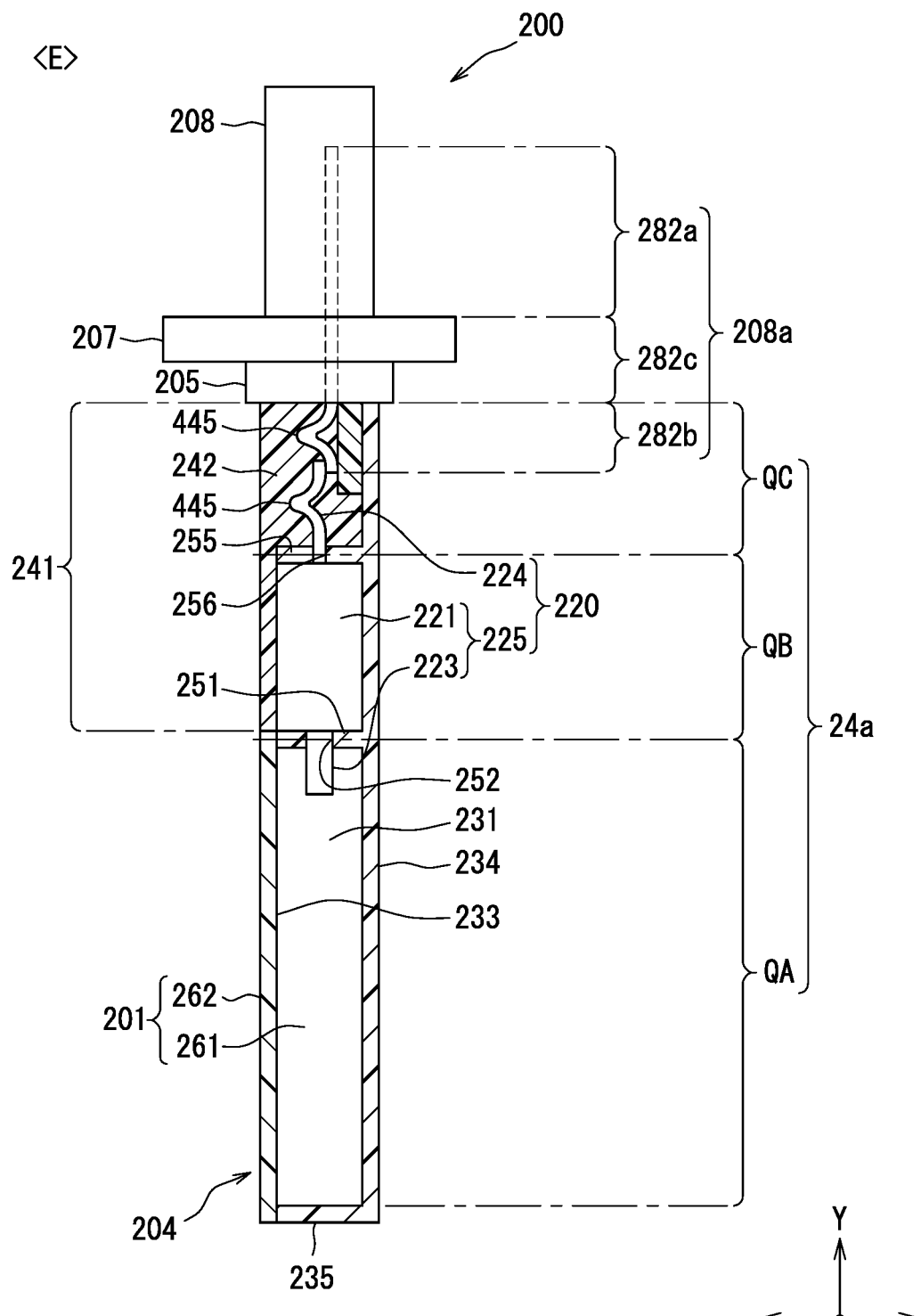
FIG. 99 is a vertical cross-sectional view of the housing in Modifications E2 and E3.

As Modification E1, in the fourth embodiment, the air flow meter 200 may have a terminal support portion that supports the connector terminal 208a in the connector region QC. For example, as shown in FIGS. 97 to 99, in the connector region QC, a back support portion 441 as a terminal support portion is provided between the second terminal portion 282b and the back wall portion 234. The back support portion 441 is formed of a synthetic resin material in a plate shape, and is bonded to the back wall portion 234 by an adhesive or the like in a state of being superposed on the inner peripheral surface of the back wall portion 234. The second terminal portion 282b abuts against the plate surface of the back support portion 441 on the housing opening 241 side. In this case, the back support portion 441 supports the second terminal portion 282b from the side opposite to the housing opening 241.

The back support portion 441 is extended to the second terminal portion 282b and the lead terminal 224 in the height direction Y. In other words, the back support portion 441 is provided at a position of extending across the boundary between the second terminal portion 282b and the lead terminal 224 in the height direction Y. As with the second terminal portion 282b, the lead terminal 224 is in contact with the plate surface of the back support portion 441 on the housing opening 241 side. In this case, in addition to the second terminal portion 282b, the back support portion 441 supports the lead terminals 224 from the side opposite to the housing opening 241.

In the housing 201, the SA main body 225 of the sensor SA 220 is caught by the back wall 234, and the wall surface 283 of the back wall portion 234 on the housing opening 241 maintains the position of the sensor SA 220. In the back support portion 441, the lead terminal 224 of the sensor SA 220 is caught by the back support portion 441, and the plate surface 441a of the back support portion 441 on the side of the housing opening 241 holds the position of the lead terminal 224. In this case, the wall surface 283 corresponds to a unit holding surface, and the plate surface 441a corresponds to a terminal holding surface.

The back support portion 441 may be made of a metal material. The back support portion 441 may be formed by a part of the housing 201. For example, the back support portion 441 is formed by a projection portion in which the back wall portion 234 of the housing 201 protrudes toward the housing opening 241 side. In the above configuration, the tip end face of the projection portion is the plate surface 411a of the back support portion 441, and corresponds to a terminal holding surface.

According to the present modification, in the connector region QC, the second terminal portion 172b is supported by the back support portion 441 from the side opposite to the housing opening 241. For that reason, the second terminal portion 172b is less likely to be unintentionally deformed or displaced. In this case, the second terminal portion 282b is displaced from the lead terminal 224, thereby being capable of inhibiting the second terminal portion 282b and the lead terminal 224 from being properly joined to each other.

According to the present modification, the lead terminal 224 inserted between the housing opening 241 and the back support portion 441 is supported by the back support portion 441 from the side opposite to the housing opening 241. For that reason, the lead terminal 224 is less likely to be unintentionally deformed or displaced. This makes it possible to inhibit that the second terminal portion 282b and the lead terminal 224 cannot be properly joined to each other due to the positional deviation of the lead terminals 224 with respect to the second terminal portion 282b.

According to the present modification, the plate surface 441a of the back support portion 441 supporting the lead terminal 224 of the sensor SA 220 is disposed at a position closer to the housing opening 241 than the wall surface 283 of the back wall portion 234 supporting the SA main body 225. In this case, since there is no need to insert the joining tool deeper than the plate surface 441a when the second lead portion 342 and the lead terminals 224 are joined to each other, the joining tool can be inhibited from unintentionally coming in contact with the housing 201.

As Modification E2, in the fourth embodiment, in the connection portion between the connector terminal 208a and the lead terminal 224, the connector terminal 208a and the lead terminal 224 may be aligned not in the width direction X and the depth direction Z but in the height direction Y. For example, as shown in FIGS. 97 and 98, each of the second terminal portion 282b and the lead terminal 224 extends toward the housing opening 241.

The second terminal portion 282b configured as described above has a terminal extending portion 443a extending from the sealing holder 205, and a terminal rising portion 443b rising from the terminal extending portion 443a toward the housing opening 241. The lead terminal 224 has a lead extending portion 444a extending from the SA main body 225, and a lead rising portion 444b rising from the lead extending portion 444a toward the housing opening 241. The lead rising portion 444b extends in the width direction X along the terminal rising portion 443b, and is joined to the terminal rising portion 443b by welding or the like. The terminal rising portion 443b corresponds to a vertical terminal portion.

According to the above modification, the terminal rising portion 443b extends from the back support portion 441 toward the housing opening 241. In this case, when the lead rising portion 444b and the terminal rising portion 443b are sandwiched between a joining tool such as welding electrodes or the like, there is no need to insert the joining tool into the back side of the lead rising portion 444b and the terminal rising portion 443b from the housing opening 241. For that reason, when the lead rising portion 444b and the terminal rising portion 443b are joined to each other with the use of the joining tool, the joining operation can be facilitated.

As Modification E3, in the fourth embodiment, the lead terminal 224 and the connector terminal 208a may have a vent 445 as a bent portion. For example, as shown in FIG. 98, the lead extending portion 444a of the lead terminal 224 and the terminal extending portion 443a of the connector terminal 208a each have the vent 445. As shown in FIG. 99, each of the lead terminal 224 and the second terminal portion 282b has the vent 445. In either configuration, stresses applied to the lead terminal 224 and the connector terminal 208a can be reduced by the vents 445.

Figure 100:
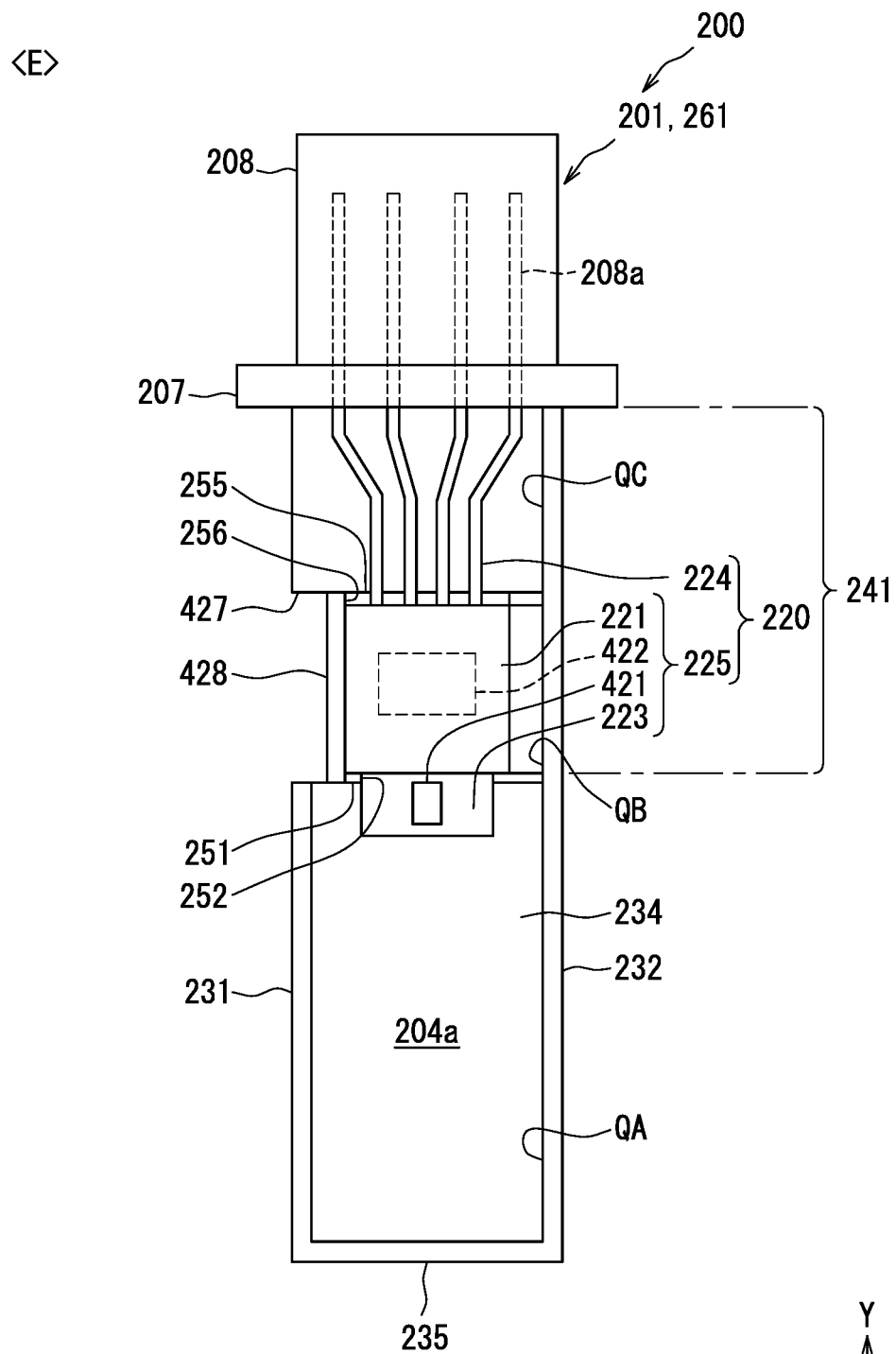
FIG. 100 is a view showing an internal structure of the housing in a state in which the potting portion and the cover member are removed in Modification E4.
Figure 101:
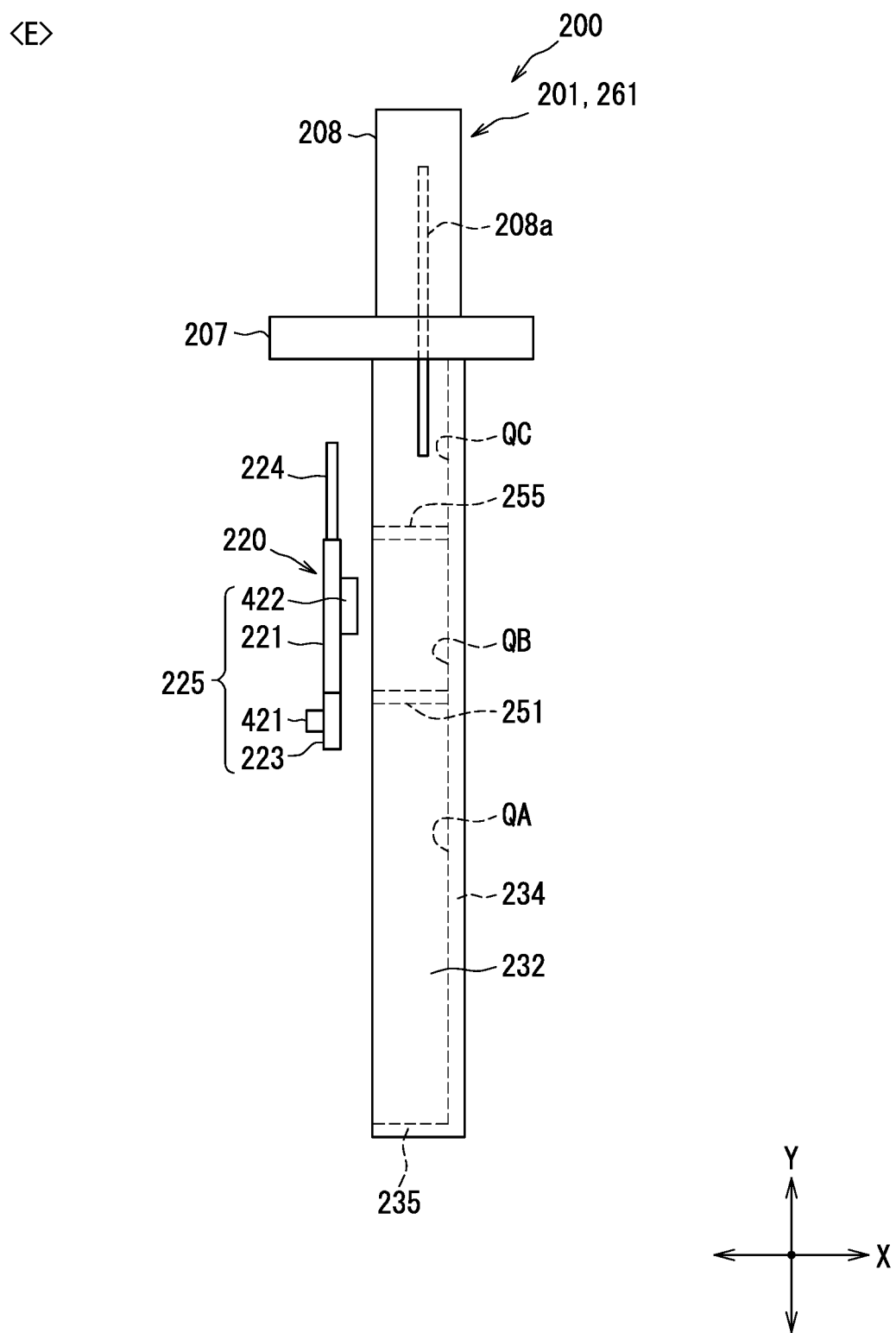
FIG. 101 is a vertical cross-sectional view of the housing in which the base member and the sensor SA are disassembled.

As Modification E4, similarly to Modification C3, the sensor SAs 50 and 220 as the detection units may have multiple physical quantity detectors. In Modification C3 described above, in the fourth embodiment, a configuration is exemplified in which the first detector 421 is provided inside the housing 201, and the second detector 422 is provided outside the housing 201. On the other hand, in the present modification, a configuration in which both the first detector 421 and the second detector 422 are provided inside the housing 201 will be exemplified. For example, in the fourth embodiment, as shown in FIGS. 100 and 101, the first detector 421 is disposed on the plate surface on the housing opening 241 side in the sensor SA 220, and the second detector 422 is disposed on the plate surface on the other side to the housing opening 241. In the above configuration, the first detector 421 faces the front wall portion 233, and the second detector 422 faces the back wall portion 234.

Figure 102:
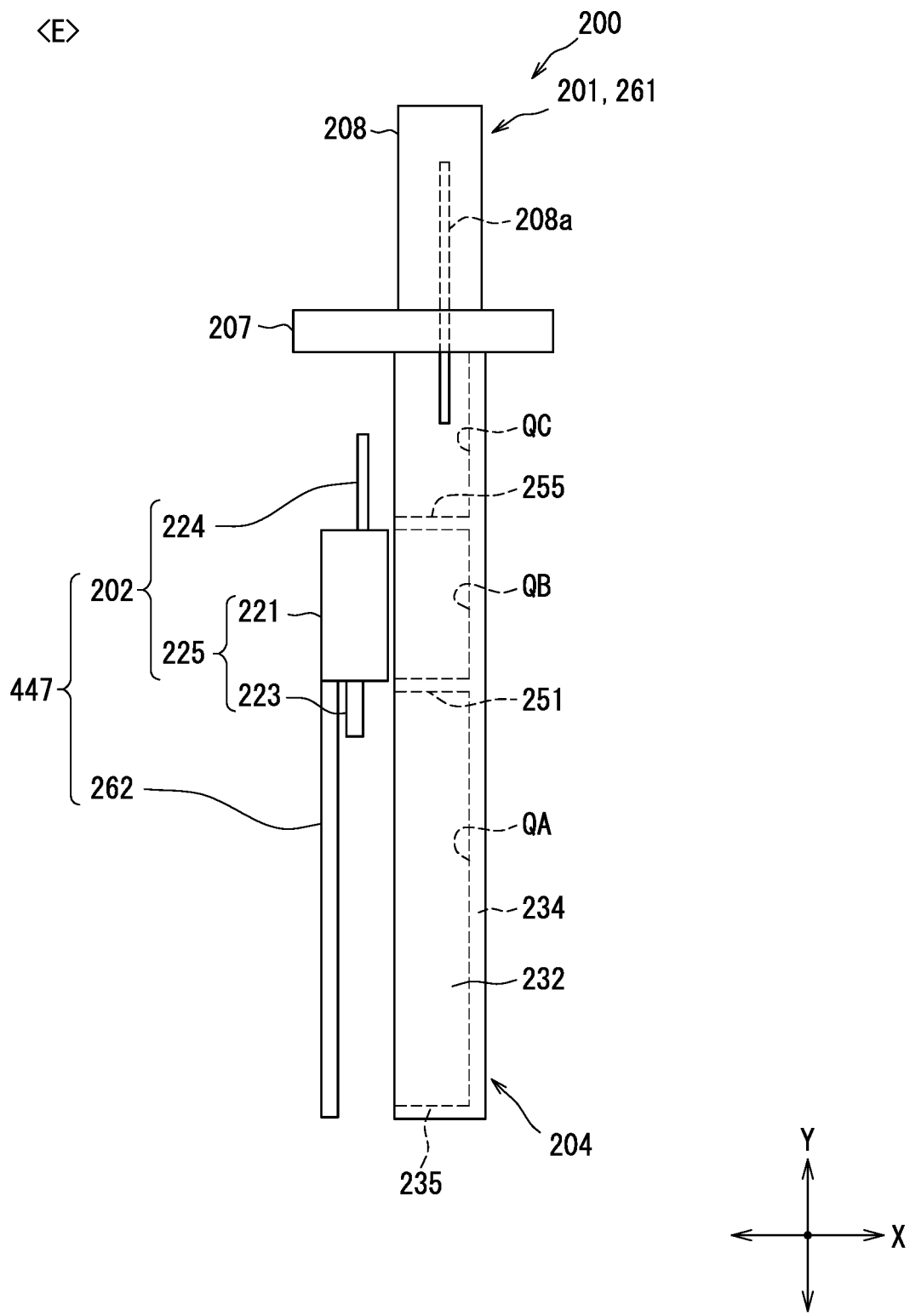
FIG. 102 is a vertical cross-sectional view of a housing in which a base member and a cover unit are disassembled in Modification E5.

As Modification E5, in the fourth embodiment, the sensor SA 220 and the cover member 262 may be assembled to each other, and the sensor SA 220 and the cover member 262 may be collectively attached to the base member 261. For example, as shown in FIG. 102, a cover unit 447 is formed by assembling the sensor SA 220 and the cover member 262 to each other, and the cover unit 447 is attached to the base member 261. According to the above configuration, the number of components can be reduced and the structure of the air flow meter 200 can be simplified.

Figure 103:
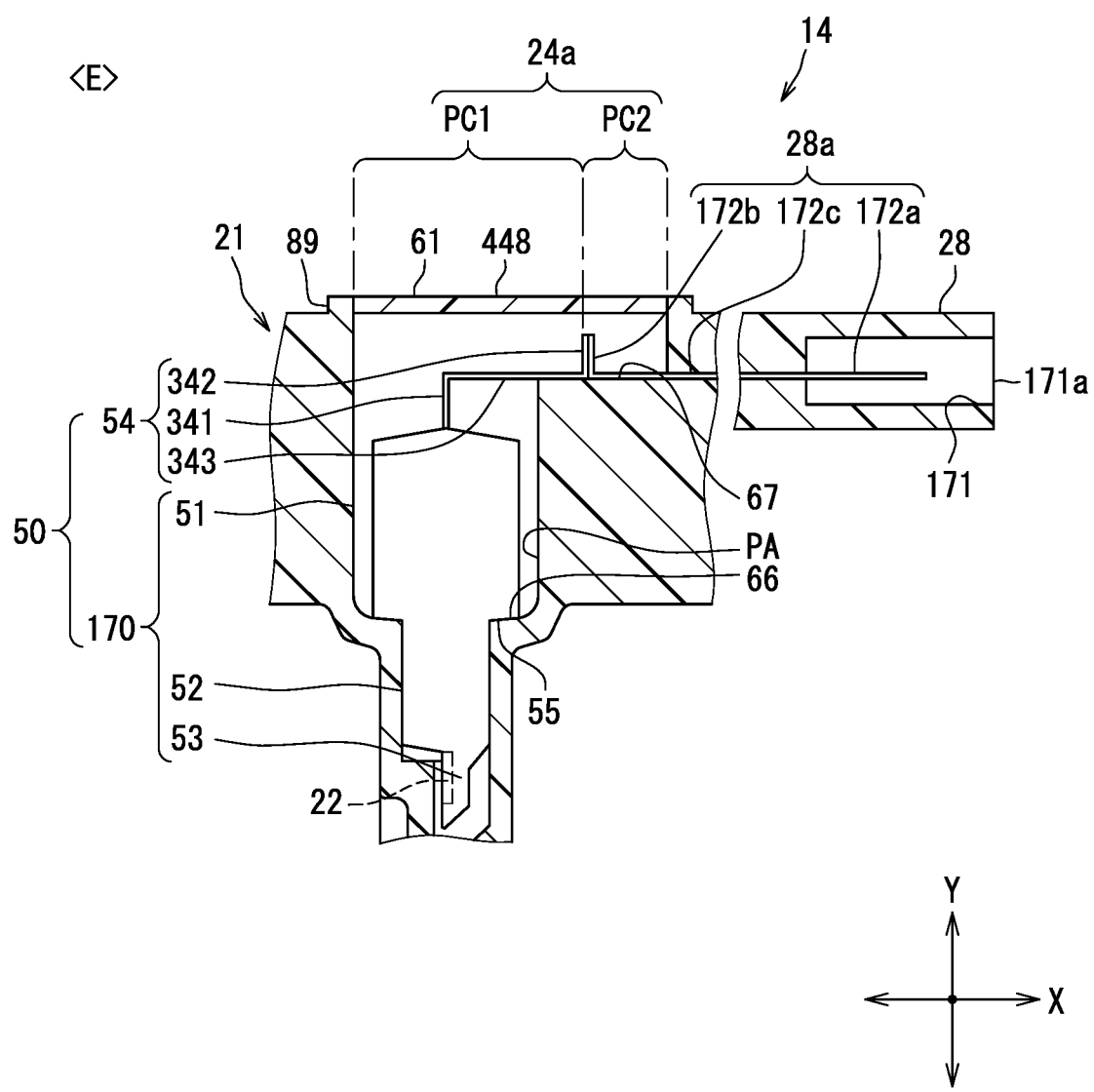
FIG. 103 is a vertical cross-sectional view of the housing in Modification E6.

As Modification E6, the internal space of the housing may be sealed by the cover member. For example, in the first embodiment, as shown in FIG. 103, the internal space 24a of the housing 21 is sealed by the cover member 448. In the above configuration, the potting portion 65 is not formed because the internal space 24a is not filled with a thermosetting resin. The cover member 448 is a separate member that is resin molded independently of the housing 21, and is fitted into the housing opening 61. The internal space 24a may be sealed by both the potting portion 65 and the cover member 448. For example, after the potting portion 65 has been formed by filling the internal space 24a with the thermosetting resin, the cover member 448 is attached to the housing opening 61.

Figure 105:
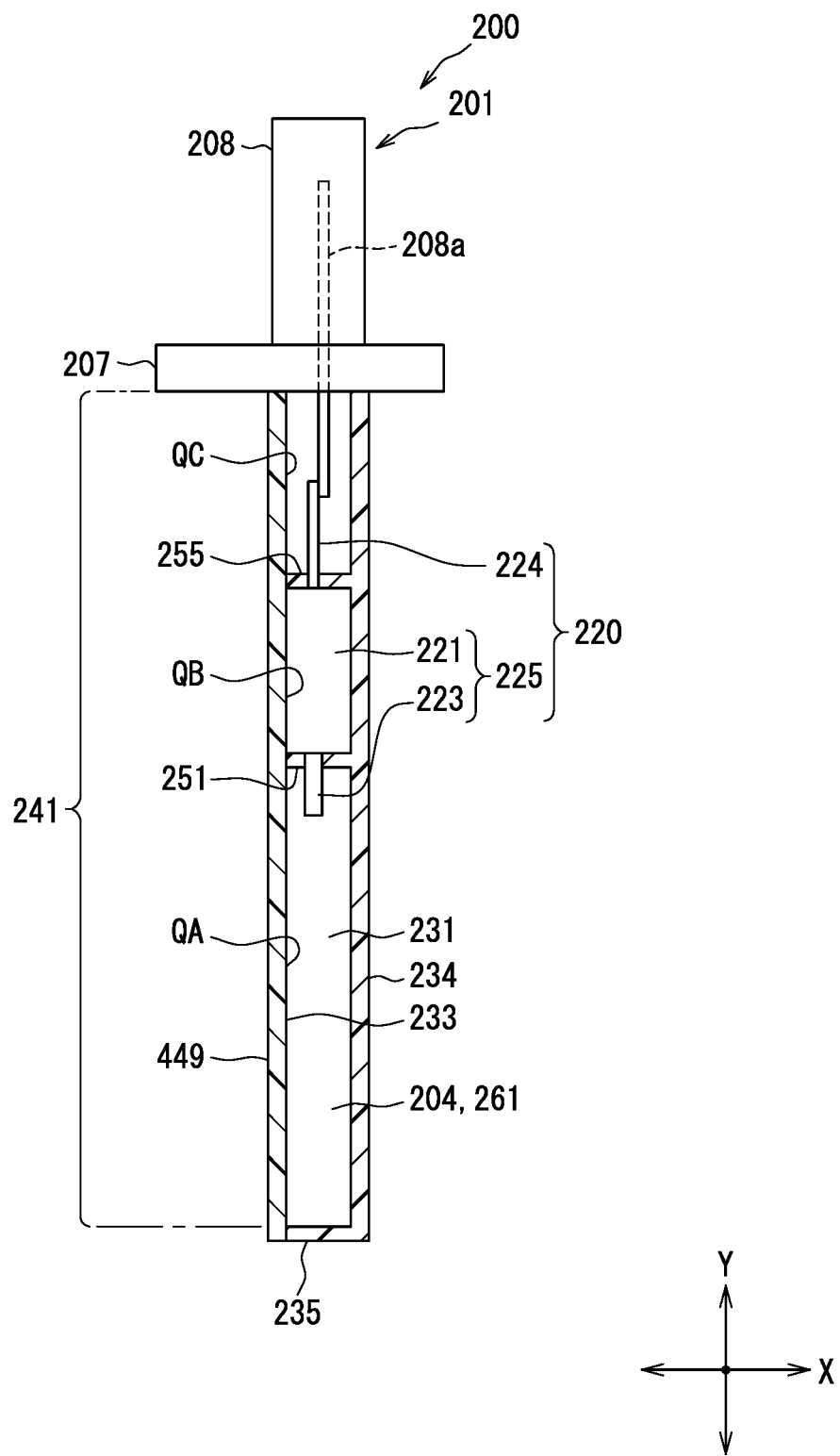
FIG. 105 is a vertical cross-sectional view of the housing.

In the fourth embodiment, as shown in FIGS. 104 and 105, the internal space 204a of the housing 201 is sealed with a cover member 449. In the above configuration, a portion of the open portion of the base member 261, which is not closed by the cover member 262, is not the housing opening 241 as in the fourth embodiment, but the entire open portion of the base member 261 is the housing opening 241. The cover member 449 is fitted into the housing opening 241 to close the entire housing opening 241. The internal space 204a may be sealed by both the potting portion 242 and the cover member 449. For example, after the potting portion 242 has been formed by filling the internal space 204a with a thermosetting resin, the cover member 262 is attached to the housing opening 241.

As Modification E7, the connector terminal may protrude into the main body region. Even in this case, if the connector terminal does not enter between the detection unit and the housing opening in the direction in which the detection unit and the housing opening are aligned, the connector terminal does not hinder the insertion of the detection unit into the internal space of the housing. For example, in the first embodiment, the connector terminals 28a protrudes into the main body region PC1, so that the second terminal portion 172b is disposed in the main body region PC1. Also, in the above configuration, the second terminal portion 172b does not need to be inserted between the housing opening 61 and the sensor SA 50 in the height direction Y.

As Modification E8, in the first embodiment, the connection terminal portion 172c of the connector terminal 28a may be exposed to the connector region PC2. For example, the connection terminal portion 172c is separated from the sealing step surface 67 toward the housing opening 61. Even in the above configuration, if the connection terminal portion 172c and the second terminal portion 172b do not protrude into the main body region PC1, the terminal portions 172b and 172c can be inhibited from hindering the sensor SA 50 from being inserted into the internal space 24a.

As Modification E9, in the first embodiment, the second terminal portion 172b may extend not in the height direction Y but in the width direction X or the depth direction Z.

As Modification E10, the connector region may not be disposed between the housing opening and the unit body in the direction in which the housing opening and the detection unit are aligned in the internal space of the housing. For example, in the first embodiment, the sealing step surface 67 is disposed at a position farther from the housing opening 61 than the lead terminal 54 in the height direction Y. In the above configuration, the connector region PC2 is aligned laterally with the sensor SA 50 in the width direction X.

As Modification E11, if the connector terminal is fixed to the housing, a part of the connector terminal does not necessarily have to be embedded in the housing. For example, the connector terminal is attached to the housing after the housing has molded with resin with the use of a mold device. Also, in the above configuration, if the physical quantity measurement device is configured such that the connector terminal does not hinder the insertion of the detection unit into the internal space of the housing, the detection unit can be installed in the internal space of the housing after the connector terminal has been attached to the housing.

<Modifications of Configuration Group F>

Figure 106:
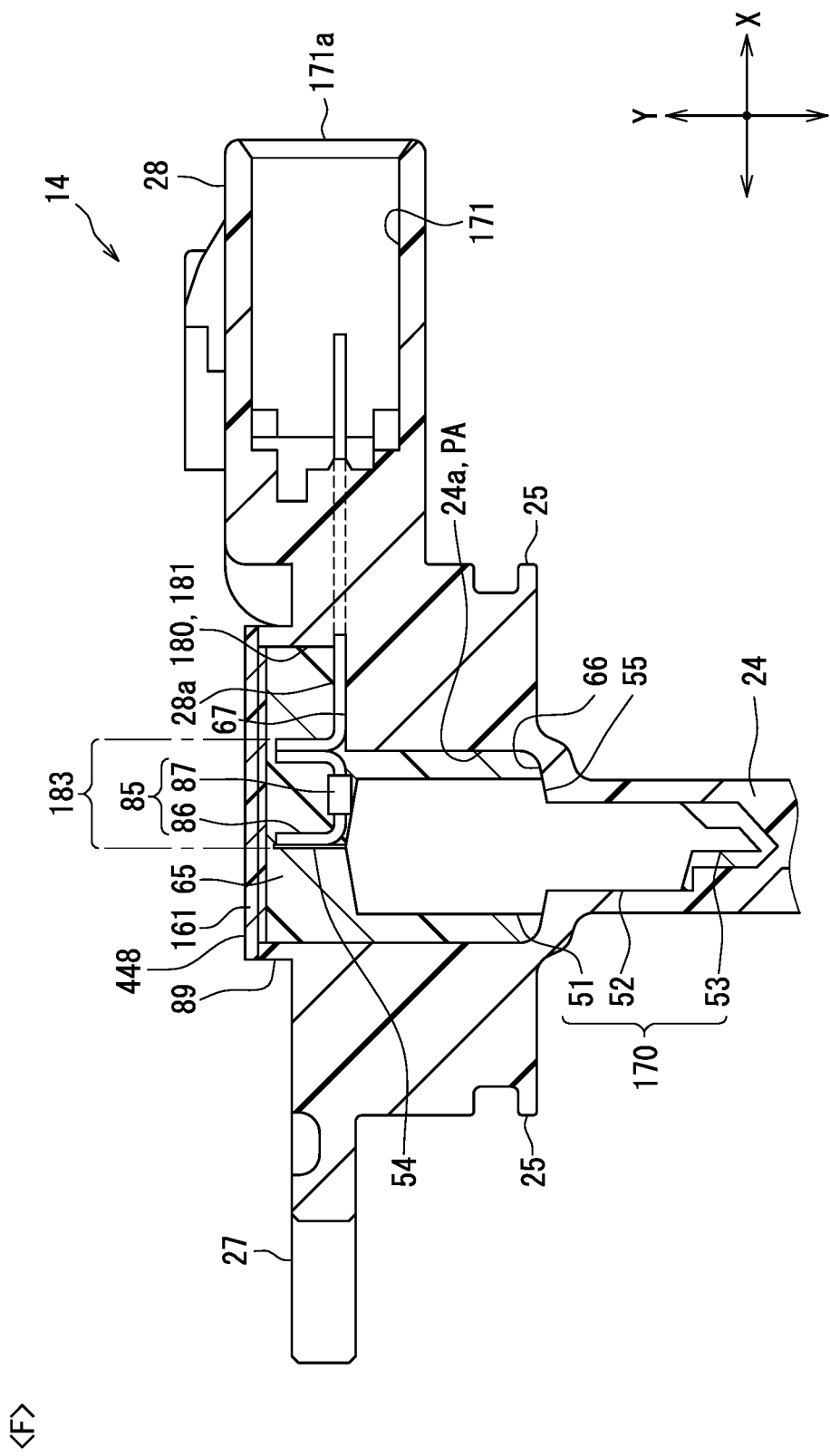
FIG. 106 is a vertical cross-sectional view of the housing in Modification F1.

As Modification F1, similarly to Modification E6 described above, the detection unit installed in the internal space of the housing may be hidden from the housing opening side by the cover member. For example, in the first embodiment, as shown in FIG. 106, the sensor SA 50 installed in the internal space 24*a* is hidden from the housing opening 61 by the cover member 448. The cover member 448 covers the connection portion 183 in addition to the sensor SA 50. The cover member 448 has a portion that enters the internal space 24*a* and a portion that overlaps with the end face of the lip 89, and the portion that enters the internal space 24*a* is fitted to the inner peripheral surface 180 of the sealing region PA.

In the above configuration, both the potting portion 65 and the cover member 448 are provided in the internal space 24*a*, and the cover member 448 is disposed on the other side of the sensor SA 50 across the potting portion 65. In this case, at least one of the potting portion 65 and the cover member 448 may seal the internal space 24*a*.

At the time of manufacturing the air flow meter 14, the cover member 448 is used as a separate member from the housing 21, and molded with resin with the use of a molding device or the like. After the sensor SA 50 is installed in the internal space 24*a* of the housing 21 and the potting portion 65 is formed by injecting a thermosetting resin into the internal space 24*a*, the cover member 448 is attached to the housing 21. In this case, the cover member 448 is fixed to the inner peripheral surface 180 of the sealing region PA or the end face of the lip 89 with the use of an adhesive, a molten resin, or the like.

Figure 107:
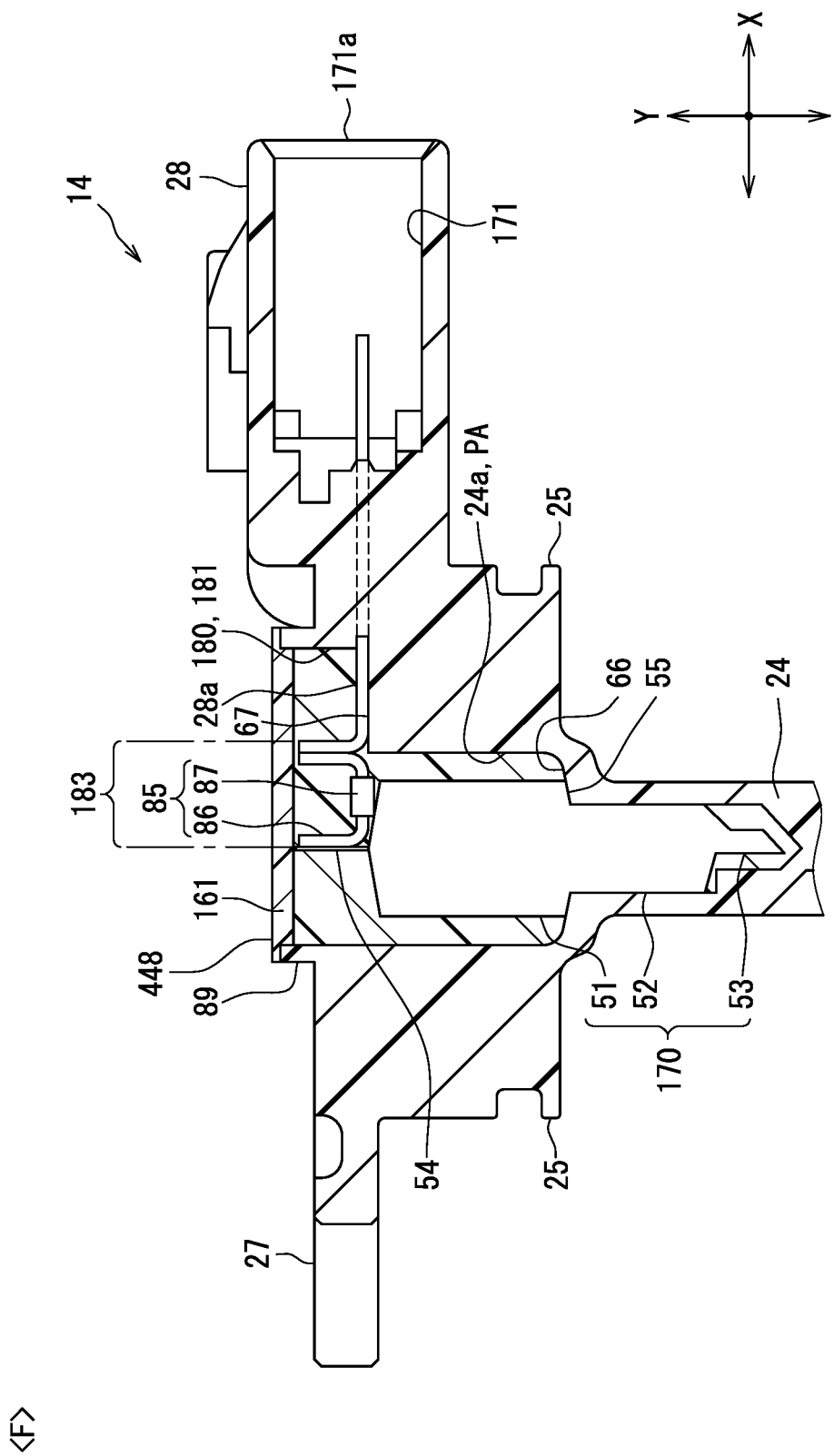
FIG. 107 is a vertical cross-sectional view of the housing.

As a configuration in which the cover member 448 covers the sensor SA 50 from the housing opening 61, as shown in FIG. 107, there is a configuration in which the potting portion 65 is not provided. In the above configuration, since the internal space 24*a* is not sealed by the potting portion 65, it is preferable that the cover member 262 seals the internal space 24*a*.

Further, in the fourth embodiment, as in Modification E6, as shown in FIG. 105, the sensor SA 220 installed in the internal space 204*a* is covered by the cover member 449 from the housing opening 241.

According to the above modification, the cover member 448 formed as a member different from the housing 21 is attached to the housing 21, so that the sensor SA 50 installed in the internal space 24*a* is covered and hidden by the cover member 448. When the cover member 448 is attached to the housing 21, a pressure is hardly applied to the internal space 24*a*, so that a positional deviation of the sensor SA 50 hardly occurs. Therefore, the detection accuracy of the flow rate detector 22 can be inhibited from varying from product to product.

Figure 108:
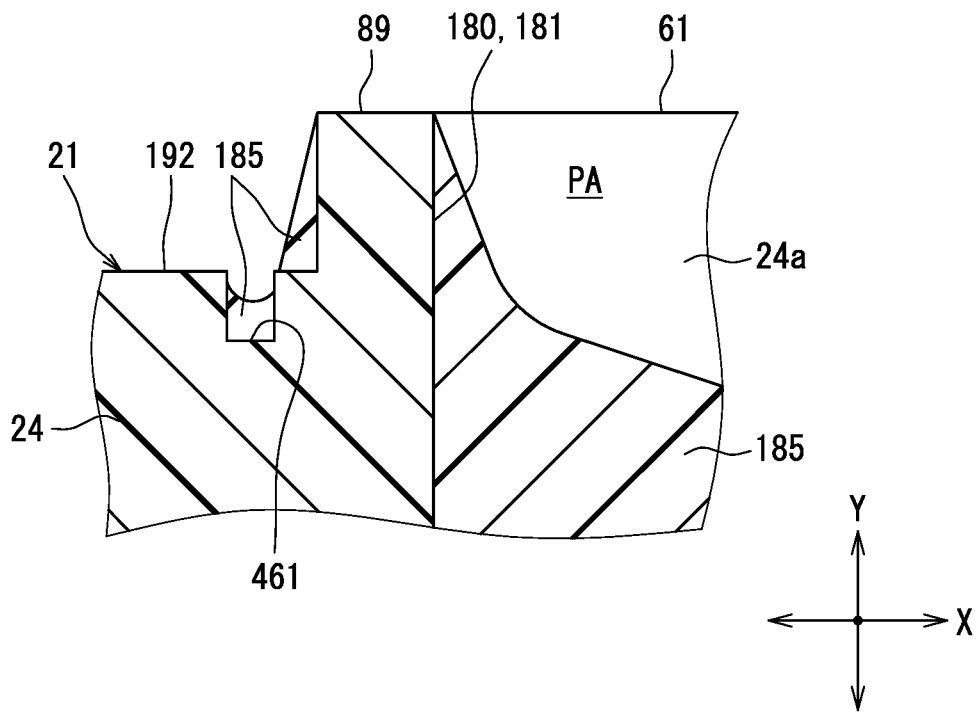
FIG. 108 is an enlarged view of the periphery of a lip periphery in Modification F2.

As Modification F2, the housing may have a storage groove for storing the thermosetting resin when the thermosetting resin overflows from the housing opening. For example, in the first embodiment, as shown in FIG. 108, the housing 21 has a storage groove 461 for storing the potting material 185 overflowing from the housing opening 61. The storage groove 461 extends annularly along a peripheral portion of the housing opening 61, and is disposed at a position separated from the lip 89 to the outer peripheral side on the side opposite to the sealing region PA across the lip 89. The storage groove 461 is provided in the housing base end face 192, which is the base end face of the housing 21, and is opened in the height direction Y.

The housing base end face 192 is formed by an outer peripheral surface of the housing body 24, an outer peripheral surface of the flange portion 27, or the like, and the storage groove 461 is provided in a portion of the housing base end face 192 formed by the outer peripheral surface of the housing body 24. The storage groove 461 may be provided in a portion of the housing base end face 192 formed by the outer peripheral surface of the flange portion 27.

In the present modification, even if the potting material 185 overflows from the housing opening 61 when the potting material 185 is injected into the internal space 24*a*, the overflowing potting material 185 is stored in the storage groove 461. For that reason, the potting material 185 spreads over a wider range than the storage groove 461, and the potting material 185 can be inhibited from adhering to an unintended portion such as the air flow meter 14 or the work table.

Figure 109:
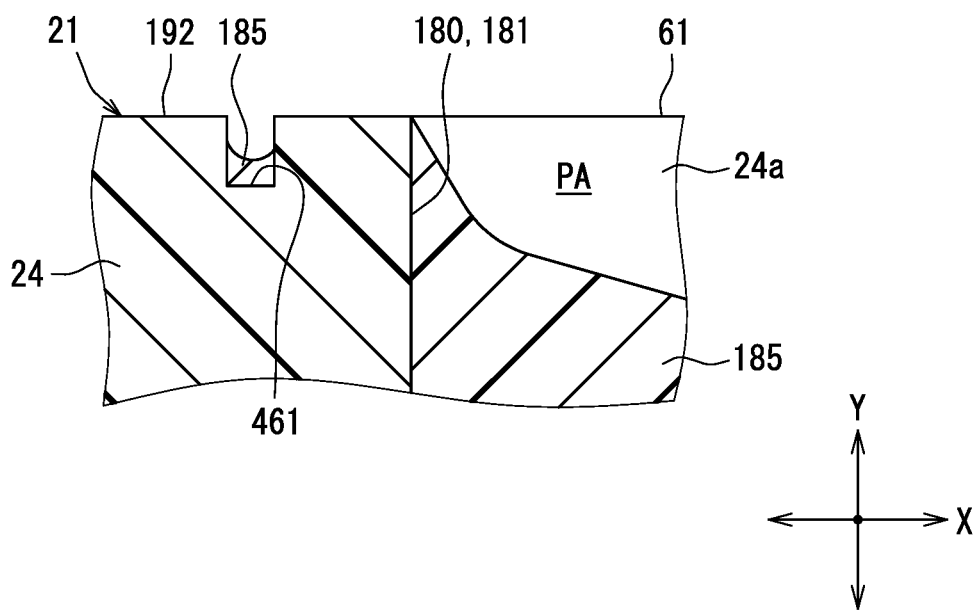
FIG. 109 is an enlarged view of the periphery of the lip in Modification F3.

As Modification F3, the housing does not have to have an open rib portion. For example, in the first embodiment, as shown in FIG. 109, the lip 89 as the open rib portion does not extend from the housing body 24, and the storage groove 461 is provided in the outer peripheral side of the housing opening 61, similarly to Modification F2. In the above configuration, the housing opening 61 is defined by the housing body 24 rather than the lip 89, and the storage groove 461 is disposed in the housing base end face 192. According to the above configuration, the potting material 185 overflowing from the housing opening 61 is stored in the storage groove 461 in the same manner as in Modification F2 described above.

Figure 110:
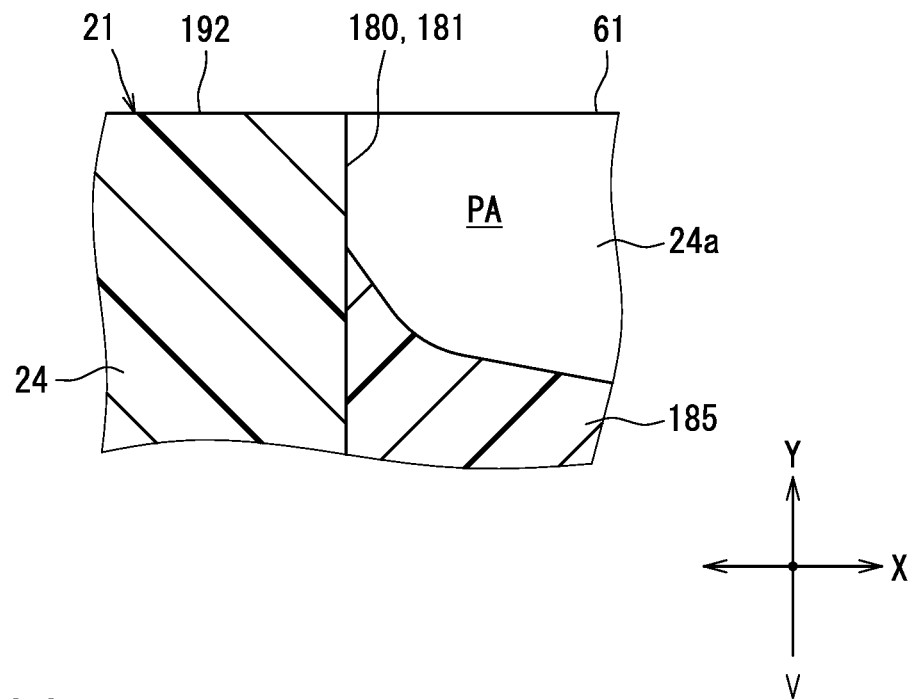
FIG. 110 is an enlarged view of the periphery of the lip.

As shown in FIG. 110, the housing 21 may not have both the lip 89 and the storage groove 461. Also, in the above configuration, the injection amount of the potting material 185 into the internal space 24*a* is adjusted so that a liquid surface or a fluid surface of the potting material 185 does not reach the housing opening 61, thereby being capable of inhibiting the potting material 185 from overflowing from the housing opening 61.

Figure 111:
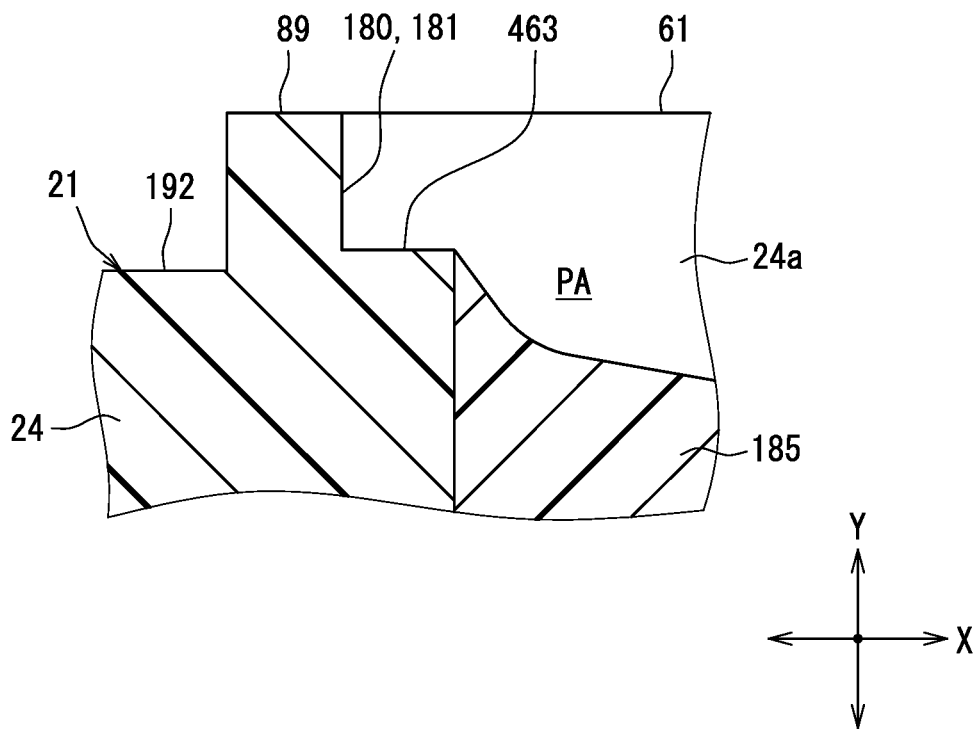
FIG. 111 is an enlarged view of the periphery of the lip in Modification F4.

As Modification F4, the inner peripheral surface of the open rib portion and the inner peripheral surface of the housing body may not be flush with each other, and a step may be formed between the inner peripheral surface of the open rib portion and the inner peripheral surface of the housing body. For example, in the first embodiment, as shown in FIG. 111, the inner peripheral surface of the lip 89 is disposed on the outer peripheral side of the inner peripheral surface of the housing body 24 in the inner peripheral surface 180 of the sealing region PA. In the above configuration, an opening step surface 463 facing the housing opening 61 is formed between the inner peripheral surface of the lip 89 and the inner peripheral surface of the housing body 24. The opening step surface 463 extends annularly along the peripheral portion of the housing opening 61 in the same manner as that of the lip 89.

According to the above configuration, when an operator injects the potting material 185 into the internal space 24*a*, it is preferable to adjust the injection amount of the potting material 185 so that the potting material 185 does not reach the opening step surface 463. In this case, even if the potting material 185 reaches the opening step surface 463, the potting material 185 has not yet reached the housing opening 61, and the potting material 185 can be inhibited from overflowing from the housing opening 61 beyond the lip 89.

Figure 112:
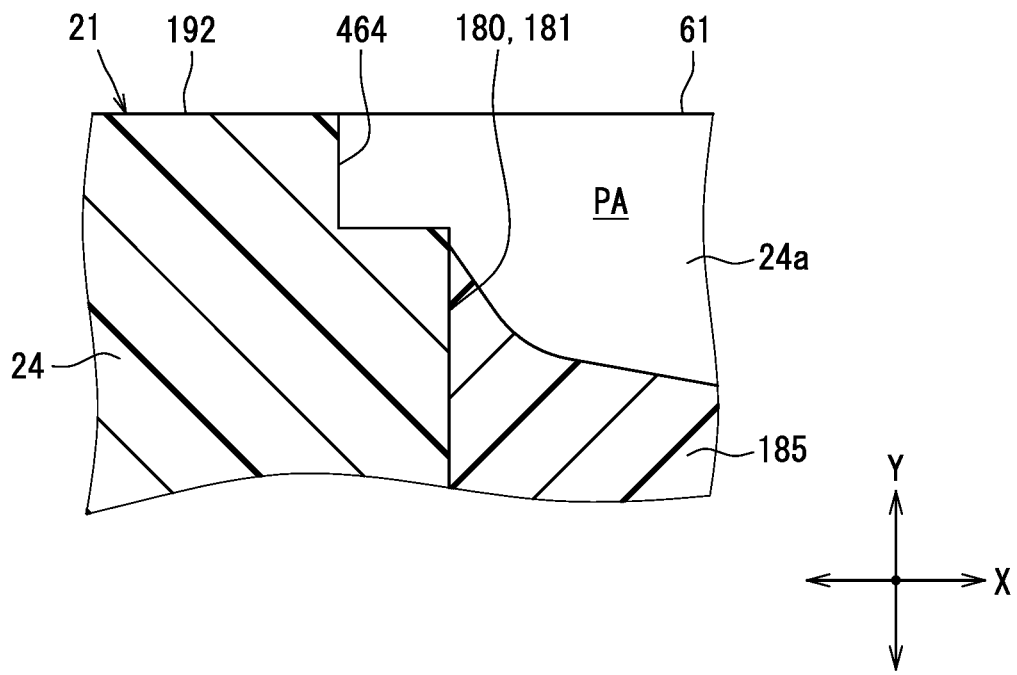
FIG. 112 is an enlarged view of the periphery of a lip in Modification F5.

As Modification F5, an inner peripheral recess portion recessed in the inner peripheral surface of the housing may be provided at the open end portion of the internal space. For example, in the first embodiment, as shown in FIG. 112, an inner peripheral recess portion 464 recessed in the inner peripheral surface 180 of the sealing region PA is provided at a position extending over the inner peripheral surface 180 and the housing base end face 192. The inner peripheral recess portion 464 is also open toward the housing opening 61 and extends annularly along the peripheral portion of the housing opening 61. The inner peripheral surface of the inner peripheral recess portion 464 forms an inner peripheral surface 180.

According to the above configuration, when the operator injects the potting material 185 into the internal space 24a, it is preferable to adjust the injection amount of the potting material 185 so that the potting material 185 does not reach the inner peripheral recess portion 464. In this case, even if the potting material 185 reaches the inner peripheral recess portion 464, the potting material 185 has not yet reached the housing opening 61, and the potting material 185 can be inhibited from overflowing from the housing opening 61 beyond the inner peripheral recess portion 464.

Figure 113:
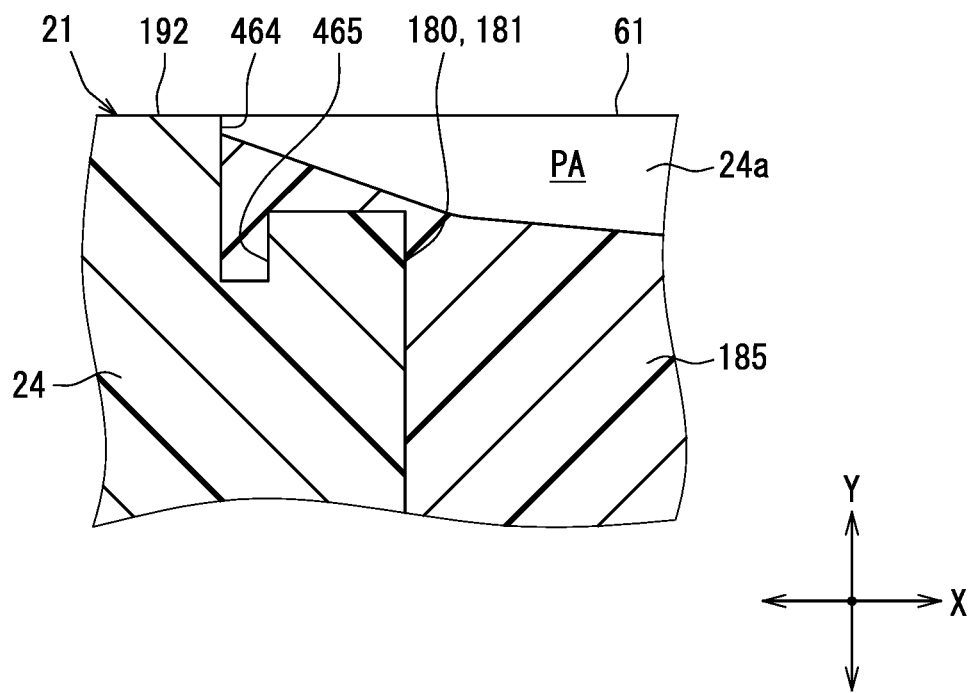
FIG. 113 is an enlarged view of the periphery of the lip.

Further, as shown in FIG. 113, a recess inner groove 465 for storing the potting material 185 that has entered an inside of an inner peripheral recess portion 464 is provided in the inner peripheral recess portion 464. The recess inner groove 465 is formed in a surface of the inner peripheral surface of the inner peripheral recess portion 464 facing the housing opening 61 side, and is opened toward the housing opening 61 side. The recess inner groove 465 extends annularly along the inner peripheral recess portion 464.

According to the above configuration, a volume of the inner peripheral recess portion 464 is increased by the volume of the recess inner groove 465. For that reason, even if the potting material 185 injected into the internal space 24a reaches the inner peripheral recess portion 464, the injection amount of the potting material 185 necessary until the potting material 185 reaches the housing opening 61 is increased. Therefore, the overflow of the potting material 185 from the housing opening 61 beyond the inner peripheral recess portion 464 is less likely to occur by the volume of the recess inner groove 465.

Figure 121:
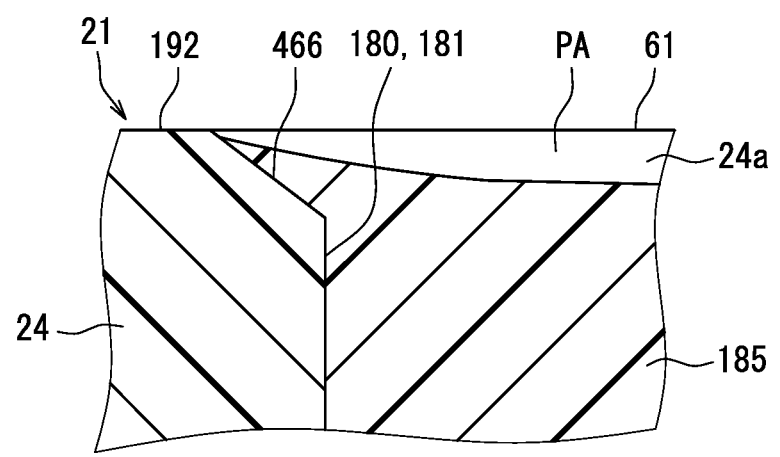

As Modification F6, a chamfered portion in which the inner peripheral end of the housing base end face is chamfered may be provided at the open end portion of the internal space. For example, in the first embodiment, as shown in FIG. 121, a chamfered portion 466 configured by chamfering an outgoing corner portion of the housing 21 is provided so as to extend over the housing base end face 192 and the inner peripheral surface 180. The chamfered portion 466 is a chamfered surface obtained by chamfering an outgoing corner portion where the housing base end face 192 and the inner peripheral surface 180 of the sealing region PA intersect with each other, and extends straight in the direction of gradually expanding the sealing region PA toward the housing base end face 192 in the height direction Y. The chamfered portion 466 extends annularly along the peripheral portion of the housing opening 61.

According to the above configuration, it is preferable to inject the potting material 185 into the internal space 24a until the potting material 185 reaches the chamfered portion 466 within a range in which the potting material 185 does not overflow from the internal space 24a. In that case, the potting material 185 easily creeps up the chamfered portion 466, and the potting surface 193 is expanded by the amount by which the potting material 185 creeps up the chamfered portion 466, so that the size of the information portion 194 to be applied to the potting surface 193 can be increased. As a result, the visibility of the information portion 194 can be enhanced.

The chamfered portion 466 may be a curved surface. Examples of the curved surface include a curved surface in which the chamfered portion 466 budges toward the housing base end face 192 in the height direction Y, and a curved surface in which the chamfered portion 466 is recessed toward the housing tip end face 191.

As Modification F7, the inner peripheral curved surface of the inner peripheral surface of the housing does not necessarily have to be curved as long as the inner peripheral curved surface is bent so as to bulge toward the outer peripheral side. For example, the inner peripheral curved surface may be bent at multiple locations so as to bulge toward the outer peripheral side. Even in this case, since the two inner peripheral flat surfaces intersecting with each other are connected to each other by the inner peripheral curved surfaces, the thermosetting resin can be inhibited from creeping up the inner peripheral surface of the housing when the thermosetting resin is injected into the internal space of the housing.

As Modification F8, in the case where the filling portion such as the potting portion 65 is formed by the filler such as the potting material 185, the filler may be slowly cured at room temperature, instead of forcibly curing the filling material by applying heat.

As Modification F9, as the filler filled in the internal space of the housing, not a thermosetting resin such as the potting material 185 is used, but a photocurable resin cured by irradiation of light or an ultraviolet curable resin cured by irradiation of ultraviolet rays may be used. As the filler, an adhesive which is hardened by exposure to air or application of water may be used. In short, the internal space may be filled with a curable resin which is cured by application of heat, light, air, water, or the like as a filler. Even in this case, the filler filled in the internal space is cured to form the filled portion. The filler is cured to such an extent that the shape of the filler can be maintained, thereby forming the filled portion.

<Modification of Configuration Group G>

As Modification G1, similarly to Modification F1, the internal space of the housing may be sealed by the cover member. For example, in the first embodiment, a cover member is molded with a resin as a member separate from the housing 21, and the cover member is attached to the housing 21 so as to close the internal space 24a from the housing opening 61 side. In the above configuration, the cover member corresponds to a sealing portion, and the information portion 194 is provided on the outer surface of the cover member. Also, in the above configuration, since the housing opening 61 and the internal space 24a are increased in size, the outer surface of the cover member is increased in size, so that the visibility of the information portion 194 can be enhanced.

As Modification G2, in the first embodiment, the SA main body 170 of the sensor SA 50 and the connector terminal 28a may be aligned in the depth direction Z. Even in this instance, when the sensor SA 50 is inserted into the internal space 24a from the housing opening 61, the connector terminal 28a can be inhibited from becoming troublesome.

As Modification G3, in the first embodiment, the housing opening 61 may not be oriented in the height direction Y, but may be oriented in the width direction X or the depth direction Z. Even in this instance, it is preferable that the housing opening 61 is disposed at a position opposed to the inflow port 33a across the sensor SA 50 and the ring holding portion 25 in the height direction Y. In other words, it is preferable that the potting surface 193 is disposed outside the intake pipe 12a in a state in which the air flow meter 14 is attached to the intake pipe 12a. As a result, the operator can visually recognize the information portion 194 of the potting surface 193 without removing the air flow meter 14 from the intake pipe 12a.

<Modification of Configuration Group H>

Figure 114:
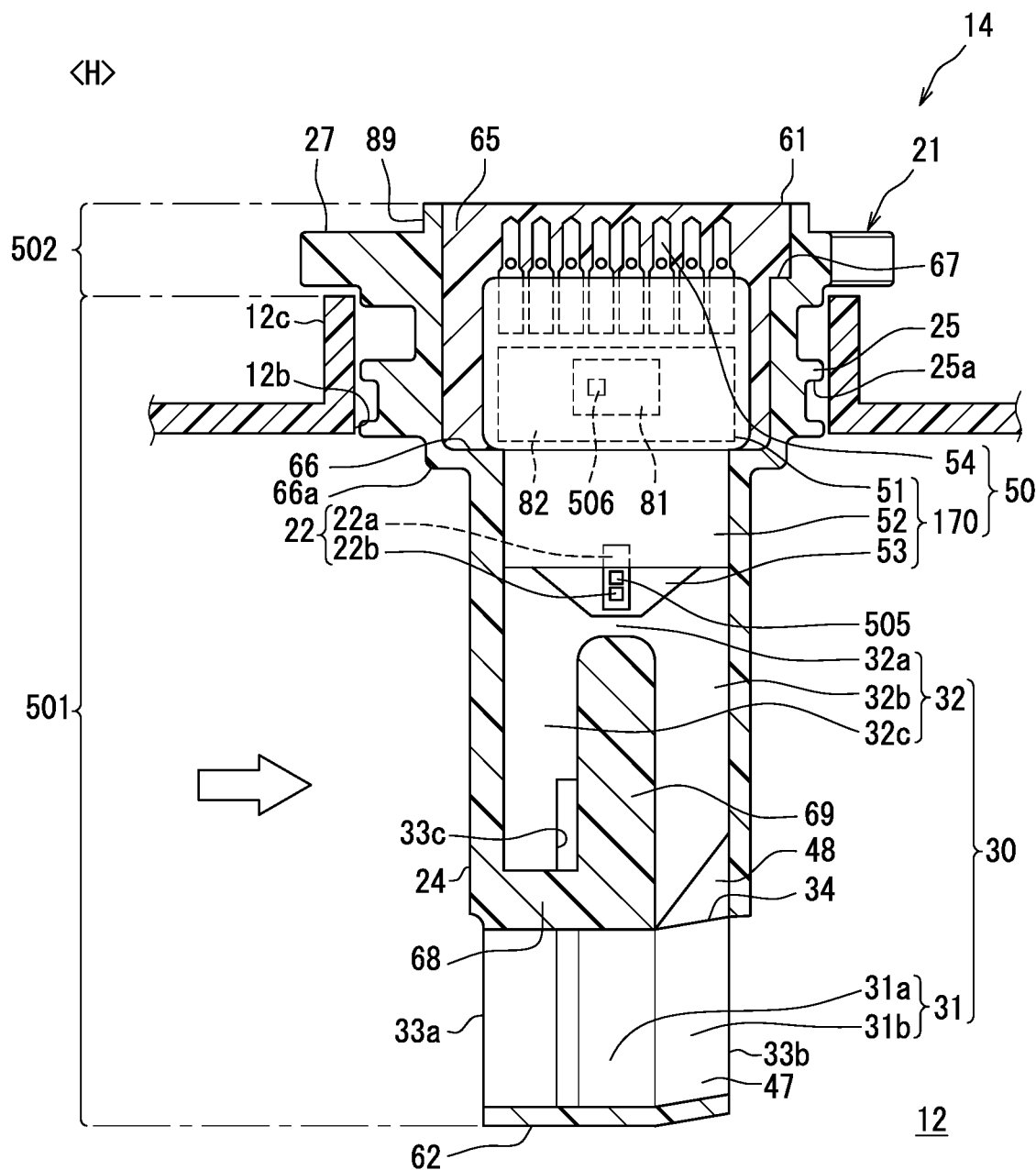
FIG. 114 is a vertical cross-sectional view of an air flow meter in a state of being attached to an intake pipe in Modification H1.

As Modification H1, in the first embodiment, the second temperature detector 506 may not be mounted on the lead frame 82 as long as the second temperature detector 506 is disposed between the housing base end face 192 and the first temperature detector 505. For example, as shown in FIG. 114, the second temperature detector 506 is mounted on the circuit chip 81. In the above configuration, a board of the circuit chip 81 corresponds to a circuit board on which elements of the second temperature detector 506 are mounted. The second temperature detector 506 may be mounted on the relay board 83, the lead terminal 54, or the like.

Figure 115:
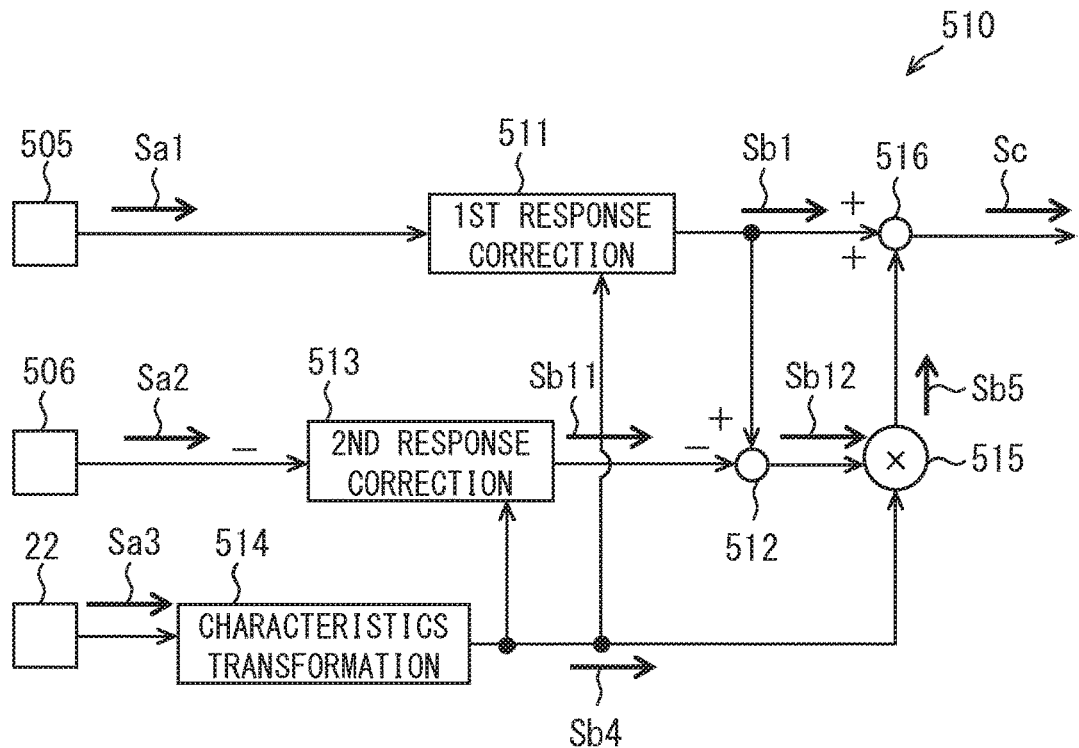
FIG. 115 is a block diagram showing an electrical configuration of a temperature correction unit in Modification H2.

As Modification H2, in the first embodiment, after the second correction signal is acquired by performing a response correction of the second temperature signal Sa2, a difference between the second correction signal and the first correction signal Sb1 may be calculated. For example, as shown in FIG. 115, the second correction unit 513 does not perform the response correction of the temperature differential signal Sb2, but performs the response correction of the second temperature signal Sa2.

The second correction unit 513 calculates a second correction signal Sb11 by performing the response correction of the second temperature signal Sa2, and outputs the second correction signal Sb11 to the temperature differential unit 512. The second correction unit 513 corrects the second temperature signal Sa2 with the use of a behavior of change of the second temperature signal Sa2 in the same manner as the first correction unit 511 corrects the first temperature signal Sa1 with the use of the behavior of change of the first temperature signal Sa1. The second correction unit 513 uses the flow rate signal Sa3 and the flow rate transformation signal sb4 to correct the second temperature signal Sa2 in the same manner as the first correction unit 511 uses the flow rate signal Sa3 and the flow rate transformation signal sb4 to correct the first temperature signal Sa1.

Rather than calculating the differential correction signal Sb3, the temperature differential unit 512 calculates a corrected differential signal Sb12 which is a difference between the first correction signal Sb1 and the second correction signal Sb11. The correction amount calculation unit 515 calculates a correction amount signal Sb5 with the use of the corrected differential signal Sb12 and the flow rate transformation signal sb4.

Also, in the above configuration, the second temperature signal Sa2 is used as a correction parameter for the correction of the first temperature signal Sa1. For that reason, even if the correction amount signal Sb5 is calculated with the use of the corrected differential signal Sb12 instead of the differential correction signal Sb3, the error of the correction value signal Sc with respect to an actual temperature Sd can be reduced. Therefore, as compared with the configuration in which the second correction signal Sb11 is not used for the correction of the first temperature signal Sa1, the measurement accuracy of the correction value signal Sc can be improved.

Figure 116:
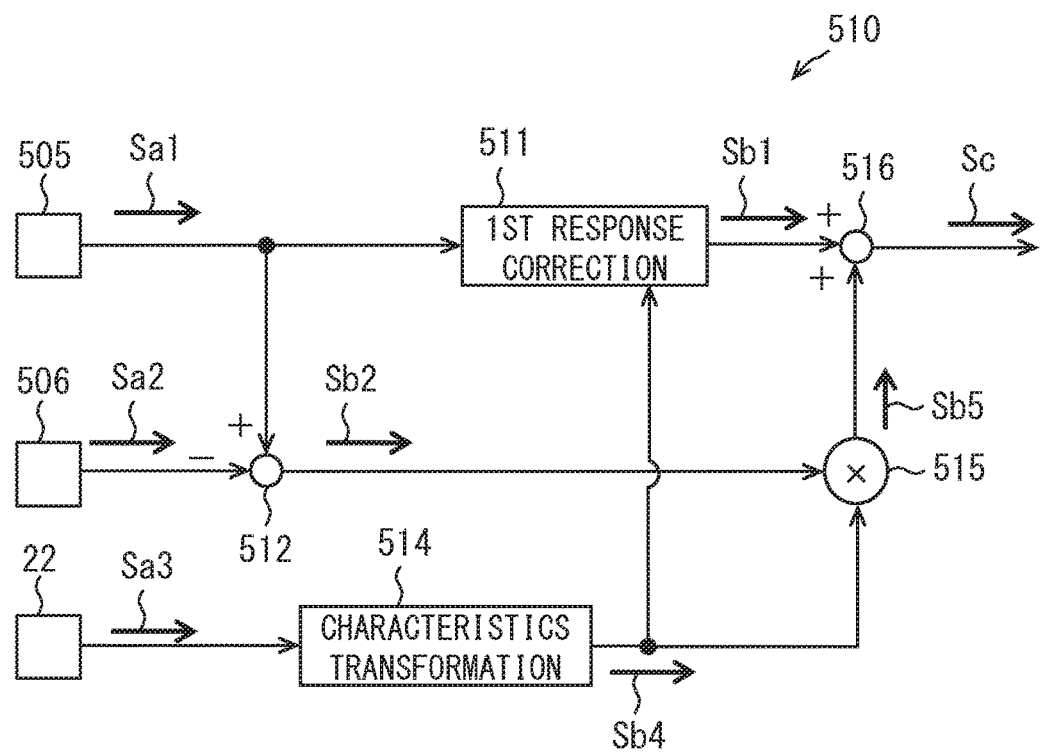
FIG. 116 is a block diagram showing an electrical configuration of a temperature correction unit in Modification H3.

As Modification H3, in the first embodiment, the response correction of the temperature differential signal Sb2 may not be performed. For example, as shown in FIG. 116, the temperature correction unit 510 does not have the second correction unit 513. In the above configuration, the temperature differential signal Sb2 calculated by the temperature differential unit 512 is input directly to the correction amount calculation unit 515. Also, in the above configuration, the second temperature signal Sa2 is used as the correction parameter for the correction of the first temperature signal Sa1 similarly to Modification H2 described above. For that reason, even if the correction amount signal Sb5 is calculated with the use of the temperature differential signal Sb2 instead of the differential correction signal Sb3, an error of the correction value signal Sc with respect to the actual temperature Sd can be reduced. Therefore, the measurement accuracy of the correction value signal Sc can be enhanced in the same manner as in Modification H2 described above.

Figure 117:
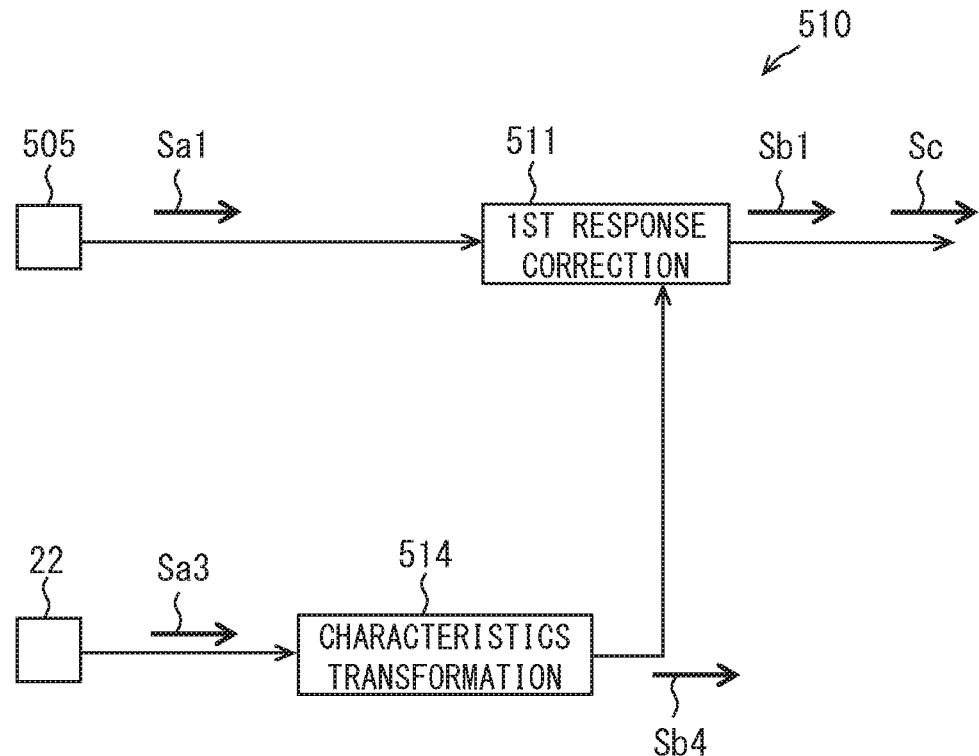
FIG. 117 is a block diagram showing an electrical configuration of a temperature correction unit in Modification H4.

As Modification H4, in the first embodiment, the second temperature signal Sa2 may not be used for correcting the first temperature signal Sa1. For example, as shown in FIG. 117, the temperature correction unit 510 does not include the temperature differential unit 512, the second correction unit 513, the correction amount calculation unit 515, and the correction value calculation unit 516. In the above configuration, the first correction signal Sb1 output from the first correction unit 511 is acquired as the correction value signal Sc. Also, in the above configuration, the behavior of change of the first temperature signal Sa1 and the flow rate signal Sa3 are used as the correction parameters for the correction of the first temperature signal Sa1. For that reason, even if the second temperature signal Sa2 is not used for the correction of the first temperature signal Sa1, the response of the correction value signal Sc to the actual temperature Sd can be enhanced. In the present modification, the air flow meter 14 does not need to have the second temperature detector 506.

Figure 118:
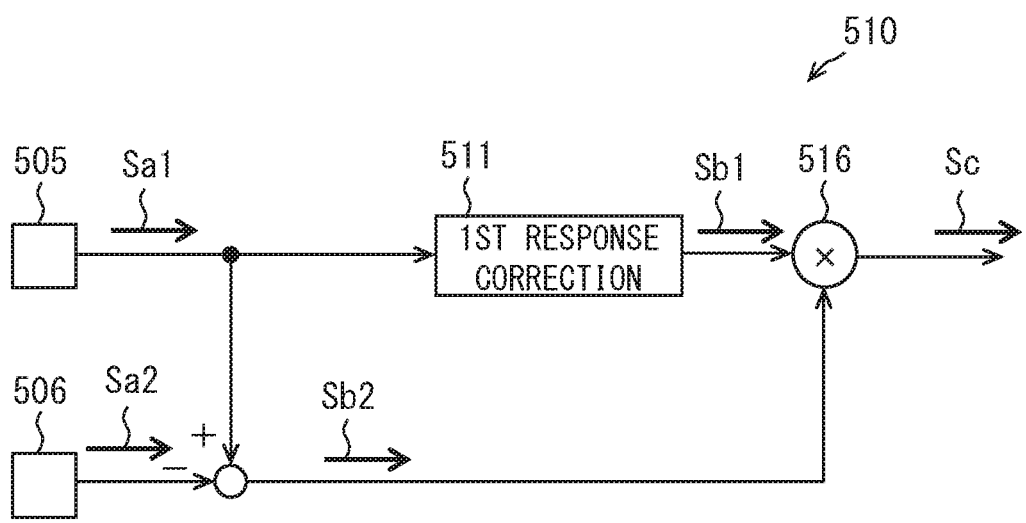
FIG. 118 is a block diagram showing an electrical configuration of a temperature correction unit in Modifications H5 and H7.

As Modification H5, in the first embodiment, the flow rate signal Sa3 may not be used to correct the first temperature signal Sa1. For example, as shown in FIG. 118, the temperature correction unit 510 does not include the second correction unit 513, the characteristic transformation unit 514, and the correction amount calculation unit 515. In the above configuration, the correction value calculation unit 516 calculates the correction value signal Sc with the use of the second temperature signal Sa2 instead of the correction amount signal Sb5. Also, in the above configuration, the second temperature signal Sa2 is used for correcting the first temperature signal Sa1 in the same manner as in Modification H2 described above. For that reason, even if the flow rate signal Sa3 is not used for the correction of the first temperature signal Sa1, the error of the correction value signal Sc with respect to the actual temperature Sd can be reduced. In the present modification, the air flow meter 14 does not need to have the flow rate detector 22.

Figure 119:
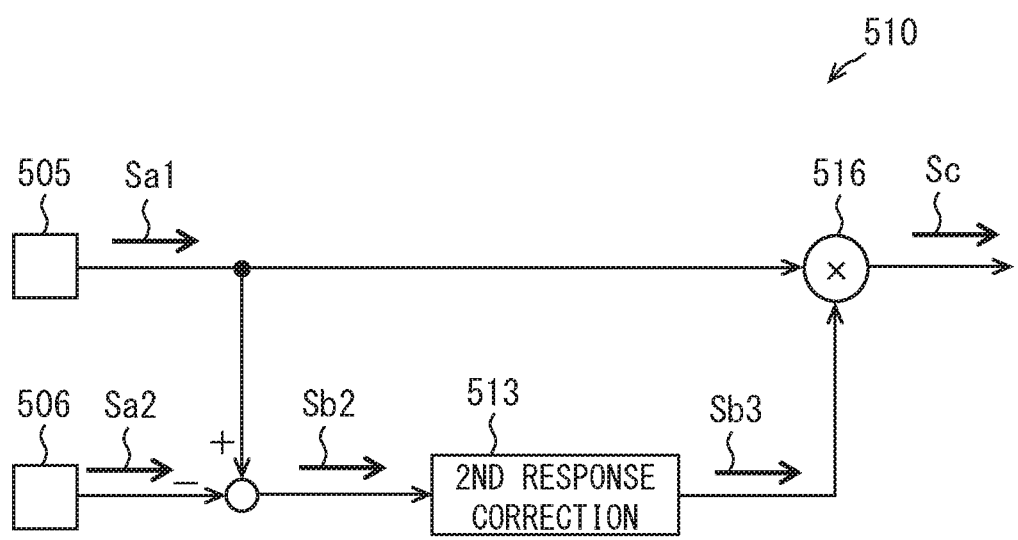
FIG. 119 is a block diagram showing an electrical configuration of a temperature correction unit in Modifications H6 and H7.

As Modification H6, in the first embodiment, the response correction of the first temperature signal Sa1 may not be performed. For example, as shown in FIG. 119, the temperature correction unit 510 does not include the first correction unit 511, the correction amount calculation unit 515, and the correction amount calculation unit 515. In the above configuration, the correction value calculation unit 516 calculates the correction value signal Sc with the use of the first temperature signal Sa1 instead of the first correction signal Sb1. Also, in the above configuration, the second temperature signal Sa2 is used for correcting the first temperature signal Sa1 in the same manner as in Modification H2 described above. For that reason, even if the behavior of change of the first temperature signal Sa1 is not used for the correction of the first temperature signal Sa1, the error of the correction value signal Sc with respect to the actual temperature Sd can be reduced.

As Modification H7, in the first embodiment, the correction value calculation unit 516 may calculate the correction value signal Sc by multiplying a signal based on the first temperature signal Sa1 by a signal based on the second temperature signal Sa2 or the flow rate signal Sa3 instead of integrating the signals. For example, as shown in FIG. 118, the correction value calculation unit 516 calculates the correction value signal Sc by multiplying the first correction signal Sb1 by the temperature differential signal Sb2. As shown in FIG. 119, the correction value calculation unit 516 multiplies the first temperature signal Sa1 by the differential correction signal Sb3 to calculate the correction value signal Sc.

As Modification H8, in the first embodiment, the first temperature detector 505 may not be mounted on the detection board 22a of the flow rate detector 22 as long as the first temperature detector 505 is disposed on the opposite side of the housing opening 61 across the second temperature detector 506 in the height direction Y. For example, the first temperature detector 505 is mounted on the relay board 83 or the lead frame 82.

As Modification H9, in the first embodiment, at least one of the first temperature detector 505 and the second temperature detector 506 may not be mounted on the sensor SA 50. For example, the first temperature detector 505 is embedded in the longitudinal partition wall 69 of the housing 21, or the second temperature detector 506 is mounted on the connector terminal 28a.

As Modification H10, in the first embodiment, the flow rate detector 22 and the first temperature detector 505 may be mounted on boards independent of each other as long as those detectors are provided in the measurement flow channel 32. The flow rate detector 22 and the first temperature detector 505 may be disposed at positions separated from each other in the height direction Y. Even in this instance, since the detection targets to be detected by the flow rate detector 22 and the first temperature detector 505 are intake air flowing through the measurement flow channel 32, the response of the first temperature signal Sa1 using the flow rate signal Sa3 can be enhanced.

As Modification H11, in the first embodiment, the physical quantity corrected based on its behavior of change is the temperature, but the correction target may be a physical quantity different from the temperature, such as the flow rate, humidity, and pressure of the intake air. For example, a first pressure detector for detecting a pressure is provided in the measurement flow channel 32 as a physical quantity detector, and a second pressure detector as the same kind-quantity detector for detecting a physical quantity of the same kind as the first pressure detector is disposed at a position closer to the housing base end face 192 than the first pressure detector. In the above configuration, in the measurement control device, the first pressure signal which is the detection result of the first pressure detector is corrected with the use of the second pressure signal which is the detection result of the second pressure detector.

In addition, the physical quantity measurement device has a temperature detector that detects a temperature as the different kind-quantity detector that detects a physical quantity of a kind different from the pressure, and in the measurement control device, the first pressure signal is corrected with the use of a temperature signal that is a detection result of the temperature detector. Further, in the measurement control device, the first pressure signal is corrected with the use of the behavior of change of the first pressure signal. According to those configurations, the accuracy of pressure measurement and the response of pressure measurement can be enhanced with respect to the measurement of pressure as a physical quantity.

As Modification H12, in the first embodiment, the measurement control device for correcting the first temperature signal Sa1 may be configured not by the circuit chip 81 but by another control device included in the air flow meter 14. In addition, the measurement control device may be provided in an external device such as an ECU 20 in addition to the air flow meter 14. For example, the first temperature signal Sa1, the second temperature signal Sa2, and the flow rate signal Sa3 are input to the ECU 20 from the first temperature detector 505, the second temperature detector 506, and the flow rate detector 202 through the circuit chip 81, respectively. Further, the measurement control device may be various arithmetic devices mounted on a vehicle, and multiple arithmetic devices may function as a control device in cooperation with each other. In addition, various programs may be stored in a non-transitory tangible storage medium such as a flash memory or a hard disk provided in each calculation device.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A physical quantity measurement device for measuring a physical quantity of a fluid, comprising:
    a measurement flow channel through which the fluid flows;
    a detection unit having a physical quantity detector that detects a physical quantity of the fluid in the measurement flow channel; and
    a housing that accommodates at least a part of the detection unit and forms the measurement flow channel, wherein
    the housing includes:
        a housing attachment that is attached to a predetermined attaching target; and
        a position holding wall holding a position of the detection unit by contacting the detection unit, wherein the housing includes an inward part positioned inward of the attaching target and an outward part positioned outward of the attaching target, and the position holding wall is provided inward of the housing attachment in an alignment direction along which the inward part and the outward part are aligned,
    the position holding wall includes a contact surface that holds the position of the detection unit by contacting the detection unit to prevent a movement of the detection unit toward the inward part in the alignment direction,
    the detection unit includes a first portion and a second portion,
    the second portion is located inward of the first portion in the alignment direction,
    the second portion is smaller than the first portion in both the alignment direction and a direction perpendicular to the alignment direction, an edge of the first portion of the detection unit has a unit contact portion that is a step surface between the first portion and the second portion and in contact with the contact surface, and the unit contact portion is provided at a position close to an end of the detection unit in the alignment direction, the physical quantity detector is provided closer to the end of the detection unit than the unit contact portion is, the detection unit has a plate surface extending in the alignment direction, the position holding wall is a housing wall portion forming an inner peripheral surface of the housing, and a separation distance between the position holding wall and the physical quantity detector is larger, in a direction orthogonal to the alignment direction and parallel to the plate surface, than a thickness dimension of the housing wall portion.

2. The physical quantity measurement device according to claim 1, wherein the position holding wall is thinner than the housing attachment.

3. The physical quantity measurement device according to claim 1, wherein one of two directions orthogonal to the alignment direction is defined as a first direction and the other is defined as a second direction, and the position holding wall includes at least one of:
  a first holding protrusion that holds the position of the detection unit by contacting the detection unit to prevent a movement of the detection unit in the first direction; and
  a second holding protrusion that holds the position of the detection unit by contacting the detection unit to prevent a movement of the detection unit in the second direction.

4. The physical quantity measurement device according to claim 3, wherein the first holding protrusion protrudes toward the detection unit in at least the first direction among the first direction and the second direction, and the second holding protrusion protrudes toward the detection unit in at least the second direction among the first direction and the second direction.

5. The physical quantity measurement device according to claim 1, wherein the housing has a housing connector that connects the housing attachment and the position holding wall.

6. The physical quantity measurement device according to claim 5, wherein the housing connector has an orthogonal portion extending from the position holding wall in a direction orthogonal to the alignment direction, and a separation distance between the orthogonal portion and the physical quantity detector is larger in the alignment direction than a thickness dimension of the orthogonal portion.

7. The physical quantity measurement device according to claim 1, wherein the housing attachment has a sealing holder that holds a sealing member which is in contact with the attaching target.

8. The physical quantity measurement device according to claim 1, wherein the housing includes:
  a housing opening that is provided outward of the position holding wall in the alignment direction; and
  an accommodation space that extends from the housing opening in the alignment direction toward the inward part and accommodates at least a part of the detection unit.

9. A physical quantity measurement device for measuring a physical quantity of a fluid, comprising:

a measurement flow channel through which the fluid flows;

a detection unit having a physical quantity detector that detects a physical quantity of the fluid in the measurement flow channel; and a housing that accommodates at least a part of the detection unit and forms the measurement flow channel, wherein the housing includes:
  a housing attachment that is attached to a predetermined attaching target; and
  a position holding wall holding a position of the detection unit by contacting the detection unit, wherein the housing includes an inward part positioned inward of the attaching target and an outward part positioned outward of the attaching target, and the position holding wall is provided inward of the housing attachment in an alignment direction along which the inward part and the outward part are aligned, the position holding wall includes a contact surface that holds the position of the detection unit by contacting the detection unit to prevent a movement of the detection unit toward the inward part in the alignment direction, the detection unit includes a first portion and a second portion, the second portion is located inward of the first portion in the alignment direction, the second portion is smaller than the first portion in both the alignment direction and a direction perpendicular to the alignment direction, an edge of the first portion of the detection unit has a unit contact portion that is a step surface between the first portion and the second portion and in contact with the contact surface, and the unit contact portion is provided at a position close to an end of the detection unit in the alignment direction, the physical quantity detector is provided closer to the end of the detection unit than the unit contact portion is, the housing has a housing connector that connects the housing attachment and the contact surface, the housing connector has an orthogonal portion extending from the contact surface in a direction orthogonal to the alignment direction, and a separation distance between the orthogonal portion and the physical quantity detector is larger in the alignment direction than a thickness dimension of the orthogonal portion.

10. A physical quantity measurement device for measuring a physical quantity of a fluid, comprising:

a measurement flow channel through which the fluid flows;

a detection unit having a physical quantity detector that detects a physical quantity of the fluid in the measurement flow channel; and a housing that accommodates at least a part of the detection unit and forms the measurement flow channel, wherein the housing includes:
  a housing attachment that is attached to a predetermined attaching target; and a position holding wall holding a position of the detection unit by contacting the detection unit, wherein the housing includes an inward part positioned inward of the attaching target and an outward part positioned outward of the attaching target, and the position holding wall is provided inward of the housing attachment in an alignment direction along which the inward part and the outward part are aligned, the position holding wall includes a contact surface that holds the position of the detection unit by contacting the detection unit to prevent a movement of the detection unit toward the inward part in the alignment direction, the detection unit has a unit contact portion that is in contact with the contact surface, and the unit contact portion is provided at a position close to an end of the detection unit in the alignment direction, the physical quantity detector is provided closer to the end of the detection unit than the unit contact portion is, the detection unit has a plate surface extending in the alignment direction, the position holding wall is a housing wall portion forming an inner peripheral surface of the housing, a separation distance between the position holding wall and the physical quantity detector is larger, in a direction orthogonal to the alignment direction and parallel to the plate surface, than a thickness dimension of the housing wall portion, and the housing includes:
- a housing opening that is provided outward of the position holding wall in the alignment direction; and
- an accommodation space that extends from the housing opening in the alignment direction toward the inward part and accommodates at least a part of the detection unit.

11. A physical quantity measurement device for measuring a physical quantity of a fluid, comprising:
- a measurement flow channel through which the fluid flows;
- a detection unit having a physical quantity detector that detects a physical quantity of the fluid in the measurement flow channel; and
- a housing that accommodates at least a part of the detection unit and forms the measurement flow channel, wherein the housing includes:
- a housing attachment that is attached to a predetermined attaching target; and
- a position holding wall holding a position of the detection unit by contacting the detection unit, wherein the housing includes an inward part positioned inward of the attaching target and an outward part positioned outward of the attaching target, and the position holding wall is provided inward of the housing attachment in an alignment direction along which the inward part and the outward part are aligned, the position holding wall includes a contact surface that holds the position of the detection unit by contacting the detection unit to prevent a movement of the detection unit toward the inward part in the alignment direction, the detection unit has a unit contact portion that is in contact with the contact surface, and the unit contact portion is provided at a position close to an end of the detection unit in the alignment direction, the physical quantity detector is provided closer to the end of the detection unit than the unit contact portion is, the housing has a housing connector that connects the housing attachment and the contact surface, the housing connector has an orthogonal portion extending from the contact surface in a direction orthogonal to the alignment direction, a separation distance between the orthogonal portion and the physical quantity detector is larger in the alignment direction than a thickness dimension of the orthogonal portion, and the housing includes:
- a housing opening that is provided outward of the position holding wall in the alignment direction; and
- an accommodation space that extends from the housing opening in the alignment direction toward the inward part and accommodates at least a part of the detection unit.

\* \* \* \* \*